US012812448B2

(12) United States Patent
Chun et al.

(10) Patent No.: US 12,812,448 B2
(45) Date of Patent: Nov. 24, 2026

(54) DATA UNIT HANDLING IN A WIRELESS SYSTEM BASED ON QUALITY-OF-SERVICE CONFIGURATION

(71) Applicant: Comcast Cable Communications, LLC, Philadelphia, PA (US)

(72) Inventors: SungDuck Chun, Fairfax, VA (US); Kyungmin Park, Vienna, VA (US); Esmael Hejazi Dinan, McLean, VA (US); Peyman Talebi Fard, Vienna, VA (US); Weihua Qiao, Herndon, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 531 days.

(21) Appl. No.: 18/163,502

(22) Filed: Feb. 2, 2023

(65) Prior Publication Data

US 2023/0247476 A1 Aug. 3, 2023

Related U.S. Application Data

(60) Provisional application No. 63/305,767, filed on Feb. 2, 2022.

(51) Int. Cl.
*H04W 28/02* (2009.01)
*H04W 28/06* (2009.01)

(52) U.S. Cl.
CPC ....... *H04W 28/0268* (2013.01); *H04W 28/06* (2013.01)

(58) Field of Classification Search
CPC .......................... H04W 28/0268; H04W 28/06
See application file for complete search history.

(56) References Cited

U.S. PATENT DOCUMENTS

| | | | | |
|---|---|---|---|---|
| 8,259,732 | B2 | 9/2012 | Torsner | |
| 8,855,047 | B2 | 10/2014 | Sammour et al. | |
| 2005/0195741 | A1* | 9/2005 | Doshi | H04L 47/805 370/230 |
| 2008/0212593 | A1* | 9/2008 | Niska | H04L 47/2408 370/400 |
| 2010/0228862 | A1* | 9/2010 | Myers | H04L 65/1045 709/227 |

(Continued)

FOREIGN PATENT DOCUMENTS

| | | | |
|---|---|---|---|
| EP | 3241324 | A1 | 11/2017 |
| WO | 2016107636 | A1 | 7/2016 |

OTHER PUBLICATIONS

Seong-Ryong Kang et al., "Multi-layer active queue management and congestion control for scalable video streaming," IEEE, Proceedings of the 24th International Conference on Distributed Computing Systems 2004.

(Continued)

*Primary Examiner* — Jeong S Park
(74) *Attorney, Agent, or Firm* — Banner & Witcoff, Ltd.

(57) ABSTRACT

Packets may be sent via a core network using one or more Quality of Service (QoS) flows. A QoS configuration may comprise information associated with a type of packet and/or a type of application data unit (ADU). At least one QoS configuration may be used for differentiated treatment of the packets sent using the one or more QoS flows. A packet may be prioritized over another packet based on a QoS configuration.

20 Claims, 45 Drawing Sheets

(56) References Cited

U.S. PATENT DOCUMENTS

| | | | | |
|---|---|---|---|---|
| 2012/0281566 | A1* | 11/2012 | Pelletier | H04W 76/27 370/252 |
| 2015/0215218 | A1 | 7/2015 | Kanamarlapudi et al. | |
| 2015/0358853 | A1 | 12/2015 | Kiss | |
| 2018/0199228 | A1* | 7/2018 | Van Phan | H04W 28/0257 |
| 2019/0053326 | A1 | 2/2019 | Lee et al. | |
| 2021/0029043 | A1* | 1/2021 | Dhanabalan | H04L 41/0894 |
| 2023/0269620 | A1* | 8/2023 | Rossbach | H04W 72/1263 370/329 |
| 2024/0373282 | A1* | 11/2024 | Sha | H04W 28/0263 |
| 2024/0414586 | A1* | 12/2024 | Yang | G06T 19/006 |

OTHER PUBLICATIONS

Mar. 23, 2023—European Search Report—EP Application No. 23154743.1.

3GPP TS 23.501 V17.2.0 (Sep. 2021), Technical Specification, 3rd Generation Partnership Project; Technical Specification Group Services and System Aspects; System architecture for the 5G System (5GS); Stage 2 (Release 17).

3GPP TS 23.502 V17.2.1 (Sep. 2021), Technical Specification, 3rd Generation Partnership Project; Technical Specification Group Services and System Aspects; Procedures for the 5G System (5GS); Stage 2 (Release 17).

3GPP TR 26.928 V16.1.0 (Dec. 2020), Technical Report 3rd, Generation Partnership Project; Technical Specification Group Services and System Aspects; Extended Reality (XR) in 5G (Release 16).

3GPP TS 29.060 V16.0.0 (Mar. 2020), Technical Specification, 3rd Generation Partnership Project; Technical Specification Group Core Network and Terminals; General Packet Radio Service (GPRS); GPRS Tunnelling Protocol (GTP) across the Gn and Gp interface (Release 16).

3GPP TS 29.122 V17.3.0 (Sep. 2021), Technical Specification, 3rd Generation Partnership Project; Technical Specification Group Core Network and Terminals; T8 reference point for Northbound APIs; (Release 17).

3GPP TS 29.212 V17.1.0 (Sep. 2021), Technical Specification, 3rd Generation Partnership Project; Technical Specification Group Core Network and Terminals; Policy and Charging Control (PCC); Reference points (Release 17).

3GPP TS 29.244 V17.3.0 (Dec. 2021), Technical Specification, 3rd Generation Partnership Project; Technical Specification Group Core Network and Terminals; Interface between the Control Plane and the User Plane Nodes; Stage 3 (Release 17).

3GPP TS 29.281 V16.2.0 (Mar. 2021), Technical Specification, 3rd Generation Partnership Project; Technical Specification Group Core Network and Terminals; General Packet Radio System (GPRS) Tunnelling Protocol User Plane (GTPv1-U) (Release 16).

3GPP TS 29.522 V17.3.0 (Sep. 2021), Technical Specification, 3rd Generation Partnership Project; Technical Specification Group Core Network and Terminals; 5G System; Network Exposure Function Northbound APIs; Stage 3 (Release 17).

3GPP TS 36.322 V16.0.0 (Jul. 2020), Technical Specification, 3rd Generation Partnership Project; Technical Specification Group Radio Access Network; Evolved Universal Terrestrial Radio Access (E-UTRA); Radio Link Control (RLC) protocol specification (Release 16).

3GPP TS 37.324 V16.3.0 (Jun. 2021), Technical Specification, 3rd Generation Partnership Project; Technical Specification Group Radio Access Network; E-UTRA and NR; Service Data Adaptation Protocol (SDAP) specification (Release 16).

3GPP TS 38.300 V16.7.0 (Sep. 2021), Technical Specification, 3rd Generation Partnership Project; Technical Specification Group Radio Access Network; NR; NR and NG-RAN Overall Description; Stage 2 (Release 16).

3GPP TS 38.322 V16.2.0 (Dec. 2020), Technical Specification, 3rd Generation Partnership Project; Technical Specification Group Radio Access Network; NR; Radio Link Control (RLC) protocol specification (Release 16).

3GPP TS 38.323 V16.4.0 (Jun. 2021), Technical Specification, 3rd Generation Partnership Project; Technical Specification Group Radio Access Network; NR; Packet Data Convergence Protocol (PDCP) specification (Release 16).

3GPP TS 38.331 V16.5.0 (Jun. 2021) 3rd Generation Partnership Project; Technical Specification Group Radio Access Network; NR; Radio Resource Control (RRC) protocol specification (Release 16).

3GPP TS 38.413 V16.7.0 (Oct. 2021) 3rd Generation Partnership Project; Technical Specification Group Radio Access Network; NG-RAN; NG Application Protocol (NGAP) (Release 16).

3GPP TS 38.415 V16.5.0 (Jul. 2021) 3rd Generation Partnership Project; Technical Specification Group Radio Access Network; NG-RAN; PDU Session User Plane Protocol (Release 16).

R2-163775 3GPP TSG-RAN WG2 Meeting #93b, Dubrovnik, Croatia, Apr. 11-15, 20, Source: Fujitsu, Title: Radio Bearer Handling and Challenges for 5G.

R2-166571 3GPP TSG-RAN WG2 Meeting #95bis, Kaohsiung, Taiwan, Oct. 10-14, 2016, Source: Qualcomm Incorporated, Title: Throughput prediction and network assisted DASH.

R2-166574 3GPP TSG-RAN WG2 Meeting #95bis, Kaohsiung, Taiwan, Oct. 10-14, 2016, Source: Qualcomm Incorporated, CMCC, Huawei, Title: Radio-aware TCP optimization.

R2-166576 3GPP TSG-RAN WG2 Meeting #95bis, Kaohsiung, Taiwan, Oct. 10-14, 2016, Source: Qualcomm Incorporated, CMCC, Huawei, Title: Text proposal for radio-aware TCP optimization.

R2-166583 3GPP TSG-RAN WG2 Meeting #95bis, Kaohsiung, Taiwan, Oct. 10-14, 2016, Source: Intel Corporation, Title: Impact analysis of critical data discard on UL Video transmission.

R2-166585 3GPP TSG-RAN WG2 Meeting #95bis, Kaohsiung, Taiwan, Oct. 10-14, 2016, Source: Qualcomm Incorporated, CMCC, Title: Text proposal for service information acquisition and UE assisted local cache.

R2-166597 3GPP TSG-RAN WG2 Meeting #95bis, Kaohsiung, Taiwan, Oct. 10-14, 2016, Source: Huawei, HiSilicon, Qualcomm Incorporated, CMCC, Title: Discussion on the solution on video optimization.

R2-166642 3GPP TSG-RAN WG2 Meeting #95bis, Kaohsiung, Taiwan, Oct. 10-14, 2016, Source: Nokia, Alcatel-Lucent Shanghai Bell, Title: Considerations on CASD issues.

R2-1700191 3GPP TSG-RAN WG2 NR, Spokane, USA, Jan. 17-19, 2017, Source: MediaTek Inc., Title: User Plane Enhancements for TCP Performance.

R2-1703311 3GPP TSG-RAN WG2 #97bis, Spokane, USA, Apr. 3-7, 2017, Source: Ntt Docomo, Inc., Fujitsu, Title: Potential hurdle in maximising DL TCP throughput.

R2-1703524 3GPP TSG-RAN WG2 #97bis, Spokane, USA, Apr. 3-7, 2017, Source: MediaTek Inc., Title: Impact of blockage on TCP performance in high frequency scenarios.

R2-1704060 3GPP TSG-RAN2 #98, Hangzhou, China, May 15-19, 2017, Source: OPPO, Title: Discussion on open issues of eVideo.

R2-1704757 3GPP TSG-RAN2 #98, Hangzhou, China, May 15-19, 2017, Source: Intel Corporation, Title: Enhancements to critical data discard on video.

R2-1707777 3GPP TSG-RAN2 #99, Hangzhou, Berlin, Germany, Aug. 21-25, 2017, Source: OPPO, Title: Discussion on open issues of eVideo.

R3-162790 3GPP TSG RAN WG3 Meeting #94, Hangzhou, Reno, USA, Nov. 14-18, 2016, Source: Intel Corporation, Title: Impact analysis of critical data discard on UL Video transmission and TP to address solutions for issue 4.

RP-180346, 2018/03/12, Source: MediaTek Inc.

RP-213587 3GPP Tsg Ran Meeting #94e, Electronic Meeting, Dec. 6-17, 2021, Source: Nokia (Email discussion moderator), Title: New SID “Study on XR Enhancements for NR”.

S1-202120, 2020/05/08, Source: Huawei, Title: Motivation for R18 5G multimedia enhancements SID.

S1-203149 3GPP TSG-SA WG1 Meeting #91-e, e-meeting, Aug. 24-Sep. 2, 2020, Source: Huawei, Title: Motivation for network efficiency for wideband media services.

S2-2105434 3GPP TSG-TSA2 Meeting # 146E, E-meeting, Aug. 16-27, 2021, Source: Ericsson, Deutsche Telekom, AT&T, Verizon, Apple, T-Mobile USA Inc., Telefonica S.A., MediaTek Inc., CableLabs, Title: Use of L4S in 5GS.

(56) References Cited

OTHER PUBLICATIONS

S2-2109360 SA WG2 Meeting #S2-148E, E-meeting, Aug. 16-27, 2021, Source: China Mobile, Huawei, Hisilicon, Tencent, Xiaomi, Title: New SID on Study on architecture enhancement for XR and media services.
S4-210612 3GPP TSG SA WG4 #113e, E-meeting, Apr. 6-14, 2021, Source: Qualcomm Incorporated, Title: [FS_XRTraffic] SA4 and RAN1 Collaboration Proposal.
S4-210640 F3GPP TSG SA WG4 113-e, Apr. 6-14, 2021, Source: Tencent, Title: [FS_5GMS-EXT] Updated text for Content Preparation.
SP-210620 3GPP SA Rel. 18 Workshop, Sep. 9-10, 2021, Title: System Architecture (SA2) Rel 18 priorities, Source: Source: Qualcomm.

* cited by examiner

DATA UNIT HANDLING IN A WIRELESS SYSTEM BASED ON QUALITY-OF-SERVICE CONFIGURATION

CROSS-REFERENCE TO RELATED APPLICATIONS

This application claims the benefit of U.S. Provisional Application No. 63/305,767, filed on Feb. 2, 2022. The above referenced application is hereby incorporated by reference in its entirety.

BACKGROUND

A wireless device is configured by a base station for wireless communications between the wireless device and the base station. A protocol data unit (PDU) session is established for wireless communications between the wireless device and a core network via the base station. The PDU session uses quality of service (QoS) flows to address QoS requirements of wireless communications.

SUMMARY

The following summary presents a simplified summary of certain features. The summary is not an extensive overview and is not intended to identify key or critical elements.

A wireless device may communicate with an application server via a core network. For example, an application at the wireless device may communicate with an application at the application server. An application may generate application data units (ADUs). ADUs may be packetized for sending via the core network. One or more QoS configurations may be used to prioritize different types of packets and/or packets associated with different types of ADUs. By using QoS configurations to prioritize different types of packets as described herein, advantages may be achieved such as improved quality of experience (QoE), improved throughput, reduced delay, reduction of wasted resources, alleviation of congestion, and/or other advantages described herein.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1A:
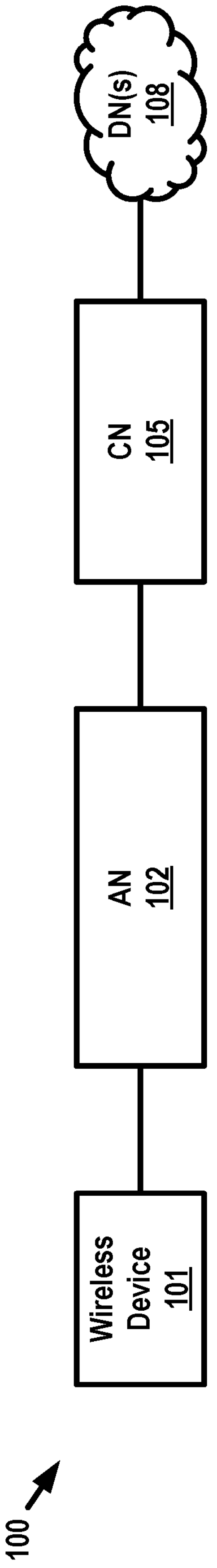
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to a multiple access procedure for wireless communications.

FIG. 1A shows an example communication network 100. The communication network 100 may comprise, for example, a public land mobile network (PLMN) operated/managed/run by a network operator. The communication network 100 comprise one or more of a wireless device 101, an access network (AN) 102, a core network (CN) 105, and/or one or more data network(s) (DNS) 108.

The wireless device 101 may communicate with DNs 108, for example, via AN 102 and/or CN 105. As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, an unmanned aerial vehicle, an urban air mobility aircraft, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The AN 102 may connect the wireless device 101 to the CN 105. A communication direction from the AN 102 to the wireless device 101 may be referred to as a downlink and/or a downlink communication direction. The communication direction from the wireless device 101 to the AN 102 may be referred to as an uplink and/or an uplink communication direction. Downlink transmissions may be separated and/or distinguished from uplink transmissions using frequency division duplexing (FDD), time-division duplexing (TDD), any other duplexing and/or multiplexing schemes, and/or some combination of the two duplexing techniques. The AN 102 may connect to and/or communicate with wireless device 101 via radio communications over an air interface. An AN that at least partially operates over the air interface may be referred to as a radio access network (RAN). A RAN may comprise one or more of: a radio unit (RU), distributed unit (DU), and/or a centralized unit (CU). A RAN may operate in a virtualized and/or in a non-virtualized environment. A RAN may perform one or more network functions in hardware. A RAN may perform one or more network functions in software. A RAN may perform one or more network functions in hardware and/or software. The CN 105 may set up/configure one or more end-to-end connections between wireless device 101 and the one or more DNs 108. The CN 105 may authenticate wireless device 101, provide a charging functionality, and/or provide/configure one or more additional functionalities/services for the wireless device 101.

As used throughout, the term "base station" may refer to, comprise, and/or encompass any element of the AN 102 that facilitates communication between wireless device 101 and the AN 102 (and/or any other elements of the communication network 100). A base station may comprise an RU. ANs and base stations may be referred to by other terminologies and/or may have other implementations. The base station may be a terrestrial base station at a fixed location on the earth. The base station may be a mobile base station with a moving coverage area. The base station may be on an aerial vehicle and/or may be located in space. For example, the base station may be on board an aircraft or a satellite. The RAN may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

The base station may be referred to using different terminologies in different communication standards/protocols. For example, WiFi and other standards may use the term access point. The Third-Generation Partnership Project (3GPP) has produced specifications for three generations of mobile networks, each of which uses a different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use different terminologies to refer to the elements/components which implement the methods described in the present disclosure (e.g., wireless devices, base stations, ANs, CNs, components thereof, and/or other elements in a communication network). A base station may be and/or comprise a repeater or relay node used to extend the coverage area of a donor node. A repeater node may amplify and rebroadcast a radio signal received from a donor node. A relay node may perform the same/similar functions as a repeater node. A relay node may decode radio signals received from the donor node (e.g., to remove noise) before amplifying and rebroadcasting the radio signal.

The AN 102 may include one or more base stations. The one or more base stations may have/serve one or more coverage areas. A geographical size and/or an extent of a coverage area may be based on a range at which a receiver of AN 102 can successfully receive transmissions from a transmitter (e.g., the wireless device 101) operating within the coverage area (and/or vice-versa). The coverage areas may be referred to as sectors or cells. In some contexts, the term cell may refer to a carrier frequency used in a particular coverage area. Base stations with large coverage areas may be referred to as macrocell base stations. Base stations may cover/serve smaller areas, for example, to provide coverage in areas/locations with weak macrocell coverage, and/or to provide additional coverage in areas with high traffic (e.g., referred to as hotspots). Examples of small cell base stations comprise (e.g., in order of decreasing coverage areas) microcell base stations, picocell base stations, femtocell base stations, and/or home base stations. In combination, the coverage areas of the base stations may provide radio coverage/service to the wireless device 101 over a wide geographic area to support wireless device mobility.

A base station may comprise one or more sets of antennas for communicating with the wireless device 101 over an air interface. Each set of antennas may be separately controlled by the base station. Each set of antennas may have a corresponding coverage area. For example, a base station may comprise three sets of antennas to respectively control three coverage areas (e.g., on three different sides) of the base station. A base station may comprise any quantity of antennas, which may correspond to any quantity of coverage areas. The entirety of the base station (and its corresponding antennas) may be deployed at a single location or at a plurality of locations. A controller (e.g., at a central location) may control/operate one or more sets of antennas at one or more distributed locations. The controller may be, for example, a baseband processing unit that comprises a centralized and/or cloud-based RAN architecture. The baseband processing unit may be either centralized in a pool of baseband processing units or may be virtualized. A set of antennas at a distributed location may be referred to as a remote radio head (RRH).

Figure 1B:
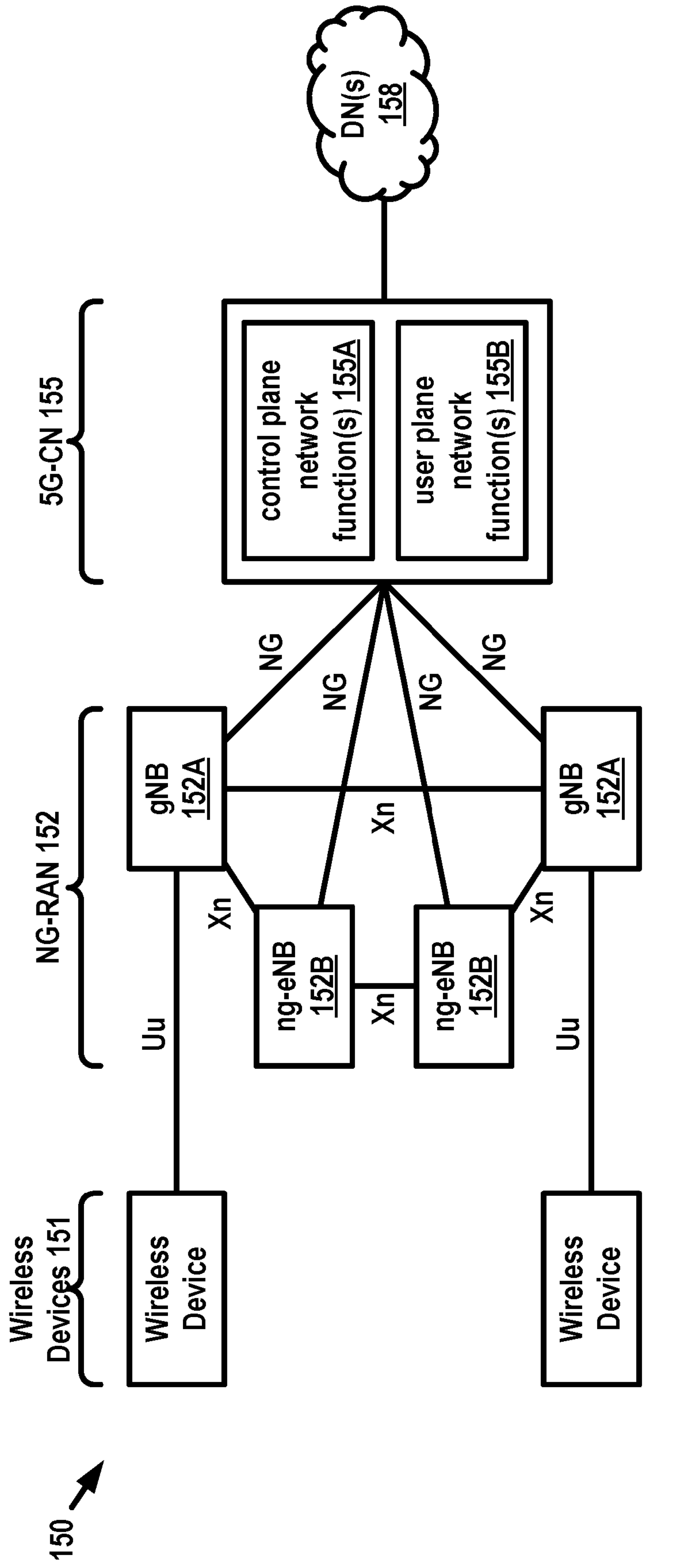

FIG. 1B shows another example communication network 150. The communication network 150 may comprise, for example, a PLMN operated/run by a network operator. The communication network 150 may comprise wireless devices 151, a next generation radio access network (NG-RAN) 152, a 5G core network (5G-CN) 155, and one or more DNs 158. The NG-RAN 152 may comprise one or more base stations (e.g., generation node Bs (gNBs) 152A and/or next generation evolved Node Bs (ng eNBs) 152B). The 5G-CN 155 may comprise one or more network functions (NFs). The one or more NFs may comprise control plane functions 155A and user plane functions 155B. The one or more DNs 158 may comprise public DNS (e.g., the Internet), private DNs, and/or intra-operator DNs. The components/elements shown in FIG. 1B may represent specific implementations and/or terminology of components/elements shown in FIG. 1A.

The base stations of the NG-RAN 152 may be connected to the wireless devices 151 via one or more Uu interfaces. The base stations of the NG-RAN 152 may be connected to each other via one or more first interface(s) (e.g., Xn interface(s)). The base stations of the NG-RAN 152 may be connected to 5G-CN 155 via one or more second interfaces (e.g., NG interface(s)). An interfaces may comprise one or more air interfaces, direct physical connections, indirect connections, and/or combinations thereof. For example, the Uu interface may comprise an air interface. The NG and Xn interfaces may comprise an air interface, direct physical connections, and/or indirect connections over an underlying transport network (e.g., an internet protocol (IP) transport network).

Each of the Uu, Xn, and NG interfaces may be associated with a protocol stack. The protocol stacks may comprise a user plane (UP) protocol stack and a control plane (CP) protocol stack. User plane data may comprise data corresponding to (e.g., associated with and/or pertaining to) users of the wireless devices 151. For example, user plane data may comprise internet content downloaded via a web browser application, sensor data uploaded via a tracking application, and/or email data communicated to and/or from an email server. Control plane data may comprise signaling and/or control message messages. For example, control plane data may facilitate packaging and routing of user plane data such that the user plane data may be communicated with (e.g., sent to and/or received from) the DN(s). The NG interface may be divided into (e.g., may comprise) an NG user plane interface (NG-U) and an NG control plane interface (NG-C). The NG-U interface may provide/perform delivery of user plane data between the base stations and the one or more user plane network functions 155B. The NG-C interface may be used for control signaling between the base stations and the one or more control plane network functions 155A. The NG-C interface may provide, for example, NG interface management, wireless device context management, wireless device mobility management, transport of non-access stratum (NAS) messages, paging, protocol data unit (PDU) session management, and configuration transfer and/or warning message transmission. In at least some scenarios, the NG-C interface may support transmission of user data (e.g., a small data transmission for an IoT device).

One or more of the base stations of the NG-RAN 152 may be split into a central unit (CU) and one or more distributed units (DUs). A CU may be coupled to one or more DUs via an interface (e.g., an F1 interface). The CU may handle one or more upper layers in the protocol stack and the DU may handle one or more lower layers in the protocol stack. For example, the CU may handle a radio resource control (RRC) layer, a physical data convergence protocol (PDCP) layer, and/or a service data application protocol (SDAP) layer, and the DU may handle radio link control (RLC) layer, a medium access control (MAC) layer, and/or a physical (PHY) layer. The one or more DUs may be in geographically diverse locations relative to the CU and/or each other. The CU/DU split architecture may permit increased coverage and/or better coordination.

The gNBs 152A and ng-eNBs 152B may provide different user plane and control plane protocol termination towards the wireless devices 151. For example, the gNB 154A may provide new radio (NR) protocol terminations over a Uu interface associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate wireless devices 151, set up end-to-end connections between wireless devices 151 and the one or more DNs 158, and/or provide charging functionality. The 5G-CN 155 may be based on a service-based architecture. The service-based architecture may enable the NFs comprising the 5G-CN 155 to offer services to each other and to other elements of the communication network 150 via interfaces. The 5G-CN 155 may include any quantity of other NFs and any quantity of instances of each NF.

FIG. 2A, FIG. 2B, FIG. 2C, and FIG. 2D show example frameworks for a service-based architecture within a core network. A service, in a service-based architecture, may be requested/sought by a service consumer and provided by a service producer. An NF may determine, prior to obtaining the requested service, where the requested service may be obtained. The NF may communicate with a network repository function (NRF) to discover a service. For example, an NF that provides one or more services may register with a network repository function (NRF). The NRF may store data relating to the one or more services that the NF is prepared to provide to other NFs in the service-based architecture. A consumer NF may query the NRF to discover/determine a producer NF. For example, the consumer NF may obtain, from the NRF, a list of NF instances that provide a particular service).

Figure 2A:
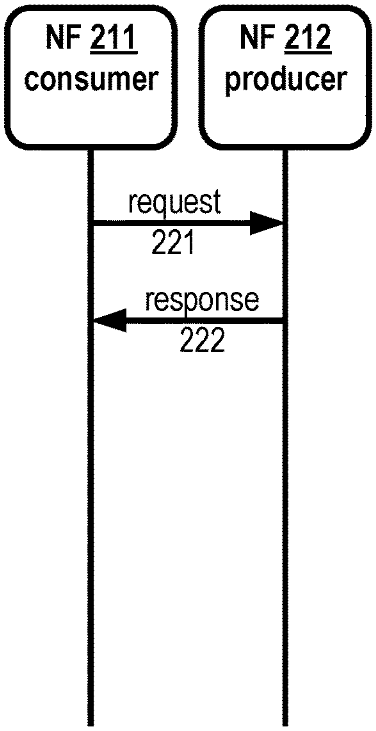
FIG. 2A, FIG. 2B, FIG. 2C, and FIG. 2D show examples frameworks for a service-based architecture within a core network.

As shown in FIG. 2A, an NF 211 (e.g., a consumer NF) may send a request 221 to an NF 212 (e.g., a producer NF). The request 221 may be a request for a particular service. The request 221 may be sent based on a discovery that NF 212 is a producer of that service. The request 221 may comprise data relating to NF 211 and/or the requested service. The NF 212 may receive the request 221, perform one or more actions associated with the requested service (e.g., retrieving data), and provide/send a response 221. The one or more actions performed by the NF 212 may be based on request data included in the request 221, data stored by the NF 212, and/or data retrieved by the NF 212. The response 222 may notify/indicate, to the NF 211, that the one or more actions have been completed. The response 222 may comprise response data relating to the NF 212, the one or more actions, and/or the requested service.

Figure 2B:
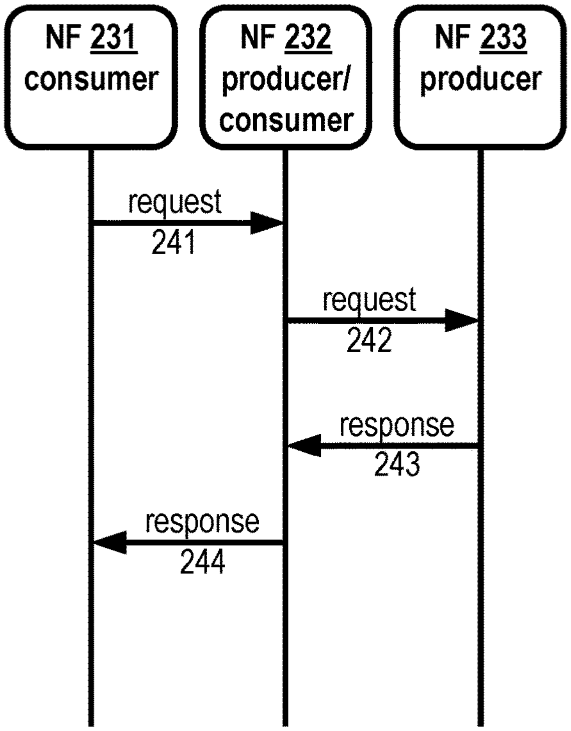

As shown in FIG. 2B, an NF 231 may send a request 241 to an NF 232. A service produced/provided by the NF 232 may comprise sending a request 242 to an NF 233 (e.g., based on receiving the request 241). The NF 233 may perform one or more actions and provide/send a response 243 to the NF 232. The NF 232 may send a response 244 to the NF 231, for example, based on receiving the response 243. As shown in FIG. 2B, an NF (e.g., a single NF) may perform the role of a producer of services, consumer of services, and/or both. A particular NF service may comprise any quantity/number of nested NF services produced by one or more other NFs.

Figure 2C:
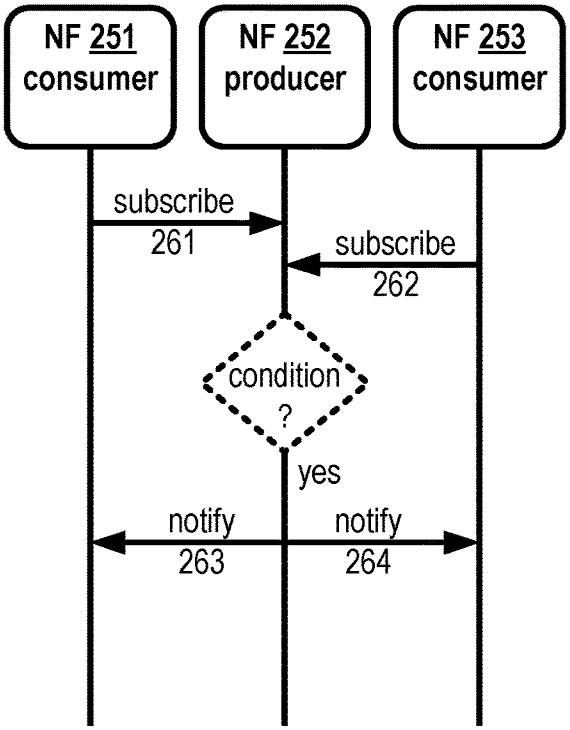

FIG. 2C shows an example of subscribe-notify interactions between a consumer NF and a producer NF. An NF 251 may send a subscription 261 (e.g., a subscription request) to an NF 252. An NF 253 may send a subscription 262 (e.g., a subscription request) to the NF 252. Although FIG. 2C shows two NFs and the NF 252 providing multiple subscription services to the two NFs, a subscribe-notify interaction may comprise one subscriber, and/or any other quantity of subscribers. The NFs 251, 253 may be independent from one another. For example, the NFs 251, 253 may independently discover the NF 252 and/or independently determine to subscribe to the service offered by the NF 252. The NF 252 may provide/send a notification to a subscribing NF, for example, based on receiving the subscription. For example, the NF 252 may send a notification 263 to the NF 251 based on the subscription 261 and/or may send a notification 264 to the NF 253 based on the subscription 262.

The sending of the notifications 263, 264 may be conditional. The sending of the notifications 263, 264 may be based on a determination that a condition has occurred. The notifications 263, 264 may be based on a determination that a particular event has occurred, a determination that a particular condition is outstanding, and/or a determination that a duration of time associated with the subscription has elapsed. The duration of time may be a time period associated with a subscription for notifications (e.g., periodic notifications). The NF 252 may send the notifications 263, 264 to the NFs 251, 253 simultaneously, substantially simultaneously, and/or based on/in response to a same condition. The NF 252 may send the notifications 263, 264 at different times and/or based on/in response to different notification conditions. The NF 251 may request a notification based on a certain parameter, as measured by the NF 252, exceeding a first threshold. The NF 252 may request a notification based on the parameter exceeding a second threshold (e.g., different from the first threshold). A parameter of interest and/or a corresponding threshold may be indicated in the subscriptions 261, 262.

Figure 2D:
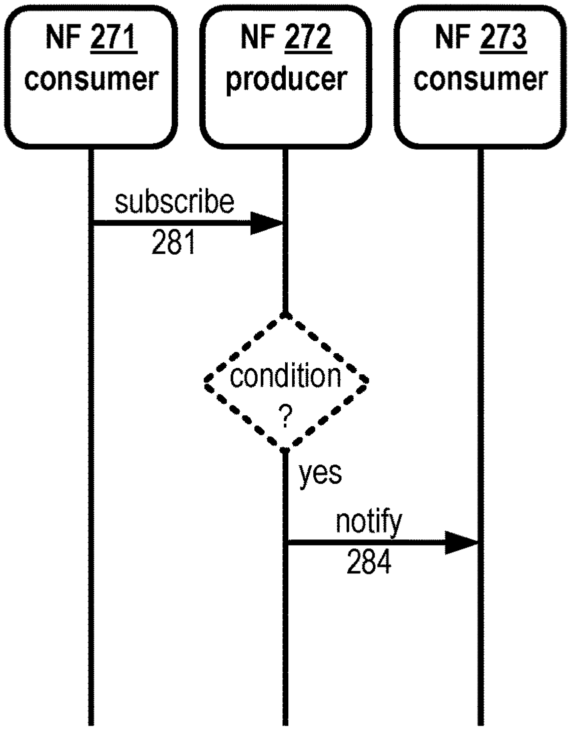

FIG. 2D shows another example of a subscribe-notify interaction. An NF 271 may send a subscription 281 to an NF 272. The NF 272 may send a notification 284, for example, based on/in response to receipt of the subscription 281 and/or a determination that a notification condition has occurred. The notification 284 may be sent to an NF 273. While the example of FIG. 2C shows a notification being sent to the subscribing NF, the example of FIG. 2D shows that a subscription and its corresponding notification may be associated with (e.g., received from and sent to) different NFs. For example, the NF 271 may subscribe to the service provided by the NF 272 on behalf of the NF 273.

Figure 3:
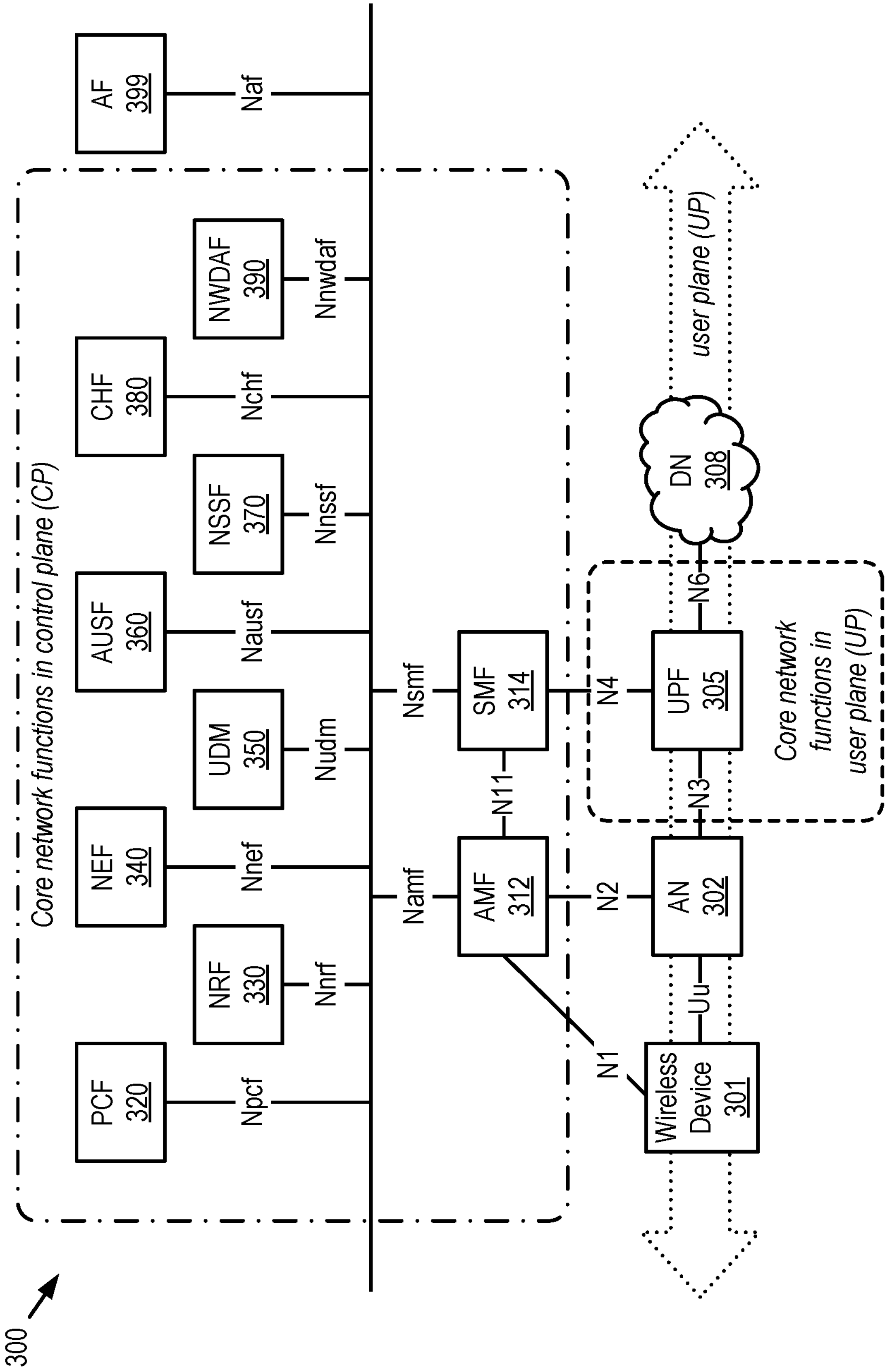
FIG. 3 shows an example communication network.

FIG. 3 shows an example communication network 300. The Communication network 300 may comprise a wireless device 301, an AN 302, and/or a DN 308. The other elements shown in FIG. 3 may be included in and/or associated with a core network. An element (e.g., each element) of the core network may be an NF.

The NFs may comprise a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and/or an application function (AF) 399. The UPF 305 may be a user plane core network function. The NFs 312, 314, and 320-390 may be control plane core network functions. The core network may comprise additional instances of any of the NFs shown in FIG. 3 and/or one or more different types of NF that provide different services. Other examples of NF type may comprise a gateway mobile location center (GMLC), a location management function (LMF), an operations, administration, and maintenance function (OAM), a public warning system (PWS), a short message service function (SMSF), a unified data repository (UDR), and/or an unstructured data storage function (UDSF).

An element (e.g., each element) shown in FIG. 3 may comprise an interface with at least one other element. The interface may be a logical connection and/or a direct physical connection. Any interface may be identified/indicated using a reference point representation and/or a service-based representation. In a reference point representation, the letter N may be used followed by a numeral to indicate an interface between two specific elements. For example, as shown in FIG. 3, the AN 302 and the UPF 305 may interface via N3, whereas UPF 305 and DN 308 may interface via N6. In a service-based representation, the letter N may be followed by one or more alphabets/letters. The letters may identify/indicate an NF that provides services to the core network. For example, PCF 320 may provide services via interface Npcf. The PCF 320 may provide services to any NF in the core network via Npcf. A service-based representation may correspond to a bundle of reference point representations. For example, the Npcf interface between PCF 320 and the core network may generally correspond to an N7 interface between PCF 320 and SMF 314, an N30 interface between PCF 320 and NEF 340, and/or an N # interface between any functions where # may indicate any number.

The UPF 305 may serve as a gateway for user plane traffic between the AN 302 and the DN 308. The wireless device 301 may connect to UPF 305 via a Uu interface and an N3 interface (also described as NG-U interface). The UPF 305 may connect to the DN 308 via an N6 interface. The UPF 305 may connect to one or more other UPFs (not shown) via an N9 interface. The wireless device 301 may be configured to receive services through a protocol data unit (PDU) session. The PDU session may be a logical connection between the wireless device 301 and the DN 308. The UPF 305 (or a plurality of UPFs) may be selected by the SMF 314 to handle/process a particular PDU session between the wireless device 301 and the DN 308. The SMF 314 may control the functions of the UPF 305 with respect to the PDU session. The SMF 314 may connect to the UPF 305 via an N4 interface. The UPF 305 may handle/process any quantity of PDU sessions associated with any quantity of wireless devices (via any quantity of ANs). The UPF 305 may be controlled, for handling the one or more PDU sessions, by any quantity of SMFs via any quantity of corresponding N4 interfaces.

The AMF 312 may control wireless device access to the core network. The wireless device 301 may register with the network via the AMF 312. for the wireless device 301 may register with the network prior to establishing a PDU session. The AMF 312 may manage a registration area of the wireless device 301, which may enable the network to track the physical location of wireless device 301 within the network. The AMF 312 may manage wireless device mobility for a wireless device in connected mode. For example, the AMF 312 may manage wireless device handovers from one AN (or portion thereof) to another. The AMF 312 may perform, for a wireless device in idle mode, registration updates, and/or page the wireless device to transition the wireless device to connected mode.

The AMF 312 may receive, from the wireless device 301, NAS messages. The NAS messages may be sent/transmitted in accordance with NAS protocol. NAS messages may relate to communications between the wireless device 301 and the core network. NAS messages may be relayed to the AMF 312 via the AN 302. Communication between the wireless device 301 and the AMF 312 may be represented as communication via the N1 interface. NAS messages may facilitate wireless device registration and mobility management, for example, by authenticating, identifying, configuring, and/or managing a connection of the wireless device 301. NAS messages may support session management procedures for maintaining user plane connectivity and quality of service (QoS) of a session between the wireless device 301 and the DN 309. The AMF 312 may send a NAS message to SMF 314, for example, if the NAS message involves (e.g., is associated with, corresponds to) session management. NAS messages may be used to transport messages between wireless device 301 and other components of the core network (e.g., core network components other than AMF 312 and SMF 314). The AMF 312 may act on/process a NAS message, or alternatively, forward the NAS message to an appropriate core NF (e.g., SMF 314, etc.).

The SMF 314 may establish, modify, and/or release a PDU session based on messaging received from the wireless device 301. The SMF 314 may allocate, manage, and/or assign an IP address to the wireless device 301, for example, based on establishment of a PDU session. Multiple SMFs may be in/associated with the network. Each of the SMFs may be associated with a respective group of wireless devices, base stations, and/or UPFs. A wireless device with multiple PDU sessions may be associated with a different SMF for each PDU session. The SMF 314 may select one or more UPFs to handle/process a PDU session. The SMF 314 may control the handling/processing of the PDU session by the selected UPF by providing rules for packet handling (e.g., packet detection rules (PDRs), forwarding action rules (FARs), QoS enforcement rules (QERs), etc.). Rules relating to QoS and/or charging for a particular PDU session may be obtained from the PCF 320 and provided to the UPF 305 (e.g., by the SMF 314).

The PCF 320 may provide/send, to other NFs, services relating to policy rules. The PCF 320 may use subscription data and information about network conditions to determine policy rules. The PCF 320 may provide the policy rules to a particular NF which may be responsible for enforcement of those rules. Policy rules may relate to policy control for access and mobility, and may be enforced by the AMF 312. Policy rules may relate to session management, and may be enforced by the SMF 314. Policy rules may be network-specific, wireless device-specific, session-specific, and/or data flow-specific.

The NRF 330 may provide service discovery functions. The NRF 330 may belong/correspond to a particular PLMN. The NRF 330 may maintain NF profiles relating to other NFs in the communication network 300. The NF profile may comprise, for example, an address, PLMN, and/or type of the NF, a slice indicator/identifier, a list of the one or more services provided by the NF, and/or authorization required to access the services.

The NEF 340 may provide an interface to external domains, permitting the external domains to selectively access the control plane of the communication network 300. The external domain may comprise, for example, third-party network functions, application functions, and/or any other functions. The NEF 340 may act as a proxy between external elements and network functions such as the AMF 312, the SMF 314, the PCF 320, the UDM 350, and/or any other functions. As an example, the NEF 340 may determine a location and/or reachability status of the wireless device 301 based on reports from the AMF 312, and/or may provide status information to an external element. An external element may provide, via the NEF 340, information that facilitates the setting of parameters for establishment of a PDU session. The NEF 340 may determine which data and capabilities of the control plane are exposed to the external domain. The NEF 340 may provide secure exposure (e.g., by authenticating and/or authorizing an external entity) to exposed data or capabilities of the communication network 300. The NEF 340 may selectively control the exposure such that the internal architecture of the core network is hidden/obscured from the external domain.

The UDM 350 may provide data storage for other NFs. The UDM 350 may permit a consolidated view of network information. The consolidated view may be used to ensure that the most relevant information may be made available to different NFs from a single resource. The UDM 350 may store and/or retrieve information from a unified data repository (UDR). For example, the UDM 350 may obtain user subscription data relating to the wireless device 301 from the UDR.

The AUSF 360 may support mutual authentication of the wireless device 301 by the core network and authentication of the core network by the wireless device 301. The AUSF 360 may perform key agreement procedures and provide keying material that may be used to improve security.

The NSSF 370 may select/determine one or more network slices to be used by the wireless device 301. The NSSF 370 may select a slice based on slice selection information. For example, the NSSF 370 may receive single network slice selection assistance information (S-NSSAI) and map the S-NSSAI to a network slice instance identifier (NSI).

The CHF 380 may control billing-related tasks associated with wireless device 301. For example, the UPF 305 may report/send traffic usage information, associated with wireless device 301, to the SMF 314. The SMF 314 may collect usage data from the UPF 305 and one or more other UPFs. The usage data may indicate a quantity of data exchanged, a DN that the data is exchanged with, a network slice associated with the data, and/or any other information that may influence billing. The SMF 314 may share the collected usage data with the CHF 380. The CHF 380 may use the collected usage data to perform billing-related tasks associated with wireless device 301. The CHF 380 may, depending on the billing status of wireless device 301, instruct the SMF 314 to limit and/or influence/control access of the wireless device 301 and/or provide billing-related notifications to wireless device 301.

The NWDAF 390 may collect and/or analyze data from other NFs and/or offer data analysis services to other NFs. The NWDAF 390 may receive/collect, from the UPF 305, the AMF 312, and/or the SMF 314, data/information relating to a load level for a particular network slice instance. The NWDAF 390 may provide (e.g., based on the collected data) load level data to the PCF 320 and/or the NSSF 370, and/or may notify the PCF 320 and/or the NSSF 370 if a load level for a slice reaches and/or if a load level for a slice exceeds a load level threshold.

The AF 399 may be outside the core network, but may interact with the core network to provide information relating to the QoS requirements and/or traffic routing preferences associated with a particular application. The AF 399 may access the core network based on the exposure constraints imposed by the NEF 340. An operator of the core network may consider the AF 399 to be a trusted domain that may directly access the core network (and/or the communication network 300).

Figure 4A:
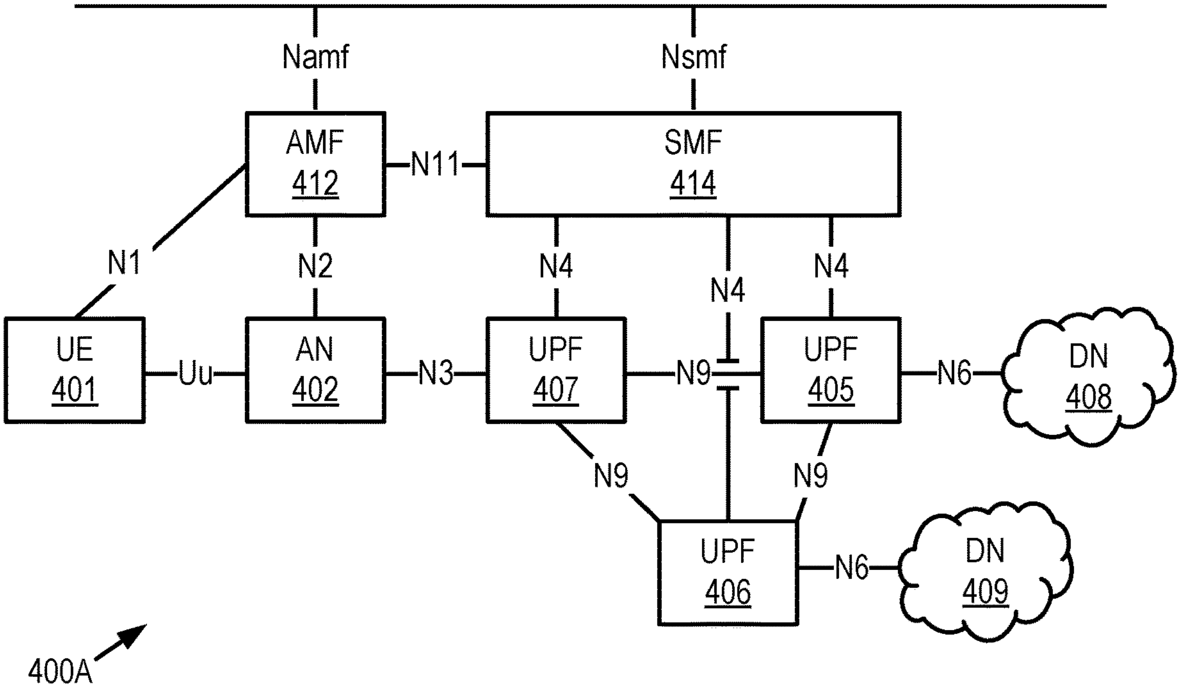
FIG. 4A and FIG. 4B show example core network architectures.
Figure 4B:
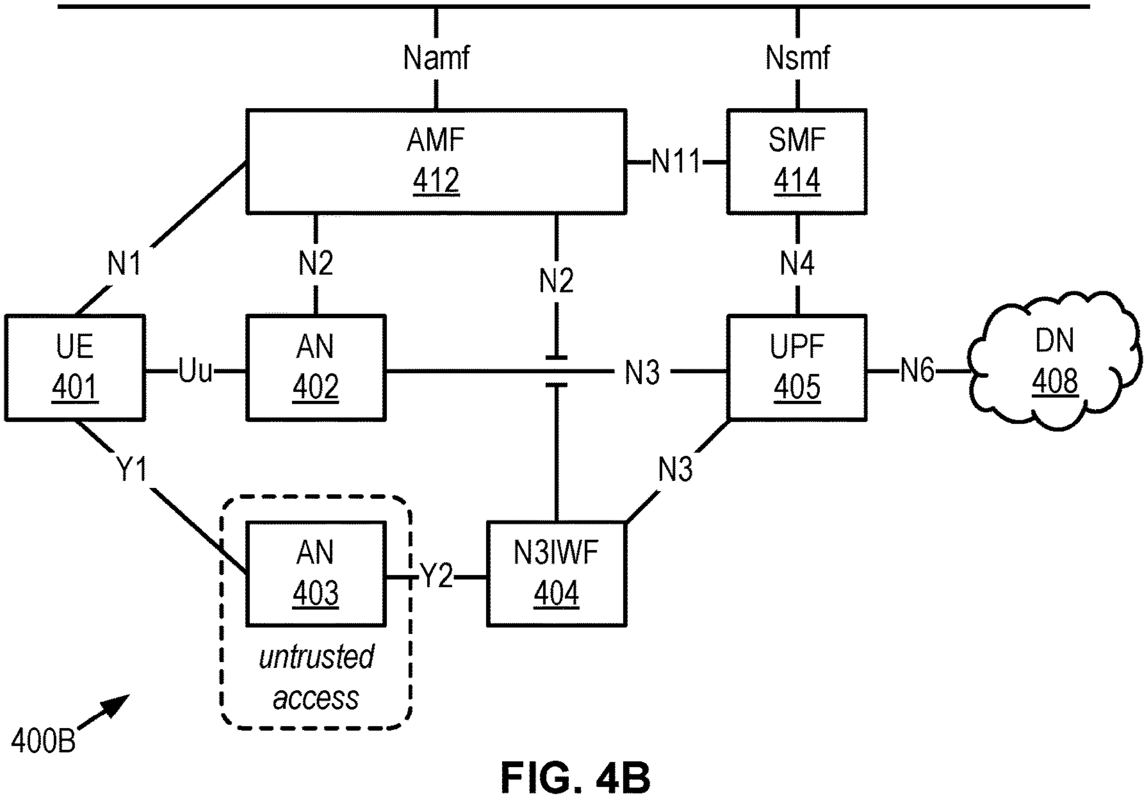
Figure 5:
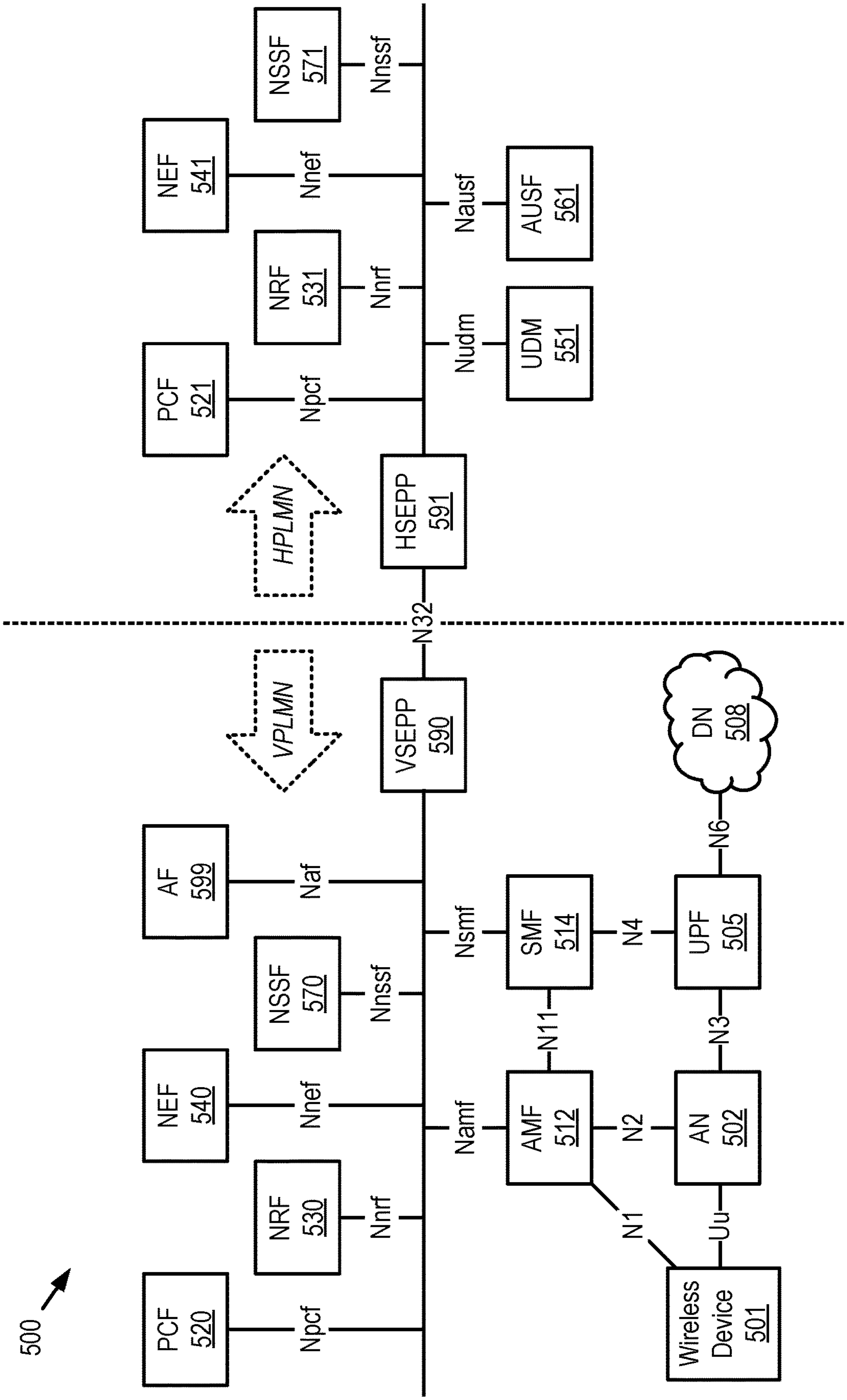
FIG. 5 shows an example of a core network architecture.

FIGS. 4A, 4B, and 5 show examples of core network architectures. The core network architectures shown in FIGS. 4A, 4B, and 5 may be analogous in some respects to the core network architecture 300 shown in FIG. 3. For brevity, some of the core network elements shown in FIG. 3 are not shown in FIGS. 4A, 4B, and 5 but may be included in one or more of these core network architectures. Many of the elements shown in FIGS. 4A, 4B, and 5 may be analogous in some respects to elements depicted in FIG. 3. For brevity, some of the details relating to their functions or operation are not shown but may be included in one or more of these core network architectures. Operation of one or more elements shown in FIGS. 4A, 4B, and 5 may be similar, or substantially similar, to corresponding elements shown in FIG. 3.

FIG. 4A shows an example of a core network architecture. The core network architecture 400A of FIG. 4A may comprise an arrangement of multiple UPFs. Core network architecture 400A may comprise one or more of: a wireless device 401, an AN 402, an AMF 412, and/or an SMF 414. The core network architecture 400A may comprise multiple UPFs (e.g., a UPF 405, a UPF 406, and a UPF 407) and multiple DNs (e.g., a DN 408 and a DN 409). Each of the multiple UPFs 405, 406, 407 may communicate with the SMF 414 via a corresponding N4 interface. The DNs 408, 409 may communicate with the UPFs 405, 406, respectively, via N6 interfaces. The multiple UPFs 405, 406, 407 may communicate with one another via N9 interfaces.

The UPFs 405, 406, 407 may perform traffic detection. The UPFs 405, 406, 407 may indicate, identify, and/or classify packets. Packet indication/identification may be performed based on PDRs provided by the SMF 414. PDRs may comprise packet detection information. Packet detection information may comprise one or more of: a source interface, a wireless device IP address, core network (CN) tunnel information (e.g., a CN address of an N3/N9 tunnel corresponding to a PDU session), a network instance indicator/identifier, a QoS flow indicator/identifier (QFI), a filter set (e.g., an IP packet filter set and/or an ethernet packet filter set), and/or an application indicator/identifier.

PDRs may indicate one or more rules for handling the packet upon detection thereof. The one or more rules may comprise, for example, FARs, multi-access rules (MARs), usage reporting rules (URRs), QERs, and/or any other rule. For example, the PDR may comprise one or more FAR identifiers, MAR identifiers, URR identifiers, and/or QER identifiers. The identifiers may indicate the rules that are prescribed/to be used for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface (e.g., "access" for downlink or "core" for uplink). The FAR may indicate a buffering action rule (BAR), for example, if a packet is to be buffered. The UPF 405 may perform data buffering of a certain quantity downlink packets, for example, if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark/indicate packets belonging to a particular QoS flow with a corresponding QFI. The marking may enable a recipient of the packet to determine a QoS of the packet (e.g., a QoS to be enforced for the packet).

The UPF 405 may provide/send usage reports to the SMF 414 in accordance with a URR. The URR may indicate one or more triggering conditions for generation and/or reporting of the usage report. The reporting may be based on immediate reporting, periodic reporting, a threshold for incoming uplink traffic, and/or any other suitable triggering condition. The URR may indicate a method for measuring usage of network resources (e.g., data volume, duration, and/or event).

The DNs 408, 409 may comprise public DNS (e.g., the Internet), private DNs (e.g., private, internal corporate-owned DNS), and/or intra-operator DNs. A DN (e.g., each DN) may provide an operator service and/or a third-party service. The service provided by a DN may be an Internet service, an IP multimedia subsystem (IMS), an augmented or virtual reality network, an edge computing or mobile edge computing (MEC) network, and/or any other service. A DN (e.g., each DN) may be indicated/identified using a data network name (DNN). The wireless device 401 may be configured to establish a first logical connection with the DN 408 (e.g., a first PDU session), a second logical connection with DN 409 (e.g., a second PDU session), or both simultaneously (e.g., the first PDU session and the second PDU sessions).

A PDU session (e.g., each PDU) session may be associated with at least one UPF configured to operate as a PDU session anchor (PSA, or anchor). The anchor may be a UPF that may provide an N6 interface with a DN.

The UPF 405 may be the anchor for the first PDU session between wireless device 401 and DN 408. The UPF 406 may be the anchor for the second PDU session between wireless device 401 and DN 409. The core network may use the anchor to provide service continuity of a particular PDU session (e.g., IP address continuity) as wireless device 401 moves from one access network to another. The wireless device 401 may establish a PDU session using a data path to the DN 408 and using an access network other than AN 402. The data path may use the UPF 405 acting as anchor. The wireless device 401 may (e.g., later) move into the coverage area of the AN 402. The SMF 414 may select a new UPF (e.g., the UPF 407) to bridge the gap between the newly-entered access network (e.g., the AN 402) and the anchor UPF (e.g., the UPF 405). The continuity of the PDU session may be preserved as any quantity/number of UPFs may be added and/or removed from the data path. A UPF added to a data path (e.g., as shown in FIG. 4A) may be described as an intermediate UPF and/or a cascaded UPF.

The UPF 406 may be the anchor for the second PDU session between wireless device 401 and the DN 409. The anchor for the first PDU session and the anchor for the second PDU sessions being associated with different UPFs (e.g., as shown in FIG. 4A) is merely exemplary. Multiple PDU sessions with a single DN may correspond to any quantity/number of anchors. A UPF at the branching point (e.g., the UPF 407 in FIG. 4) may operate as an uplink classifier (UL-CL), for example, if there are multiple UPFs. The UL-CL may divert uplink user plane traffic to different UPFs.

The SMF 414 may allocate, manage, and/or assign an IP address to the wireless device 401. The SMF 414 may allocate, manage, and/or assign an IP address to the wireless device 401, for example, based on establishment of a PDU session. The SMF 414 may maintain an internal pool of IP addresses to be assigned. The SMF 414 may (e.g., if necessary) assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of wireless device 401 may be maintained (and the same anchor UPF may be used) as the wireless device moves within the network. In SSC mode 2, the IP address of wireless device 401 may be changed as the wireless device 401 moves within the network. For example, the old IP address and an old anchor UPF may be abandoned and a new IP address and a new anchor UPF may be established, for example, as the wireless device 401 moves within the network. In SSC mode 3, it may be possible to maintain an old IP address (e.g., similar to SSC mode 1) temporarily while establishing a new IP address (e.g., similar to SSC mode 2). Applications that may be sensitive to IP address changes may operate in accordance with SSC mode 1.

UPF selection may be controlled by the SMF 414. The SMF 414 may select the UPF 405 as the anchor for the PDU session and/or the UPF 407 as an intermediate UPF, for example, based on establishment and/or modification of a PDU session between the wireless device 401 and DN 408. Criteria for UPF selection may comprise path efficiency and/or speed (e.g., a data rate) between the AN 402 and the DN 408. Reliability, load status, location, slice support and/or other capabilities of candidate UPFs may also be considered for UPF selection.

FIG. 4B shows an example of a core network architecture. The core network architecture 400B of FIG. 4B may accommodate untrusted access. The wireless device 401, as shown in FIG. 4B, may communicate with (e.g., connect to) the DN 408 via the AN 402 and the UPF 405. The AN 402 and the UPF 405 may constitute/comprise/provide trusted (e.g., 3GPP) access to the DN 408. The wireless device 401 may access the DN 408 using an untrusted access network. The untrusted access network may comprise the AN 403 and/or a non-3GPP interworking function (N3IWF) 404.

The AN 403 may be a wireless local area network (WLAN) (e.g., operating in accordance with the IEEE 802.11 standard). The wireless device 401 may communicate with (e.g., connect to) the AN 403 via an interface Y1. The connection may be in a manner that is prescribed for the AN 403. The connection to the AN 403 may or may not involve authentication. The wireless device 401 may obtain/receive an IP address from the AN 403. The wireless device 401 may determine to connect to the core network 400B using untrusted access. The AN 403 may communicate with N3IWF 404 via a Y2 interface. After selecting untrusted access, the wireless device 401 may provide N3IWF 404 with sufficient information to select an AMF. The selected AMF may be, for example, the same AMF that is used by wireless device 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA). The UPF 405 may remain the anchor for a PDU session, for example, even as wireless device 401 shifts between trusted access and untrusted access.

FIG. 5 shows an example of a core network architecture. The core network architecture 500 of FIG. 5 may correspond to an example in which a wireless device 501 may be roaming. The wireless device 501 (e.g., in a roaming scenario) may be a subscriber of a first PLMN (e.g., a home PLMN, or HPLMN) but may attach to a second PLMN (e.g., a visited PLMN, or VPLMN). The core network architecture 500 may comprise a wireless device 501, an AN 502, a UPF 505, and/or a DN 508. The AN 502 and the UPF 505 may be associated with a VPLMN. The VPLMN may manage the AN 502 and/or the UPF 505 using core network elements associated with the VPLMN. The core network elements associated with the VPLMN may comprise an AMF 512, an SMF 514, a PCF 520, an NRF 530, an NEF 540, and/or an NSSF 570. An AF 599 may be adjacent the core network of the VPLMN.

The wireless device 501 may not be a subscriber of the VPLMN. The AMF 512 may authorize the wireless device 501 to access the network (e.g., the VPLMN), for example, based on roaming restrictions that may apply to wireless device 501. The core network of the VPLMN may interact with core network elements of an HPLMN of the wireless device 501 (e.g., a PCF 521, an NRF 531, an NEF 541, a UDM 551, and/or an AUSF 561), for example, to obtain network services provided by the VPLMN. The VPLMN and the HPLMN may communicate using an N32 interface connecting respective security edge protection proxies (SEPPs). The respective SEPPs may be a VSEPP 590 and/or an HSEPP 591.

The VSEPP 590 and/or the HSEPP 591 may communicate via an N32 interface (e.g., for defined purposes). The VSEPP 590 and the HSEPP 591 may communicate via an N32 interface while concealing information about each PLMN from the other. The SEPPs may apply roaming policies, for example, based on communications via the N32 interface. The PCF 520 and/or the PCF 521 may communicate via the SEPPs to exchange policy-related signaling. The NRF 530 and/or the NRF 531 may communicate via the SEPPs to enable service discovery of NFs in the respective PLMNs. The VPLMN and HPLMN may independently maintain the NEF 540 and the NEF 541. The NSSF 570 and/or the NSSF 571 may communicate via the SEPPs to coordinate slice selection for the wireless device 501. The HPLMN may handle all authentication and subscription related signaling. The VPLMN may authenticate the wireless device 501 and/or obtain subscription data of the wireless device 501 by accessing, via the SEPPs, the UDM 551 and the AUSF 561 of the HPLMN, for example, if the wireless device 501 registers and/or requests service via the VPLMN.

The core network architecture 500 may be referred to as a local breakout configuration, in which the wireless device 501 may access the DN 508 using one or more UPFs of the VPLMN (i.e., the UPF 505). Other configurations are possible. For example, in a home-routed configuration (not shown in FIG. 5), the wireless device 501 may access a DN using one or more UPFs of the HPLMN. In the home-routed configuration, an N9 interface may run parallel to the N32 interface, crossing the frontier between the VPLMN and the HPLMN, to carry user plane data. One or more SMFs of the respective PLMNs may communicate, via the N32 interface, to coordinate session management for the wireless device 501. The SMFs may control their respective UPFs on either side of the frontier.

Figure 6:
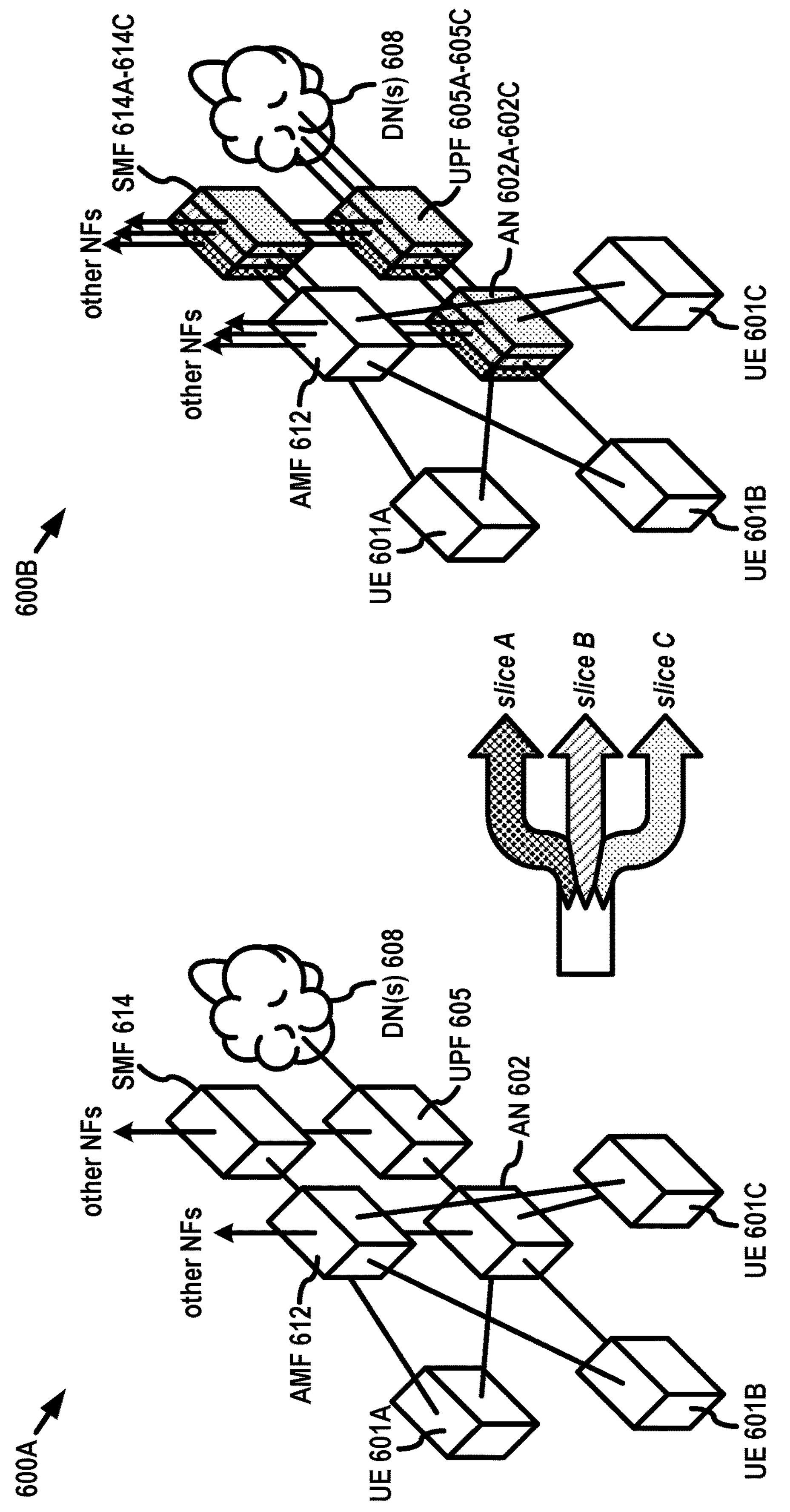
FIG. 6 shows an example of network slicing.

FIG. 6 shows an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A shows an un-sliced physical network corresponding to a single logical network. The network architecture 600A may comprise a user plane. Wireless devices 601A, 601B, 601C (collectively, wireless devices 601) may have a physical and/or a logical connection to a DN 608 via an AN 602 and a UPF 605 of the user plane. The network architecture 600A may comprise a control plane. An AMF 612 and an SMF 614, in the control plane, may control various aspects of the user plane.

The network architecture 600A may have a specific set of characteristics (e.g., relating to maximum bit rate, reliability, latency, bandwidth usage, power consumption, etc.). The set of characteristics may be affected by the nature/properties of the network elements (e.g., processing power, availability of free memory, proximity to other network elements, etc.) and/or the management thereof (e.g., optimization to maximize bit rate or reliability, reduce latency, reduce power, reduce bandwidth usage, etc.). The characteristics of the network architecture 600A may change over time. For example, by upgrading equipment and/or by modifying procedures to target a particular characteristic may change the characteristics of the network architecture 600A. At any given time, the network architecture 600A may have a single set of characteristics that may or may not be optimized for a particular use case. For example, wireless devices 601A, 601B, 601C may have different requirements, with the network architecture 600A being optimized for one of the three wireless devices.

The network architecture 600B shows an example of a sliced physical network divided into multiple logical networks. The physical network may be divided into three logical networks (e.g., slice A, slice B, and slice C). For example, the wireless device 601A may be served by AN 602A, UPF 605A, AMF 612, and SMF 614A. Wireless device 601B may be served by AN 602B, UPF 605B, AMF 612, and SMF 614B. Wireless device 601C may be served by AN 602C, UPF 605C, AMF 612, and SMF 614C.

Although the respective wireless devices 601 may communicate with different network elements from a logical perspective, the network elements may be deployed by a network operator using the same physical network elements.

One or more network slices (e.g., each network slice) may be configured for providing network services with different sets of characteristics. For example, slice A may correspond to an enhanced mobile broadband (eMBB) service. Mobile broadband may refer to internet access by mobile users, commonly associated with smartphones. Slice B may correspond to ultra-reliable low-latency communication (URLLC), which may focus on reliability and speed. Relative to eMBB, URLLC may improve the feasibility of use cases such as autonomous driving and telesurgery. Slice C may correspond to massive machine type communication (mMTC), which may focus on low-power services delivered to a large number of users. For example, slice C may be optimized for a dense network of battery-powered sensors that may provide small amounts of data at regular intervals. Many mMTC use cases may be prohibitively expensive if they operated using an eMBB or URLLC network.

A network slice serving a wireless device 601 may be updated (e.g., to provide better and/or more suitable services), for example, if service requirements for one of the wireless devices 601 changes. The set of network characteristics corresponding to eMBB, URLLC, and mMTC may be varied, such that differentiated species of eMBB, URLLC, and mMTC may be provided for a wireless device. Network operators may provide entirely new services, for example, based on/in response to customer demand.

A wireless device 601 (e.g., each of the wireless devices 601) may have/use (or be associated with) a corresponding network slice. A single slice may serve any number/quantity of wireless devices and a single wireless device may operate using any number/quantity of slices. The AN 602, the UPF 605 and the SMF 614 may be separated into three separate slices, and the AMF 612 may be unsliced. A network operator may deploy any architecture that selectively utilizes any mix of sliced and unsliced network elements, with different network elements divided into different numbers/quantities of slices. Although FIG. 6 shows three core network functions (e.g., the UPF 605, the AMF 612, the SMF 614), other core network functions (e.g., such as other core network functions not shown) may be sliced. A PLMN that supports multiple network slices may maintain a separate network repository function (NFR) for each slice, which may enable other NFs to discover network services associated with that slice.

Network slice selection may be controlled by an AMF, or alternatively, by a separate network slice selection function (NSSF). For example, a network operator may define/configure and implement distinct network slice instances (NSIs). Each NSI may be associated with single network slice selection assistance information (S-NSSAI). The S-NSSAI may comprise a particular slice/service type (SST) indicator (e.g., indicating eMBB, URLLC, mMTC, etc.). For example, a particular tracking area may be associated with one or more configured S-NSSAIs. wireless devices may identify one or more requested and/or subscribed S-NSSAIs (e.g., during registration). The network may indicate to the wireless device one or more allowed and/or rejected S-NSSAIs.

The S-NSSAI may comprise a slice differentiator (SD) to distinguish between different tenants of a particular slice and/or service type. For example, a tenant may be a customer (e.g., a vehicle manufacture, a service provider, etc.) of a network operator that obtains (e.g., purchases) guaranteed network resources and/or specific policies for servicing its subscribers. The network operator may configure different slices and/or slice types, and use the SD to determine which tenant is associated with a particular slice.

Figure 7A:
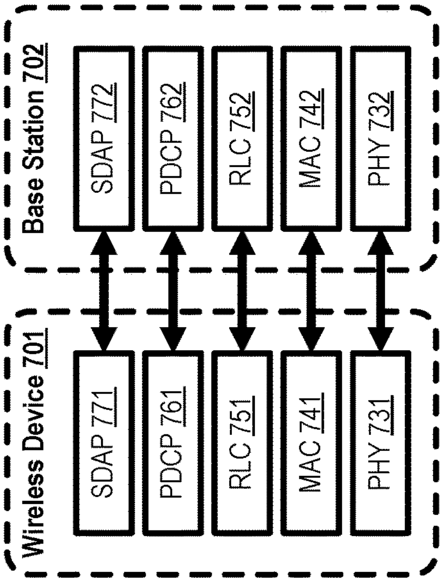
FIG. 7A shows an example a user plane protocol stack.
Figure 7B:
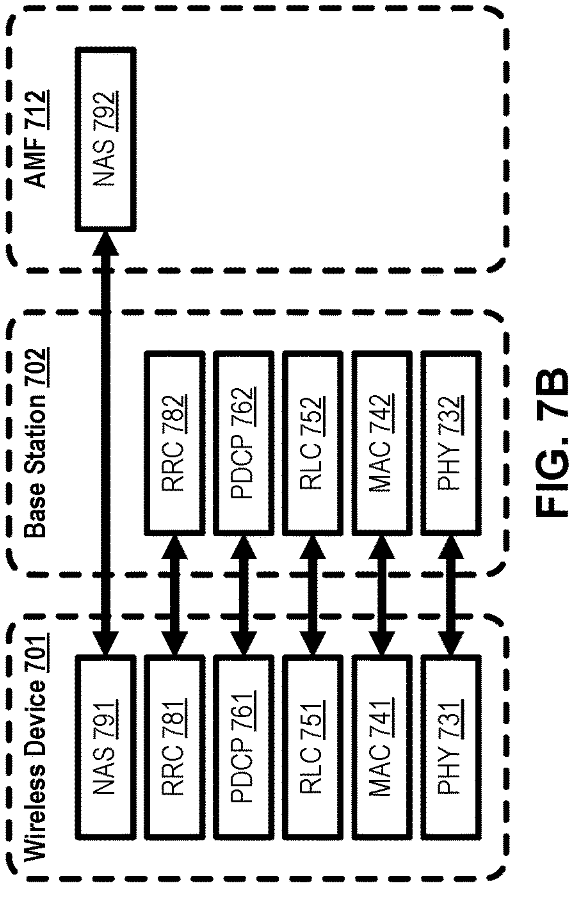
FIG. 7B shows an example a control plane protocol stack.
Figure 7C:
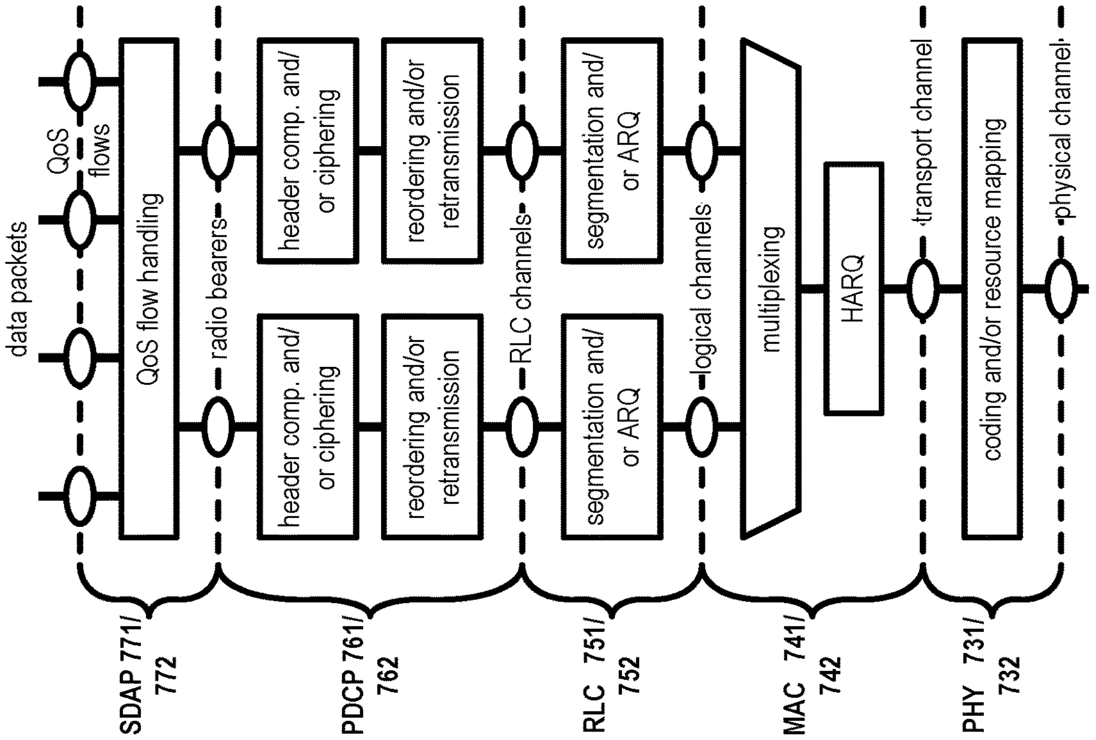
FIG. 7C shows example services provided between protocol layers of the user plane protocol stack.

FIG. 7A shows an example UP protocol stack. FIG. 7B shows an example CP protocol stack. FIG. 7C shows example services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a PHY layer. PHY layer may correspond to physical infrastructure used for transfer of signals (e.g., cables, fiber optics, and/or radio frequency transceivers). Layer 1 (e.g., in NR protocols) may comprise a PHY layer. Layer 2 may correspond to a data link layer. Layer 2 may correspond to/be associated with packaging of data (into, e.g., data frames) for transfer, between nodes of the network (e.g., using the physical infrastructure of layer 1). Layer 2 (e.g., in NR protocols) may comprise a MAC layer, an RLC layer, a PDCP layer, and an SDAP layer.

Layer 3 may correspond to a network layer. Layer 3 may be associated with routing of the data which has been packaged in layer 2. Layer 3 may handle prioritization of data and traffic avoidance. Layer 3 (e.g., in NR protocols) may comprise an RRC layer and a NAS layer. Layers 4 through 7 may correspond to a transport layer, a session layer, a presentation layer, and an application layer. The application layer may interact with an end user to provide data associated with an application. An end user, implementing the application, may generate data associated with the application and initiate sending of that information to a targeted data network (e.g., the Internet, an application server, etc.). Starting at the application layer, each layer in the OSI model may manipulate and/or repackage the information and/or deliver it to a lower layer. At the lowest layer, the manipulated and/or repackaged information may be exchanged via physical infrastructure (e.g., electrically, optically, and/or electromagnetically). The information, approaching/received at the targeted data network, may be unpackaged and provided to higher layers, for example, until it reaches the application layer in a form that is usable by the targeted data network (e.g., the same form in which it was provided by the end user). The data network may perform this procedure, in reverse, for responding to the end user.

FIG. 7A shows an example UP protocol stack. The UP protocol stack may be an NR protocol stack for a Uu interface between a wireless device 701 and a base station 702. In layer 1 of the UP protocol stack, the wireless device 701 may implement a PHY layer (e.g., PHY 731) and the base station 702 may implement a PHY layer (e.g., PHY 732). In layer 2 of the UP protocol stack, the wireless device 701 may implement a MAC layer (e.g., MAC 741), an RLC layer (e.g., RLC 751), a PDCP layer (e.g., PDCP 761), and an SDAP layer (e.g., SDAP 771). The base station 702 may implement a MAC layer (e.g., MAC 742), an RLC layer (e.g., RLC 752), a PDCP layer (e.g., PDCP 762), and an SDAP layer (e.g., SDAP 772).

FIG. 7B shows a CP protocol stack. The CP protocol stack may be an NR protocol stack for the Uu interface between the wireless device 701 and the base station 702 and/or an N1 interface between the wireless device 701 and an AMF 712. In layer 1 of the CP protocol stack, the wireless device 701 may implement the PHY 731 and the base station 702 may implement the PHY 732. In layer 2 of the CP protocol stack, the wireless device 701 may implement the MAC 741, the RLC 751, the PDCP 761, an RRC layer (e.g., RRC 781), and a NAS layer (e.g., NAS 791). The base station 702 may implement the MAC 742, the RLC 752, the PDCP 762, and an RRC layer (e.g., RRC 782). The AMF 712 may implement a NAS layer (e.g., NAS 792).

The NAS (e.g., NAS 791 and NAS 792) may be concerned with/correspond to the non-access stratum. The non-access stratum may comprise communication between the wireless device 701 and the core network (e.g., the AMF 712). Lower layers may be concerned with/correspond to the access stratum. The access stratum may comprise communication between the wireless device 701 and the base station 702. Messages sent between the wireless device 701 and the core network may be referred to as NAS messages. A NAS message may be relayed by the base station 702 Content of the NAS message (e.g., information elements of the NAS message) may not be visible to the base station 702.

FIG. 7C shows an example of services provided between protocol layers (e.g., of the NR user plane protocol stack shown in FIG. 7A). The wireless device 701 may receive services through a PDU session. The PDU session may be a logical connection between the wireless device 701 and a DN. The wireless device 701 and the DN may exchange data packets associated with the PDU session. The PDU session may comprise one or more QoS flows. The SDAP 771 and/or the SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the base station 702. The wireless device 701 may be notified of the mapping (e.g., based on control signaling and/or reflective mapping). The SDAP 772 of the base station 220 may mark downlink packets with a QFI and/or deliver the downlink packets to the wireless device 701 (e.g., for reflective mapping). The wireless device 701 may determine the mapping based on the QFI of the downlink packets.

The PDCP 761 and the PDCP 762 may perform header compression and/or decompression. Header compression may reduce the amount of data transmitted over the physical layer. The PDCP 761 and the PDCP 762 may perform ciphering and/or deciphering. Ciphering may reduce unauthorized decoding of data sent/transmitted over the physical layer (e.g., intercepted on an air interface), and/or may protect data integrity (e.g., to ensure control messages originate from intended sources). The PDCP 761 and/or the PDCP 762 may perform retransmissions of undelivered packets, in-sequence delivery and/or reordering of packets, duplication of packets, and/or identification and removal of duplicate packets. The PDCP 761 and/or the PDCP 762 may perform mapping between a split radio bearer and RLC channels, for example, in a dual connectivity scenario.

The RLC 751 and the RLC 752 may perform segmentation and retransmission through automatic repeat request (ARQ). The RLC 751 and the RLC 752 may perform removal of duplicate data units received from the MAC 741 and the MAC 742, respectively. The RLC 751 and the RLC 752 may provide RLC channels as a service to the PDCP 761 and the PDCP 762, respectively.

The MAC 741 and/or the MAC 742 may perform multiplexing and/or demultiplexing of logical channels. The MAC 741 and/or the MAC 742 may map logical channels to transport channels. The wireless device 701 may (e.g., in MAC 741) multiplex data units of one or more logical channels into a transport block. The wireless device 701 may send/transmit the transport block to the base station 702 using PHY 731. The base station 702 may receive the transport block using the PHY 732. The base station 702 may demultiplex data units of the transport blocks back into logical channels. The MAC 741 and/or the MAC 742 may perform error correction through hybrid automatic repeat request (HARQ), logical channel prioritization, and/or padding.

The PHY 731 and/or the PHY 732 may perform mapping of transport channels to physical channels. The PHY 731 and/or the PHY 732 may perform digital and analog signal processing functions (e.g., coding/decoding and modulation/demodulation) for sending and receiving information (e.g., transmission via an air interface). The PHY 731 and/or the PHY 732 may perform multi-antenna mapping.

Figure 8:
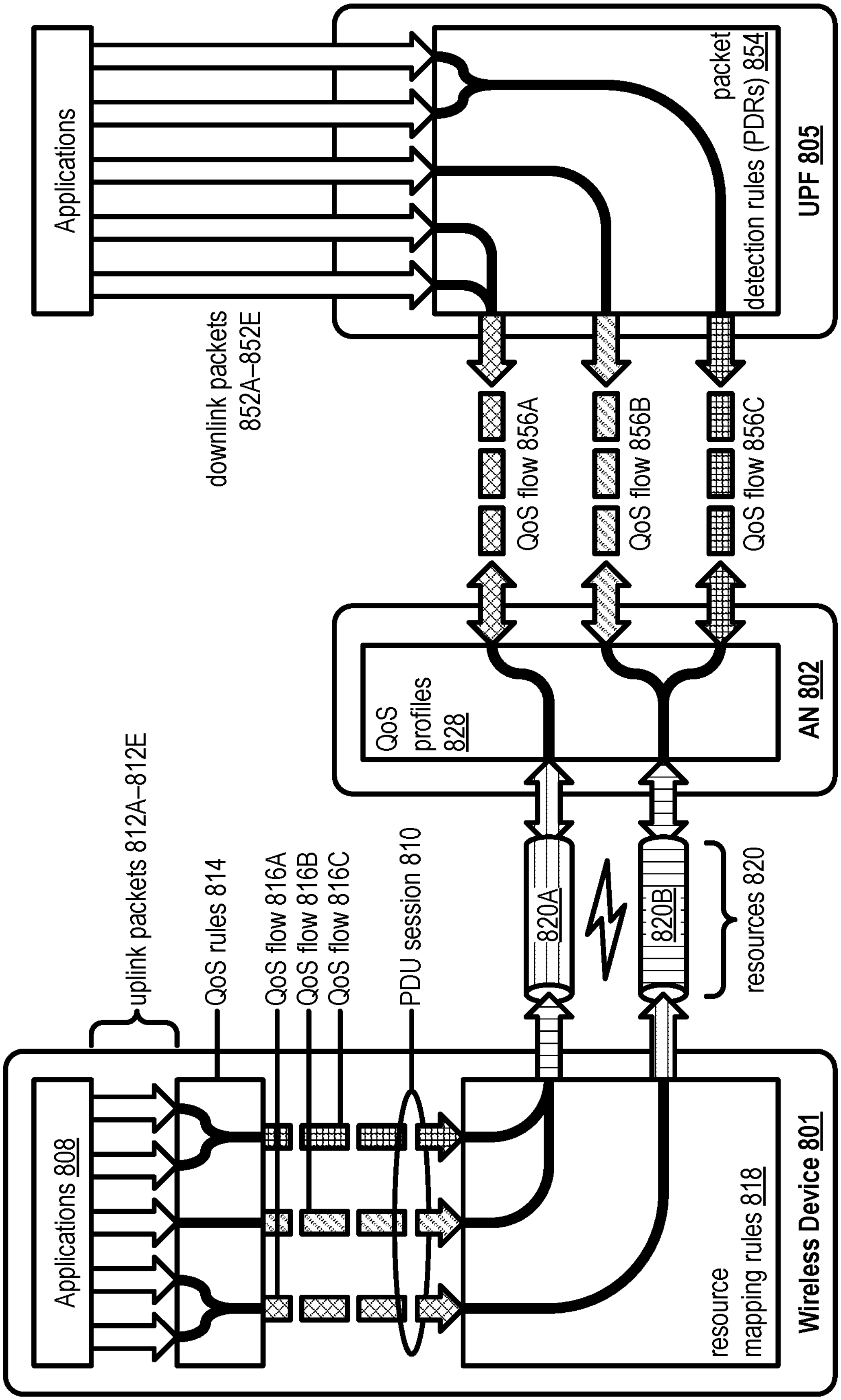
FIG. 8 shows an example quality of service (QoS) model.

FIG. 8 shows an example of a QoS model. The QoS model may be for differentiated data exchange. The QoS model may comprise a wireless device 801, an AN 802, and/or a UPF 805. The QoS model may facilitate prioritization of PDUs (which may also be referred to as packets). Higher-priority packets may be exchanged faster and/or more reliably than lower-priority packets. The network may devote more resources to exchange of high QoS packets (e.g., high priority packets).

A PDU session 810 may be established between the wireless device 801 and the UPF 805. The PDU session 810 may be a logical connection enabling the wireless device 801 to exchange data with a particular data network (e.g., the Internet). The wireless device 801 may request establishment of the PDU session 810. The wireless device 801 may indicate/identify the targeted data network based on its data network name (DNN), for example, at the time that the PDU session 810 is established. The PDU session 810 may be managed by an SMF (not shown). The SMF may select the UPF 805 (and/or optionally, one or more other UPFs, not shown), for example, to facilitate exchange of data associated with the PDU session 810, between the wireless device 801 and the data network.

One or more applications 808 associated with wireless device 801 may generate uplink packets 812A-812E associated with the PDU session 810. The wireless device 801 may apply QoS rules 814 to the uplink packets 812A-812E in accordance with a QoS model. The QoS rules 814 may be associated with the PDU session 810. The QoS rules 814 may be determined by and/or provided to the wireless device 801, for example, based on establishment and/or modification of the PDU session 810 (e.g., if/when the PDU session 810 is established and/or modified). The wireless device 801, based on the QoS rules 814, may classify the uplink packets 812A-812E, map each of the uplink packets 812A-812E to a QoS flow, and/or mark the uplink packets 812A-812E with a QFI. A packet may be sent through the network. A packet may mix with other packets from other wireless devices (e.g., having potentially different priorities). The QFI may indicate how the packet should be handled in accordance with the QoS model. As shown in the example of FIG. 8, uplink packets 812A, 812B may be mapped to a QoS flow 816A, an uplink packet 812C may be mapped to a QoS flow 816B, and the remaining packets may be mapped to QoS flow 816C.

The QoS flows may be the finest granularity of QoS differentiation in a PDU session. In FIG. 8, three QoS flows 816A-816C are shown. A different quantity/number of QoS flows may be present/used (e.g., 1, 2, 4, 5, or any other number/quantity). One or more QoS flows may be associated with a guaranteed bit rate (e.g., guaranteed bit rate (GBR) QoS flows). One or more QoS flows may have bit rates that are not guaranteed (non-GBR QoS flows). QoS flows may be subject to per-wireless device and/or per-session aggregate bit rates. A QoS flow of the QoS flows may be a default QoS flow. QoS flows may have different priorities. For example, the QoS flow 816A may have a higher priority than the QoS flow 816B, which may have a higher priority than the QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may be subject to per-wireless device and/or per-session aggregate bit rates.

The wireless device 801 may apply resource mapping rules 818 to the QoS flows 816A-816C for operating within the QoS model. The air interface between wireless device 801 and/or the AN 802 may be associated with resources 820. The QoS flow 816A may be mapped to resource 820A, and the QoS flows 816B, 816C may be mapped to resource 820B. The resource mapping rules 818 may be provided by the AN 802. The resource mapping rules 818 may designate more resources for relatively high priority QoS flows for meeting QoS requirements. A high priority QoS flow (e.g., the QoS flow 816A) may, based on the resources, be more likely to obtain the high flow bit rate, low packet delay budget, and/or other satisfy other characteristics associated with QoS rules 814. The resources 820 may comprise radio bearers. The radio bearers (e.g., data radio bearers) may be established between the wireless device 801 and the AN 802. The radio bearers in 5G, between the wireless device 801 and the AN 802, may be distinct from bearers in LTE (e.g., evolved packet system (EPS) bearers between a wireless device and a packet data network gateway (PGW), S1 bearers between an eNB and a serving gateway (SGW), and/or an S5/S8 bearer between an SGW and a PGW).

A packet associated with a particular QoS flow may be received at the AN 802 via the resource 820A or the resource 820B. The AN 802 may separate packets into respective QoS flows 856A-856C based on QoS profiles 828. The QoS profiles 828 may be received from an SMF. A QoS profile (e.g., each QoS profile) may correspond to a QFI (e.g., the QFI marked on the uplink packets 812A-812E). A QoS profile (e.g., each QoS profile) may comprise QoS parameters. The QoS parameters may comprise/indicate one or both of 5G QoS identifier (5QI) and/or an allocation and retention priority (ARP). The QoS profile for non-GBR QoS flows may comprise/indicate other/additional QoS parameters (e.g., a reflective QoS attribute (RQA)). The QoS profile for GBR QoS flows may further comprise/indicate additional QoS parameters (e.g., a GFBR, an MFBR, and/or a maximum packet loss rate). The 5QI may be a standardized 5QI having one-to-one mapping to a standardized combination of 5G QoS characteristics. The 5QI may be a dynamically assigned 5QI for which the standardized 5QI values may not be defined. The 5QI may represent 5G QoS characteristics. The 5QI may comprise/indicate one or more of a resource type, a default priority level, a packet delay budget (PDB), a packet error rate (PER), a maximum data burst volume, and/or an averaging window. The resource type may indicate a non-GBR QoS flow, a GBR QoS flow, and/or a delay-critical GBR QoS flow. The averaging window may represent a duration over which the GFBR and/or MFBR may be calculated/determined. The ARP may be a priority level comprising pre-emption capability and a pre-emption vulnerability. The AN 802 may apply admission control for the QoS flows (e.g., if resource limitations are determined), for example, based on the ARP.

The AN 802 may select/determine one or more N3 tunnels for transmission of the QoS flows 856A-856C. The packets (e.g., the uplink packets 812A-812E) may be sent to the UPF 805 (e.g., towards a DN) via the selected one or more N3 tunnels. The UPF 805 may verify that the QFIs of the uplink packets 812A-812E are aligned with the QoS rules 814 provided to the wireless device 801. The UPF 805 may measure, count packets, and/or provide packet metrics to one or more other entities in the network (e.g., a NF such as a PCF).

FIG. 8 shows a process that may comprise downlink transmissions. One or more applications may generate downlink packets 852A-852E. The UPF 805 may receive the downlink packets 852A-852E from one or more DNs and/or one or more other UPFs. The UPF 805 may apply PDRs 854 to downlink the packets 852A-852E, for example, based on the QoS model. The UPF 805 may map, based on the PDRs 854, the packets 852A-852E into QoS flows. As shown in FIG. 8, downlink packets 852A, 852B may be mapped to a QoS flow 856A, downlink packet 852C may be mapped to a QoS flow 856B, and/or the remaining packets may be mapped to a QoS flow 856C.

The QoS flows 856A-856C may be sent to the AN 802. The AN 802 may apply resource mapping rules to the QoS flows 856A-856C. The QoS flow 856A may be mapped to the resource 820A. The QoS flows 856B, 856C may be mapped to the resource 820B. The resource mapping rules may designate more resources to high priority QoS flows in order to meet QoS requirements.

FIGS. 9A-9D show example states and state transitions of a wireless device. The wireless device, at any given time, may have (or be associated with) one or more of an RRC state, a registration management (RM) state, and/or a connection management (CM) state.

Figure 9A:
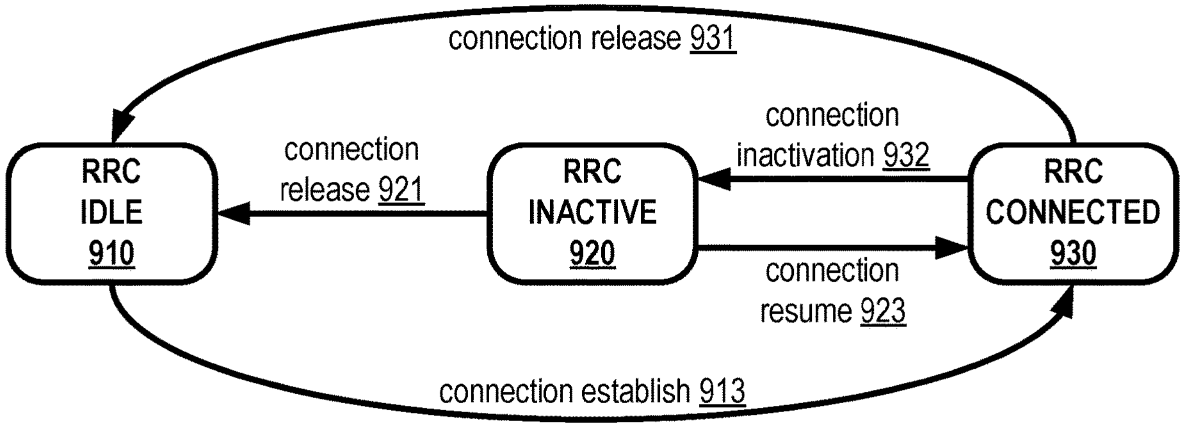
FIG. 9A, FIG. 9B, FIG. 9C, and FIG. 9D show example states and state transitions of a wireless device.

FIG. 9A shows RRC state transitions of a wireless device. The wireless device may be in one of three RRC states: RRC idle 910 (e.g., RRC_IDLE), RRC inactive 920 (e.g., RRC_INACTIVE), or RRC connected 930 (e.g., RRC_CONNECTED). The wireless device may implement/apply/use different RAN-related control plane procedures, for example, depending on the RRC state of the wireless device. Other elements of the network (e.g., a base station) may track RRC state(s) of one or more wireless devices and/or implement/apply/use RAN-related control plane procedures appropriate to an RRC state of each wireless device.

The wireless device may exchange data with a network (e.g., a base station) in an RRC connected state (e.g., RRC connected 930). The parameters necessary for exchange of data may be established and/or may be known to both the wireless device and the network. The parameters may be referred to (and/or may be included in) an RRC context of the wireless device (e.g., which may be referred to as a wireless device context). The parameters may comprise, for example, one or more access stratum (AS) contexts, one or more radio link configuration parameters, bearer configuration information (e.g., relating to a data radio bearer, signaling radio bearer, logical channel, QoS flow, and/or PDU session), security information, and/or PHY layer, MAC layer, RLC layer, PDCP layer, and/or SDAP layer configuration information. The base station with which the wireless device may be connected may store the RRC context of the wireless device.

Mobility of the wireless device, in the RRC connected state, may be managed by the access network. The wireless device may manage mobility, for example, if the wireless device is in an RRC idle state (e.g., the RRC idle 910) and/or an RRC inactive state (e.g., the RRC inactive 920). The wireless device may manage mobility, for example, by measuring signal levels (e.g., reference signal levels) of signals from a serving cell and neighboring cells, and/or by reporting measurements to the base station currently serving the wireless device. The network may initiate handover, for example, based on the reported measurements. The RRC state may transition from the RRC connected state to the RRC idle state via a connection release procedure 930. The RRC state may transition from the RRC connected state to the RRC inactive state via a connection inactivation procedure 932.

An RRC context may not be established for the wireless device. For example, this may be during the RRC idle state. During the RRC idle state (e.g., the RRC idle 910), an RRC context may not be established for the wireless device. During the RRC idle state (e.g., the RRC idle 910), the wireless device may not have an RRC connection with the base station. During the RRC idle state (e.g., the RRC idle 910), the wireless device may be in a sleep state for the majority of the time (e.g., to conserve battery power). The wireless device may wake up periodically (e.g., each discontinuous reception (DRX) cycle) to monitor for paging messages (e.g., paging messages set from the AN). Mobility of the wireless device may be managed by the wireless device via a procedure of a cell reselection. The RRC state may transition from the RRC idle state (e.g., the RRC idle 910) to the RRC connected state (e.g., the RRC connected 930) via a connection establishment procedure 913, which may involve a random-access procedure.

A previously established RRC context may be maintained for the wireless device. For example, this may be during the RRC inactive state. During the RRC inactive state (e.g., the RRC inactive 920), the RRC context previously established may be maintained in the wireless device and the base station. The maintenance of the RRC context may enable/allow a fast transition to the RRC connected state (e.g., the RRC connected 930) with reduced signaling overhead as compared to the transition from the RRC idle state (e.g., the RRC idle 910) to the RRC connected state (e.g., the RRC connected 930). The RRC state may transition from the RRC inactive state (e.g., the RRC inactive 920) to the RRC connected state (e.g., the RRC connected 930) via a connection resume procedure 923. The RRC state may transition from the RRC inactive state (e.g., the RRC inactive 920) to the RRC idle state (e.g., the RRC idle 910) via a connection release procedure 921 that may be the same as or similar to connection release procedure 931.

An RRC state may be associated with a mobility management mechanism. During the RRC idle state (e.g., RRC idle 910) and the RRC inactive state (e.g., the RRC inactive 920), mobility may be managed/controlled by the wireless device via a cell reselection. The purpose of mobility management during the RRC idle state (e.g., the RRC idle 910) or during the RRC inactive state (e.g., the RRC inactive 920) may be to enable/allow the network to be able to notify the wireless device of an event via a paging message without having to broadcast the paging message over the entire mobile communications network. The mobility management mechanism used during the RRC idle state (e.g., the RRC idle 910) and/or during the RRC inactive state (e.g., the RRC inactive 920) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms may be based on different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN may send to the wireless device a list of TAIs associated with a wireless device registration area (e.g., a wireless device registration area). A wireless device may perform a registration update with the CN to allow the CN to update the location of the wireless device and provide the wireless device with a new the wireless device registration area, for example, if the wireless device moves (e.g., via a cell reselection) to a cell associated with a TAI that may not be included in the list of TAIs associated with the wireless device registration area.

RAN areas may be used to track the wireless device (e.g., the location of the wireless device at the RAN level). For a wireless device in an RRC inactive state (e.g., the RRC inactive 920), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 920).

Figure 9B:
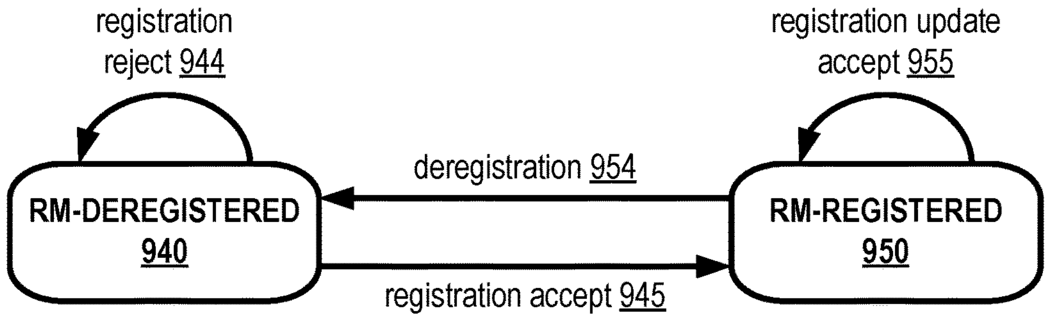

FIG. 9B shows example registration management (RM) state transitions of a wireless device. The states may be RM deregistered 940, (e.g., an RM deregistered state, RM-DEREGISTERED) and RM registered 950 (e.g., an RM deregistered state, RM-REGISTERED).

The wireless device (e.g., in RM deregistered state) may not be registered with the network, and/or the wireless device may not be reachable by the network. The wireless device may perform an initial registration, for example, in order to be reachable by the network. The wireless device may register with an AMF of the network. The wireless device may remain in the RM deregistered state, for example, if registration is rejected (e.g., via a registration reject procedure 944). The wireless device may transition to the RM registered state, for example, if the registration is accepted (e.g., via a registration accept procedure 945). The network may store, keep, and/or maintain a wireless device context for the wireless device, for example, if (e.g., while) the wireless device is in RM registered state. The wireless device context corresponding to network registration (e.g., maintained by the core network) may be different from the RRC context corresponding to RRC state (e.g., maintained by an access network or an element thereof, such as a base station). The wireless device context may comprise a wireless device indicator/identifier and a record of information relating to the wireless device. The information relating to the wireless device may comprise one or more of wireless device capability information, policy information for access and mobility management of the wireless device, lists of allowed or established slices or PDU sessions, and/or a registration area of the wireless device (i.e., a list of tracking areas covering the geographical area where the wireless device is likely to be found).

The network may store the wireless device context of the wireless device, for example, if (e.g., while) the wireless device is in an RM registered state. The network may (e.g., if necessary) use the wireless device context to reach/communicate the wireless device, for example, if (e.g., while) the wireless device is in an RM registered state. Some services may not be provided by the network unless the wireless device is registered. The wireless device may update its wireless device context while remaining in the RM registered state (e.g., via a registration update accept procedure 955). The wireless device may provide a tracking area indicator/identifier to the network, for example, if the wireless device leaves one tracking area and enters another tracking area. The network may deregister the wireless device, or the wireless device may deregister itself (e.g., via a deregistration procedure 954). The network may automatically deregister the wireless device if the wireless device is inactive for a certain amount of time. The wireless device may transition to the RM deregistered state, for example, based on the deregistration.

Figure 9C:
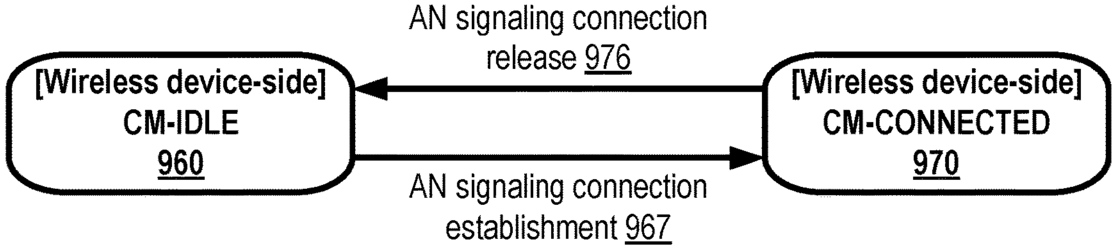

FIG. 9C shows example connection management (CM) state transitions of a wireless device. The example CM state transitions of the wireless device as shown in FIG. 9C are from a perspective of the wireless device. The wireless device may be in CM idle 960 (e.g., CM idle state, CM-IDLE) or CM connected 970 (e.g., CM connected state, CM-CONNECTED).

The wireless device may not have a NAS signaling connection with the network, for example, if the wireless device is in a CM idle state. The wireless device may not communicate with core network functions, for example, based on not having the NAS signaling connection. The wireless device may transition to a CM connected state by establishing an AN signaling connection (e.g., via an AN signaling connection establishment procedure 967). The transition may be initiated by sending an initial NAS message. The initial NAS message may be a registration request (e.g., if the wireless device is in an RM deregistered state) or a service request (e.g., if the wireless device is in an RM registered state). The wireless device may initiate the AN signaling connection establishment by sending a service request and/or the network may send a page (e.g., triggering the wireless device to send the service request), for example, If the wireless device is in an RM registered state.

The wireless device may communicate with core network functions using NAS signaling, for example, if the wireless device is in a CM connected state. For example, the wireless device may exchange (e.g., send and/or receive) NAS signaling with an AMF for registration management purposes, service request procedures, and/or authentication procedures. The wireless device may exchange NAS signaling, with an SMF, to establish and/or modify a PDU session. The network may disconnect the wireless device, or the wireless device may disconnect itself (e.g., via an AN signaling connection release procedure 976). The wireless device may transition to the CM idle state, for example, if the wireless device transitions to the RM deregistered state. The network may deactivate a user plane connection of a PDU session of the wireless device, for example, based on the wireless device transitioning to the CM idle state.

Figure 9D:

FIG. 9D shows example CM state transitions of the wireless device. The example CM state transitions of the wireless device as shown in FIG. 9D may be from a network perspective (e.g., an AMF perspective). The CM state of the wireless device, as tracked by the AMF, may be CM idle 980 (e.g., CM idle state, CM-IDLE) or CM connected 990 (e.g., CM connected state, CM-CONNECTED). The AMF many establish an N2 context of the wireless device (e.g., via an N2 context establishment procedure 989), for example, based on the wireless device transitioning from CM idle 980 to CM connected 990. The AMF may release the N2 context of the wireless device (e.g., via an N2 context release 998 procedure), for example, based on the wireless device transitioning from CM connected 990 to CM idle 980.

Figure 10:
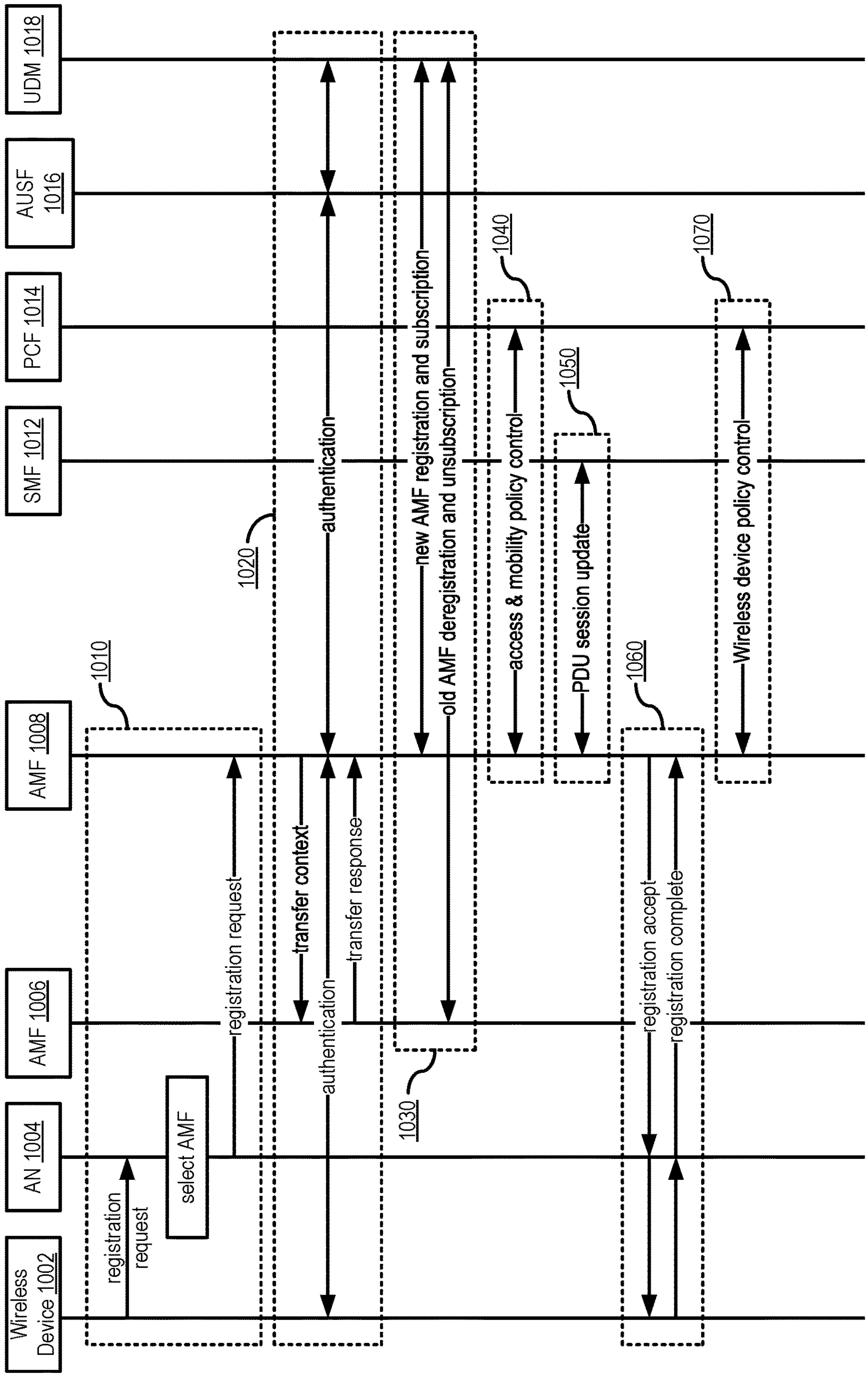
FIG. 10 shows an example registration procedure for a wireless device.
Figure 11:
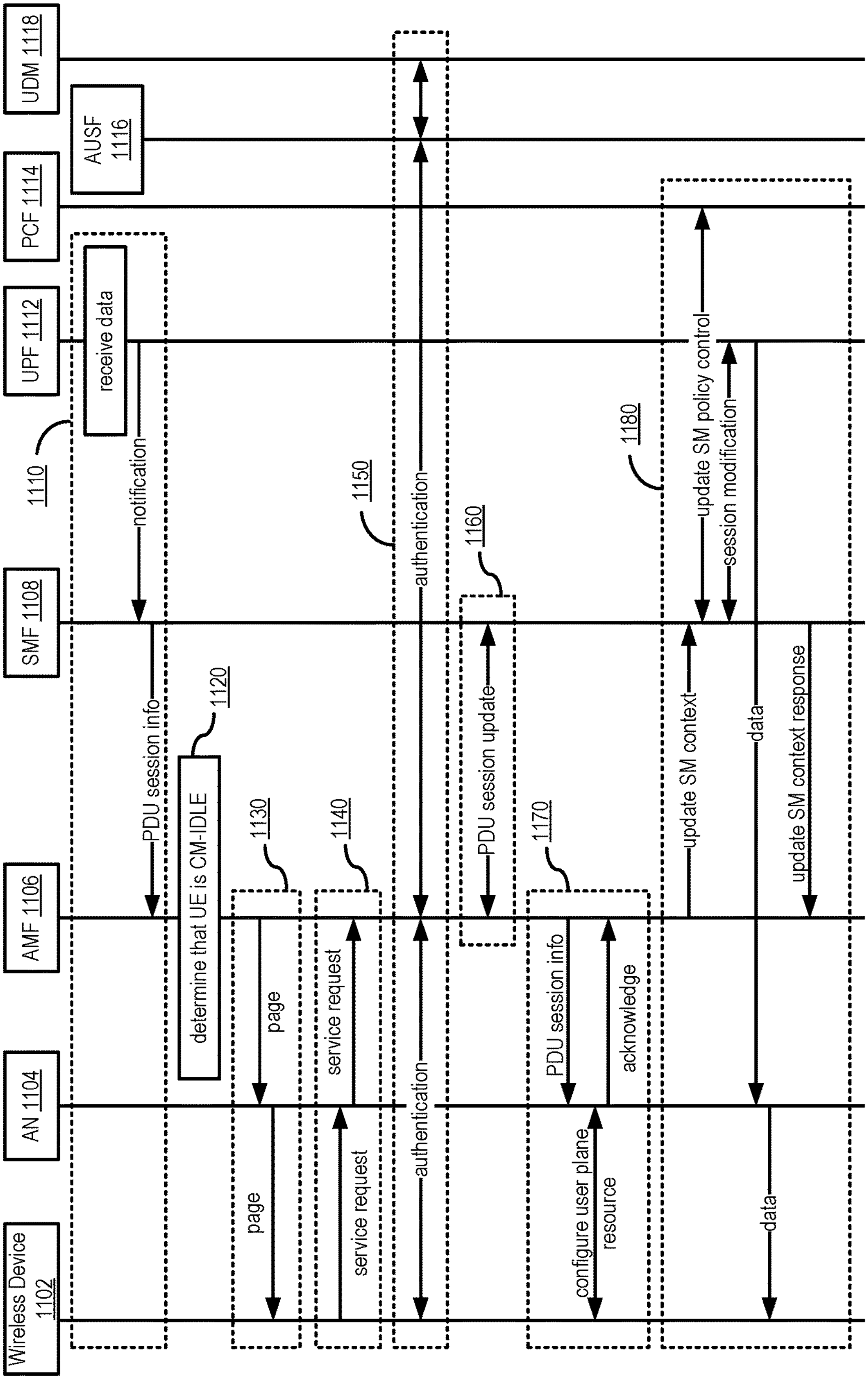
FIG. 11 shows an example service request procedure for a wireless device.
Figure 12:
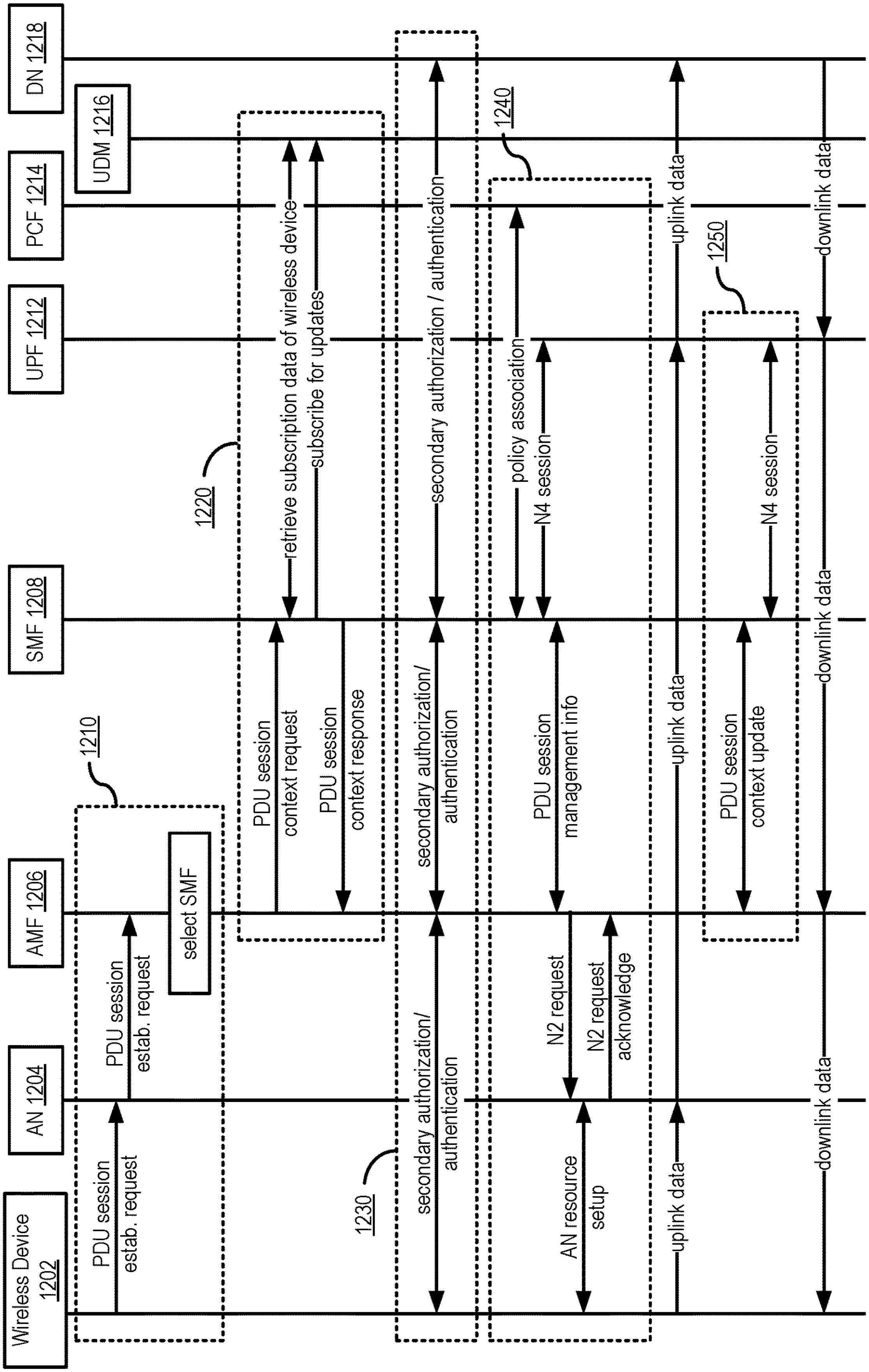
FIG. 12 shows an example of a protocol data unit session establishment procedure for a wireless device.

FIG. 10, FIG. 11, and FIG. 12 show example procedures for registering, service request, and PDU session establishment of a wireless device. FIG. 10 shows an example registration procedure for a wireless device. The wireless device 1002 may transition from an RM deregistered state (e.g., RM deregistered 940) to an RM registered state (e.g., RM registered 950), for example, based on the registration procedure.

Registration may be initiated by a wireless device 1002 for obtaining authorization to receive services, enabling mobility tracking, enabling reachability, and/or any other purpose. The wireless device 1002 may perform an initial registration (e.g., as a first step toward connecting to the network). For example, the wireless device 1002 may perform an initial registration based on the wireless device being powered on (e.g., if the wireless device is powered on), based on an airplane mode being turned off (e.g., if an airplane mode is turned off), and/or based on one or more other conditions and/or events. Registration may be performed periodically which may keep the network informed of the wireless device's presence (e.g., while the wireless device 1002 is in a CM idle state). Registration may be performed based on (e.g., in response to) a change in wireless device capability and/or registration area. Deregistration (not shown in FIG. 10) may be performed to stop network access.

At step 1010, the wireless device 1002 may send/transmit a registration request to an AN 1004. For example, the wireless device 1002 may have moved from a coverage area of a previous AMF (e.g., AMF 1006) into a coverage area of a new AMF (e.g., AMF 1008). The registration request may be/comprise a NAS message. The registration request may comprise a wireless device identifier. The AN 1004 may determine/select an AMF for registration of the wireless device. The AN 1004 may select a default AMF, or may determine/select an AMF that is already mapped to the wireless device 1002 (e.g., a previous AMF). The NAS registration request may comprise a network slice identifier. The AN 1004 may determine/select an AMF based on the requested slice. The AN 1004 may send the registration request to the selected AMF, for example, based on determination of the selected AMF. The selected AMF (e.g., AMF 1008) may receive the registration request.

At step 1020, the AMF that receives the registration request (e.g., AMF 1008) may perform a context transfer. The context may be a wireless device context (e.g., an RRC context for the wireless device). The AMF 1008 may send, to the AMF 1006, a message (e.g., an Namf_Communication_UEContextTransfer message) requesting a context of the wireless device. The message may comprise the wireless device indicator/identifier. The AMF 1006 may send, to the AMF 1008, a message (e.g., an Namf_Communication_UEContextTransfer message) that comprises the requested wireless device context. The AMF 1008 may coordinate authentication of the wireless device 1002, for example, based on receiving the wireless device context. The AMF 1008 may send, to the AMF 1006 and based on completion of authentication, a message (e.g., an Namf_Communication_UEContextTransfer Response message) indicating that the wireless device context transfer is complete.

The authentication may involve participation of one or more of the wireless device 1002, an AUSF 1016, a UDM 1018 and/or a UDR (not shown). The AMF 1008 may request that the AUSF 1016 authenticate the wireless device 1002. The AUSF may execute authentication of the wireless device 1002 (e.g., based on the request). The AUSF 1016 may get authentication data from the UDM 1018. The AUSF 1016 may send, to the AMF 1008, a subscription permanent identifier (SUPI), for example, based on the authentication being successful. The AUSF 1016 may provide an intermediate key to the AMF 1008. The intermediate key may be used to derive an access-specific security key for the wireless device 1002. The access-specific security key may enable the AMF 1008 to perform security context management (SCM). The AUSF 1016 may obtain subscription data from the UDM 1018. The subscription data may be based on information obtained from the UDM 1018 (and/or the UDR). The subscription data may comprise subscription identifiers/indicators, security credentials, access and mobility related subscription data, and/or session related data.

At step 1030, the AMF 1008 may register and/or subscribe to the UDM 1018. The AMF 1008 may perform registration using a wireless device context management service of the UDM 1018 (e.g., Nudm_UECM). The AMF 1008 may obtain subscription information of the wireless device 1002 using a subscriber data management service of the UDM 1018 (e.g., Nudm_SDM). The AMF 1008 may further request that the UDM 1018 notify/send a notification to the AMF 1008 if the subscription information of the wireless device 1002 changes. The AMF 1006 may deregister and unsubscribe, for example, based on the AMF 1008 registering and/or subscribing. The AMF 1006 may no longer need to perform mobility management of the wireless device 1006, for example, based on (e.g., after) deregistering.

At step 1040, the AMF 1008 may retrieve access and mobility (AM) policies from the PCF 1014. The AMF 1008 may provide subscription data of the wireless device 1002 to the PCF 1014. The PCF 1014 may determine access and mobility policies for the wireless device 1002, for example, based on the subscription data, network operator data, current network conditions, and/or other suitable information. For example, the owner/user of a first wireless device may purchase a higher level of service than the owner/user of a second wireless device. The PCF 1014 may provide the rules associated with the different levels of service. The network may apply different policies which facilitate different levels of service, for example, based on the subscription data of the respective wireless devices.

Access and mobility policies may relate to (e.g., may be based on and/or comprise) service area restrictions, radio access technology (RAT) frequency selection priority (RFSP), authorization and prioritization of access type (e.g., LTE versus NR), and/or selection of non-3GPP access (e.g., access network discovery and selection policy (ANDSP)). The service area restrictions may comprise list(s) of tracking areas where the wireless device is allowed to be served (and/or forbidden from being served). The access and mobility policies may comprise a wireless device (e.g., UE) route selection policy (URSP) that may influence routing to an established PDU session and/or a new PDU session. Different policies may be obtained and/or be enforced based on subscription data of the wireless device, location of the wireless device (e.g., location of the AN and/or AMF), and/or other suitable factors.

At step 1050, the AMF 1008 may update a context of a PDU session. The AMF 1008 may coordinate/communicate with an SMF (e.g., SMF 1012) to activate a user plane connection associated with an existing PDU session, for example, if the wireless device has/is associated with the existing PDU session. The SMF 1012 may update and/or release a session management context of the PDU session (e.g., Nsmf_PDUSession_UpdateSMContext, Nsmf_PDUSession_ReleaseSMContext).

At step 1060, the AMF 1008 may send a registration accept message to the AN 1004. The AN 1004 may forward the registration accept message to the wireless device 1002. The registration accept message may comprise a new wireless device indicator/identifier and/or a new configured slice indicator/identifier. The wireless device 1002 may send/transmit a registration complete message to the AN 1004. The AN 1004 may forward the registration complete message to the AMF 1008. The registration complete message may acknowledge receipt of the new wireless device identifier and/or new configured slice identifier.

At step 1070, the AMF 1008 may receive/obtain wireless device policy control information from the PCF 1014. The PCF 1014 may send/provide an ANDSP (e.g., to facilitate non-3GPP access). The PCF 1014 may provide URSP to facilitate mapping of particular data traffic to particular PDU session connectivity parameters. The URSP may indicate that data traffic associated with a particular application should be mapped to a particular SSC mode, network slice, PDU session type, and/or preferred access type (e.g., 3GPP or non-3GPP).

FIG. 11 shows an example service request procedure for a wireless device. The service request procedure may be a network-triggered service request procedure for a wireless device in a CM idle state. Other service request procedures (e.g., a wireless device-triggered service request procedure) may be performed in a manner similar to that described with reference to FIG. 11.

At step 1110, a UPF 1112 may receive data. The data may be downlink data for transmission to a wireless device (e.g., wireless device 1102). The data may be associated with an existing PDU session between the wireless device 1102 and a DN. The data may be received from a DN and/or another UPF. The UPF 1112 may buffer the received data. The UPF 1112 may notify an SMF (e.g., SMF 1108) of the received data, for example, based on (e.g., in response to) receiving the data. The identity of the SMF to be notified may be determined based on the received data. The notification may be an N4 session report. The notification may indicate that the UPF 1112 has received data associated with the wireless device 1102 and/or a particular PDU session associated with the wireless device 1102. The SMF 1108 may send PDU session information to an AMF 1106, for example, based on (e.g., in response to) receiving the notification. The PDU session information may be sent in an N1N2 message transfer for forwarding to an AN 1104. The PDU session information may comprise UPF tunnel endpoint information and/or QoS information.

At step 1120, the AMF 1106 may determine that the wireless device 1102 is in a CM idle state. The determining may be based on (e.g., in response to) the receiving of the PDU session information. The service request procedure may proceed to steps 1130 and 1140, for example, based on the determination that the wireless device is in CM idle state. The steps 1130 and 1140 may be skipped, and the service request procedure may proceed directly to 1150, for example, based on determining that the wireless device is not in CM idle state (e.g., the wireless device is in CM connected state).

At step 1130, the AMF 1106 may page the wireless device 1102. The paging at step 1130 may be performed based on the wireless device being in a CM idle state. The AMF 1106 may send a page to the AN 1104 to perform the paging. The page may be referred to as a paging or a paging message. The page may be an N2 request message. The AN 1104 may be one of a plurality of ANs in a RAN notification area of the wireless device 1102. The AN may send a page to the wireless device 1102. The wireless device 1102 may be in a coverage area of the AN 1104 and may receive the page.

At step 1140, the wireless device 1102 may request service. The wireless device 1102 may send/transmit a service request to the AMF 1106 via the AN 1104. The wireless device 1102 may request service at step 1140, for example, based on (e.g., in response to) receiving the paging at step 1130. The wireless device 1102 may receive the page and request service based on the service request procedure being a network-triggered service request procedure. The wireless device 1102 may commence a wireless device-triggered service request procedure in some scenarios (e.g., if uplink data becomes available at the wireless device). The wireless device-triggered service request procedure may commence starting at step 1140 (e.g., one or more of steps 1110 and 1120 may be skipped).

At step 1150, the network may authenticate the wireless device 1102. Authentication may require participation of the wireless device 1102, an AUSF 1116, and/or a UDM 1118 (e.g., as described herein). The authentication at step 1150 may be skipped, for example, in one or more scenarios (e.g., if the wireless device 1102 has recently been authenticated).

At step 1160, the AMF 1106 and the SMF 1108 may perform a PDU session update. The PDU session update may comprise the SMF 1108 providing, to the AMF 1106, with one or more UPF tunnel endpoint identifiers. The SMF 1108 may coordinate with one or more other SMFs and/or one or more other UPFs to set up a user plane.

At step 1170, the AMF 1106 may send PDU session information to the AN 1104. The PDU session information may be included in an N2 request message. The AN 1104 may configure a user plane resource for the wireless device 1102, for example, based on the PDU session information. The AN 1104 may perform an RRC reconfiguration of the wireless device 1102, for example, to configure the user plane resource. The AN 1104 may acknowledge the AMF 1106 (e.g., send an acknowledgment message to the AMF 1106 indicating) that the PDU session information has been received. The AN 1104 may notify the AMF 1106 (e.g., via the acknowledgment message) that the user plane resource has been configured, and/or provide information relating to the user plane resource configuration.

The wireless device 1102 may receive (e.g., at step 1170), for a wireless device-triggered service procedure, a NAS service accept message from the AMF 1106 via the AN 1104. The wireless device 1102 may send/transmit uplink data (e.g., the uplink data that caused the wireless device 1102 to trigger the service request procedure), for example, based on (e.g., after) configuring the user plane resource.

At step 1180, the AMF 1106 may update a session management (SM) context of the PDU session. The AMF 1106 may notify the SMF 1108 (and/or one or more other associated SMFs) that the user plane resource has been configured, and/or may provide information relating to the user plane resource configuration. The AMF 1106 may provide/send to the SMF 1108 (and/or one or more other associated SMFs) one or more AN tunnel endpoint identifiers/indicators of the AN 1104. The SMF 1108 may send an update SM context response message to the AMF 1106, for example, based on (e.g., after) the SM context update being complete.

The SMF 1108 may update a PCF (e.g., the PCF 1114) for purposes of policy control, for example, based on the update of the session management context. For example, the SMF 1108 may notify (e.g., via PCF 1114 update) the PCF 1114 of a new location of the wireless device 1102 if a location of the wireless device 1102 has changed. The SMF 1108 and the UPF 1112 may perform a session modification, for example, based on the update of the session management context. The session modification may be performed using N4 session modification messages. The UPF 1112 may send/transmit downlink data (e.g., the downlink data that caused the UPF 1112 to trigger the network-triggered service request procedure) to the wireless device, for example, based on the session modification being completed. The sending/transmitting of the downlink data may be based on the one or more AN tunnel endpoint identifiers of the AN 1104.

FIG. 12 shows an example PDU session establishment procedure for a wireless device. The wireless device 1202 may determine to send/transmit a PDU session establishment request (e.g., for the PDU session establishment procedure) to create a new PDU session, to hand over an existing PDU session to a 3GPP network, and/or for any other suitable reason.

At step 1210, the wireless device 1202 may initiate PDU session establishment. The wireless device 1202 may send/transmit a PDU session establishment request, via an AN 1204, to an AMF 1206. The PDU session establishment request may be a NAS message. The PDU session establishment request may indicate/comprise one or more of: a PDU session indicator/ID; a requested PDU session type (e.g., whether the requested PDU session is new or existing); a requested DN (e.g., a DNN); a requested network slice (S-NSSAI); a requested SSC mode; and/or any other suitable information. The PDU session ID may be generated by the wireless device 1202. The PDU session type may be, for example, an Internet Protocol (IP)-based type (e.g., IPv4, IPv6, or dual stack IPv4/IPv6), an Ethernet type, or an unstructured type.

The AMF 1206 may determine/select an SMF (e.g., SMF 1208) based on the PDU session establishment request. The requested PDU session may, in at least some scenarios, already be associated with a particular SMF. For example, the AMF 1206 may store a wireless device context of the wireless device 1202, and the wireless device context may indicate that the PDU session ID of the requested PDU session is already associated with the particular SMF. In some scenarios, the AMF 1206 may select the SMF based on a determination that the SMF is prepared to handle the requested PDU session. For example, the requested PDU session may be associated with a particular DNN and/or S-NSSAI. The SMF may be selected based on a determination that the SMF can manage a PDU session associated with the particular DNN and/or S-NSSAI.

At step 1220, the network may manage a context of the PDU session. The AMF 1206 may send a PDU session context request to the SMF 1208, for example, based on (e.g., after) selecting the SMF 1208 at 1210. The PDU session context request may comprise the PDU session establishment request received from the wireless device 1202 at step 1210. The PDU session context be a request may Nsmf_PDUSession_CreateSMContext Request and/or a Nsmf_PDUSession_UpdateSMContext Request. The PDU session context request may indicate/comprise indicators/identifiers of the wireless device 1202; the requested DN; and/or the requested network slice. The SMF 1208 may retrieve subscription data from a UDM 1216, for example, based on the PDU session context request. The subscription data may be session management subscription data of the wireless device 1202. The SMF 1208 may subscribe for updates to the subscription data. The PCF 1208 may send, to the SMF 1208, new information if the subscription data of the wireless device 1202 changes, for example, based on the SMF 1208 subscribing for the updates. The SMF 1208 may send/transmit a PDU session context response to the AMF 1206, for example, based on (e.g., after) receiving/obtaining the subscription data of the wireless device 1202. The PDU session context response may be a Nsmf_PDUSession_CreateSMContext Response and/or a Nsmf_PDUSession_UpdateSMContext Response. The PDU session context response may include/comprise a session management context ID.

At step 1230, secondary authorization/authentication may be performed, if necessary. The secondary authorization/authentication may involve the wireless device 1202, the AMF 1206, the SMF 1208, and/or the DN 1218. The SMF 1208 may access the DN 1218 via a server (e.g., a data network authentication, authorization, and accounting (DN AAA) server).

At step 1240, the network may set up a data path for uplink data associated with the PDU session. The SMF 1208 may select/determine a PCF (e.g., a PCF 1214). The SMF 1208 may establish a session management policy association. The PCF 1214 may provide an initial set of policy control and charging rules (PCC rules) for the PDU session, for example, based on the association. The PCF 1214 may (e.g., if targeting a particular PDU session) indicate, to the SMF 1208, one or more of a method for allocating an IP address to the PDU Session, a default charging method for the PDU session, an address of the corresponding charging entity, triggers for requesting new policies, and/or any other method, action, and/or information. The PCF 1214 may target a service data flow (SDF) comprising one or more PDU sessions. The PCF may (e.g., if targeting an SDF) indicate, to the SMF 1208, policies for one or more of applying QoS requirements, monitoring traffic (e.g., for charging purposes), steering traffic (e.g., by using one or more particular N6 interfaces), and/or any other purpose.

The SMF 1208 may determine and/or allocate an IP address for the PDU session. The SMF 1208 may select one or more UPFs (e.g., a single UPF 1212 as shown in FIG. 12) to handle the PDU session. The SMF 1208 may send an N4 session message to the selected UPF 1212. The N4 session message may be an N4 session establishment request and/or an N4 session modification request. The N4 session message may include/comprise packet detection, enforcement, and/or reporting rules associated with the PDU session. The UPF 1212 may acknowledge the N4 session message by sending an N4 session establishment response and/or an N4 session modification response.

The SMF 1208 may send PDU session management information to the AMF 1206. The PDU session management information may be/comprise a Namf_Communication_N1N2MessageTransfer message. The PDU session management information may include/comprise the PDU session ID. The PDU session management information may be/comprise a NAS message. The PDU session management information may include/comprise N1 session management information and/or N2 session management information. The N1 session management information may include/comprise a PDU session establishment accept message. The PDU session establishment accept message may include/comprise tunneling endpoint information of the UPF 1212 and QoS information associated with the PDU session.

The AMF 1206 may send an N2 request to the AN 1204. The N2 request may include/comprise the PDU session establishment accept message. The AN 1204 may determine AN resources for the wireless device 1202, for example, based on the N2 request. The AN resources may be used by the wireless device 1202 to establish the PDU session, via the AN 1204, with the DN 1218. The AN 1204 may determine resources to be used for the PDU session and indicate, to the wireless device 1202, the determined resources. The AN 1204 may send the PDU session establishment accept message to the wireless device 1202. The AN 1204 may perform an RRC reconfiguration of the wireless device 1202. The AN 1204 may send an N2 request acknowledge to the AMF 1206, for example, based on (e.g., after) the AN resources being set up. The N2 request acknowledge may include/comprise N2 session management information (e.g., the PDU session ID and tunneling endpoint information of the AN 1204).

The wireless device 1202 may (e.g., optionally) send uplink data associated with the PDU session, for example, based on the data path for uplink data being set up (e.g., at step 1240). The uplink data may be sent to a DN 1218, associated with the PDU session, via the AN 1204 and the UPF 1212.

At step 1250, the network may update the PDU session context. The AMF 1206 may send/transmit a PDU session context update request to the SMF 1208. The PDU session context update request may be a Nsmf_PDUSession_UpdateSMContext request. The PDU session context update request may comprise the N2 session management information received from the AN 1204. The SMF 1208 may acknowledge (e.g., send an acknowledgment message based on/in response to) the PDU session context update. The acknowledgement may be a Nsmf_PDUSession_UpdateSMContext response. The acknowledgement may comprise a subscription requesting that the SMF 1208 be notified of any wireless device mobility event. The SMF 1208 may send an N4 session message to the UPF 1212, for example, based on the PDU session context update request. The N4 session message may be an N4 session modification request. The N4 session message may comprise tunneling endpoint information of the AN 1204. The N4 session message may comprise forwarding rules associated with the PDU session. The UPF 1212 may acknowledge (e.g., reception of the N4 session message) by sending an N4 session modification response.

The UPF 1212 may relay downlink data associated with the PDU session, for example, based on (e.g., after) the UPF 1212 receiving the tunneling endpoint information of the AN 1204 The downlink data may be received from a DN 1218, associated with the PDU session, via the AN 1204 and the UPF 1212.

Figure 13A:
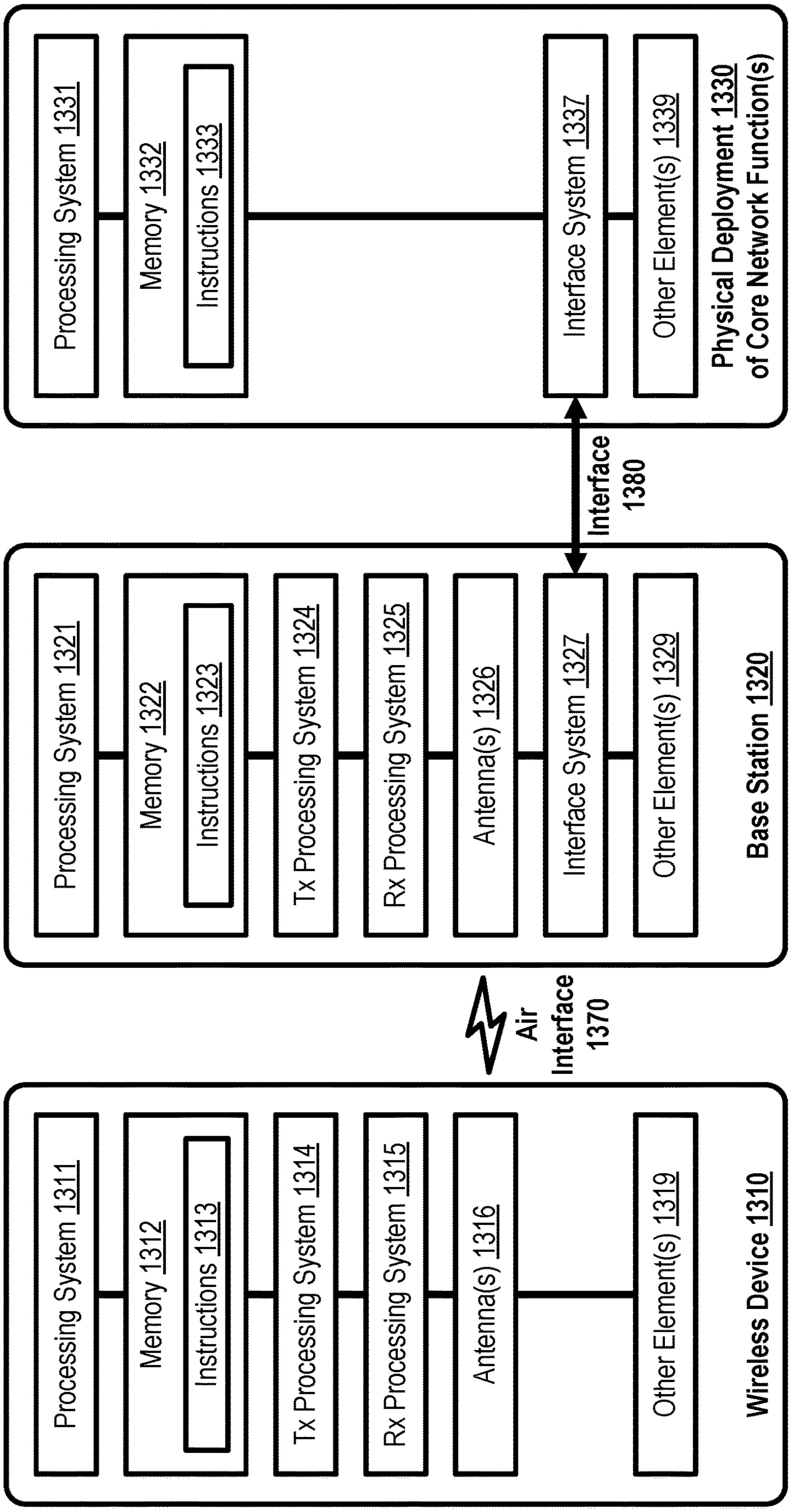
FIG. 13A shows example elements in a communications network.

FIG. 13A shows example elements in a communications network. FIG. 13A shows a wireless device 1310, a base station 1320, and a physical deployment of one or more network functions 1330 (henceforth, "deployment 1330"). Any wireless device described herein may have similar components and/or may be implemented in a similar manner as the wireless device 1310. Any base station described herein (or any portion of the base station, depending on the architecture of the base station) may have similar components and/or may be implemented in a similar manner as the base station 1320. Any physical core network deployment described herein (or any portion of the deployment, depending on the architecture of the deployment) may have similar components and may be implemented in a similar manner as the deployment 1330.

The wireless device 1310 may communicate with base station 1320 over an air interface 1370. A communication direction from wireless device 1310 to base station 1320 over air interface 1370 may be known as uplink, and a communication direction from base station 1320 to wireless device 1310 over air interface 1370 may be known as downlink. Downlink transmissions may be separated from uplink transmissions using FDD, TDD, and/or some combination of duplexing techniques. FIG. 13A shows a single wireless device 1310 and a single base station 1320, but it may be understood that wireless device 1310 may communicate with any number/quantity of base stations and/or other access network components over air interface 1370, and it may be understood that that base station 1320 may communicate with any number/quantity of wireless devices over air interface 1370.

The wireless device 1310 may comprise a processing system 1311 and a memory 1312. The memory 1312 may comprise one or more computer-readable media (e.g., one or more non-transitory computer readable media). The memory 1312 may include/comprise/store instructions 1313. The processing system 1311 may process and/or execute the instructions 1313. Processing and/or execution of the instructions 1313 may cause the wireless device 1310 and/or the processing system 1311 to perform one or more functions or activities. The memory 1312 may include/comprise data (not shown). One of the functions or activities performed by the processing system 1311 may be to store data in the memory 1312 and/or retrieve previously-stored data from the memory 1312. For example, downlink data received from the base station 1320 may be stored in the memory 1312, and uplink data for transmission to the base station 1320 may be retrieved from the memory 1312. The wireless device 1310 may communicate with the base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13A, the transmission processing system 1314 and/or the reception processing system 1315 may be coupled to a dedicated memory that may be analogous to but separate from the memory 1312. The dedicated memory may comprise instructions that may be processed and/or executed to carry out one or more respective functionalities of the transmission processing system 1314 and/or the reception processing system 1315. The wireless device 1310 may comprise one or more antennas 1316 to access the air interface 1370.

The wireless device 1310 may comprise one or more other elements 1319. The one or more other elements 1319 may comprise software and/or hardware that may provide features and/or functionalities. For example, the one or more other elements 1319 may comprise one or more of a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise or connect to one or more sources of power (e.g., a battery, a solar cell, a fuel cell, a wall outlet, an electrical grid, and/or any combination thereof).

The wireless device 1310 may send/transmit uplink data to and/or receive downlink data from the base station 1320 via the air interface 1370. One or more of the processing system 1311, transmission processing system 1314, and/or reception system 1315 may implement open systems interconnection (OSI) functionality to perform transmission and/or reception. For example, the transmission processing system 1314 and/or the reception system 1315 may perform layer 1 OSI functionality, and the processing system 1311 may perform higher layer functionality. The wireless device 1310 may transmit and/or receive data over the air interface 1370 via/using one or more antennas 1316. For scenarios where the one or more antennas 1316 comprise multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media (e.g., one or more non-transitory computer readable media). The memory 1322 may comprise instructions 1323. The processing system 1321 may process and/or execute the instructions 1323. Processing and/or execution of the instructions 1323 may cause the base station 1320 and/or the processing system 1321 to perform one or more functions or activities. The memory 1322 may comprise data (not shown). One of the functions or activities performed by the processing system 1321 may be to store data in the memory 1322 and/or retrieve previously-stored data from the memory 1322. The base station 1320 may communicate with the wireless device 1310 using a transmission processing system 1324 and/or a reception processing system 1325. The transmission processing system 1324 and/or the reception processing system 1325 may be coupled to a dedicated memory (not shown) that may be analogous to but separate from memory 1322. The dedicated memory may comprise instructions that may be processed and/or executed to carry out one or more of their respective functionalities. The base station 1320 may comprise one or more antennas 1326 to access the air interface 1370.

The base station 1320 may send/transmit downlink data to and/or receive uplink data from wireless device 1310 via the air interface 1370. To perform the transmission and/or reception, one or more of the processing system 1321, the transmission processing system 1324, and/or the reception system 1325 may implement OSI functionality. For example, the transmission processing system 1324 and/or the reception system 1325 may perform layer 1 OSI functionality, and the processing system 1321 may perform higher layer functionality. The base station 1320 may transmit and/or receive data via the air interface 1370 using one or more antennas 1326. For scenarios where the one or more antennas 1326 comprise multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless. The interface system 1327 may comprise one or more components suitable for communicating via the interface 1380. As shown in FIG. 13A, the interface 1380 may connect the base station 1320 to a single deployment 1330 (e.g., as shown in FIG. 13A), but it may be understood that wireless device 1310 may communicate with any number/quantity of base stations and/or CN deployments via the interface 1380, and it may be understood that that deployment 1330 may communicate with any number/quantity of base stations and/or other CN deployments via the interface 1380. The base station 1320 may comprise one or more other elements 1329 analogous to one or more of the one or more other elements 1319.

The deployment 1330 may comprise any quantity/number of portions of any quantity/number of instances of one or more NFs. The deployment 1330 may comprise a processing system 1331 and a memory 1332. The memory 1332 may comprise one or more computer-readable media (e.g., one or more non-transitory computer readable media). The memory 1332 may comprise instructions 1333. The processing system 1331 may process and/or execute instructions 1333. Processing and/or execution of the instructions 1333 may cause the deployment 1330 and/or the processing system 1331 to perform one or more functions or activities. The memory 1332 may comprise data (not shown). One of the functions or activities performed by processing system 1331 may be to store data in the memory 1332 and/or retrieve previously-stored data from the memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

The wireless device 1310, the base station 1320, and/or the deployment 1330 may implement timers and/or counters. A timer/counter may start and/or restart at an initial value. The timer/counter may run based on the starting. Running of the timer/counter may be associated with an occurrence. The value of the timer/counter may change (e.g., increment or decrement). The occurrence may be an exogenous event (e.g., a reception of a signal, a measurement of a condition, etc.), an endogenous event (e.g., a transmission of a signal, a calculation, a comparison, a performance of an action or a decision to so perform, etc.), and/or any combination thereof. The occurrence may be the passage of a particular amount of time. A timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused (e.g., a present value of the timer/counter may be held, maintained, and/or carried over), for example, even after an occurrence of one or more occurrences that would otherwise cause the value of the timer/counter to change. The timer/counter may be un-paused or continued (e.g., the value that was held, maintained, and/or carried over may begin changing again), for example, after an occurrence of the one or more occurrence occur. A timer/counter may be set and/or reset. As used herein, setting may comprise resetting. The value of the timer/counter may be set to the initial value, for example, if the timer/counter sets and/or resets. A timer/counter may be started and/or restarted. Starting may comprise restarting. The value of the timer/counter may be set to the initial value and the timer/counter may begin to run (e.g., increment or decrement), for example, if the timer/counter restarts.

Figure 13B:
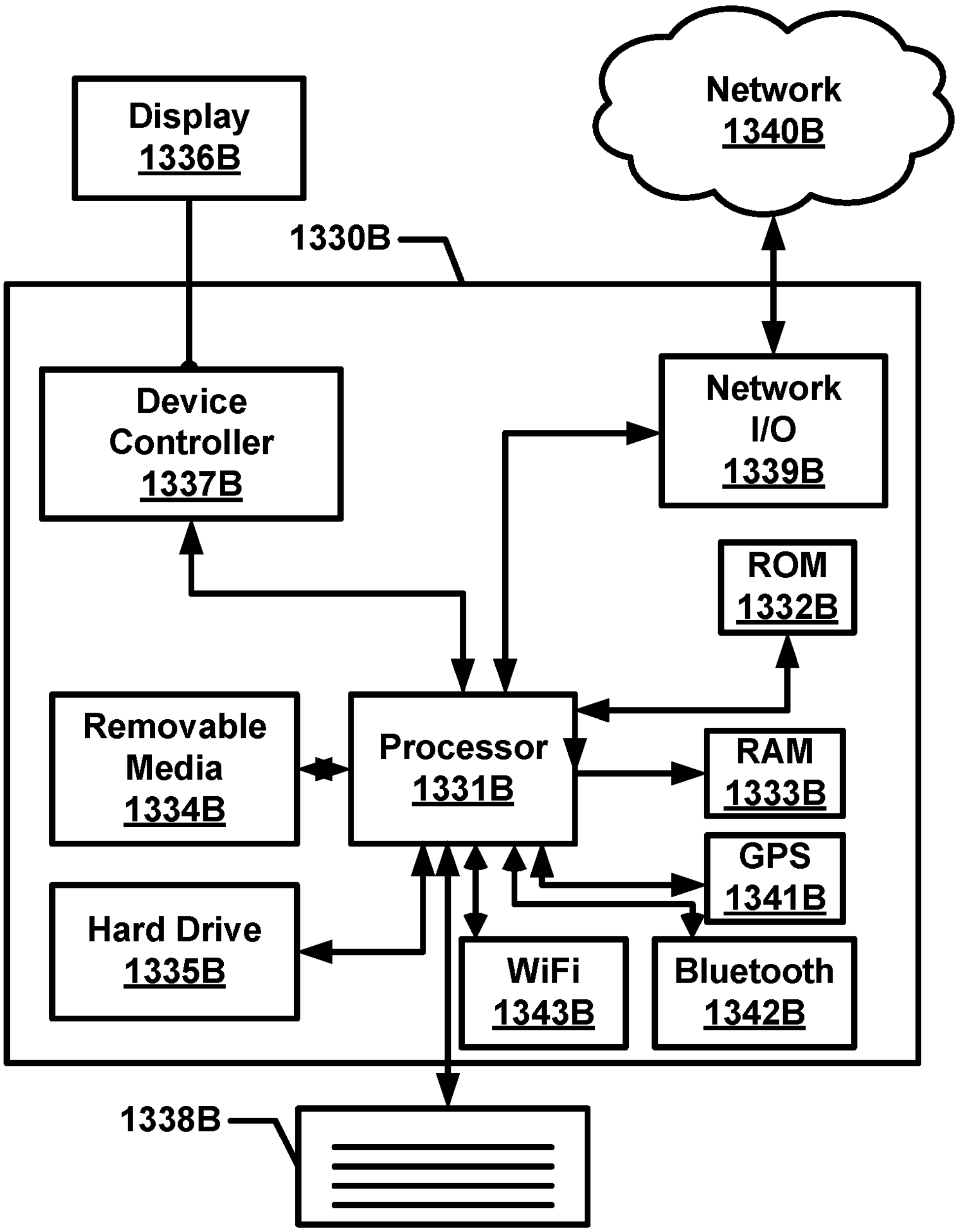
FIG. 13B shows example elements of a computing device that may be used to implement any of the various devices described herein.

FIG. 13B shows example elements of a computing device that may be used to implement any of the various devices described herein, including, for example, a base station 152A, 152B, 302, 402, 403, 502 602, 602A, 602B, 602C, 702, 802, 1004, 1104, 1204, and/or 1320, a wireless device 101, 151, 301, 401, 501, 601A, 601B, 601C, 701, 801, 1002, 1102, 1202, 1310, 1504, 1701, 1812, 1908, 2016, 2114, 2220, 2408, and/or 3019, or any other base station, wireless device, node, NF (e.g., AMF, SMF, UPF, PCF, etc.), UDM, OAM, UDM/OAM, network device, or computing device described herein. The computing device 1330B may include one or more processors 1331B, which may execute instructions stored in the random-access memory (RAM) 1333B, the removable media 1334B (such as a Universal Serial Bus (USB) drive, compact disk (CD) or digital versatile disk (DVD), or floppy disk drive), or any other desired storage medium. Instructions may also be stored in an attached (or internal) hard drive 1335B. The computing device 1330B may also include a security processor (not shown), which may execute instructions of one or more computer programs to monitor the processes executing on the processor 1331B and any process that requests access to any hardware and/or software components of the computing device 1330B (e.g., ROM 1332B, RAM 1333B, the removable media 1334B, the hard drive 1335B, the device controller 1337B, a network interface 1339B, a GPS 1341B, a Bluetooth interface 1342B, a WiFi interface 1343B, etc.). The computing device 1330B may include one or more output devices, such as the display 1336B (e.g., a screen, a display device, a monitor, a television, etc.), and may include one or more output device controllers 1337B, such as a video processor. There may also be one or more user input devices 1338B, such as a remote control, keyboard, mouse, touch screen, microphone, etc. The computing device 1330B may also include one or more network interfaces, such as a network interface 1339B, which may be a wired interface, a wireless interface, or a combination of the two. The network interface 1339B may provide an interface for the computing device 1330B to communicate with a network 1340B (e.g., a RAN, or any other network). The network interface 1339B may include a modem (e.g., a cable modem), and the external network 1340B may include communication links, an external network, an in-home network, a provider's wireless, coaxial, fiber, or hybrid fiber/coaxial distribution system (e.g., a DOCSIS network), or any other desired network. Additionally, the computing device 1330B may include a location-detecting device, such as a global positioning system (GPS) microprocessor 1341B, which may be configured to receive and process global positioning signals and determine, with possible assistance from an external server and antenna, a geographic position of the computing device 1330B.

The example in FIG. 13B may be a hardware configuration, although the components shown may be implemented as software as well. Modifications may be made to add, remove, combine, divide, etc. components of the computing device 1330B as desired. Additionally, the components may be implemented using basic computing devices and components, and the same components (e.g., processor 1331B, ROM storage 1332B, display 1336B, etc.) may be used to implement any of the other computing devices and components described herein. For example, the various components described herein may be implemented using computing devices having components such as a processor executing computer-executable instructions stored on a computer-readable medium, as shown in FIG. 13B. Some or all of the entities described herein may be software based, and may co-exist in a common physical platform (e.g., a requesting entity may be a separate software process and program from a dependent entity, both of which may be executed as software on a common computing device).

FIGS. 14A, 14B, 14C, and 14D show various example arrangements of physical core network deployments. Each of the arrangements may comprise one or more network functions and/or portions thereof. The core network deployments may comprise a deployment 1410, a deployment 1420, a deployment 1430, a deployment 1440, and/or a deployment 1450. Any of the deployments (e.g., each deployment) may be analogous to the deployment 1330 as shown in FIG. 13A. Any of the deployments (e.g., each deployment) may comprise a processing system for performing one or more functions and/or activities, memory for storing data and/or instructions, and/or an interface system for communicating with other network elements (e.g., other core network deployments). Any of the deployments (e.g., each deployment) may comprise one or more NFs. An NF may refer to a particular set of functionalities and/or one or more physical elements configured to perform those functionalities (e.g., a processing system and memory comprising instructions that, when executed by the processing system, cause the processing system to perform the functionalities). As described herein, a network function performing X, Y, and Z, may comprise the one or more physical elements configured to perform X, Y, and Z (e.g., irrespective of configuration and/or location of the deployment of the one or more physical elements), where X, Y, and Z, each may refer to one or more operations. An NF may comprise one or more of a network node, network element, and/or network device.

Different types of NF may be present in a deployment. Each type of NF may be associated with a different set of one or more functionalities. A plurality of different NFs may be flexibly deployed at different locations (e.g., in different physical core network deployments) or in a same location (e.g., co-located in a same deployment). A single NF may be flexibly deployed at different locations (e.g., implemented using different physical core network deployments) or in a same location. Physical core network deployments may also implement one or more base stations, application functions (AFs), data networks (DNS), and/or any portions thereof. NFs may be implemented in many ways, including as network elements on dedicated or shared hardware, as software instances running on dedicated or shared hardware, and/or as virtualized functions instantiated on a platform (e.g., a cloud-based platform).

Figure 14A:
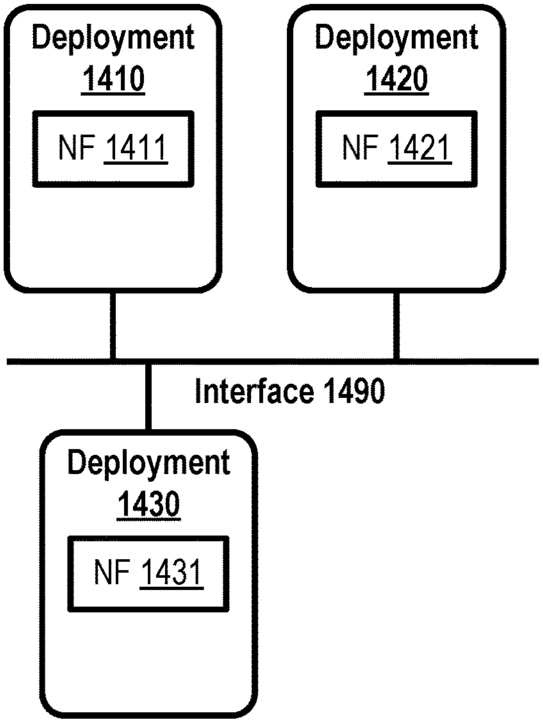
FIG. 14A, FIG. 14B, FIG. 14C, and FIG. 14D show various example arrangements of physical core network deployments.

FIG. 14A shows an example arrangement of core network deployments. Any of the core network deployments (e.g., each of the core network deployments) may comprise one network function. A deployment 1410 may comprise an NF 1411, a deployment 1420 may comprise an NF 1421, and a deployment 1430 may comprise an NF 1431. The deployments 1410, 1420, 1430 may communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

Figure 14B:
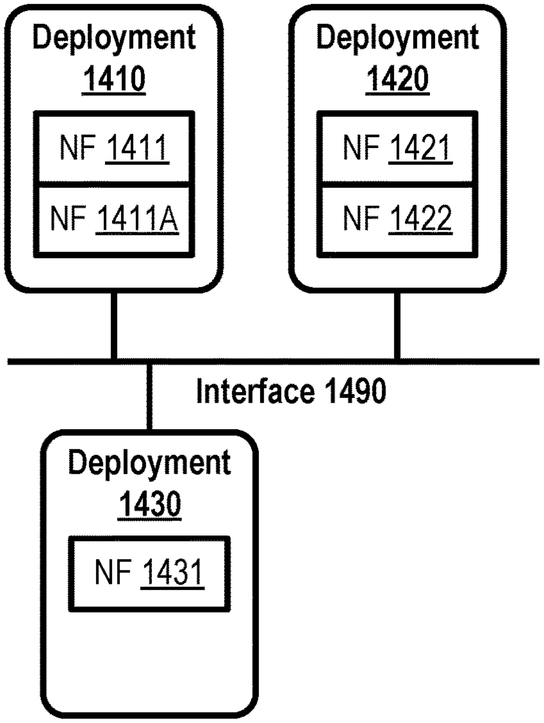

FIG. 14B shows an example arrangement where a single deployment may comprise more than one NF. Multiple NFs may be deployed in deployments 1410, 1420. Deployments 1410, 1420 may implement a software-defined network (SDN) and/or a network function virtualization (NFV).

Deployment 1410 may comprise an additional network function, NF 1411A. The NFs 1411, 1411A may comprise multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. NFs 1411, 1411A may be associated with different PLMNs, but deployment 1410, which implements NFs 1411, 1411A, may be owned and/or operated by a single entity.

Deployment 1420 may comprise a NF 1421 and an additional NF 1422. The NFs 1421, 1422 may be different NF types. Similar to NFs 1411, 1411A, the NFs 1421, 1422 may be co-located within the same deployment 1420, but may be separately implemented. For example, a first PLMN may own and/or operate deployment 1420 comprising NFs 1421, 1422. As another example, the first PLMN may implement the NF 1421 and a second PLMN may obtain, from the first PLMN (e.g., rent, lease, procure, etc.), at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. Networks may operate with greater speed, coverage, security, and/or efficiency, for example, if multiple NFs are provided at a single deployment.

Figure 14C:
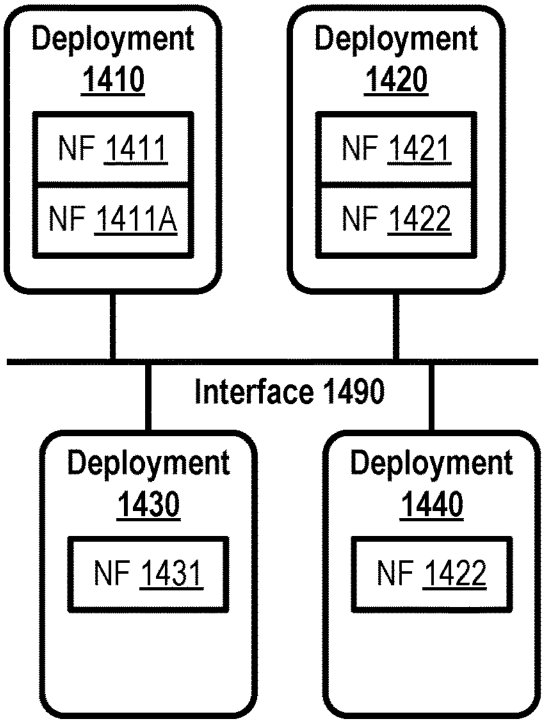

FIG. 14C shows an example arrangement of core network deployments in which a single instance of an NF may be implemented using a plurality of different deployments. For example, a single instance of NF 1422 may be implemented at deployments 1420, 1440. The functionality provided by NF 1422 may be implemented as a bundle or sequence of subservices. Any subservice (e.g., each subservice) may be implemented independently, for example, at a different deployment. Any subservice (e.g., each subservice) may be implemented in a different physical location. By distributing implementation of subservices of a single NF across different physical locations, the mobile communications network may operate with greater speed, coverage, security, and/or efficiency.

Figure 14D:
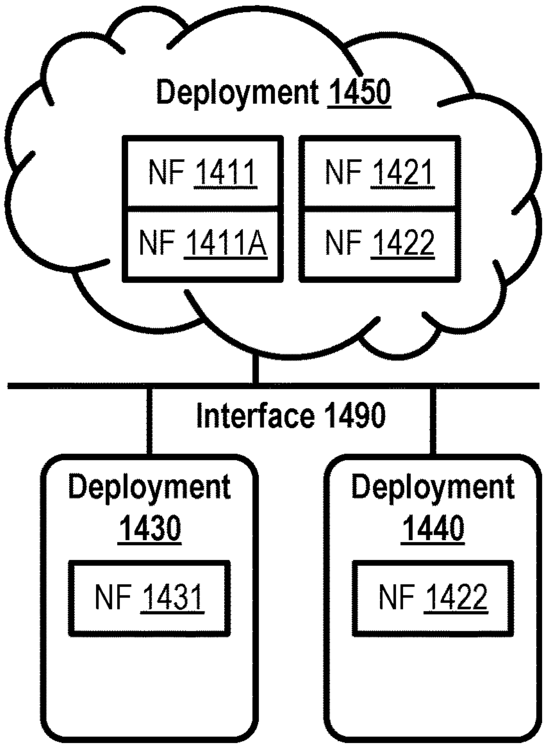

FIG. 14D shows an example arrangement of core network deployments in which one or more network functions may be implemented using a data processing service. As shown in FIG. 14D, NFs 1411, 1411A, 1421, 1422 may be included in a deployment 1450 that may be implemented as a data processing service. The deployment 1450 may comprise a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the FIGS. 14A-14D, different network elements (e.g., NFs) may be located in different physical deployments, or co-located in a single physical deployment. Sending and receiving of messages among different network elements, as described herein, is not limited to inter-deployment transmission or intra-deployment transmission, unless explicitly indicated.

A deployment may be a black box that may be preconfigured with one or more NFs and preconfigured to communicate, in a prescribed manner, with other black box deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

An ADU may comprise various types of data and/or information. The data and/or information may be application layer data and/or application layer information. The data and/or information of an ADU may comprise multimedia data and/or multimedia information. For example, an ADU may comprise a file or a portion of a file, a picture or a portion of a picture, video content (e.g., a video frame or a portion of a video frame, a video slice, a video tile), audio content (e.g., an audio frame or a portion of an audio frame), text, and so on. An ADU may comprise a data unit generated by one or more protocols (e.g., Real Time Protocol (RTP), Dynamic Adaptive Streaming over HTTP (DASH), Transmission Control Protocol (TCP), User Datagram Protocol (UDP), etc.). An ADU may be generated and/or created by an application. A first instance of an application may generate and/or create an ADU for use and/or enjoyment by a second instance of the application. An application may generate and/or create an ADU for processing by an application server associated with an application.

A middle layer may package and/or format an ADU. The middle layer may, for example, package and/or format an ADU for sending, by a sender, to a receiver. For example, the middle layer may provide functionality associated with one or more protocols (e.g., Internet Protocol (IP), etc.). The middle layer may, for example, format an ADU into one or more packets based on the one or more protocols. The middle layer may forward one or more packets to a lower layer, for example, after formatting the ADU into one or more packets (e.g., based on one or more protocols). The lower layer may provide functionality associated with forwarding the one or more packets, for example, via an interface, from one node/device to another node/device. A first instance of an application may be located at one node/device, and a second instance of the application may be located at another node/device.

Figure 15:
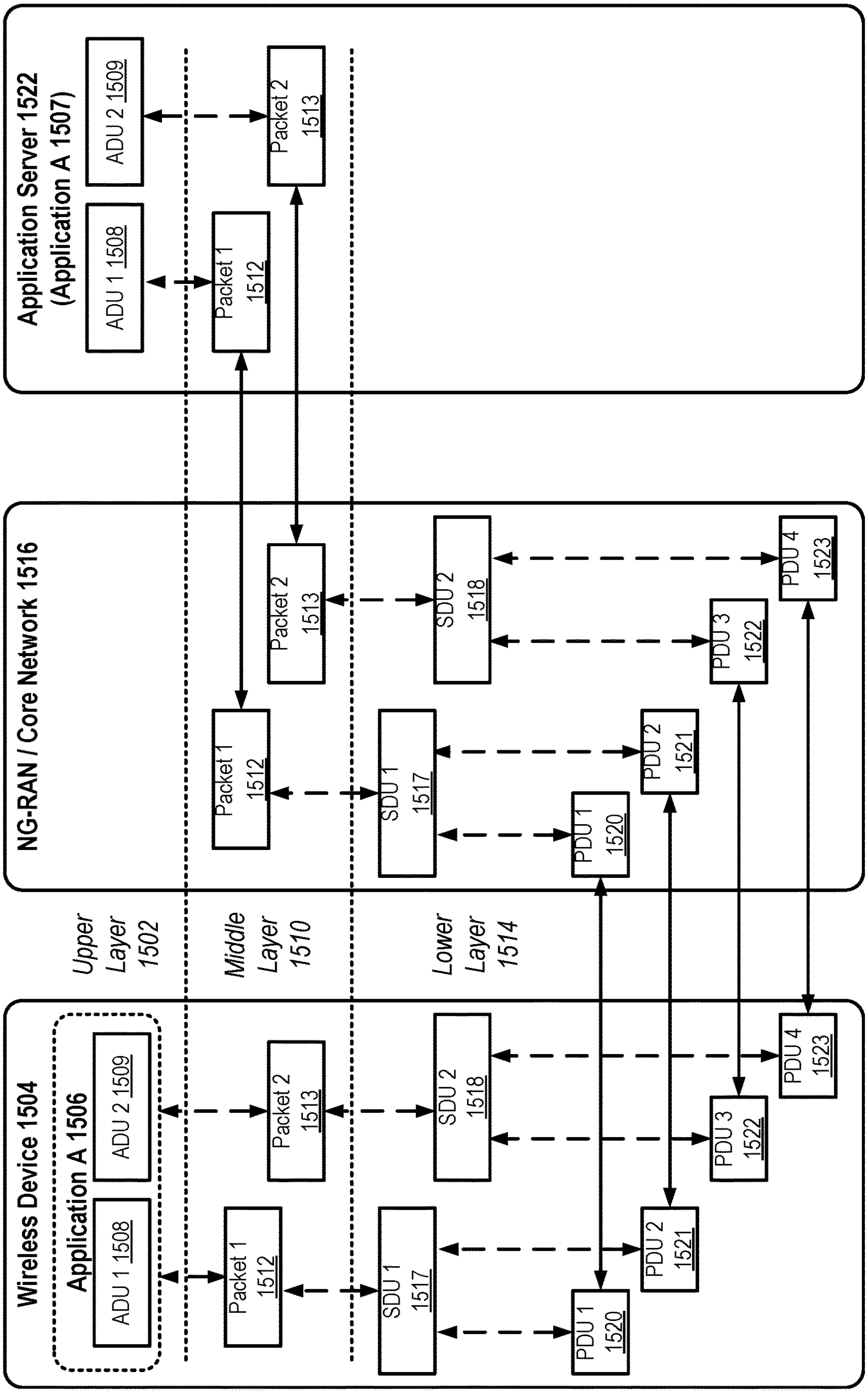
FIG. 15 shows an example of sending an application data unit (ADU).

FIG. 15 shows an example of sending an application data unit (ADU). An upper layer 1502 may include an application (e.g., Application A 1506) in a wireless device 1504. The upper layer 1502 may generate one or more application data units (ADUs). The one or more ADUs may comprise ADU 1 1508 and/or ADU 2 1509. The upper layer 1502 in the wireless device 1504 may make available (e.g., provide, deliver, send) the ADU 1 1508 and/or the ADU 2 1509 to a middle layer 1510 of the wireless device. The middle layer 1510 of the wireless device 1504 may process and/or package one or more ADUs (e.g., ADU 1 1508 and/or ADU 2 1509) into one or more packets, for example, based on the one or more protocols. The one or more packets may comprise, for example, a packet 1 1512 and/or a packet 2 1513. One or more ADUs (e.g., ADU 1 1508 and/or ADU 2 1509) may be processed into one or more IP packets, for example, based on the Internet Protocol being used. An IP packet may comprise at least a portion of at least one of the one or more ADUs. A packet (e.g., packet 1 1512) may, for example, comprise at least a portion of the ADU 1 1508 or comprise at least a portion of the ADU 1 1508 and at least a portion of the ADU 2 1509. A packet (e.g., packet 2 1513) may, for example, comprise at least a portion of the ADU 2 1509 or comprise at least a portion of the ADU 2 1509 and at least a portion of the ADU 1 1508.

The middle layer 1510 of the wireless device 1504 may make available (e.g., provide, deliver, send) the generated one or more packets to a lower layer 1514 of the wireless device 1504. The lower layer 1514 may comprise an Access Stratum (AS). An AS may transfer data between a and an NG-RAN/Core Network. An SDAP entity of an AS may acquire (e.g., receive, access, obtain, retrieve) from a middle layer of a wireless device a packet as a Service Data Unit (SDU). An SDAP entity of the AS of the wireless device 1504 may, for example, acquire from the middle layer 1510 the packet 1 1512 as SDU 1 1517. The SDAP entity of the AS of the wireless device 1504 may, for example, acquire from the middle layer 1510, the packet 2 1513 as SDU 2 1518. An AS of wireless device 1504 may process and send the SDU 1 1517 and/or the SDU 2 1518, for example, to an AS layer of an NG-RAN/Core Network 1516. An RLC entity of an AS layer of the wireless device 1504 may generate one or more Protocol Data Units (PDUs) (e.g., PDU 1 1520, PDU 2 1521, PDU 3 1522, PDU 4 1523), for example, from the SDU 1 1517 and/or the SDU 2 1518. An RLC layer of an AS may segment an SDU into multiple PDUs, for example, based on radio resources allocated by the NG-RAN/Core Network (e.g., an amount of radio resources allocated by the NG-RAN/Core Network). An RLC layer of an AS of the wireless device 1504 may, for example, segment SDU 1 1517 into PDU 1 1520 and PDU 2 1521 and segment the SDU 2 1518 into PDU 3 1522 and PDU 4 1523. A MAC entity of an AS may receive one or more PDUs from an RLC entity. The MAC entity may transmit the received one or more PDUs to an NG-RAN/Core Network (e.g., NG-RAN/Core Network 1516). An SDU and/or a PDU may comprise at least a portion of the data and/or information of an ADU (e.g., application layer data and/or application layer information). For example, the payload of an SDU and/or a PDU may comprise application layer data and/or application layer information. A set of ADUs may include one or more ADUs. One or more ADUs (e.g., ADUs that are associated with each other) may be referred to as an ADU set. A set of SDUs may include one or more SDU. One or more SDUs (e.g., SDUs that are associated with each other) may be referred to as an SDU set. One or more PDUs (e.g., PDUs that are associated with each other) may be referred to as a PDU set. A set of SDUs and/or a set of PDUs may be associated with one or more ADUs and/or one or more ADU types. A set of ADUs may be associated with one or more ADU types. An ADU and/or a set of ADUs may be associated with a data flow to and/or from an application.

The various layers of a wireless device (e.g., wireless device 1504) have different functions, such as those described herein in, for example, FIG. 7C. The data of an ADU (e.g., ADU 1 1508 and/or ADU 2 1509) may be divided, subdivided, compressed, ciphered, reordered, multiplexed, encoded, etc. A PDU may be suitable for transmission, for example, after an ADU passes through the layers (e.g., an upper layer, a middle layer, and/or a lower layer) of a wireless device. A PDU may be not be usable (e.g., indecipherable) to an application associated with an ADU. The process describe above may be reversed, for example, after a wireless device sends (e.g., transmits) the PDUs to an NG-RAN/Core Network. An ADU may be reconstructed by a receiver (e.g., an application server), for example, so that an application can use the data of the ADU. The application server 1522 may reconstruct ADU 1 1508 and/or ADU 2 1509, for example, for use by Application A 1507. An application may comprise a client-side application (e.g., the Application A 1506 at the wireless device 1504) and/or a server-side application (e.g., the Application A 1507 at the application server 1522). An application may comprise an instance of the application. For example, a wireless device may include an instance of an application (e.g., an instance of a content output application that receives content for output). For example, an application server may include an instance of an application (e.g., an instance of a content output application that sends content for output). An application may comprise one or more of a module, a routine, a subroutine, a function, a module, a program, and/or a service.

A MAC entity of an NG-RAN/Core Network may receive one or more PDUs sent by a wireless device. The received one or more PDUs may be reassembled into one or more SDUs. An AS of the NG-RAN/Core Network 1516 may reassemble the SDU 1 1517, for example, with the received PDU 1 1520 and PDU 2 1521. The AS of the NG-RAN/Core Network 1516 may reassemble the SDU 2, for example, with the received PDU 3 1522 and PDU 4 1523. The packet 1 1512 of the SDU 1 1517 and/or the packet 2 1513 of the SDU 2 1518 may be made available (e.g., provided, delivered, sent) from the NG-RAN/Core Network 1516 to a core network node (e.g., a UPF). The core network node may send the packet 1 1512 and/or the packet 2 1513 toward a receiver (e.g., application server 1522 associated with the ADU 1 1508 and the ADU 2 1509) via, for example, the Internet. A middle layer 1510 of the application server 1522 may recover the ADU 1 1508 and/or the ADU 2 1509, for example, after receiving the packet 1 1512 and/or the packet 1513. The middle layer 1510 of the application server 1522 may make available (e.g., provide, deliver, send) the ADU 1 1508 and/or the ADU 2 1509 to an upper layer 1502 of the application server. The upper layer 1502 of the application server 1522 may perform application-specific processing for the received ADU 1 1508 and/or the ADU 2 1509.

In at least some technologies, one or more protocol entities and/or one or more layers may be agnostic to differentiated characteristics of one or more ADU types for an application. For example, an AS may not consider different characteristic of different applications. For example, the AS may not consider the difference, similarity, and/or relationship(s) among one or more ADUs of an application. For example, a data unit in lower layers (e.g., packet 1 1512, SDU 1 1517, PDU 2 1521 in FIG. 15) may be associated with a portion of an ADU associated with a particular application (e.g., ADU 1 1508 in FIG. 15). Within the lower layers, the data unit may not be recognizable as being associated with (e.g., being different than, being similar to, having a relationship with) a particular application data unit, or even a particular application. At lower layers, the data unit may be a series of ones and zeroes which are packaged for sending to a receiver. This application-agnostic approach (e.g., ADU-agnostic approach) may contribute to supporting independent enhancement of one or more layers and/or one or more entities. For example, by not tying operation of an AS to a certain application characteristic, the AS may evolve without requiring a change of behavior of one or more applications. Due to this application-agnostic approach, an AS may support the introduction of new later-developed applications. As new use cases emerge and QoS requirements of applications are implemented to provide enhanced experiences, application-agnostic ADU processing by an AS may fail to support an efficient use of radio resources and network resources.

Figure 16:
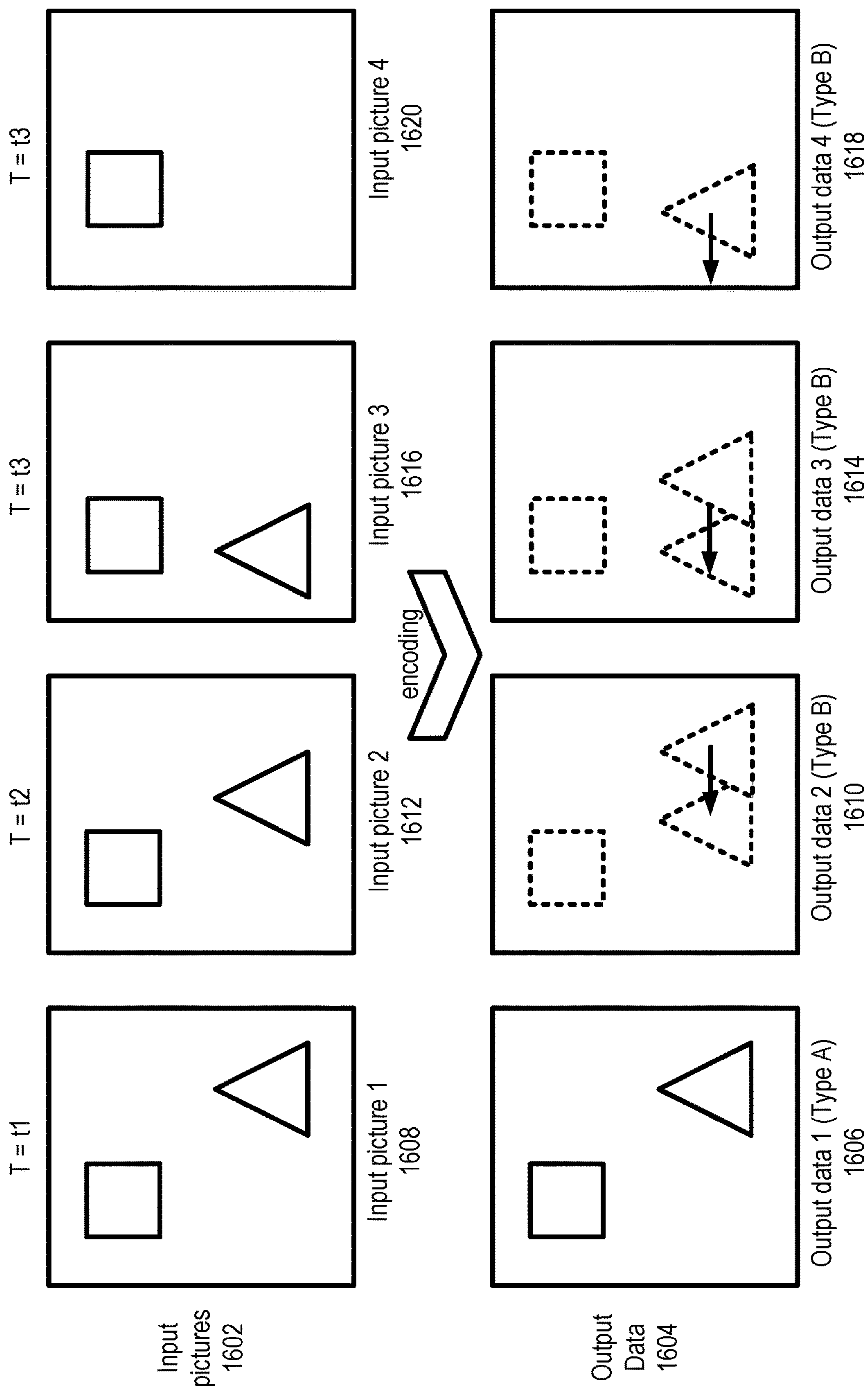
FIG. 16 shows an example of encoding video in an application.

FIG. 16 shows an example of encoding video in an application. FIG. 16 shows an example of how video (e.g., sequence of movements) input pictures 1602 are represented. For example, in FIG. 16, the input pictures 1602 show that a rectangular object does not move while a triangular object moves from the right of the screen to the left of the screen. Based on this sequence of movements, an encoder of the application may generate one or more output data 1604. The output data 1604 may include different types of output data (e.g., Type A, Type B). The different types of output data may include, for example, different types of video frames (e.g., an I-frame type, a B-frame type, and a P-frame type). The first output data (e.g., Output data 1 1606, Type A) may comprise information that describes details of a first input picture (e.g., Input picture 1 1608 at T=t1). The second output data (e.g., Output data 2 1610, Type B) may comprise information that describes a difference of the first input picture 1608 and a second input picture (e.g., Input picture 2 1612 at T=t2). For example, the second output data may comprise information that the triangular object moves from the right to the left. Compared to sending the second input picture itself, sending information of changes in the pictures may reduce the amount of data that needs to be transmitted. A third output data (e.g., Output data 3 1614, Type B) may comprise information of changes between the second input picture and a third input picture (e.g., Input picture 3 1616 at T=t3). A fourth output data (e.g., Output data 4 1618, Type B) may comprise information of changes between the third input picture and a fourth input picture (e.g., Input picture 4 1620 at T=t4).

Video may be sent from a sender to a receiver. A sender of video, for example, may send (e.g., transmit) one or more output data to a receiver. For example, the one or more output data 1604 in FIG. 16 may be sent (e.g., transmitted). The receiver may receive one or more data sent by the sender, and/or the receiver may not receive one or more data sent by the sender. For example, the receiver may receive the second output data, the third output data and the fourth output data. For example, the receiver may not receive the first output data. Because the second output data includes information of changes between the first input picture and the second picture, the receiver may need the first input picture, for example, for the recovery of the second picture from the second output data. The receiver may not be able to recover the second input picture from the received second output data, for example, based on the first output data comprising the first input picture is not being received. The receiver may not be able to recover the third input picture from the third output data, for example, based on the receiver not having information of the second input picture. The usability of one or more output data (e.g., the second output data, the third output data, the fourth output data) may be dependent on the availability of one or more output data (e.g., the first output data).

Figure 17:
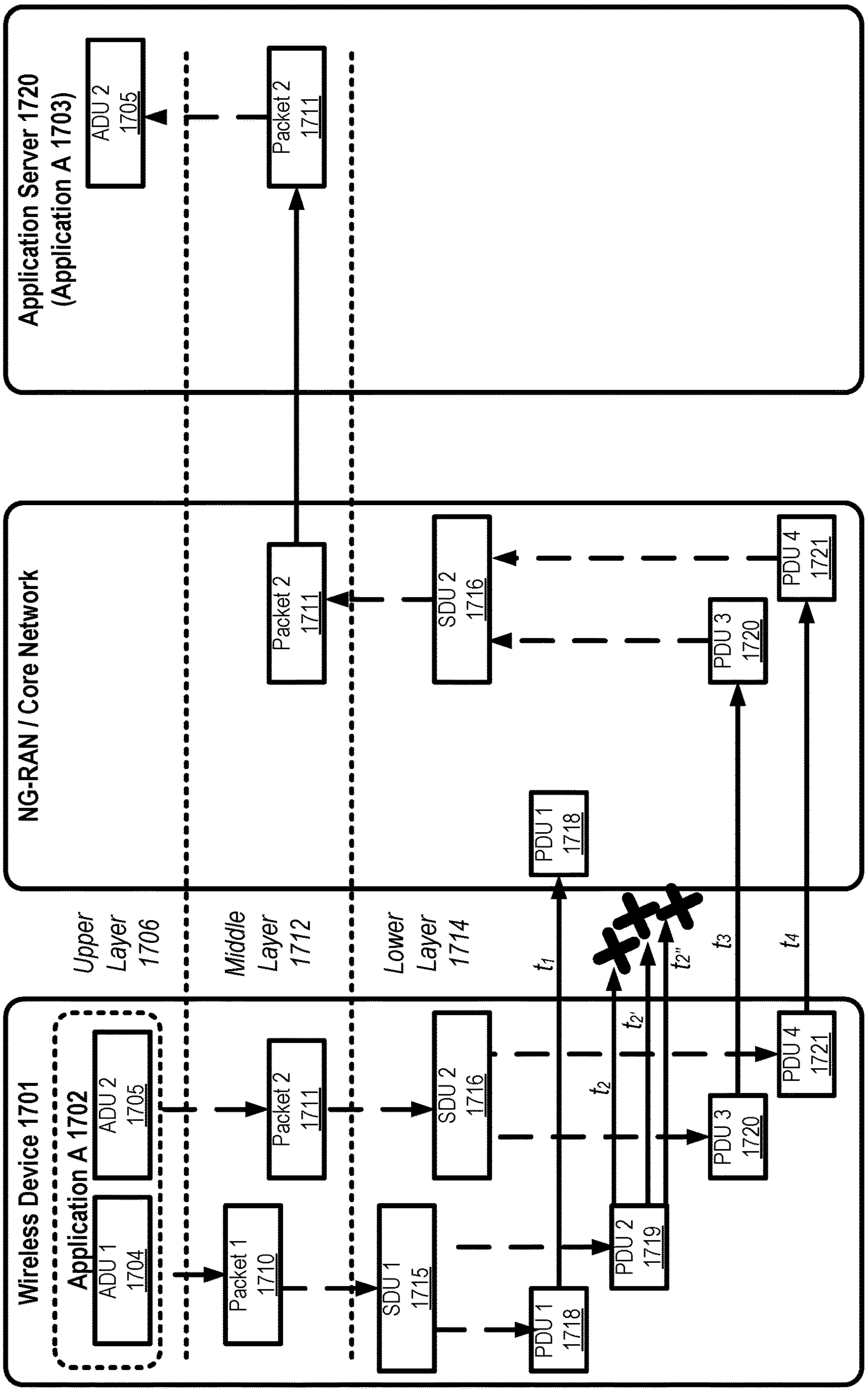
FIG. 17 shows an example of data delivery failure.

FIG. 17 shows an example of data delivery failure. A wireless device 1701 may include an Application A 1702 that may generate a first ADU 1 1704 and a second ADU 2 1705. One or more ADUs generated by the Application A 1702 may comprise a service data flow. ADUs generated by the Application A 1702 may have different importance (e.g., different priorities). For example, the first ADU 1 1704 may be of higher importance (e.g., higher priority) than the second ADU 2 1705. For example, the first ADU 1 1704 may comprise the first output data (e.g., Output data 1 1606, Type A) generated by the example application of FIG. 16. For example, the second ADU 2 1705 may comprise the second output data (e.g., Output data 2 1610, Type B), the third output data (e.g., Output data 3 1614, Type B), or the fourth output data (e.g., Output data 4 1618, Type B) generated by the example application of FIG. 16. The first ADU 1 1704 may be made available (e.g., provided, delivered, sent) by an upper layer 1706 to a middle layer 1708 as a first packet 1 1710. The first packet 1 1710 may be made available (e.g., provided, delivered, sent) by the middle layer 1712 to a lower layer 1714 as an SDU 1 1715. The second ADU 2 1705 may be made available (e.g., provided, delivered, sent) by the upper layer 1706 to the middle layer 1712 as a second packet 2 1711. The second packet 2 1711 may be made available (e.g., provided, delivered, sent) to the lower layer 1714 as a SDU 2 1716. The lower layer 1714 may generate PDU 1 1718 and PDU 2 1719 for the SDU 1 1715. The lower layer 1714 may generate PDU 3 1720 and PDU 4 1721 for the SDU 2 1716. The lower layer 1714 may send the PDU 1 1718 ($t_1$), PDU 2 1719 ($t_2$, $t_{2'}$, $t_{2''}$), PDU 3 1720 ($t_3$), and PDU 4 1721 ($t_4$). The PDU 1 1718, the PDU 3 1720, and the PDU 4 1721 may be successfully received by a receiver ($t_1$, $t_3$, $t_4$). The PDU 2 1719 may not be successfully received by the receiver ($t_2$, $t_{2'}$, $t_{2''}$).

Based on the PDU 3 1720 and the PDU 4 1721, the receiver may reassemble SDU 2 1716. The SDU 2 1716 may be made available (e.g., provided, delivered, sent) by the lower layer 1714 to the middle layer 1712 as the second packet 2 1711. The second packet 2 1711 may be made available (e.g., provided, delivered, sent) to an application server 1720 hosting the Application A 1703. The middle layer 1712 may make available (e.g., provide, deliver, send) ADU 2 1705 to the Application A 1703. For example, the ADU 2 1705 may comprise the second output data (e.g., Output data 2 1610, Type B) generated by the example application of FIG. 16. Due to the reception failure ($t_2$, $t_{2'}$, $t_{2''}$) of PDU 2 1719, the receiver may not be able to reassemble SDU 1 1715. Due to missing SDU 1 1715, the packet 1 1710 may not be recovered and may not be available to the Application Server 1710. The Application A 1703 may not receive the ADU 1 1704. For example, the ADU 1 1704 may comprise the first output data (e.g., Output data 1 1606, Type A) generated by the example application of FIG. 16. ADU 2 1705 (e.g., the second output data) may depend on ADU 1 1704 (e.g., the first output data), so the Application A 1703 may need the ADU 1 1704 to use (e.g., process) the ADU 2 1705. Due to not receiving the ADU 1 1704, the Application A may not be able to use the received ADU 2 1705. Radio resource and/or network resources for the delivery of the ADU 2 1705 may be unnecessarily wasted. Without ADU 1 1704, ADU 2 1705 may not be useful. Transmission of PDU 3 1720 and PDU 4 1721 may result in wasted resources, for example, based on transmission of PDU 2 1719 failing.

A lower layer (e.g., an AS layer of NR, an AS layer of LTE) may not provide differentiated handling of ADUs based on the different characteristics of different ADUs of a service data flow, for example, in at least some technologies. More prioritized ADUs (e.g., ADUs having higher priorities) may not be delivered while less prioritized ADUs (e.g., ADUs having lower priorities) may be delivered. At least some wireless communications may not provide a needed, desired, or preferred quality of experience (QoE). For example, new media types (e.g., VR, XR, live streaming video) may be associated with increased data rates and/or bit rates and/or latency requirements to maintain a needed, desired, or preferred QoE. For example, applications associated with new media types (e.g., VR, XR) may be time-sensitive, and delays in delivery of ADUs to such applications may cause annoyance or invoke sensations of discomfort (e.g., disorientation, dizziness, and the like) in users. Other types of applications may generate ADUs with various types of relationships (e.g., dependency relationships) between the ADUs. For example, video encoding applications and video decoding applications may generate ADUs having a dependency relationship, for example, ADUs associated with P-frames and B-frames that depend on ADUs associated with I-frames for encoding and decoding. For example, a failure to deliver ADUs associated with an I-frame may render corresponding B-frames and/or P-frames unusable. At least some technologies may waste resource resulting from the delivery of unusable ADUs.

As described herein, system efficiency may be improved by enhancement in operation of a network and/or a wireless device. Service data units of a service data flow may be indicated/identified and/or classified and/or categorized. A protocol entity may, for example, indicate/identify and/or classify and/or categorize one or more service data units of a service data flow. The protocol entity may, for example, be configured with information for identification of one or more types of one or more ADUs for one or more packets of a service data flow. The protocol entity may, for example, be configured with differentiated QoS configurations. Packets may be processed based on differentiated QoS configurations. The protocol entity may process the one or more packets, for example, based on the differentiated QoS configurations. This may enhance a quality of experience, for example, for a user. A QoE may be provided or improved, for example, by increasing a probability of delivering a first type of ADU compared to a second type of ADU (e.g., an ADU that is more important than another ADU and/or an ADU that is associated with a higher priority than another ADU). By using QoS configurations to prioritize different types of packets as described herein, advantages may be achieved such as increased probability of successful delivery of prioritized packets, reduced delay in delivering prioritized packets, avoiding unnecessary transmission of non-prioritized packets, providing or improving a QoE for various types of applications (e.g., VR, XR, live video streaming), avoidance and/or reduction of wasted network resources from sending packets (e.g., unusable packets) unnecessarily, and/or reducing and/or resolving congestion arising from, for example, a resource shortage (e.g., by sending prioritized packets and not sending non-prioritized packets).

Enhanced delivery of packets may be achieved by using one or more QoS configurations to prioritize packets sent through a core network. Rather than send the packets from the same source (e.g., the wireless device or the application server) via the same QoS flow, differentiated treatment of packets from the source may be used, for example, for sending packets from the same source via one or more QoS flows. For example, some packets from a source may be prioritized over other packets from that source even if the source itself is prioritized over another source. Differentiated treatment of packets may be used, for example, for packets sent via the same QoS flow. For example, some packets sent via a QoS flow may be prioritized over other packets sent via that QoS flow. A QoS configuration may indicate different packet types and/or different ADU types for differentiated treatment of packets sent via a core network. For example, a QoS configuration may indicate that a type of packet should be prioritized over another type of packet. Information may be sent with a packet that can be used to differentiate packets associated with a packet type and/or a ADU type from other packets associated with another packet type and/or another ADU type. Enhanced processing of packets sent via a core network may be performed using the additional information sent with the packets, for example, to prioritize a type of packet over another type of packet. Increases in available data rates may justify any additional overhead associated with sending the additional information used for differentiated treatment of packets. By using QoS configurations to prioritize different types of packets and sending additional information used to differentiate packets as described herein, advantages may be achieved such as increased probability of successful delivery of prioritized packets, reduced delay in delivering prioritized packets, avoiding unnecessary sending of non-prioritized packets, avoidance and/or reduction of wasted network resources from sending packets (e.g., unusable packets) unnecessarily, and/or reducing and/or resolving congestion arising from, for example, a resource shortage. For example, QoS configurations described herein may be advantageously used to provide or improve a QoE for various applications such as those having high data rates and/or low latency requirements (e.g., virtual reality (VR) applications, extended reality (XR) applications), applications where relationships (e.g., dependencies) exist between ADUs and thus the packets associated with such ADUs (e.g., video encoding applications and/or video decoding applications that encode and/or decode I-frames, B-frames, and/or P-frames of video content), as well as any other applications benefitting from the differentiated treatment of packets associated with different packet types and/or ADU types.

Data may be sent from (e.g., transmitted by) a wireless device to an application server, for example, as described herein with reference to FIG. 15 and/or FIG. 17. Additionally or alternatively, data may be sent from (e.g., transmitted by) an application server to a wireless device and/or data may be sent from (e.g., transmitted by) a first wireless device to a second wireless device directly.

An NG-RAN may refer to a base station, which may comprise at least one of a gNB, an eNB, an ng-eNB, a NodeB, an access node, an access point, an N3IWF, a relay node, a base station central unit (e.g., gNB-CU), a base station distributed unit (e.g., gNB-DU), and/or the like.

An AMF may refer to a core network device, which may comprise at least one of a mobility management function/entity, an access and mobility management function, and/or the like. An SMF may refer to a core network device, which may comprise at least one of a session management function/entity, a serving gateway, a Packet Data Network (PDN) gateway, and/or the like.

A core network node may refer to a core network device, which may comprise at least one of an AMF, a SMF, a NSSF, a UPF, a NRF a UDM, a PCF and/or the like. A core network may refer to a core network node. An access node may refer to a base station, which may comprise an NG-RAN, and/or the like. A network node may refer to a core network node and/or an access node and/or a wireless device and/or the like.

A protocol entity may refer to an entity performing a set of specific functions related to a wireless access (e.g., LTE access, NR access) and/or a wireline access (e.g., Ethernet) and/or communication (e.g., TCP, IP). An entity may refer to a protocol entity. A protocol entity of LTE and/or NR may, for example, comprise an SDAP entity and/or a PDCP entity and/or an RLC entity and/or a MAC entity and/or a PHY entity. A protocol entity (e.g., an SDAP entity, a PDCP entity, an RLC entity, a MAC entity, a PHY entity) may, for example, comprise a layer (e.g., an SDAP layer, a PDCP layer, an RLC layer, a MAC layer, a PHY layer, respectively).

A service data unit may refer to a unit of data received, for example, by a protocol entity. A protocol data unit may refer to a unit of data, for example, a unit of data sent by a protocol entity. A protocol entity may receive one or more service data units (SDUs) from another protocol entity, and the protocol entity may send one or more protocol data units (PDUs) to another protocol entity of the same host or another host. A PDU may comprise one or more packets. A PDCP entity may, for example, receive one or more PDCP service data units (PDCP SDUs) from a higher entity (e.g., an SDAP entity). The PDCP entity may, for example, send one or more PDCP protocol data units (PDCP PDUs) to a lower entity (e.g., an RLC entity). The lower entity (e.g., an RLC entity) may receive one or more RLC SDUs. The one or more RLC SDUs may be same as the one or more PDCP PDUs.

An application function (AF) may refer to an application server (AS). An AS may, for example, host and/or run and/or execute one or more applications.

An ADU may refer to a unit of data that is provided by (e.g., sent between, exchanged among) one or more hosts serving one or more applications. An application (e.g., an Internet browser, an instant messaging application, a video-player application, etc.) may be running/executing (e.g., as one instance of the application) on a first host (e.g., a smartphone, computer, application server, etc.), and the same application (e.g., another instance of the application) may be running on a second host (e.g., another smartphone, computer, application server, etc.). The application running/executing on the first host may generate application data (e.g., a picture, a text message, video, etc.). The application running/executing on the first host may make available (e.g., provide, deliver, send) the application data to a first-type protocol entity (e.g., an HTTP entity, etc.), for example, for providing the application data from the first host to the second host. The first-type protocol entity of the first host may process the application data and generate one or more first-type protocol data units (e.g., HTTP request messages, HTTP response messages, etc.), for example, to provide the application data to the second host. The first-type protocol entity may make available (e.g., provide, deliver, send) the one or more first-type protocol data units to a first-type access (e.g., LTE access, NR access, Wireless Fidelity (WIFI) access, etc.). The first-type access of the first host may process the one or more first-type protocol data units. The first-type access of the first host may generate one or more first-type access protocol data units (e.g., SDAP PDUs, PDCP PDUs, RLC PDUs, MAC PDUs, etc.). The first-type access of the first host may send (e.g., transmit) the one or more first-type access protocol data units. A first-type access of a third host (e.g., an NG-RAN, a wireless device, etc.) may receive the one or more first-type access protocol data units. The third host may reassemble the one or more first-type protocol data units and may make available (e.g., provide, deliver, send) the one or more first-type protocol data units to a second-type access (e.g., LTE access, NR access, WIFI access, Ethernet access, Asynchronous Transfer Mode (ATM) access, GPRS (General Packet Radio Service) Tunneling Protocol (GTP) access, etc.) of the third host.

The second-type access of the third host may process the one or more first-type protocol data units. The second-type access of the third host may generate one or more second-type access protocol data units (e.g., Ethernet Frames, ATM cells, LTE access PDUs, NR access PDUs, WIFI access packets, etc.). The second-type access of the third host may send (e.g., transmit) the one or more second-type access protocol data units. The second-type access of the second host may receive the one or more second-type access protocol data units. The second-type access of the second host may reassemble the one or more first-type protocol data units, for example, using the one or more second-type access protocol data units. The second-type access of the second host may make available (e.g., provide, deliver, send) the reassembled one or more first-type protocol data units to the first-type protocol entity of the second host. The first-type protocol entity of the second host may reassemble the application data, for example, using the one or more received first-type protocol data units. The first-type protocol entity of the second host may make available (e.g., provide, deliver, send) the application data to the application of the second host.

One or more protocol entities (e.g., a TCP entity, a UDP entity, an RTP entity, etc.) may exist between the application and the access (e.g., LTE access, NR access, WIFI access). One or more protocol entities (e.g., a second-type protocol entity, a third-type protocol entity, and so on) may exist between the first-type protocol entity and the access. One or more hosts (e.g., NG-RANs, UPFs, Internet routers, etc.) may exist between the first host and the second host. One or more additional hosts (e.g., a fourth host (e.g., UPF), a fifth host (e.g., Internet router) and so on) may exist between the third host and the second host. Different types of accesses may be used. A pair of hosts may, for example, use the same or different types of accesses. A third-type access (e.g., an optic fiber, a satellite, etc.) may be used, for example, for communication between the third host and the fourth host.

An ADU may refer to application data. An ADU may refer to the first-type protocol data unit. An ADU may be refer to the second-type protocol data unit and so on. An ADU may refer to a unit of data of a protocol entity. Contexts for a protocol entity may be kept/stored/maintained. A first host and a second host may, for example, keep one or more contexts for a protocol entity. For example, the application of the first host may communicate with an application of the second host. The application of the first host may have a context for the second host. The application of the second host may have a context for the first host. The application data may, therefore, be an ADU. For example, the first-type protocol entity of the first host may communicate with the first-type protocol entity of the second host. The first-type protocol entity of the first host may have a context for the second host. The first-type protocol of the second host may have a context for the first host. The first-type protocol data unit may, therefore, be an ADU. For example, the first-type access of the first host may not communicate with the second-type access of the second host. The first-type access of the first host may not have a context for second-type access of the second host. The second-type access of the second host may not have a context for the first-type access of the first host. The first-type access protocol data unit, therefore, may not be an ADU for the second host. The second-type access protocol data unit, therefore, may not be an ADU for the first host.

Figure 24:
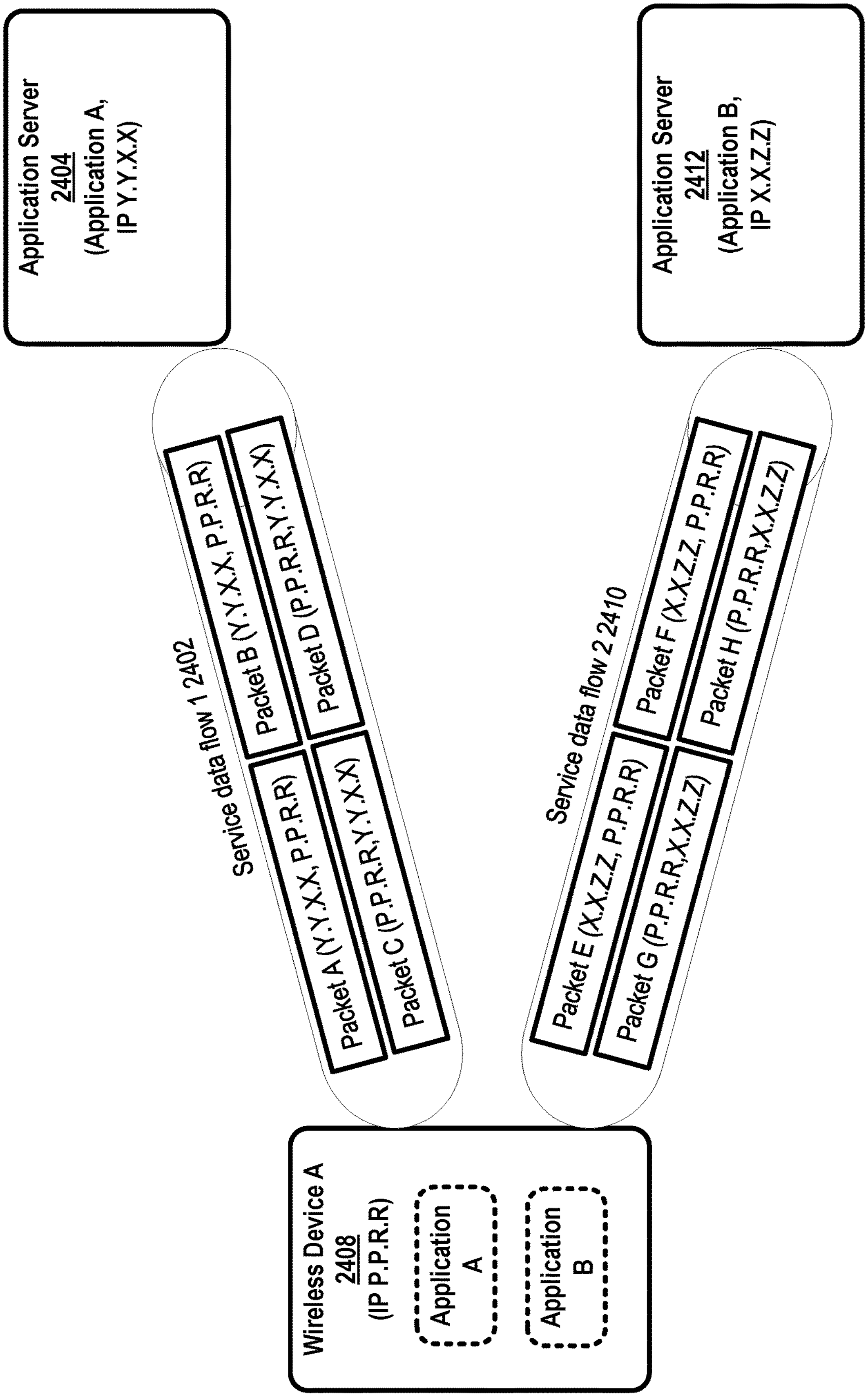
FIG. 24 shows an example service data flow.

A service data flow may refer to a set of data units exchanged among one or more hosts. FIG. 24 shows an example service data flow. For example, a first service data flow (e.g., service data flow 1 2402) may refer to a set of one or more data units from a second host (e.g., Application Server 2404 having IP address Y.Y.X.X and running/executing Application A) to a first host (e.g., Wireless Device A 2408 having IP address P.P.R.R) and/or a set of one or more data units from the first host to the second host. For example, a second service data flow (e.g., service data flow 2 2410) may refer to a set of one or more data units from a third host (e.g., Application Server 2412 having IP address X.X.Z.Z and running/executing Application B) to the first host (e.g., Wireless Device A 2408) and/or a set of one or more data units from the first host to the third host. For example, one or more data units of a service data flow may share one or more attributes (e.g., source IP address, destination IP address, source port, destination port, protocol identifier, etc.). Different applications may be identified with different service data flows. A packet A, a packet B, a packet C, and a packet D of service data flow 1 2402 may comprise the first service data flow based on, for example, the one or more packets sharing the same IP addresses. A packet E, a packet F, a packet G, and a packet H of service data flow 2 2410 may comprise the second service data flow based on, for example, the one or more packets sharing the same IP addresses.

An ADU type may refer to a type of an ADU. One or more ADU types may exist, for example, for a service data flow. For example, a service data flow may comprise one or more ADU types. For example, an ADU type (e.g., the first output data 1606 in FIG. 16) may be used to provide information of one or more components of an image (e.g., a picture, a video frame, etc.), for example, for a service data flow of a video stream. An ADU type (e.g., the second output data 1610 in FIG. 16) may be used to provide information about one or more relationships among the components. An ADU type may be an RTP packet and/or an ADU type may be an RTCP packet, for example, for a service data flow of an RTP protocol. An ADU type may be a TCP packet and/or an ADU type may be a TCP ACK packet, for example, for a service data flow of TCP protocol. An ADU type may be a picture frame and/or an ADU type may be a control command (e.g., play/stop/rewind), for example, for a service data flow of streaming service. An ADU type may be a packet for controlling a machine-learning application and/or an ADU type may be a packet for exchanging data used for updating parameters for the machine-learning application, for example, for a service data flow for a machine-learning application (e.g., Artificial Intelligence/Machine Learning (AI/ML) application, federated learning application, etc.). One or more ADU types may comprise an ADU that may be treated differently than another ADU. For example, one or more ADU types may comprise an ADU associated with a higher importance/priority and/or an ADU associated with a lower importance/priority. Within a service data flow, one or more data units of the service data flow may have different types. For example, the packets of the service data flows show in FIG. 24 may be associated with different types. For example, the packet A and/or the packet C of the service data flow 1 2402 in FIG. 24 may comprise a first type (e.g., a first ADU type, e.g., the first output data 1606 in FIG. 16). For example, the packet B and/or the packet D of the service data flow 1 2402 in FIG. 24 may comprise a second type (e.g., a second ADU type, e.g., the second output data 1610 in FIG. 16).

An ADU-based QoS may refer to a QoS framework where differentiated QoS is provided to different ADUs of a service data flow. For example, a first-type ADU of a service data flow may be associated with a high probability of successful delivery. For example, a second-type ADU of a service data flow may be associated with a low probability of successful delivery. An ADU-based QoS may refer to a QoS configuration. A QoS configuration may support one or more of detection of different types of ADUs, identification of different types of ADUs, classification of packets based on the different types of ADUs, provisioning of different QoS based on the different types of ADUs, and so on. An ADU-based QoS may refer to providing differentiated QoS experience per packet of a service data flow. For example, a first packet of a service data flow may be provided with a first QoS while a second packet of the service data flow may be provided with a second QoS. An ADU-based QoS may refer to providing differentiated QoS experience per packet of a service data flow, for example, based on information associated with an ADU for the packet. For example, an ADU-based QoS may be interpreted as providing per packet differentiated quality of service for a service data flow. For example, an ADU-based QoS may comprise one or more of per packet detection, differentiation of packets for a service data flow, per packet QoS rule(s), and so on.

A QoS configuration may refer to any information that supports ADU-based QoS. For example, a QoS configuration may comprise information for identifying one or more types of ADUs associated with one or more packets and/or QoS information (e.g., packet error rate, packet delay budget, data rate, etc.) and/or configuration information (e.g., information associated with a radio bearer, information associated with protocol entities, etc.). For example, a first network node (e.g., a UPF, a wireless device) may use a QoS configuration (e.g., information for identifying one or more types of ADUs) to determine an ADU type for a received packet. For example, a third network node (e.g., a SMF) may provide a QoS configuration (e.g., QoS information) to a second network node (e.g., an NG-RAN), for example, to inform the second network node of a preferred/desired/required treatment of a packet. For example, the second network node may transmit the packet using the QoS configuration (e.g., a radio bearer, a protocol entity, a timer), for example, to provide the packet to a fourth network node (e.g., a wireless device).

Figure 18:
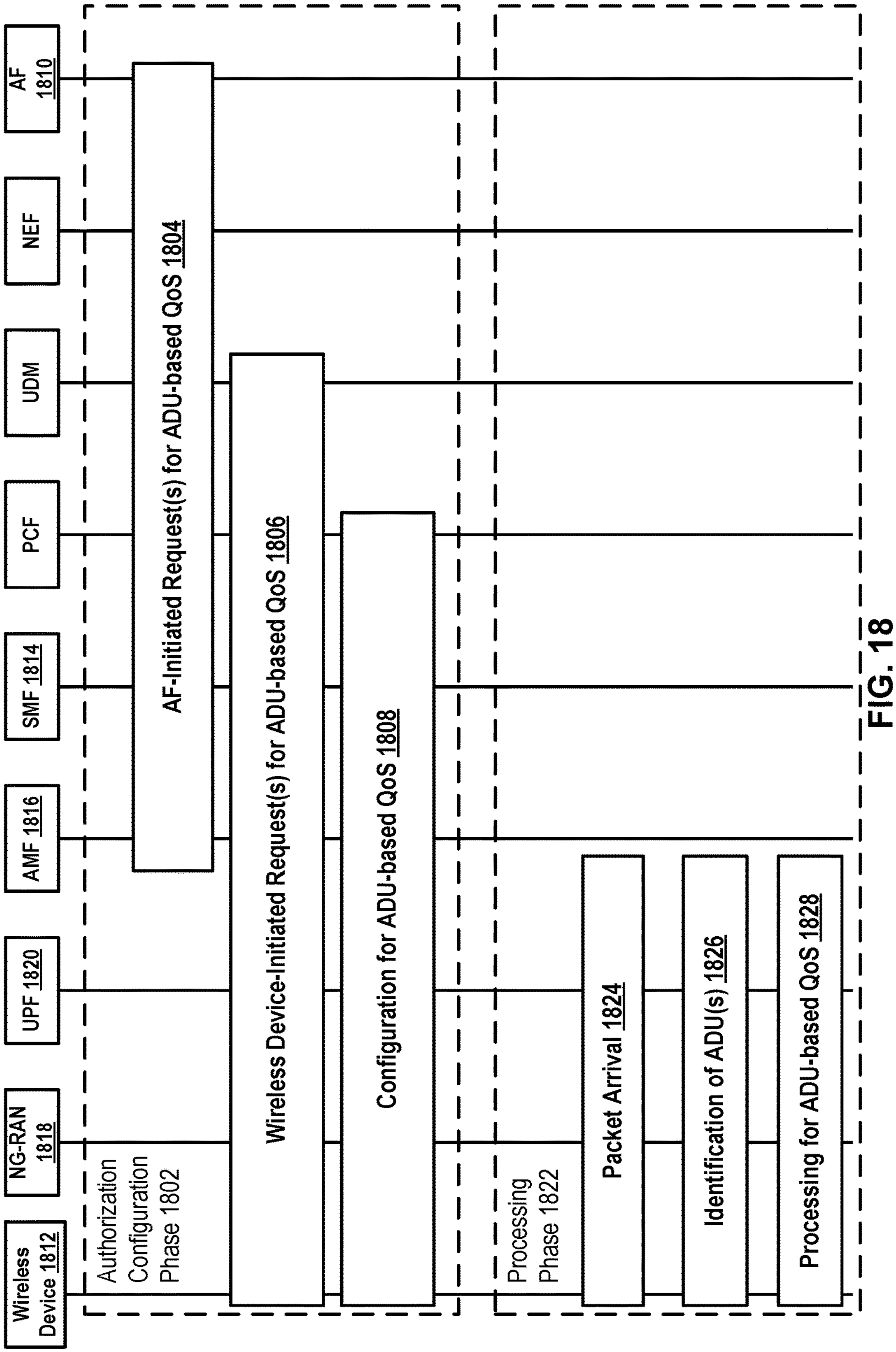
FIG. 18 shows an example of ADU-based quality management for wireless communications.

FIG. 18 shows an example of ADU-based quality management for wireless communications. An authorization configuration phase 1802 may include one or more AF-initiated requests for ADU-based QoS 1804, one or more wireless device-initiated requests for ADU-based QoS 1806, and/or configuration of ADU-based QoS 1808. One or more messages comprising one or more ADU-based QoS service requests may be sent to a network. An AF 1810 may send, for example, one or more messages comprising one or more ADU-based QoS service requests to a network. For example, the AF 1810 may send to the network one or more messages requesting that the network provides an ADU-based QoS service. An ADU-based QoS service request may comprise ADU-type classification information and/or QoS requirement(s) for one or more ADU types and/or one or more service data flow description(s) and/or the like. ADU-type classification information (e.g., ADU identification information) may comprise information that indicates how to identify and/or classify different types of ADUs (ADU types) for one or more service data flow(s). A QoS requirement for an ADU type (e.g., ADU-based QoS information) may comprise information indicating preferred/desired/required QoS (e.g., a maximum data rate, a packet delay budget, a packet error rate, etc.) for one or more types of ADUs. A service data flow description may comprise information of the service data flow where the ADU-type classification information and/or the QoS requirement(s) for ADU type apply.

One or more messages may comprising one or more ADU-based QoS service request may be sent. A wireless device 1812 may send, for example, one or more messages comprising one or more ADU-based QoS service requests to a network node (e.g., an SMF 1814, an AMF 1816). The wireless device 1812 may send a PDU session establishment request comprising an ADU-based QoS service request, for example, during a PDU session establishment procedure. For example, the PDU session establishment request may comprise capability information indicating whether the wireless device 1812 supports an ADU-based QoS service.

One or more network nodes may be configured to provide ADU-based QoS service. One or more network nodes may be configured to provide ADU-based QoS service, for example, based on a request from the AF 1810 and/or based on a request from the wireless device 1812. For example, a network node (e.g., the SMF 1814, an NG-RAN 1818) may configure one or more network nodes (e.g., the NG-RAN, the wireless device 1812, a UPF 1820) to provide ADU-based QoS service. For example, one or more network nodes (e.g., the UPF 1820, the NG-RAN 1818, the wireless device 1812) may perform identification of one or more ADU types associated with received packets. The one or more network nodes may handle the packet, for example, based on the identified ADU type and based on the QoS configuration(s) for the identified ADU type. A processing phase 1822 may include the arrival of one or more packets 1824 (e.g., at the wireless device 1812, the NG-RAN 1818, and/or the UPF 1820), identification of one or more ADUs 1826 (e.g., by the wireless device 1812, the NG-RAN 1818, and/or the UPF 1820), and processing (e.g., one or more ADUs and/or packets) for ADU-based QoS 1828 (e.g., by the wireless device 1812, the NG-RAN 1818, and/or the UPF 1820).

Figure 19:
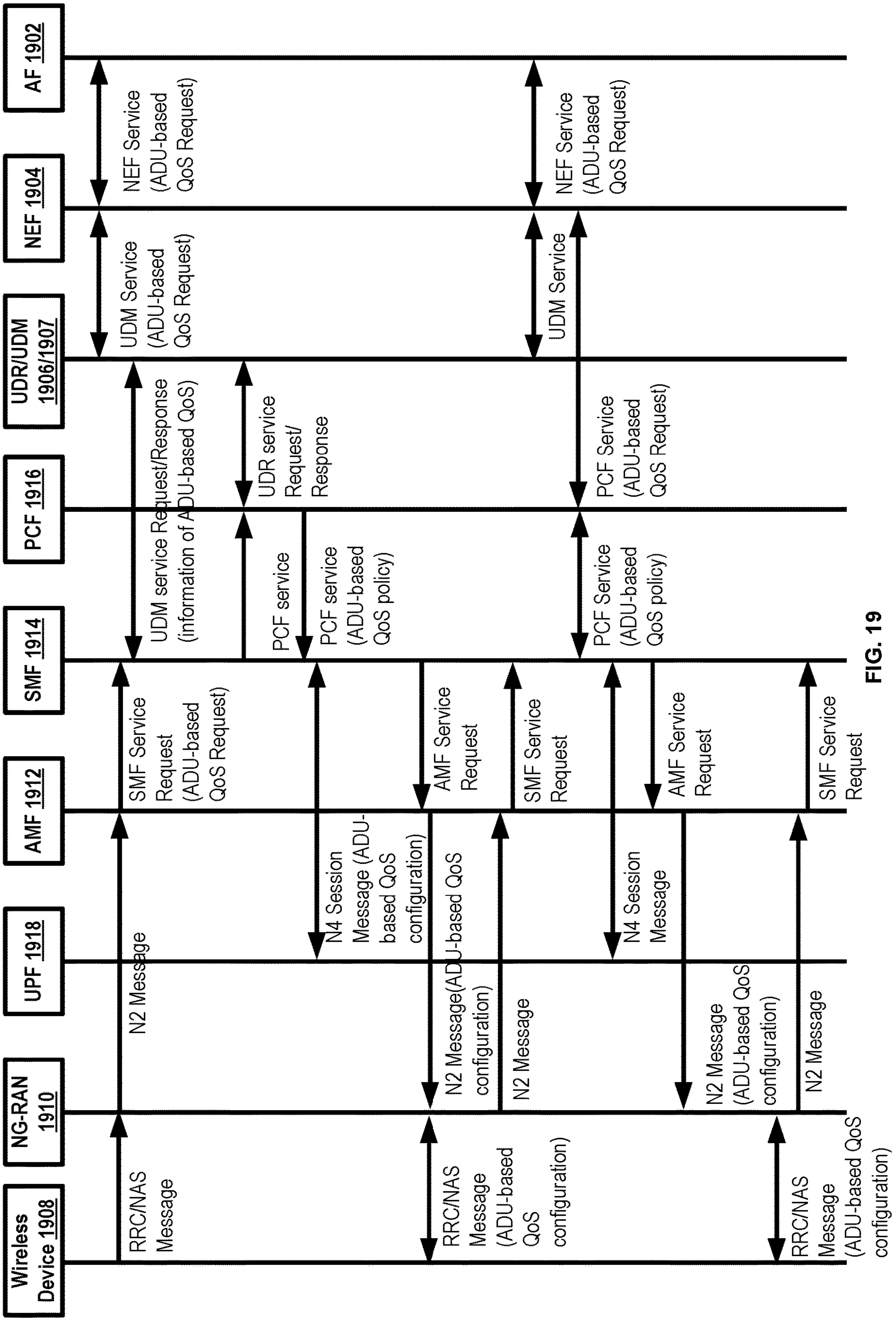
FIG. 19 shows an example of ADU-based quality management for wireless communication.

FIG. 19 shows an example of ADU-based quality management for wireless communication. Whether ADU-based QoS service by a network is needed/desired/preferred may be determined. An AF 1902 may, for example, determine that ADU-based QoS service by a network is needed/desired/preferred. The AF 1902 may determine to request a network to activate ADU-based QoS service, for example, to enhance efficiency in delivery of packets. The AF 1902 may invoke a NEF service request from a first network node, for example, based on a determination to request a network to activate ADU-based QoS service (e.g., to enhance efficiency in delivery of packets). The AF 1902 may send the NEF service request to the first network node, for example, to invoke the NEF Service request from the first network node. The first network node may be, for example, an NEF 1904 and/or the like. The invoked NEF service may be an Nnef_ParameterProvision_Create service and/or an Nnef_ServiceParameter_Create service and/or an Nnef_ApplyPolicy_Create service and/or the like. The invoked NEF service request may comprise at least one of following: target wireless device information or wireless device group information, an ADU-based QoS service request, one or more expected wireless device behavior parameters, network configuration parameters information, an external group identifier (ID) and 5G Virtual Network (VN) group data, service description information, and/or service parameter information. The target wireless device information or wireless device group information may indicate a target wireless device or a group of wireless devices to which an ADU-based QoS service applies. An individual target wireless device may be identified by a GPSI (Generic Public Subscription Identifier) and/or an IP address/Prefix and/or a MAC address. Groups of wireless devices may be identified by external group identifiers. Any wireless device using a service identified by the Service Description information may be targeted. An ADU-based QoS service request may comprise information related to an ADU-based QoS service. An ADU-based QoS request may comprise ADU type classification information and/or one or more QoS requirement(s) for an ADU type. An expected wireless device behavior parameter may comprise information related to potential mobility of a wireless device. Network configuration parameters information may comprise information related to communication availability and/or reachability of a wireless device. External group ID and 5G VN group data may comprise information related to a group of wireless devices belonging to a group. Service description information may comprise information to identify a service and/or a service data flow. Service description information may comprise DNN and/or S-NSSAI and/or an AF-Service-Identifier and/or an Application Identifier. Service description information may indicate an AF that sent an ADU-based QoS service request and/or indicate an application to which an ADU-based QoS service applies. Service parameter information may comprise the service specific information to be provisioned in a network and/or a wireless device for a service identified by the service description.

ADU-based QoS service request information may comprise at least one of following: a request for activation of an ADU-based QoS service, capability information of an AF for an ADU-based QoS service, ADU identification information (e.g., ADU type classification information), ADU-based QoS information (e.g., a QoS requirement for an ADU type), S-NSSAI information, and/or DNN information. A request for activation of an ADU-based QoS service may indicate that an AF requests the network provide an ADU-based QoS service. Capability information of an AF for an ADU-based QoS service may indicate a capability of the AF for the ADU-based QoS service. Capability information of an AF for an ADU-based QoS service may indicate, for example, which mechanism(s) are supported by the AF to indicate ADU-related information. ADU identification information may indicate how an AF may provide ADU information associated with a packet. ADU identification information may, for example, comprise information that indicates how to identify different types of ADUs (ADU types) for a service data flow. ADU-based QoS information may indicate one or more QoS requirements for an identified ADU. ADU-based QoS information may comprise information indicating one or more preferred/desired/required QoS (e.g., maximum data rate, packet delay budget, packet error rate, etc.) for one or more types of ADUs. S-NSSAI information may indicate a network slice where an ADU-based QoS service is used. DNN information may indicate a network where an ADU-based QoS service is used.

ADU identification information (e.g., information of ADU type identification) may comprise information indicating how a network node may identify ADU-related information for a packet. ADU identification information may comprise information indicating how to determine whether one or more packets are associated with a same ADU or different ADUs. ADU identification information may comprise information indicating how to determine whether a packet and a preceding packet are associated with a same ADU or different ADUs. ADU identification information may indicate one or more fields of an ADU and/or in a packet, for example, for identification of an ADU type associated with a packet. ADU identification information may indicate a mapping between one or more values of one or more fields and one or more ADU types, for example, for identification of an ADU type associated with a packet. ADU identification information may comprise: information indicating how to detect and/or identity and/or classify one or more ADUs and/or one or more packets, information indicating how to detect and/or identify an ADU associated with a packet, information indicating how to detect and/or identify an identity of an ADU associated with a packet, information indicating how to detect and/or identify and/or classify an ADU type associated with a packet, information indicating which one or more fields may be used to detect and/or identify an ADU type associated with a packet, information indicating how to detect and/or identify and/or classify one or more types of ADUs for an application, information indicating or associated with one or more ADU types for a service data flow, and/or information indicating how to classify a packet based on an ADU type associated with the packet.

ADU-based QoS information may indicate one or more QoS requirements for an identified ADU and/or an identified ADU type and/or packets associated with an ADU type. For example, a service data flow may exist between a wireless device and an application server. The service data flow may comprise one or more first packets associated with a first ADU type and one or more second packets associated with a second ADU type. First QoS handling may be configured for the one or more first packets associated with the first ADU type of the service data flow, for example, based on the one or more first packets requiring first QoS handling. Second QoS handling may be configured for the one or more second packets associated with the second ADU type, for example, based on the one or more second packets requiring second QoS handling. The first QoS handling may indicate that a packet error rate may be lower than 1%. The second QoS handling may indicate that a packet error rate may be lower than 5%. For example, the first QoS handling and/or the second QoS handling may indicate one or more QoS parameters. The one or more QoS parameters may comprise at least one of a maximum data rate, a packet error rate, a packet delay budget, 5QI, and/or the like. For example, the information of ADU-based QoS may comprise: information indicating or associated with one or more QoS parameters/configurations for one or more ADU types, information indicating or associated with one or more Qos parameters/configurations for one or more ADU types of at least one service data flow, and/or information indication or otherwise associated with one or more QoS parameters/configurations for one or more packets associated with one or more ADU types for at least one service data flow.

ADU-based QoS information may indicate different QoS parameters/configurations for different packets associated with different ADU types, for a service data flow. ADU-based QoS information may indicate different QoS parameters/configurations for different ADU types of a service data flow. ADU-based QoS information may indicate different QoS parameters/configurations for different ADUs associated with the service data flow.

One or more packets may be associated with one or more sub-service data flows and/or the like, for example, based on one or more ADU types being associated with one or more packets of a service data flow. For example, a service data flow may comprise one or more sub-service data flows. A sub-service data flow of a service data flow may comprise one or more packets associated with a ADU type. For example, for a first service data flow (e.g., service data flow 1 2402 in FIG. 24), one or more packets (e.g., the packet A and the packet C in FIG. 24) may be a first ADU type and/or one or more second packets (e.g., the packet B and the packet D in FIG. 24) may be a second ADU type. The one or more packets of the first ADU type (e.g., the packet A and the packet C in FIG. 24) may comprise a first sub-service data flow for the first service data flow. The one or more packets of the second ADU type (e.g., the packet B and the packet D in FIG. 24) may comprise a second sub-service data flow for the first service data flow.

A service data flow may comprise one or more packets of one or more ADU types. For example, a service data flow may comprise one or more first packets of a first ADU type and/or one or more second packets of a second ADU type. One or more packets of an ADU type may comprise a sub-service data flow of a service data flow. For example, one or more first packets of a first ADU type may comprise a first sub-service data flow of the service data flow. For example, one or more second packets of a second ADU type may comprise a second sub-service data flow of the service data flow. An indication of an ADU type may refer to an indication of a sub-service data flow. An identification of an ADU type associated with a packet may refer to an identification of a sub-service data flow for the packet. An ADU type associated with a packet may refer to a sub-service data flow identity for the packet.

One or more packets may be one or more IP packets. For example, the one or more packets may be associated with the same service data flow and/or different service data flows. The one or more packets may comprise a first packet and a second packet. The first packet may comprise at least a portion of a first ADU. The second packet may comprise at least a portion of a second ADU. The ADU identification information may indicate a specific field of the one or more packets to use for ADU identification. For example, the ADU identification information may indicate a Differentiated Services Code Point (DSCP) field of an IP packet to use for ADU identification. For example, the ADU identification information may indicate that an IP packet with DSCP field set to value 1 corresponds to or is associated with a first ADU type. For example, the ADU identification information may indicate that an IP packet with DSCP field set to value 2 corresponds to or is associated with a second ADU type. A network node may receive a first packet with its DSCP field set to value 1. A network node may receive a second packet with it DSCP field set to value 2. The network node may determine that the first packet and the second packet are associated with different ADU types, for example, by observing the difference in the respective values of the DSCP fields of the first packet and the second packet. For example, the network node may determine that the first packet is associated with the first ADU type. For example, the network node may determine that the second packet is associated with the second ADU type.

One or more packets may be one or more IP packets. For example, the one or more packets may be associated with the same service data flow and/or different service data flows. The one or more packets may comprise a first packet and a second packet. The first packet may comprise at least a portion of a first ADU. The second packet may comprise at least a portion of a second ADU. For example, one or more ADUs may comprise one or more RTP packets. The ADU identification information may indicate one or more fields of a packet. For example, the ADU identification information may indicate a timestamp field of a packet. For example, the ADU identification information may indicate that a packet with timestamp field set to value 1:1:1 is associated with a first ADU type. For example, the ADU identification information may indicate that a packet with timestamp field set to value 2:2:2 is associated with a second ADU type. For example, a network node may receive the first packet with its timestamp field set to value 1:1:1. For example, the network node may receive the second packet with its timestamp field set to value 1:1:1. The network node may determine that the first packet and the second packet are associated with the first ADU type, for example, based on the value timestamp field in the first packet matching the value of the timestamp field in the second packet.

Whether an invoked NEF service request is authorized or unauthorized may be determined. A first network node (e.g., the NEF 1904 and/or the like), for example, may determine whether an invoked NEF service request from the AF 1902 is authorized or unauthorized. The first network node (e.g., the NEF 1904 and/or the like) may invoke a UDM service request from a second network node, for example, based on an invoked NEF service request from the AF 1902 being authorized. The first network node may send a service request to a second network node, for example, to invoke a service request from the second network node. For example, the second network node may be a UDM 1907 and/or the like. For example, an invoked UDM service may be a Nudm_ParameterProvision_Create service and/or a Nudm_ServiceSpecificAuthorization_Create service, and/or the like.

In an example, the invoked UDM service request may comprise at least one of following: an ADU-based QoS service request, one or more expected wireless device behavior parameters, one or more network configuration parameters, an external group ID and 5G VN group data, a service description, and/or one or more service parameters. An ADU-based QoS service request may comprise information related to an ADU-based QoS. An expected wireless device behavior parameter may comprise information related to potential mobility of a wireless device. A network configuration parameter may comprise information related to communication availability and/or reachability of a wireless device. External group ID and 5G VN group data may comprise information related to a group of wireless devices belonging to a group. A service description may comprise information that indicates or can be used to identify a service and/or a service data flow and/or an application. A service description may comprise DNN and/or S-NSSAI and/or an AF-Service-Identifier or an Application Identifier. A service description may indicate an AF that sent the request for an ADU-based QoS service and/or indicate an application to which an ADU-based QoS service applies. A service parameter may comprise service-specific information to provision in a network and/or a wireless device for the service identified by a service description.

Information conveyed by a UDM service request may be processed. A second network node (e.g., the UDM 1907 and/or the like), for example, may process information conveyed by the UDM service request for an invoked UDM service request. The second network node may invoke a UDR service request from a third network node, for example, based on a result of processing information conveyed by a UDM service request. The second network node may send the UDR service request to the third network node, for example, to invoke the UDR service request from the third network node. For example, the second network node may process the received ADU-based QoS service request information into packet flow descriptions and/or AF traffic influence request information and/or session management subscription data, and/or the like. For example, the third network node may be a UDR 1906 and/or the like. For example, the invoked UDR service may be Nudr_DM_Create service and/or the like.

In an example, the invoked UDR service request may comprise at least one of following: packet flow descriptions (PFDs), AF traffic influence request information, service-specific information, access and mobility subscription data, wireless device context in SMF data, session management subscription data, group data, a service description, and/or ADU-based QoS service request information. A PFD may comprise information indicating a description of a service data flow and/or a packet flow. A PFD may comprise ADU type classification information and/or ADU identification information. AF traffic influence request information may comprise information indicating traffic steering in relation to a service data flow. Service-specific information may comprise one or more service parameters. Access and mobility subscription data may comprise information related to the handling of access and mobility of a wireless device. Wireless device context in SMF data may comprise information related to the wireless device context in an SMF serving the wireless device. Session management subscription data may comprise information related to packet data session handling. Group data may comprise information indicating or associated with a group. ADU-based QoS service request information may comprise information related to an ADU-based QoS service.

Information delivered with an invoked UDR service request may be stored. The third network node, for example, may store information delivered with an invoked UDR service request. The third network node may store information delivered with an invoked UDR service request, for example, based on the UDR service request (e.g., an Nudr_DM_Create request) being invoked. For example, the information may comprise one or more PFDs, the service specific information, the access and mobility subscription data, the wireless device context in SMF data, the session management subscription data, the group data, the service description, and/or the ADU-based QoS service request information. The third network node may respond to the second network node with a UDR service response (e.g., Nudr_DM_Create response), for example, after the third network node stores the delivered information. The UDR service response may indicate whether performance of the requested UDR service is successful or unsuccessful.

A UDM service response may be sent. The second network node, for example, may send, to the first network node, a UDM service response (e.g., an Nudm_ParameterProvision_Create an response, Nudm_ServiceSpecificAuthorization_Create response). The second network node may sent the UDM service response to the first network node, for example, based on the second network node receiving the UDR service response (e.g., an Nudr_DM_Create response) from the third network node. The UDM service response may indicate whether performance of the requested UDM service is successful or unsuccessful.

An NEF service response may be sent. The first network node, for example, may send, to the AF 1902, an NEF service response (e.g., an Nnef_ParameterProvision_Create response, an Nnef_ServiceParameter_Create response, an Nnef_ApplyPolicy_Create response, and/or the like). The first network node may send an NEF service response to the AF 1902, for example, based on the first network node receiving the UDM service response from the second network node. The NEF service response may indicate, for example, that processing the request from the AF 1902 is successful.

A procedure to establish a PDU session may be initiated. The wireless device 1908, for example, may initiate a procedure to establish a PDU session. The wireless device 1908 may initiate a procedure to establish a PDU session, for example, to establish a PDU session to exchange data for an application with an application function. For example, the procedure may be a PDU session establishment procedure. The NAS entity of the wireless device 1908 may compose a first NAS message (e.g., PDU session establishment request message). For example, the first NAS message may comprise information associated with an ADU-based QoS service. For example, the first NAS message may comprise ADU-based QoS wireless device capability information, for example, to indicate whether or not the wireless device 1908 supports ADU-based QoS service. For example, the first NAS message may comprise ADU-based QoS service request, for example, to request a PDU session supporting ADU-based QoS service. The RRC entity may establish an RRC connection with an NG-RAN 1910, for example, to deliver the first NAS message to a network. The wireless device 1908 may send, to the NG-RAN 1910, an RRC message comprising the first NAS message. The wireless device 1908 may send the RRC message, for example, via the established RRC connection. The NG-RAN 1910 may send an N2 message (e.g., an initial wireless device message) to a network node (e.g., an AMF 1912). The N2 message may comprise the first NAS message. The AMF 1912 may invoke an SMF service request (e.g., an Nsmf_PDUSession_CreateSMContext request) from an SMF 1914, for example, based on the first NAS message being related to a PDU session. The AMF 1912 may send the SMF service request to the SMF 1914, for example, to invoke the SMF service request.

A UDM service request may be invoked. The SMF 1914, for example, may invoke a UDM service request (e.g., an Nudm_SDM_Get request). The SMF 1914 may invoke a UDM service request, for example, for an invoked SMF service request. For example, the SMF 1914 may send, to the UDM 1907, the UDM service request, for example, to invoke the UDM service request. The SMF 1914 may retrieve information associated with an ADU-based QoS service for the wireless device 1908, for example, by sending the UDM service request. The UDM 1907 may invoke a UDR service request (e.g., an Nudr_DM_Query request), for example, based on the UDM not having information associated with the ADU-based QoS service for the wireless device 1908. The UDM 1907 may send the UDR service request to the UDR 1906, for example, to invoke the UDR service request. The UDR 1906 may respond to the UDM 1907 with a UDR service response (e.g., an Nudr_DM_Query response), for example, for the invoked UDR service request. The UDM 1907 may respond to the SMF 1914 by a UDM service response (e.g., an Nudm_SDM_Get response) comprising information associated with the ADU-based QoS service.

Whether information related to ADU-based QoS service needs to be provided may be determined. The UDM 1907, for example, may determine whether the information related to ADU-based QoS service needs to be provided. The UDM 1907 may determine whether the information related to ADU-based QoS service needs to be provided, for example, for the invoked UDM service request. For example, the UDM service request may comprise an S-NSSAI. The UDM 1907 may determine whether the S-NSSAI is configured to use an ADU-based QoS service, for example, for the service request. The UDM service request may include the identity of the wireless device. The UDM 1907 may determine whether the wireless device 1908 or a group to which the wireless device belongs is configured to use an ADU-based QoS service, for example, for the UDM service request. The UDM service request may include a DNN. The UDM 1907 may determine whether the DNN is configured to use an ADU-based QoS service, for example, for the UDM service request. The UDM 1907 may send a UDM service response comprising the information associated with the ADU-based QoS service, for example, based on the UDM determining that the ADU-based QoS service is configured to be used.

A policy decision may be requested. The SMF 1914, for example, may request a policy decision from a PCF 1916. The SMF 1914 may request a policy decision from the PCF 1916, for example, for a PDU session establishment request. For example, the SMF 1914 may invoke a PCF service request (e.g., an Npcf_SMPolicyControl_Create request). The SMF 1914 may send the PCF service request to the PCF 1916, for example, to invoke the PCF service request. For example, the invoked PCF service request may comprise information associated with an ADU-based QoS service. The PCF 1916 may decide an ADU-based QoS policy to use for the PDU session, for example, for the invoked the PCF service request. The PCF 1916 may trigger a UDR service request (e.g., an Nudr_DM_Query request), for example, based on the PCF needing to retrieve a policy-related subscription data from a UDR (e.g., the UDR 1906). The UDR 1906 may respond to the PCF 1916 with a UDR service response (e.g., an Nudr_DM_Query response), for example, for the invoked UDR service request. The response from the UDR 1906 may comprise information associated with the ADU-based QoS service. The PCF 1916 may determine an ADU-based QoS policy for the PDU session, for example, based on the information associated with an ADU-based QoS service from the SMF 1914 and/or the information associated with an ADU-based QoS from a UDR (e.g., the UDR 1906). The PCF 1916 may respond to the SMF 1914 with a PCF service response (e.g., an Npcf_SMPolicyControl_Create response). The PCF service response may comprise an ADU-based QoS policy. The ADU-based QoS policy may comprise information associated with the ADU-based QoS.

An ADU-based QoS associated configuration parameter for a PDU session may be determined. The SMF 1914, for example, may determine an ADU-based QoS associated configuration parameter for a PDU session. The SMF 1914 may determine an ADU-based QoS associated configuration parameter for a PDU session, for example, based on the information associated with an ADU-based QoS service from the UDM 1907 for the ADU-based QoS service. An ADU-based QoS policy for the PDU session may be determined. The PCF 1916, for example, may determine an ADU-based QoS policy for the PDU session. The PCF 1916 may determine an ADU-based QoS policy for the PDU session, for example, based on the information delivered from the UDR 1906 for the ADU-based QoS. An ADU-based QoS policy for the PDU session may be requested. The SMF 1914, for example, may request the PCF 1916 to provide an ADU-based QoS policy for the PDU session for the ADU-based QoS. An ADU-based QoS associated configuration parameter for the PDU session may be determined. The SMF 1914, for example, may determine an ADU-based QoS associated configuration parameter for the PDU session. The SMF 1914 may determine an ADU-based QoS associated configuration parameter for the PDU session, for example, based on the ADU-based QoS policy.

An ADU-based QoS policy may comprise at least one of the following: ADU authorization information, ADU identification information, and/or ADU-based QoS information. ADU authorization information may comprise information indicating whether to allow an ADU-based QoS service for a PDU session and/or information indicating whether to allow an ADU-based QoS service for one or more service data flows and/or information indicating whether to allow an ADU-based QoS service for one or more applications.

An ADU-based QoS associated configuration parameter may comprise at least one of the following: ADU authorization information, ADU identification information, information associated with an ADU-based QoS service, information indicating whether or not to support an ADU-based QoS service for a PDU session, information indicating whether or not a request for ADU-based QoS for the PDU session is accepted, one or more parameters that a wireless device may use for the configuration of a PDU session for an ADU-based QoS service, one or more parameters that a UPF may use for the configuration of a PDU session for an ADU-based QoS service, one or more parameters that an NG-RAN may use for the configuration of a PDU session for an ADU-based QoS and/or one or more protocol entities, and/or information associated with an ADU-based QoS. For example, information associated with the ADU-based QoS service may comprise at least one of the following: ADU-based QoS service request information, a target wireless device information or wireless device group information, network configuration parameter information, service description information (e.g., a service description), service parameter information (e.g., one or more service parameters).

A PCF service request (e.g., an Npcf_SMPolicyControl_Create request) may comprise at least one of following: one or more SUPIs, one or more PDU session IDs, one or more DNNs, one or more S-NSSAIs, one or more addresses, one or more ADU-based QoS wireless device capabilities, QoS information, information associated with an ADU-based QoS service, and/or subscription data. An SUPI may indicate an identity of a wireless device. A PDU session ID may indicate an identity of a PDU session. A DNN may identify a network where a PDU session is connected. An S-NSSAI may identify a network slice over which a PDU session is established. An address may comprise an IPV4 (Internet Protocol version 4) address and/or an IPV6 (Internet Protocol version 6) address. An ADU-based QoS wireless device capability may comprise information indication whether a wireless device can support an ADU-based QoS and/or a list of one or more supported methods for an ADU-based QoS service. QoS information may indicate subscribed QoS information for a wireless device and/or requested QoS information. Subscription data may comprise at least part of subscription data delivered from a UDM.

A PCF service response (e.g., an Npcf_SMPolicyControl_Create response) may comprise at least one of following: one or more SM policy association IDs, ADU-based QoS policy information, and/or information associated with an ADU-based QoS. An SM policy association ID may indicate an identity of the policy information. ADU-based QoS policy information may comprise one or more policies determined by the PCF for an ADU-based QoS service.

A UDM service request (e.g., an Nudm_SDM_Get request) may comprise at least one of: one or more NF IDs, one or more subscription data types, and/or one or more keys. An NF ID may indicate an identity of a network function (e.g., a network node) which sends a UDM service request. A subscription data type may indicate a type of requested subscription data. A key may indicate a target for a requested subscription data type.

A UDM service response (e.g., an Nudm_SDM_Get response) may comprise at least one of: subscription data, and/or information associated with an ADU-based QoS service. Subscription data may comprise subscription data requested by a network function. Subscription data may comprise subscription information for an ADU-based QoS service.

An SMF service request may comprise at least one of the following: one or more SUPIs, one or more DNNs, one or more PDU Session IDs, one or more NF IDs, one of more N1 SM containers, user location information, one of more access types, and/or one or more GPSIs. A SUPI may indicate an identity of the wireless device associated with an SMF service request. A DNN may indicate an identity of a network associated with an SMF service request. A PDU Session ID may indicate an identity of a PDU session. An NF ID may indicate an identity of a network function that triggers an SMF service request. An N1 SM container may comprise one or more NAS messages sent by a wireless device. For example, an NAS message may comprise a PDU session establishment request. User location information may indicate a current location of the wireless device. An access type may indicate which access a wireless device uses. A GPSI may indicate an identity of the wireless device.

An N4 session message may be sent. The SMF 1914, for example, may send an N4 session message (e.g., an N4 session establishment request, an N4 session modification request, and/or the like) to a UPF 1918 for an ADU-based QoS service. The SMF 1914 may send an N4 session message to the UPF 1918, for example, based on the determined ADU-based QoS associated configuration parameter. The N4 session message may include at least one of the following: one or more packet detection rules, one or more packet enforcement rules (e.g., a QoS enforcement rule), one or more packet reporting rules, and/or one or more ADU-based QoS associated configuration parameters. A packet detection rule may indicate how to detect and/or identity and/or classify one or more service data flows. A packet detection rule may indicate how to detect and/or identity and/or classify one or more sub-service data flows. A packet detection rule may indicate how to detect and/or identity and/or classify one or more ADU types associated with one or more packets. A packet enforcement rule may indicate one or more QoS parameters for one or more service data flows and/or one or more sub-service data flows and/or one or more ADU types. A packet reporting rule may indicate one or more criteria of when a UPF reports an event to an SMF.

A packet detection rule may provide information to identity service data flow. For example, the packet detection rule may indicate that a first service data flow corresponds to a source IP address of 1.1.1.1 and a destination IP address of 2.2.2.2. For example, the packet detection rule may indicate that a second data service flow corresponds to a source IP address of 3.3.3.3 and a destination IP address of 4.4.4.4. The UPF 1918 may receive one or more IP packets. The one or more IP packets may comprise a first IP packet, a second IP packet and a third IP packet. The UPF 1918 may identify the received IP packets, for example, based on the packet detection rule. The UPF 1918 may determine that the first IP packet corresponds to the first service data flow, for example, based on a source IP address of the first IP packet indicating 1.1.1.1 and a destination IP address of the first IP packet indicating 2.2.2.2. The UPF 1918 may determine that the second IP packet corresponds to the second service data flow, for example, based on a source IP address of the second IP packet indicating 3.3.3.3 and a destination IP address of the second IP packet indicating 4.4.4.4. The UPF 1918 may determine that the third IP packet corresponds to the first service data flow, for example, based on a source IP address of the third IP packet indicating 1.1.1.1 and a destination IP address of the third IP packet indicating 2.2.2.2.

An ADU-based QoS associated configuration parameter may provide information indicating how to perform an ADU-based QoS service. The ADU-based QoS associated configuration parameter may, for example, provide information indicating how to identity and/or classify and/or process one or more packets (e.g., IP packets) of a service data flow. A first IP packet and a third IP packet may be associated with a first service data flow. The UPF 1918 may determine associated ADU information (e.g., associated ADU type) for the IP packets, for example, based on the ADU identification information. For example, the ADU identification information may indicate that one or more fields in a packet are associated with an identity of an ADU associated with the packet. For example, the ADU identification information may indicate that one or more fields of a packet are associated with an identity of the ADU associated with the packet. For example, the ADU identification information may indicate that one or more fields in a packet is/are associated with an ADU type associated with the packet. The UPF 1918 may determine one or more ADU types associated with one or more packets, for example, by checking one or more values of the one or more fields. For example, the ADU identification information may indicate that a DSCP field of an IP packet indicates an ADU type associated with the IP packet. The UPF 1918 may determine that the first IP packet is associated with a first ADU type, for example, based on a DSCP field of the first IP packet indicating a "0" value. The UPF 1918 may determine that the third IP packet is associated with a second ADU type, for example, based on a DSCP field of the third IP packet indicating a "1" value. The UPF 1918 may determine that the first IP packet and the third IP packet may be associated with a same ADU type, for example, based on a DSCP field of the first IP packet indicating a "0" value and based on a DSCP field of the second IP packet indicating a "0" value.

Whether one or more packets are of a same service data flow may be determined. The UPF 1918, for example, may determine whether or not one or more packets are of a same service data flow. The UPF 1918 may determine whether or not one or more packets are of a same service data flow, for example, based on a packet detection rule. One or more ADU types associated with the one or more packets may be determined. The UPF 1918, for example, may determine one or more ADU types associated with the one or more packets of the service data flow. The UPF 1918 may determine one or more ADU types associated with the one or more packets of the service data flow, for example, based on the ADU identification information. Appropriate QoS processing for the one or more packets may be used. The UPF 1918, for example, may use appropriate QoS processing for the one or more packets. The UPF 1918 may use appropriate QoS processing for the one or more packets, for example, based on the determination of associated ADU types.

Similar process may be performed by a wireless device (e.g., the wireless device 1908) and/or other NF. The wireless device (e.g., the wireless device 1908) and/or the other NF may determine the associated one or more ADU information for one or more packets, for example, based on the ADU identification information.

An N4 session message may be used to respond to another N4 session message. The UPF 1918, for example, may respond to the SMF 1914 with another N4 session message (e.g., an N4 Session Establishment Response, a PFCP session establishment response) for an N4 session message from the SMF. An AMF service request and/or an SMF service response may be invoked after configuring a UPF for ADU-based QoS service. The SMF 1914, for example, may invoke an AMF service request (e.g., an Namf_Communication_N1N2MessageTransfer request) and/or an SMF service response (e.g., an Nsmf_PDUSession_CreateSMcontext response). The SMF 1914 may invoke an AMF service request and/or an SMF service response, for example, after configuring a UPF for an ADU-based QoS service. The SMF 1914 may send to the AMF 1912, the AMF service request and/or the SMF service response, for example, to invoke the AMF service request and/or the SMF service response. The AMF service request and/or the SMF service response may comprise at least one of the following: one or more PDU Session IDs, N2 SM information, one or more N1 SM containers, and/or one or more ADU-based QoS associated configuration parameters. A PDU session ID may indicate an identifier of a PDU session. N2 SM information may comprise information for setting up an N3 interface between an NG-RAN and a UPF. For example, the N2 SM information may comprise one or more ADU-based QoS associated configuration parameters. An N1 SM container may comprise a PDU session establishment accept message. For example, an N1 SM Container may comprise one or more ADU-based QoS associated configuration parameters.

An N2 message may be sent. The AMF 1912, for example, may send an N2 message (e.g., an N2 PDU session request) to the NG-RAN 1910, The AMF 1912 may send the N2 message to the NG-RAN 1910, for example, based on the AMF receiving an AMF service request and/or based on an SMF service response. An N2 message may comprise at least one of the following: N2 SM information, one or more NAS messages, and/or one or more ADU-based QoS associated configuration parameters. N2 SM information may comprise one or more ADU-based QoS associated configuration parameters. An NAS message may comprise an N1 SM container.

An NAS message may be sent. The NG-RAN 1910, for example, may send an NAS message to the wireless device 1908. The NG-RAN 1910 may sent the NAS message to the wireless device 1908, for example, based on the N2 message comprising a NAS message. An AS layer may be configured. The NG-RAN 1910, for example, may configure an AS layer of the wireless device 1908. The NG-RAN 1910 may configure the AS layer of the wireless device 1908, for example, based on the NG-RAN receiving the N2 message. The NG-RAN 1910 may use information delivered via the ADU-based QoS associated configuration parameter, for example, for the configuration of the AS layer of the wireless device 1908. For example, the NG-RAN 1910 may configure a PDCP entity and/or a SDAP entity and/or an RLC entity and/or a MAC entity to identity and/or classify one or more packets and/or one or more service data units, based on ADU identification information (e.g., an associated ADU type). For example, the NG-RAN 1910 may configure a PDCP entity and/or a SDAP entity and/or an RLC entity and/or a MAC entity to use different configuration/parameters for one or more packets and/or for one or more service data units and/or for one or more protocol data units, based on the ADU identification information (e.g., an associated ADU type).

An N2 message may be sent after configuring an AS layer. The NG-RAN 1910, for example, may send an N2 message (e.g., an N2 PDU session response) to the AMF 1912. The NG-RAN 1910 may send the N2 message to the AMF 1912, for example, after configuring an AS layer of the wireless device 1908 and/or one or more N3 bearers for the wireless device. The AMF 1912 may respond to the SMF 1914 with an AMF service response and/or an SMF service request, for example, after receiving the N2 message (e.g., an N2 PDU Session Response) from the NG-RAN 1910.

Data may be sent to an AF. The wireless device 1908, for example, may send data to the AF 1902. The wireless device 1908 may send data to the AF 1902, for example, based on the established PDU session. The AF 1902 may determine that ADU-based QoS service is desired/preferred/needed for the wireless device 1908. The AF 1902 may determine that an ADU-based QoS service is desired/preferred/needed for the wireless device 1908, for example, to reduce the use (e.g., a waste) of network resources and/or to enhance quality of experience for an application. The AF 1902 may initiate a procedure to a first network node (e.g., the NEF 1904) to request ADU-based QoS service for the wireless device, for example, based on a determination that an ADU-based QoS service is desired/preferred/needed. For example, the AF may invoke a NEF service request (e.g., an Nnef_AFsessionWithQoS_Create request) from the first network node. The AMF 1912 may send the NEF service request to the first network node, for example, to invoke the NEF service request. An NEF service request may comprise: one or more wireless device addresses, one or more AF IDs, one or more flow descriptions, one or more External Application IDs, one or more QoS references, one or more DNNs, one or more S-NSSAIs, and/or one or more ADU-based QoS service requests. A wireless device address may indicate identification information for a wireless device. For example, a wireless device address may indicate an IP address of the wireless device. An AF ID may indicate an identity of an AF. A flow description may indicate a service data flow. An External Application ID may indicate an identity of an application. A QoS reference may indicate a requested QoS parameter to support an application. A DNN may indicate a network associated with an application. An S-NSSAI may indicate a network slice associated with an application.

Whether an AF is authorized for a received NEF service request may be determined. The NEF 1904, for example, may determine whether the AF 1902 is authorized for a received NEF service request. The NEF 1904 may determine a PCF (e.g., the PCG 1916) associated with the NEF service request, for example, based on the AF 1902 being authorized for the received NEF service request. For example, the NEF 1904 may determine the PCF 1916, based on the DNN and/or the S-NSSAI and/or the wireless device address of the NEF service request. The NEF 1904 may invoke a PCF service request (e.g., an Npcf_PolicyAuthorization_Create request) to the PCF 1916. The NEF 1904 may send the PCF service request to the PCF, for example, to invoke the PCF service request. The PCF service request may comprise: one or more wireless device addresses, one or more AF IDs, one or more flow descriptions, one or more QoS references, and/or an ADU-based QoS service request.

A wireless device associated with a PCF service request may be determined. The PCF 1916, for example, may identify a wireless device (e.g., the wireless device 1908) associated with the PCF service request (e.g., a first PCF service request from the NEF 1904 to the PCF 1916). The PCF 1916 may identify a wireless device associated with the PCF service request, for example, based on the wireless device address information of the PCF service request. QoS configurations for an identified wireless device may be determined. The PCF 1916, for example, may determine QoS configurations for the identified wireless device based on the information conveyed by the PCF service request. The PCF 1916 may determine ADU-based QoS policy information and/or information associated with the ADU-based QoS, for example, based on the information conveyed by the PCF service request. A PCF service may be invoked. The PCF 1916, for example, may invoke a PCF service (e.g., an Npcf_SMPolicyControl_UpdateNotify service) by sending a PCF request toward the SMF 1914 associated with the wireless device 1908 (e.g., a second PCF service request from the PCF 1916 to the SMF 1914), for example, based on the determined ADU-based QoS policy information and/or information associated with the ADU-based QoS. The PCF 1916 may send a PCF service request to the SMF 1914 (e.g., the second PCF service request), for example, to invoke the PCF service. The PCF service request (e.g., the second PCF service request from the PCF 1916 to the SMF 1914) may comprise the ADU-based QoS policy information and/or information associated with the ADU-based QoS. The SMF 1914 may perform a procedure to update a configuration of a UPF (e.g., the UPF 1918) and/or an NG-RAN (e.g., the NG-RAN 1910) and/or a wireless device (e.g., the wireless device 1908) as described herein, for example, based on the information provided by the PCF service (e.g., an Npcf_SM-PolicyControl_UpdateNotify service). The PCF 1916 may send a response to the NEF 1904, for example, based on the PCF service request (e.g., the first PCF service request from the 1904 NEF to the PCF 1916) (e.g., an Npcf_PolicyAuthorization_Create request). The NEF 1904 may send a response to AF 1902, for example, based on the response from the PCF 1916. For example, the NEF may trigger an Nnef_AFsessionWithQoS_Create response.

An ADU-based QoS associated configuration parameter may comprise at least one of the following: one or more PDRs, one or more QERs, one or more indications of a source interface, one or more wireless device IP addresses, one or more SDF filters, packet detection/description information (PDI), and/or one or more application IDs. A PDR may indicate one or more identities of one or more PDU rules. A QER may indicate a QoS enforcement rule or a QoS marking action rule for a matching packet for a PDR. A QER may comprise information of QoS configurations applicable for a packet, based on ADU identification information (e.g., an ADU type associated with the packet). An indication of a source interface may indicate a source interface of a packet. A wireless device IP address may identify an IP address for a packet. An SDF filter may identify an SDF filter against which a packet is examined. For example, an SDF filter may identify a service data flow. For example, an SDF filter may identify a ADU type of a service data flow. PDI may comprise an information indicating how to identify an ADU type associated with a packet. An application ID may indicate an identifier of an application to which the ADU-based QoS information may apply. An SDF filter may comprise at least one of the following: one or more flow descriptions, one or more SDF filter IDs, indication of one or more types of service, indication of one or more traffic classes, and/or indication of one or more ADU fields. An SDF filter ID may indicate the identity of an SDF filter. A port number may indicate the port number used by a packet and/or a ADU associated with the packet. An indication of a type of service may indicate the type of service of a packet and/or an ADU associated with the packet. An indication of a traffic class may indicate the traffic class of a packet and/or an ADU associated with the packet. An indication of an ADU field may indicate one or more fields of a packet and/or an ADU associated with the packet. An ADU field may be one or more fields of the IP protocol and/or one or more fields of one or more protocol above the IP protocol. For example, an ADU field may indicate one or more fields of RTP and/or TCP and/or UDP and/or QUIC (Quick UDP Internet Connections) and/or HTTP and/or video/audio data and/or one or more protocols. A QER may indicate information comprising at least one of the following: one or more gate statuses, one or more maximum bitrates, one or more downlink (DL) markings, one or more QFIs, and/or one or more Radio Access Technology (RAT) types. A gate status may indicate whether or not a packet of a matching SDF and/or a packet and/or an ADU type associated with the packet can pass a UPF. A maximum bitrate may indicate a maximum bit rate for a service data flow and/or one or more packets of a matching ADU type. A DL marking may indicate marking information for the packet. A QFI may indicate a QFI to be used for a matching packet. An RAT type may indicate whether 3GPP access or non-3GPP access is used for a packet. An RAT type may indicate whether NR or LTE or WIFI is used for a packet.

Figure 20:
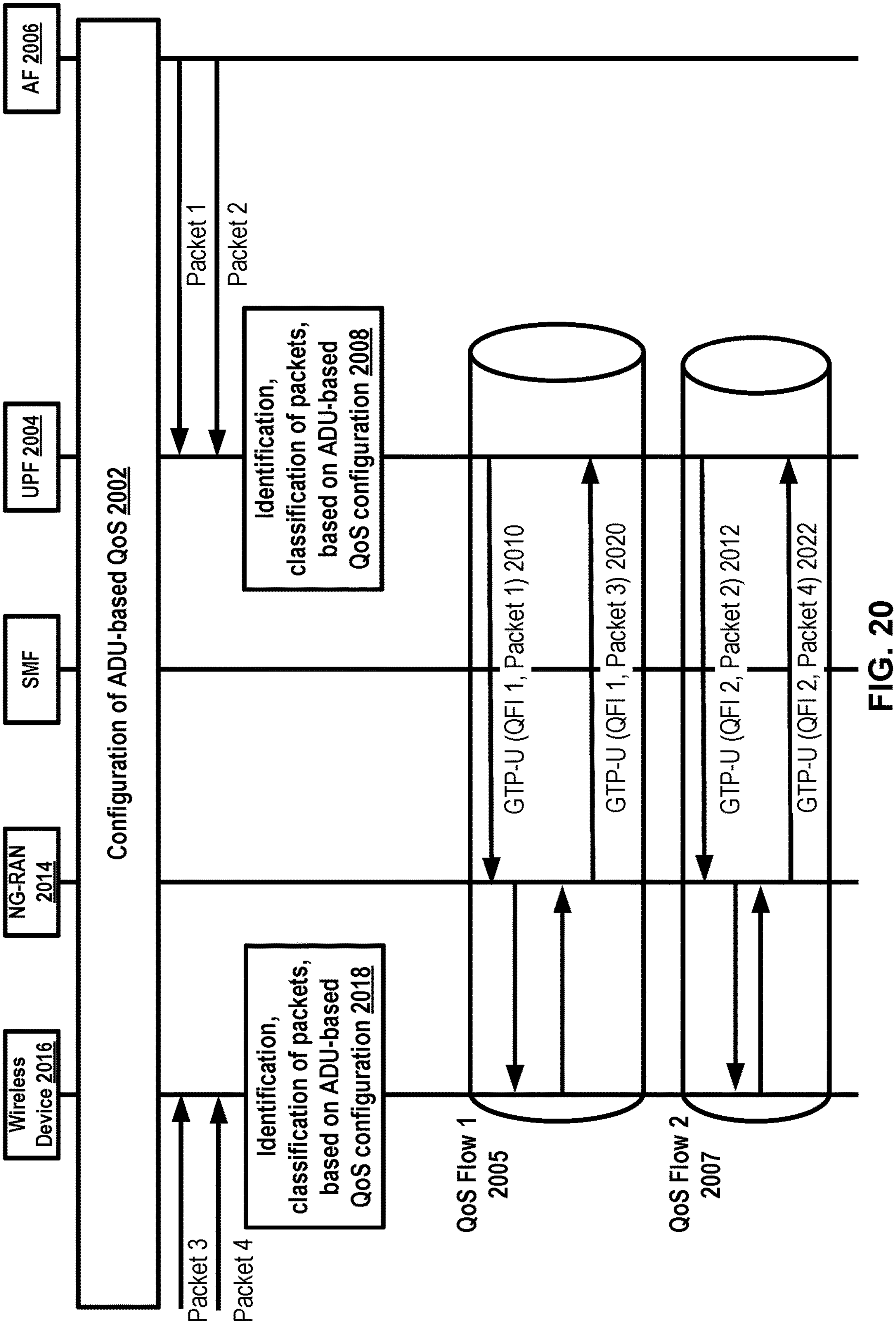
FIG. 20 shows an example of ADU-based quality management for packet communication.

FIG. 20 shows an example of ADU-based quality management for packet communication. One or more packets associated with a service data flow (e.g., packets associated with ADUs generated by the same application server and/or application) may be sent via different QoS flows, for example, based on one or more ADU-based QoS configurations indicating differentiated treatment of different packet types that are associated with different types of ADUs. Packets associated with a packet type and/or an ADU type (e.g., packets that are more important and/or are associated with a higher priority) may be sent via one QoS flow while packets associated with another packet type and/or another ADU type may be sent via another QoS flow (e.g., packets that are less important and/or are associated with a lower priority). Multiple QoS flows (e.g., two or more) may be available for sending a packet. A QFI may indicate which QoS flow a packet is associated with. The QFI associated with a packet may implicitly indicate, for example, a packet type, an ADU type, an importance of a packet, and/or a priority associated with the packet. An ADU-based QoS configuration may indicate differentiated treatment of packet types based on one or more QFIs. For example, an ADU-based QoS configuration may indicate that one QFI is more important and/or has a higher priority than another QFI. For example, an ADU-based QoS configuration may indicate that one QFI is less important and/or has a lower priority than another QFI. For example, the ADU-based QoS configuration may enable packets from the same source (e.g., an application, an application server, a service data flow) to be sent via different QoS flows using different QFIs for different packets, for example, based on the ADS-based QoS configuration indicating how to treat different types of packets and/or different types of ADUs (e.g., packets and/or ADUs that are more or less important, packets and/or ADUs that are associated with a higher or lower priority, and/or packets and/or ADUs having a relationship (e.g., a dependency relationship) with each other). Prioritizing packets associated with a QFI that is associated with an ADU and/or a type of ADU (e.g., a more important and/or higher priority ADU and/or ADU type) may, for example, increase a probability of delivering ADUs associated with that type of ADU and/or achieve one or more additional advantages described herein.

Configuration of ADU-based QoS 2002 may be performed, for example, to configure one or more network nodes to support ADU-based QoS (e.g., as shown in FIG. 19). A network node (e.g., a UPF 2004) may receive one or more packets from an AF 2006 (e.g., application function, application server), for example, after configuration is complete. The one or more packets may comprise a first packet and/or a second packet (e.g., packet 1 and/or packet 2 in FIG. 20). The one or more packets may be for a service data flow. The first packet may comprise at least a portion of a first ADU. The second packet may comprise a portion of a second ADU. The first packet (e.g., packet 1) may be sent via a first QoS flow (e.g., QoS Flow 1 2005). The second packet (e.g., packet 2) may be sent via a second QoS flow (e.g., QoS Flow 2 2007). The first QoS flow may be identified using a first QFI (e.g., QFI 1). The second QoS flow may be identified using a second QFI (e.g., QFI 2). For example, the first QoS flow may be associated with packets that are more important and/or that are associated with a higher priority, and the second QoS flow may be associated with packets that are less important and/or that are associated with a lower priority. For example, the first QoS flow may be associated with packets that are less important and/or that are associated with a lower priority, and the second QoS flow may be associated with packets that are more important and/or that are associated with a higher priority.

One or more packets may be identified and/or classified. The UPF 2004, for example, may perform identification and/or classification of the one or more packets 2008, for example, based on one or more ADU-based QoS associated configuration parameters (e.g., a PDR, a QER, an FAR). An ADU-based QoS associated configuration parameter may comprise ADU identification information. ADU Identification information may indicate how to identify an ADU type associated with a packet. For example, the ADU identification information may indicate that one or more fields in a packet is used to identity a type of an ADU associated with the packet. For example, one or more fields in a packet may comprise a DSCP field. A packet may be determined to be associated with a first type of ADU, for example, based on the DSCP field value of the packet indicating a first value. A packet may be determined to be associated with a second type of ADU, for example, based on the DSCP field value of the packet indicating a second value. The UPF 2004 may determine that one or more packets are associated with a first ADU type, for example, based on ADU identification information. The UPF 2004 may determine that one or more packets are associated with a second ADU type, for example, based on ADU identification information.

One or more packets may be processed, for example, based on one or more ADU-based QoS associated configuration parameters. The UPF 2004, for example, may process the one or more packets based on one or more ADU-based QoS associated configuration parameters. The UPF may use one or more QoS parameters for the one or more packets, for example, based on the ADU-based QoS associated configuration (e.g., a QER, a PDR) parameter and/or based on the determined one or more ADU types. For example, an ADU-based QoS associated configuration parameter may comprise one or more QoS parameters. The one or more QoS parameters may comprise a first QoS parameter and/or a second QoS parameter. For example, the first QoS parameter may indicate that a first QoS Flow Identifier (QFI) is or should be used for the first ADU type and/or a first sub-service data flow identifier. For example, the second QoS parameter may indicate that a second QoS Flow Identifier is or should be used for the second ADU type and/or a second sub-service data flow identifier. An ADU type and/or sub-service data flow identifier may support differentiating one or more packets within a service data flow. The UPF 2004 may mark the first packet with a first QFI, for example, based on the first packet being associated with a first ADU type. For example, the first QoS parameter may indicate a first QoS flow (e.g., QoS Flow 1 2005, first QFI) should be used to send the first packet associated with the first ADU type. The UPF 2004 may mark the second packet with a second QFI, for example, based on the second packet being associated with a second ADU type. For example, the second QoS parameter may indicate a second QoS flow (e.g., QoS Flow 2 2007, second QFI) should be used to send the second packet associated with the second ADU type. The UPF 2004 may construct one or more GPRS Tunneling Protocol for User Plane (GTP-U) packets (containers) (e.g., GTP-U packets 2010, 2012 in FIG. 20) and/or may forward the one or more GTP-U packets to an NG-RAN 2014. The one or more GTP-U packets may comprise a first GTP-U packet 2010 and/or a second GTP-U packet 2012. The first GTP-U packet 2012 may comprise the first packet (e.g., packet 1) and/or the first QFI (e.g., QFI 1). The second GTP-U packet 2012 may comprise the second packet (e.g., packet 2) and/or the second QFI (e.g., QFI 2). The NG-RAN 2014 may receive the one or more GTP-U packets (e.g., GTP-U packets 2012, 2012). The NG-RAN 2014 may configure one or more radio bearers for a wireless device 2016. The one or more radio bearers may comprise a first radio bearer and/or a second radio bearer. The NG-RAN 2014 may send the one or more packets (e.g., packet 1 and/or packet 2) of the one or more GTP-U packets 2010, 2012 to the wireless device 2016, for example, based on the QFI information. The first packet (e.g., packet 1) may be sent to the wireless device 2016 via a first radio bearer, for example, based on the first QFI (e.g., QFI 1). The second packet (e.g., packet 2) may be sent to the wireless device 2016 via a second radio bearer, for example, based on the second QFI (e.g., QFI 2). The NG-RAN 2014 may send the one or more packets with QFI information, for example, based on the QFI information. For example, the first packet (e.g., packet 1) may be sent to the wireless device 2016 via the first radio bearer, with the first QFI information (e.g., QFI 1). For example, the second packet (e.g., packet 2) may be sent to the wireless device 2016 via the second radio bearer, with the second QFI information (e.g., QFI 2).

One or more packets generated by an application may (optionally) be determined for sending. Determining packets to send may (optionally) include, for example, acquiring the packets (e.g., receiving the packets, accessing the packets, obtaining the packets, or retrieving the packets). Packets to send may (optionally) be determined, for example, by a computing device, an access stratum layer, a network device, a network function, a protocol entity, and/or a network node. Packets to send may be provided, for example, by a computing device, an access stratum layer, a network device, a network function, a protocol entity, a network node, an application server, and/or an application. The wireless device 2016, for example, (optionally) may determine one or more packets to send that are generated by an application. The wireless device 2016 may (optionally) determine one or more packets to send as described herein. The application that generates the may be executed by (e.g., running at), for example, the wireless device itself, a computing device that is physically connected to the wireless device, or a computing device that is not physically connected to the wireless device (e.g., a computing device that is in wireless signal communication with the wireless device). For example, the one or more packets may comprise a third packet and/or a fourth packet (e.g., packet 3 and/or packet 4 in FIG. 20). The third packet (e.g., packet 3) and the fourth packet (e.g., packet 4) may comprise a service data flow. The wireless device 2016 may perform identification and/or classification of the one or more packets 2018, for example, based on one or more ADU-based QoS associated configuration parameters. The wireless device 2016 may identify one or more ADU types associated with the one or more packets, for example, based on one or more ADU-based QoS associated configuration parameters. The wireless device 2016 may use one or more QoS parameters for the one or more packets, for example, based on the one or more ADU-based QoS associated configuration parameters and/or based on the identified ADU type(s) for the one or more packets (e.g., as described herein for the NG-RAN 2014 and/or the UPF 2004). For example, The wireless device 2016 may determine that the third packet (e.g., packet 3) is associated with a first ADU type and/or that the fourth packet (e.g., packet 4) is associated with a second ADU type, for example, based on the ADU identification information. A protocol entity (e.g., an SDAP entity) of the wireless device 2016 may determine the first QFI (e.g., QFI 1) for the third packet (e.g., packet 3) and the second QFI (e.g., QFI 2) for the fourth packet (e.g., packet 4), for example, for the third packet and the fourth packet of the service data flows and based on the ADU identification information. The wireless device 2016 may send the third packet over the first radio bearer and/or the wireless device may send the fourth packet over the second radio bearer, for example, based on the determination of the respective QFIs for the third packet and the fourth packet. The wireless device 2016 may mark the third packet with the first QFI (e.g., QFI 1), for example based on the third packet being associated with the first ADU type. For example, the first QFI may indicate that the first QoS flow (e.g., QoS Flow 1 2005) should be used to send the third packet associated with the first ADU type. The wireless device 2016 may mark the fourth packet with the second QFI (e.g., QFI 2), for example, based on the fourth packet being associated with the second ADU type. For example, the second QFI may indicate that the second QoS flow (e.g., QoS Flow 2 2007) should be used to send the fourth packet associated with the second ADU type.

One or more GTP-U packets comprising one or more packets may be received. The NG-RAN 2014, for example, may receive one or more GTP-U packets comprising one or more packets, for example, for a wireless device in RRC-Inactive mode. The NG-RAN 2014 may identify one or more ADU types associated with the one or more packets, for example, based on the one or more ADU-based QoS associated configuration parameters. The NG-RAN 2014 may use one or more QoS parameters for the one or more packets, for example, based on the one or more ADU-based QoS associated configuration parameters and/or based on the identified ADU types for the one or more packets. The NG-RAN 2014 may construct one or more GTP-U packets (containers) (e.g., GTP-U packets 2020, 2022 in FIG. 20) and/or may forward the one or more GTP-U packets to the UPF 2004. The one or more GTP-U packets may comprise a third GTP-U packet 2020 and/or a fourth GTP-U packet 2022. The third GTP-U packet 2020 may comprise the third packet (e.g., packet 3) and/or the first QFI (e.g., QFI 1). The fourth GTP-U packet 2022 may comprise the fourth packet (e.g., packet 4) and/or the second QFI (e.g., QFI 2). The UPF 2004 may receive the one or more GTP-U packets (e.g., GTP-U packets 2020, 2022).

Figure 21A:
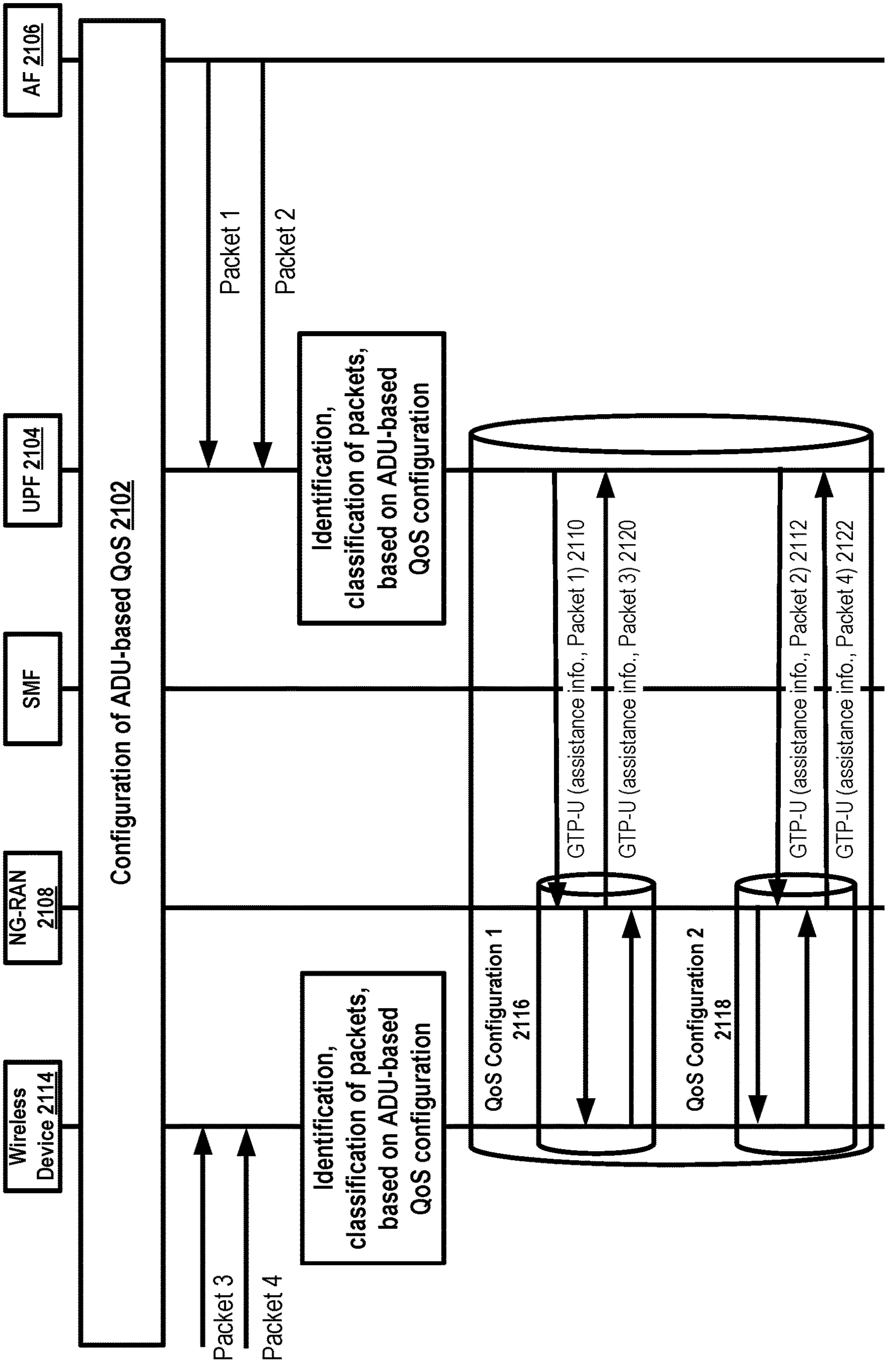
FIG. 21A shows an example of ADU-based quality management for packet communication.
Figure 21B:
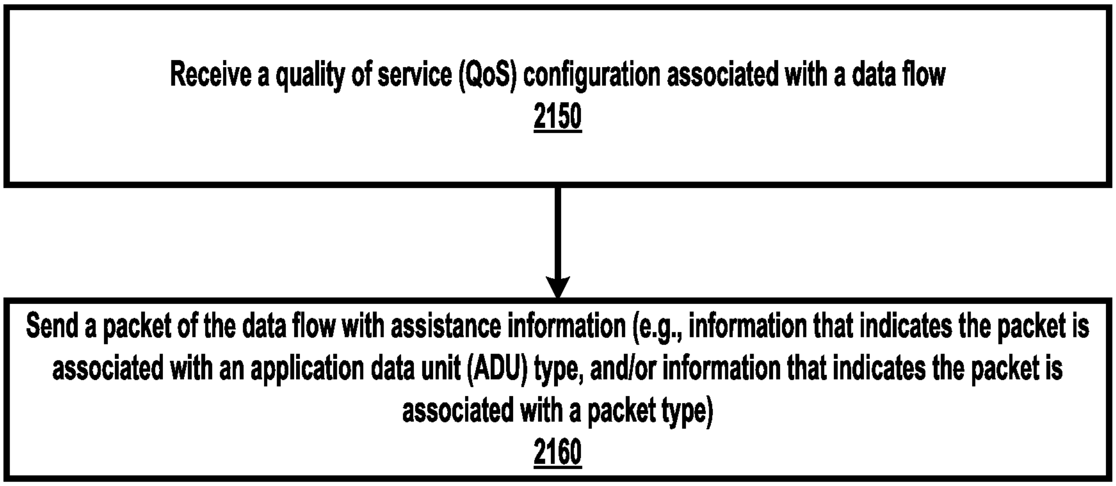
FIG. 21B shows an example method for ADU-based quality management for packet communication.

FIG. 21A shows an example of ADU-based quality management for packet communication. FIG. 21B shows an example method for ADU-based quality management for packet communication. Configuration of ADU-based QoS 2102 may be performed, for example, to configure one or more network nodes to support ADU-based QoS (e.g., to configure one or more network nodes with one or more ADU-based QoS associated configuration parameters as shown in FIG. 19). At step 2150, for example, a QoS configuration may be received. The QoS configuration may be received as described herein, for example, by a computing device (e.g., the wireless device 2114, NG-RAN 2108), a network function (e.g., UPF 2104), an access stratum layer, a protocol entity, an application function (e.g., AF 2106), and/or an application server. The example GTP-U packets (containers) shown in FIG. 21A are configured with a new type of information referred to herein as assistance information that may be used for differentiated treatment of packets associated with different types of ADUs. For example, the assistance information may indicate that one or more packets associated with an ADU and/or a type of ADU is more or less important than one or more packets associated with another ADU and/or another type of ADU. For example, the assistance information may indicate that one packet associated with an ADU and/or a type of ADU is associated with a higher or lower priority than another packet associated with another ADU and/or another type of ADU. For example, the assistance information may indicate that one packet associated with an ADU and/or a type of ADU has a relationship (e.g., a dependency relationship) with another packet associated with another ADU and/or another type of ADU (e.g., a packet and/or ADU associated with an I-frame of video content and another packet associated with a B-frame or P-frame of the video content). At step 2160, a packet of the data flow may be sent with assistance information (e.g., information that indicates the packet is associated with an ADU type and/or information that indicates the packet is associated with a packet type). A packet may be sent as described herein, for example, by a computing device (e.g., the wireless device 2114, NG-RAN 2108), a network function (e.g., UPF 2104), an access stratum layer, a protocol entity, an application function (e.g., AF 2106), and/or an application server. The packet may be prioritized based on the assistance information sent with the packet. Prioritizing packets associated with an ADU and/or a ADU type (e.g., packets upon which other packets depend and/or packets associated with an ADU and/or ADU type upon which other ADUs depend) may, for example, avoid or reduce wasted network resources resulting from unnecessary sending of unusable packets and/or achieve one or more additional advantages described herein.

A UPF 2104 may receive one or more packets (e.g., from an AF 2106). The one or more packets may comprise a first packet (e.g., packet 1) and/or a second packet (e.g., packet 2). The one or more packets may comprise a service data flow. The UPF 2104 may determine one or more ADU types associated with the one or more packets, for example, based on one or more ADU-based QoS associated configuration parameters (e.g., as described herein for FIG. 19 and/or FIG. 20).

The UPF 2104, for example, may send one or more GTP-U packets to an NG-RAN 2108. The UPF 2104 may send one or more GTP-U packets to an NG-RAN 2108, for example, based on the determined one or more ADU types for the one or more packets. The one or more GTP-U packets (e.g., GTP-U packets 2110, 2112 in FIG. 21A) may comprise the one or more packets (e.g., packet 1, packet 2 in FIG. 21A) and/or ADU information associated with the one or more packets. The ADU information associated with the one or more packets may be referred to as ADU assistance information and/or assistance information. The ADU information may indicate one or more ADU types associated with the one or more packets. For example, the one or more GTP-U packets may comprise a first GTP-U packet 2110 and/or a second GTP-U packet 2112. The first GTP-U packet 2110 may comprise the first packet (e.g., packet 1) and/or first ADU information. The first ADU information may indicate a first ADU type. The second GTP-U packet 2112 may comprise the second packet (e.g., packet 2) and/or second ADU information. The second ADU information may indicate a second ADU type. The one or more GTP-U packets may comprise information indicating a QFI associated with the one or more packets. The one or more GTP-U packets may indicate the QFI for the one or more packets of the one or more GTP-U packets. For example, a QFI may indicate a value set to three (QFI 3). The ADU information of the one or more GTP-U packets may indicate the one or more ADU types for the one or more packets associated with the QFI. The NG-RAN 2108, for example, may send the one or more packets (e.g., packet 1 and/or packet 2) to a wireless device 2114, for example, based on the QFI information and/or the one or more ADU information and/or the one or more ADU-based QoS associated configuration parameters. The NG-RAN 2108 may send the first packet (e.g., packet 1) to the wireless device 2114, for example, based on a first QoS configuration (e.g., a first radio bearer, a first logical channel, a first timer value, a first AS layer parameter, etc.) for the first ADU type. The NG-RAN 2108 may send the second packet (e.g., packet 2) to the wireless device 2114, for example, based on a second QoS configuration (e.g., a second radio bearer, a second logical channel, a second timer value, a second AS layer parameter, etc.) for the second ADU type.

One or more radio bearers may be configured for the QFI. The NG-RAN 2108, for example, may configure one or more radio bearers for the QFI. The NG-RAN 2108 may send the one or more packets to the wireless device 2114 over the one or more radio bearers, for example, based on the one or more ADU information. For example, the first QoS configuration (e.g., QoS Configuration 1 2116) may comprise a first radio bearer of the one or more radio bearers. For example, the second QoS configuration (e.g., QoS Configuration 2 2118) may comprise a second radio bearer of the one or more radio bearers. The first packet (e.g., packet 1) may be sent to the wireless device 2114 via the first radio bearer, for example, based on the first ADU information (e.g., a first ADU type). The second packet (e.g., packet 2) may be sent to the wireless device via the second radio bearer, for example, based on the second ADU information (e.g., a second ADU type).

The NG-RAN 2108 may configure a radio bearer for a QFI. The one or more packets may be sent with the ADU information associated with the one or more packets, for example, based on the one or more packets being sent over the radio bearer for the QFI. For example, the ADU information may comprise one or more ADU types associated with one or more packets.

One or more packets to send may (optionally) be determined. A packet to send may be (optionally) determined as described herein and include, for example, acquiring the packets (e.g., from an upper or lower layer, a computing device, an entity (e.g., a protocol entity), a node). The wireless device 2114, for example, may (optionally) determine one or more packets to send that are generated by an application as described herein. For example, the one or more packets may comprise a third packet (e.g., packet 3) and/or a fourth packet (e.g., packet 4) for a service data flow. The wireless device 2114 may identify one or more ADU types associated with the one or more packets, for example, based on one or more ADU-based QoS associated configuration parameters. For example, the wireless device 2114 may determine that the third packet (e.g., packet 3) is associated with the first ADU type and/or the wireless device may determine that the fourth packet (e.g., packet 4) is associated with the second ADU type. The wireless device 2114 may use one or more QoS parameters for the one or more packets (e.g., as described herein for the NG-RAN 2104), for example, based on the one or more ADU-based QoS associated configuration parameters and/or based on the identified ADU types for the one or more packets. The wireless device 2114 may send the third packet (e.g., packet 3) with a third ADU information (e.g., the first ADU type), for example, based on the third packet being associated with the first ADU type and based on the first QoS configuration (e.g., QoS Configuration 1 2116). The wireless device 2114 may send the fourth packet (e.g., packet 4) with a fourth ADU information (e.g., the second ADU type), based on the fourth packet being associated with the second ADU type and the second QoS configuration (e.g., QoS Configuration 2 2118). The NG-RAN 2108 may send one or more GTP-U packets to the UPF 2104. The one or more GTP-U packets (e.g., GTP-U packets 2120, 2122 in FIG. 21A) may comprise the one or more packets (e.g., packet 3, packet 4 in FIG. 21A) and/or ADU information associated with the one or more packets. For example, the one or more GTP-U packets may comprise a third GTP-U packet 2120 and/or a fourth GTP-U packet 2122. The third GTP-U packet 2120 may comprise the third packet (e.g., packet 3) and/or third ADU information. The third ADU information may indicate a first ADU type. The fourth GTP-U packet 2122 may comprise the fourth packet (e.g., packet 4) and/or fourth ADU information. The fourth ADU information may indicate a second ADU type. The NG-RAN 2108 may send the third packet (e.g., packet 3) to the UPF 2104, for example, based on a first QoS configuration (e.g., QoS Configuration 1 2116) for the first ADU type. The NG-RAN 2108 may send the fourth packet (e.g., packet 2) to the UPF 2104, for example, based on a second QoS configuration (e.g., QoS Configuration 2) for the second ADU type.

Figure 22:
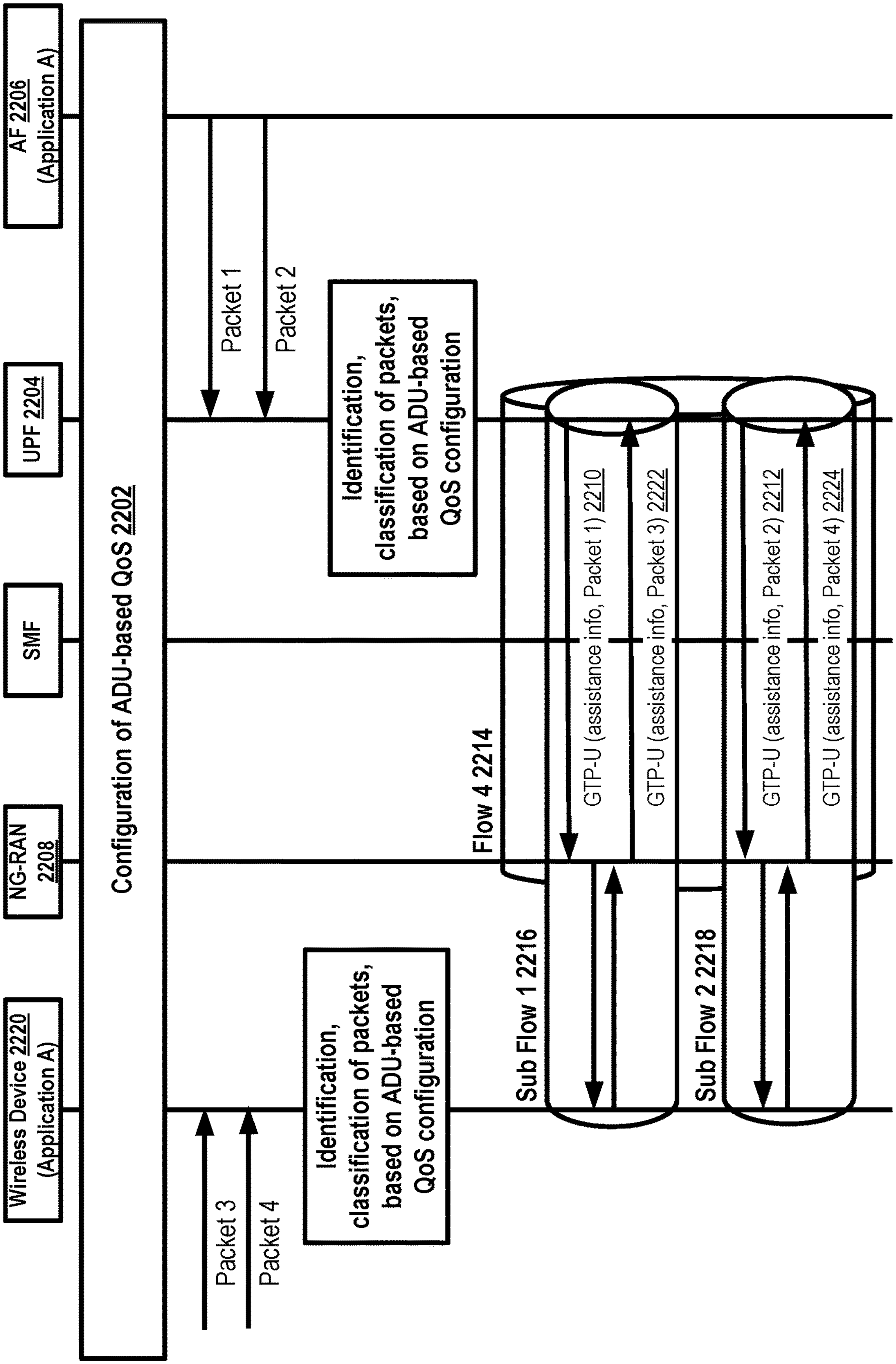
FIG. 22 shows an example of ADU-based quality management for packet communication.

FIG. 22 shows an example of ADU-based quality management for packet communication. A QoS flow may be associated with multiple (e.g., two or more) QoS sub-flows. Assistance information may indicate that a QoS sub-flow is associated with a type of packet and/or a type of ADU. Different types of packets associated with different ADUs and/or different types of ADUs may be sent via different QoS sub-flows of a QoS flow. Using assistance information to prioritize packets associated with different ADUs and/or different types of ADUs for sending via different QoS sub-flows may, for example, increase a probability of delivering packets associated with more important and/or higher priority ADUs and/or types of ADUs (e.g., by applying duplication and/or retransmission) and/or achieve one or more additional advantages described herein.

Configuration of ADU-based QoS 2202 may be performed, for example, to configure one or more network nodes to support ADU-based QoS (e.g., to configure one or more network nodes with one or more ADU-based QoS associated configuration parameters as described herein for FIG. 19 and/or FIG. 20). A UPF 2204 may receive one or more packets for a service data flow (e.g., from an AF 2206 and/or an application). The UPF 2204 may determine one or more ADU types associated with the one or more packets, for example, based on one or more ADU-based QoS associated configuration parameters (e.g., as described herein for FIG. 19 and/or FIG. 20).

The UPF 2204 may send one or more GTP-U packets to an NG-RAN 2208, for example, based on the determined one or more ADU types for the one or more packets. The one or more GTP-U packets (e.g., GTP-U packets 2210, 2212 in FIG. 22) may comprise the one or more packets (e.g., packet 1, packet 2 in FIG. 22) and/or ADU information associated with the one or more packets. The ADU information may indicate one or more ADU types associated with the one or more packets. For example, the one or more GTP-U packets may comprise a first GTP-U packet 2210 and/or a second GTP-U packet 2212. The first GTP-U packet 2210 may comprise the first packet (e.g., packet 1) and/or first ADU information. The first ADU information may indicate a first ADU type. The first ADU type may comprise a first sub-service data flow identifier. For example, FIG. 22 shows a QoS flow 2214 (Flow 4) that comprises two QoS sub-flows 2216, 2218 (Sub Flow 1, Sub Flow 2). The first sub-service data flow identifier may indicate a first QoS sub-flow (e.g., QoS sub-flow 2216) of a QoS flow (e.g., QoS flow 2214). The second GTP-U packet 2212 may comprise the second packet (e.g., packet 2) and/or second ADU information. The second ADU information may indicate a second ADU type. The second ADU type may comprise a second sub-service data flow identifier. The second sub-service data flow identifier may indicate a second QoS sub-flow (e.g., QoS sub-flow 2218) of the QoS flow (e.g., QoS flow 2214). The one or more GTP-U packets may comprise information indicating a QFI (e.g., QFI 4) associated with the one or more packets. The ADU information of the GTP-U packets may indicate one or more ADU types for the one or more packets associated with the QFI. The NG-RAN 2208 may configure one or more radio bearers for a wireless device 2220, for example, based on the one or more ADU-based QoS associated configuration parameters. The NG-RAN 2208 may send the one or more packets to the wireless device 2220, for example, via the one or more radio bearers. The one or more radio bearers may comprise a first radio bearer and/or a second radio bearer. The NG-RAN 2208 may send the one or more packets to the wireless device 2220, for example, based on the ADU information. The first packet may be sent to the wireless device 2220 via a first QoS configuration (e.g., the first radio bearer, the first sub-service data flow (e.g., QoS sub-flow 2216)), for example, based on the first ADU information. The second packet may be sent to the wireless device 2220 via a second QoS configuration (e.g., the second radio bearer, the second sub-service data flow (e.g., QoS sub-flow 2218)), for example, based on the second ADU information.

The wireless device 2220 may receive one or more packets generated by an application (e.g., Application A). The one or more packets may comprise a third packet (e.g., packet 3) and/or a fourth packet (e.g., packet 4). The wireless device 2220 may identify one or more ADU types associated with the one or more packets, for example, based on the one or more ADU-based QoS associated configuration parameters. The wireless device 2220 may determine that the third packet (e.g., packet 3) is associated with the first ADU type and/or that the fourth packet (e.g., packet 4) is associated with the second ADU type. The wireless device 2220 may use one or more QoS parameters for the one or more packets, for example, based on the one or more ADU-based QoS associated configuration parameters and/or based on the identified ADU types for the one or more packets. For example, for one or more packets associated with the first ADU type, the wireless device 2220 may send those packets using a first QoS parameter (e.g., the first logical channel, a first RLC entity, a first RLC parameter, a first PDCP entity, a first MAC parameter, the first sub-service data flow (e.g., QoS sub-flow 2216), and so on). For example, for one or more packets associated with the second ADU type, the wireless device 2220 may send those packets using a second QoS parameter (e.g., the second logical channel, a second RLC entity, a second RLC parameter, a second PDCP entity, a second MAC parameter, the second sub-service data flow (e.g., QoS sub-flow 2218), and so on). The NG-RAN 2208 may send one or more GTP-U packets to the UPF 2204, for example, based on the determined one or more ADU types for the one or more packets. The one or more GTP-U packets (e.g., GTP-U packets 2222, 2224 in FIG. 22) may comprise the one or more packets (e.g., packet 3, packet 4 in FIG. 22) and/or ADU information associated with the one or more packets. The ADU information may indicate one or more ADU types associated with the one or more packets. For example, the one or more GTP-U packets may comprise a third GTP-U packet 2222 and/or a fourth GTP-U packet 2224. The third GTP-U packet 2222 may comprise the third packet (e.g., packet 3) and/or third ADU information. The third ADU information may indicate the first ADU type. The first ADU type may comprise a first sub-service data flow identifier (e.g., an identifier for QoS sub-flow 2216). The fourth GTP-U packet 2224 may comprise the fourth packet (e.g., packet 4) and/or fourth ADU information. The fourth ADU information may indicate the second ADU type. The second ADU type may comprise a second sub-service data flow identifier (e.g., an identifier for QoS sub-flow 2218). The NG-RAN 2208 may send the one or more packets to the UPF 2204, for example, based on the ADU information. The third packet may be sent to the UPF 2204 via the first QoS configuration (e.g., the first sub-service data flow (e.g., QoS sub-flow 2216)), for example, based on the third ADU information. The fourth packet may be sent to the UPF 2204 via the second QoS configuration (e.g., the second sub-service data flow (e.g., QoS sub-flow 2218)), for example, based on the fourth ADU information.

Figure 23:
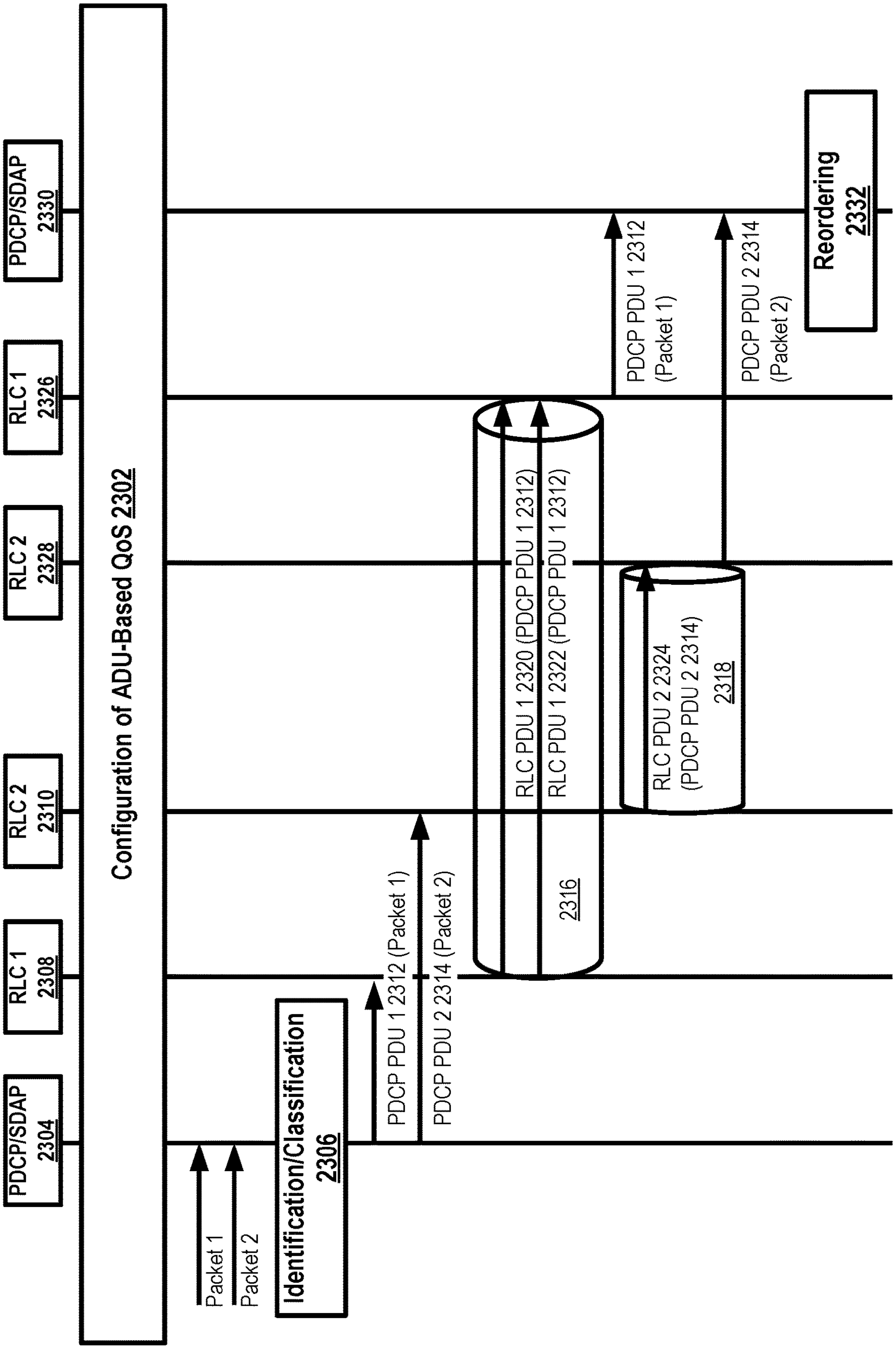
FIG. 23 shows an example of ADU-based quality management for packet communication.

FIG. 23 shows an example of ADU-based quality management for packet communication. The packets shown in FIG. 23 are sent via different protocol entities and/or channels for differentiated treatment of packets associated with different types of ADUs. For example, different types of packets associated with different ADUs and/or different types of ADUs may be sent via different protocol entities and/or channels. For example, PDUs comprising packets that are associated with an ADU and/or a type of ADU (e.g., a more important ADU and/or ADU type, a higher priority ADU and/or ADU type, an ADU and/or ADU type that other ADUs and/or other ADU types depend on) may be duplicated and sent. For example, PDUs comprising packets that are associated with another ADU and/or type of ADU (e.g., a less important ADU and/or ADU type, a lower priority ADU and/or ADU type, an ADU and/or ADU type that other ADUs and/or other ADU types do not depend on) may be sent without duplication. Duplicating PDUs comprising packets associated with an ADU and/or a type of ADU (e.g., a more important and/or higher priority ADU and/or ADU type) may, for example, increase a probability of delivering packets associated with that ADU and/or that type of ADU. By increasing the probability of packet delivery, operation of applications (e.g., time-sensitive applications that demand low latency packet delivery) may be improved. Not duplicating PDUs comprising packets associated with another ADU and/or another type of ADU (e.g., a less important and/or lower priority ADU and/or ADU type) may avoid unnecessary transmission by removing/discarding/dropping/ignoring packets associated with that ADU and/or that type of ADU. By avoiding unnecessary transmission, wasted network resources and/or delay of successful delivery of other types packets (e.g., packets associated with more important and/or higher priority ADUs) may be avoided and/or congestion of network resources may be addressed (e.g., reduced, resolved)/avoided.

Configuration of ADU-based QoS 2302 may be performed, for example, to configure one of more network nodes to support ADU-based QoS (e.g., to configure one or more networks nodes with one or more ADU-based QoS associated configuration parameters as described herein for FIG. 19 and/or FIG. 20). An NG-RAN may configure a wireless to support ADU-based QoS service, for example, based on the one or more ADU-based QoS associated configuration parameters.

A wireless device may receive one or more packets from an upper layer for a service data flow and/or a QoS flow. The wireless device may determine one or more ADU types associated with the one or more packets, for example, based on the one or more ADU-based QoS associated configuration parameters. For example, the one or more packets from an upper layer may comprise a first packet (e.g., packet 1) and/or a second packet (e.g., packet 2). The first packet may comprise at least a portion of a first ADU and/or the second packet may comprise at least a portion of a second ADU. An ADU-based QoS associated configuration parameter may comprise ADU identification information. The ADU identification information may indicate how to identify an ADU type associated with a packet. For example, the ADU identification information may indicate that one or more fields in a packet is used to identify a type of an ADU associated with a packet. For example, one of the one or more fields may be a DSCP field. A packet may be determined as being associated with a first type of ADU, for example, based on the DSCP field of a packet indicating a first value. A packet may be determined as being associated with a second type of ADU, for example, based on the DSCP field of the packet indicating a second value. One of the one or more fields of a packet may be a field indicating a type of video frame or a type of audio frame. A packet may be determined to be associated with a third type of ADU, for example, based on the field indicating a first value. A packet may be determined to be associated with a fourth type of ADU, for example, based on the field indicating a second value. Priority information of a packet may be used to determine an ADU type associated with the packet. For example, an upper layer may make available (e.g., provide, deliver, send) a packet with information indicating a priority. If the priority is set to high, the An ADU type associated with the packet may be determined as a fifth type of ADU, for example, based on the priority being set to high. An ADU type associated with the packet may be determined as a sixth type of ADU, for example, based on the priority being set to low. The upper layer may provide the information indicating an ADU type associated with the packet, for example, based on the upper layer making a packet available (e.g., providing, delivering, sending) to the wireless device.

A wireless device may determine that one or more packets (e.g., the first packet, packet 1) are associated with a first ADU type, for example, based on ADU identification information. The wireless device may determine that one or more packets (e.g., the second packet, packet 2) are associated with a second ADU type, for example, based on ADU identification information. For example, a first entity (e.g., a PDCP entity, an RLC entity, a MAC entity, an SDAP entity) of the wireless device may perform identification of one or more ADU types associated with the one or more packets. For example, a PDCP/SDAP entity 2304 of the wireless device may perform identification and classification 2306 of one or more ADU types associated with the one or more packets. For example, the first entity may determine that the first packet is associated with a first ADU type. For example, the first entity may determine that the second packet is associated with a second ADU type.

The wireless device may be configured with one or more second protocol entities (e.g., RLC entities, PDCP entities) for a first protocol entity (e.g., a PDCP entity, an SDAP entity, MAC entity, an RLC entity), for example, to support ADU-based QoS. The one or more second protocol entities may comprise a first second protocol entity (e.g., RLC entity 2308, RLC 1) and/or a second second protocol entity (e.g., RLC entity 2310, RLC 2). For example, the first second protocol entity (e.g., RLC entity 2308, RLC 1) may be configured to send the first ADU type. For example, the second second protocol entity (e.g., RLC entity 2310, RLC 2) may be configured to deliver the second ADU type. For example, the wireless device may receive the configuration of the one or more second protocol entities via RRC message.

The first protocol entity (e.g., the PDCP/SDAP entity 2304) may generate one or more protocol data units (PDUs) from one or more service data units (SDUs) associated with the one or more packets, for example, based on the configuration. For example, the first protocol entity may generate a first PDU (e.g., PDCP PDU 1 2312) for the first packet (e.g., packet 1). For example, the first protocol entity may generate a second PDU (e.g., PDCP PDU 2 2314) for the second packet (e.g., packet 2). The first protocol entity may determine one or more second protocol entities to which the one or more protocol data units are delivered, for example, based on the one or more ADU-based QoS associated configuration parameters. The first protocol entity may make available (e.g., provide, deliver, send) the first PDU associated with the first packet (e.g., PDCP PDU 1 2312) to the first second protocol entity (e.g., the RLC entity 2308), for example, based on the first packet being associated with the first ADU type. The first protocol entity may make available (e.g., provide, deliver, send) the second PDU associated with the second packet (e.g., PDCP PDU 2 2314) to the second second protocol entity (e.g., the RLC entity 2310), for example, based on that the second packet being associated with the second ADU type. The one or more second protocol entities may send the one or more received PDUs.

The wireless device may be configured with one or more channels (e.g., logical channels, radio bearers, sub-service data flows, RLC entities) for a first protocol entity (e.g., the PDCP/SDAP entity 2304), for example, to support ADU-based QoS. The one or more channels may comprise a first channel 2316 and/or a second channel 2318. For example, the first channel 2316 may be configured to deliver one or more packets associated with the first ADU type (e.g., packet 1). For example, the second channel 2318 may be configured to deliver one or more packets associated with the second ADU type (e.g., packet 2). For example, the wireless may receive the configuration of the one or more channels via RRC message.

Different channels associated with different ADU types may use different configurations, for example, based on the one or more ADU-based QoS associated configuration parameters. For example, the first channel 2316 may use duplicated transmission. For example, the second channel may not use duplicated transmission. The first channel 2316 may duplicate the first PDU (e.g., the PDCP PDU 1 2312) and send the first PDU and a duplicated first PDU, for example, based on the first channel receiving the first PDU. The first channel 2316 may generate a first second-level protocol data unit (e.g., RLC PDU 1 2320) and a second second-level protocol data unit (e.g., RLC PDU 1 2322) using the first PDU (e.g., the PDCP PDU 1 2312), for example, to use duplicated transmission. The second channel 2318 may not duplicate the second PDU (e.g., the PDCP PDU 2 2314) and send the second PDU, for example, based on the second channel receiving the second PDU. For example, the second channel may generate a second-level protocol data unit (e.g., RLC PDU 2 2324) using the second PDU (e.g., PDCP PDU 2 2314).

A sender and/or a receiver may be configured with one or more ADU-based Qos associated configuration parameters (e.g., as described herein for FIG. 19 and/or FIG. 20). An NG-RAN may configure a wireless device to support ADU-based QoS, for example, based on the one or more ADU-based QoS associated configuration parameters.

An upper layer of a sender (e.g., a wireless device and/or an NG-RAN) may generate one or more packets. For example, the one or more packets may be associated with one or more ADUs. For example, the one or more packets may comprise one or more ADUs. The upper layer of a sender may make available (e.g., provide, deliver, send) the one or more packets to an entity (e.g., a PDCP entity, an RLC entity, a MAC entity, an SDAP entity). The entity may perform identification and/or classification of the one or more packets. The entity may determine one or more ADU types associated with the one or more packets, for example, based on ADU-based QoS associated configuration. For example, the one or more packets from an upper layer may comprise a first packet and/or a second packet. The first packet may comprise a first ADU and/or the second packet may comprise a second ADU. An ADU-based QoS associated configuration parameter may comprise ADU identification information. The ADU identification information may indicate how to identify an ADU type associated with a packet. For example, the ADU identification information may indicate that one or more fields in a packet is used to identity a type of an ADU.

The sender may determine that one or more packets (e.g., a first packet) are associated with a first ADU type, for example, based on ADU identification information. The first ADU type may comprise a first sub-service data flow. The sender may determine that one or more packets (e.g., a second packet) are associated with a second ADU type, for example, based on ADU identification information. For example, the first entity may determine that the first packet is associated with a first ADU type. For example, the first entity may determine that the second packet is associated with a second ADU type. The second ADU type may comprise a second sub-service data flow.

The sender may be configured with one or more QoS parameters, for example, to support ADU-based QoS. The one or more QoS parameters may comprise a first QoS parameter and/or a second QoS parameter. The one or more QoS parameters may be associated with one or more access layer configurations. The one or more access layer configurations may comprise one or more configurations of one or more access layer entities (e.g., a PDCP entity, an SDAP entity, a MAC entity, an RLC entity). For example, the one or more QoS parameters may be associated with a quantity of retransmissions and/or a timer value and/or a logical channel and/or a latency and/or an error rate and/or a maximum power and/or a frequency and/or a cell and/or a network slice, etc. For example, the first QoS parameter may be configured for packets associated with the first ADU type. For example, the second QoS parameter may be configured for packets associated with the second ADU type. For example, the first QoS parameter may be associated one or more first lower protocol entities (e.g., a first PDCP entity, a first SDAP entity, a first MAC entity, a first RLC entity). For example, the second QoS parameter may be associated one or more second lower protocol entities (e.g., a second PDCP entity, a second SDAP entity, a second MAC entity, a second RLC entity).

For example, one or more lower protocol entities may comprise one or more first lower protocol entities and/or one or more second lower protocol entities. For example, the one or more first lower protocol entities may be configured to make available (e.g., provide, deliver, send) one or more packets associated with the first ADU type. For example, the one or more second lower protocol entities may be configured to make available (e.g., provide, deliver, send) one or more packets associated with the second ADU type. For example, sender may receive the configuration via RRC message.

The one or more lower protocol entities may receive one or more packets. For example, the first lower protocol entity may receive one or more packets associated with the first ADU type. For example, the second lower protocol entity may receive one or more packets associated with the second ADU type. The one or more lower protocol entities may process the one or more packets. The one or more lower protocol entities may generate one or more protocol data units using the one or more packets. The one or more lower protocol entities may send the one or more protocol data units. The one or more protocol data units may comprise information of the one or more ADU types associated with one or more packets. The information of the one or more ADU types may comprise information indicating one or more sub-service data flows associated with the one or more packets.

The receiver may receive the one or more protocol data units. For example, the receiver may comprise one or more lower protocol entities. The one or more lower protocol entities may comprise a first lower protocol entity (e.g., an RLC entity 2326, RLC 1) and/or a second lower protocol entity (e.g., an RLC entity 2328, RLC 2). The first lower protocol entity (e.g., the RLC entity 2326, RLC 1) of the receiver may receive one or more protocol data units associated with the first ADU type (e.g., the PDCP PDU 1 2312, the RLC PDU 1 2320, and/or the RLC PDU 1 2322). The second lower protocol entity (e.g., the RLC entity 2328, RLC 2) of the receiver may receive one or more protocol data units associated with the second ADU type (e.g., the PDCP PDU 2 2314 and/or the RLC PDU 2 2324). The one or more lower protocol entities may reassemble one or more packets (e.g., packet 1 and/or packet 2) using the received one or more protocol data units. The first lower protocol entity of the receiver may reassemble one or more packets, using one or more protocol data units associated with the first ADU type. The second lower protocol entity of the receiver may reassemble one or more packets, using one or more protocol data units associated with the second ADU type. The one or more lower protocol entities may make available (e.g., provide, deliver, send) the one or more reassembled packets to an entity (e.g., a PDCP/SDAP entity 2330) configured to perform a reordering 2332 of the one or more reassembled packets. The entity may make available (e.g., provide, deliver, send) the one or more packets to an upper layer of the receiver, for example, after reordering of the one or more packets.

Figure 25:
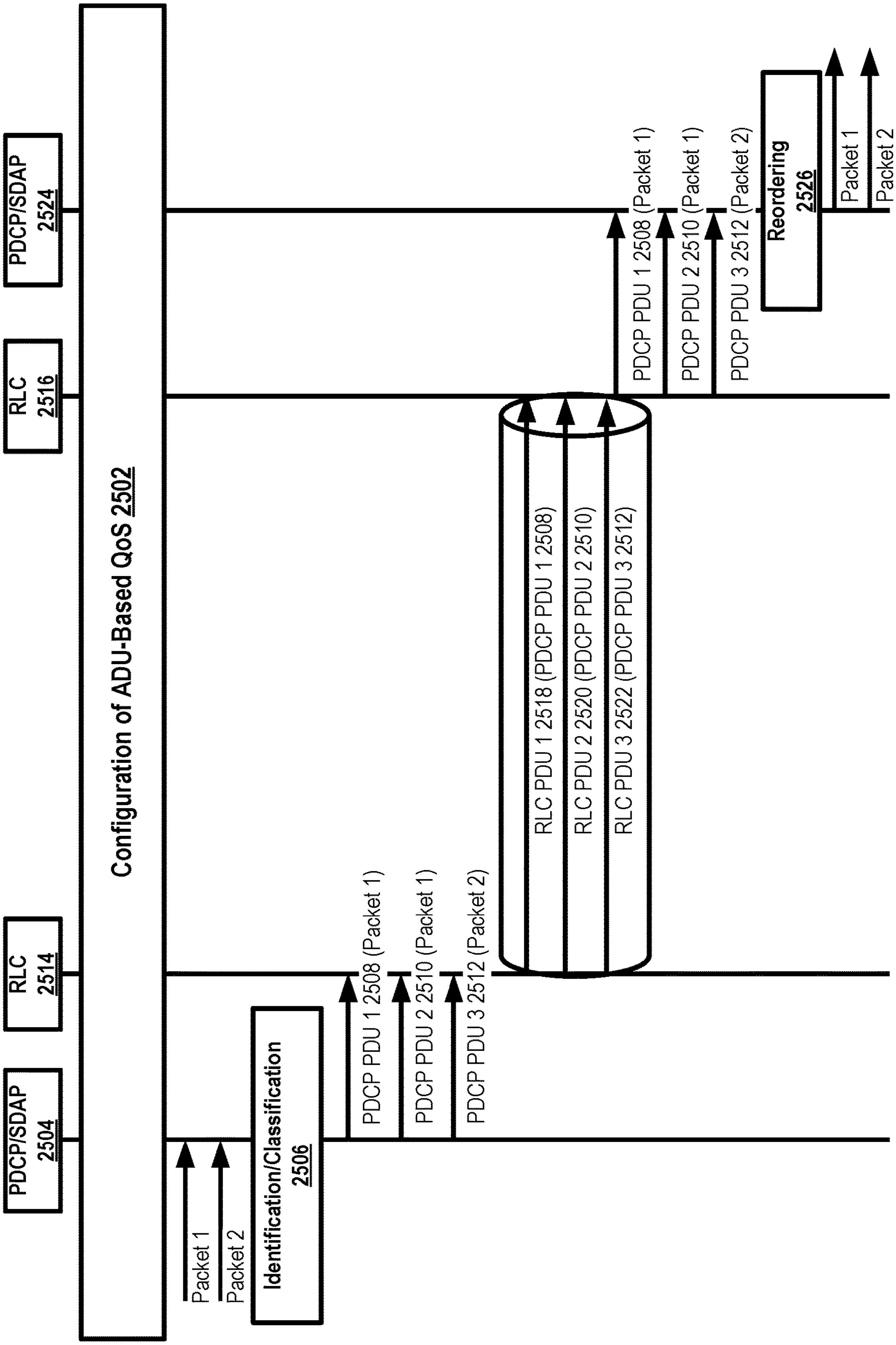
FIG. 25 shows an example of ADU-based quality management for packet communication.

FIG. 25 shows an example of ADU-based quality management for packet communication. FIG. 25 shows packet duplication for differentiated treatment of packets associated with different ADUs and/or different types of ADUs. For example, a type of packet associated with an ADU and/or a type of ADU (e.g., a more important ADU and/or ADU type, a higher priority ADU and/or ADU type, an ADU and/or ADU type that other ADUs and/or other ADU types depend on) may be duplicated. For example, packets that are associated with another type of ADU (e.g., a less important ADU, a lower priority ADU, an ADU that other ADUs and/or other ADU types do not depend on) may not be duplicated. Duplicating packets associated with an ADU and/or a type of ADU (e.g., a more important and/or higher priority ADU and/or ADU type) may, for example, increase a probability of delivering ADUs associated with that ADU and/or type of ADU and/or achieve one or more additional advantages described herein.

Configuration of ADU-based QoS 2502 may be performed, for example, to configure one or more network nodes to support ADU-based QoS (e.g., to configure one or more network nodes with one or more ADU-based QoS associated configuration parameters as described herein for FIG. 19 and/or FIG. 20). An NG-RAN may configure a wireless device to support ADU-based QoS, for example, based on the one or more ADU-based QoS associated configuration parameters.

A wireless device may receive one or more packets from an upper layer. The wireless device may determine one or more ADU types associated with the one or more packets, for example, based on one or more ADU-based QoS associated configuration parameters. For example, the one or more packets from an upper layer may comprise a first packet (e.g., packet 1) and/or a second packet (e.g., packet 2). The first packet may comprise a first ADU and/or the second packet may comprise a second ADU. An ADU-based QoS associated configuration parameter may comprise ADU identification information. The ADU identification information may indicate how to identify an ADU type associated with a packet. For example, the ADU identification information may indicate that one or more fields in a packet is used to identity a type of an ADU associated with the packet. For example, one of the one or more fields may be a DSCP field. The packet may be determined as being associated with a first type of ADU, for example, based on the DSCP field of the packet indicating a first value. The packet may be determined as being associated with a second type of ADU, for example, based on the DSCP field of a packet indicating a second value. One of the one or more fields may be a field indicating a type of video frame or a type of audio frame. The packet may be determined as being associate with a third type of ADU, for example, based on the field indicating a first value. The packet may be determined as being associated with a fourth type of ADU, for example, based on the field indicating a second value. The ADU identification information may be used to determine one or more ADU types associated with one or more packets of a service data flow.

The wireless device may determine that one or more packets (e.g., the first packet, packet 1) are associated with a first ADU type, for example, based on the ADU identification information. The wireless device may determine that one or more packets (e.g., the second packet, packet 2) are associated with a second ADU type, for example, based on the ADU identification information. For example, a first entity (e.g., a PDCP entity, an RLC entity, a MAC entity, an SDAP entity) of the wireless device may perform identification of one or more ADU types associated with the one or more packets. For example, a PDCP/SDAP entity 2504 of the wireless device may perform identification and classification 2506 of one or more ADU types associated with the one or more packets. For example, the first entity may determine that the first packet is associated with the first ADU type. For example, the first entity may determine that the second packet is associated with the second ADU type.

A wireless device may be configured with one or more QoS configurations (e.g., setting parameters for protocol entities) for one or more ADU types of a service data flow, for example, to support ADU-based QoS. The one or more QoS configurations may be one or more parameters (e.g., a timer value, a buffer size, a window size, a quantity of retransmissions, duplication, etc.) for one or more protocol entities (e.g., a PDCP entity, an RLC entity, a MAC entity, an SDAP entity). For example, the first entity (e.g., the PDCP/SDAP entity 2504) may be configured with one or more QoS configurations. The one or more QoS configuration may comprise a first QoS configuration and/or a second QoS configuration. The first QoS configuration may be used for one or more packets associated with the first ADU type. The second QoS configuration may be used for one or more packets associated with the second ADU type. The first QoS configuration may indicate that duplication (e.g., duplicated packet transmission) is used. The second QoS configuration may indicate that duplication (e.g., duplicated packet transmission) is not used.

The first entity (e.g., the PDCP/SDAP entity 2504) may generate one or more first-level protocol data units (e.g., PDCP PDUs, RLC PDUs, SDAP PDUs) using the one or more packets, for example, after identifying one or more ADU types associated with the one or more packets. The first entity may use the first QoS configuration to the first packet, for example, based on the first packet being associated with the first ADU type. The first entity may generate a first first-level protocol data unit (e.g., PDCP PDU 1 2508) using the first packet and/or may duplicate the first first-level protocol data unit, for example, based on the first QoS configuration. For example, the first entity may duplicate the first first-level PDU into a second first-level PDU (e.g., PDCP PDU 2 2510). The duplicated second first-level PDU (e.g., PDCP PDU 1 2508) may contain the same packet (e.g., packet 1) as the first first-level PDU (e.g., PDCP PDU 2 2510). The first entity may generate a third first-level PDU (e.g., PDCP PDU 3 2512) using the second packet and/or may not duplicate the third first-level PDU, for example, based on the second QoS configuration. The first entity may make available (e.g., provide, deliver, send) the generated one or more first-level protocol data units (e.g., PDCP PDU 1 2508, PDCP PDU 2 2510, and/or PDCP PDU 3 2512) to a second entity (e.g., an RLC entity 2514).

The duplicated first-level protocol data unit may comprise an indication that the duplicated first-level protocol data unit is duplicated. For example, the second first-level PDU (e.g., the PDCP PDU 2 2510) may comprise an indication that the second first-level PDU is a duplicate of the first first-level PDU (e.g., the PDCP PDU 1 2508). For example, the third first-level PDU (e.g., the PDCP PDU 3 2512) may not comprise an indication that the third first-level PDU is a duplicate.

The second entity (e.g., the RLC entity 2514) may receive the one or more first-level protocol data units from the first entity (e.g., the PDCP/SDAP entity 2504). The second entity may process the one or more first-level protocol data units and/or may generate one or more second-level protocol data units, for example, using the one or more first-level protocol data units. For example, the RLC entity 2514 may generate RLC PDU 1 2518 using PDCP PDU 1 2508. For example, the RLC entity 2514 may generate RLC PDU 2 2520 using PDCP PDU 2 2510. For example, the RLC entity 2514 may generate RLC PDU 3 2522 using PDCP PDU 3 2512. The second entity may send the one or more second-level protocol data units.

A second entity (e.g., an RLC entity 2516) of a receiver may receive the one or more second-level protocol data units. The second entity of the receiver may reassemble one or more first-level protocol data units (e.g., the PDCP PDU 1 2508, the PDCP PDU 2 2510, and/or the PDCP PDU 3 2512) using the received one or more second-level protocol data units (e.g., the RLC PDU 1 2518, the RLC PDU 2 2520, and/or the RLC PDU 3 2512). The second entity of the receiver may make available (e.g., provide, deliver, send) the one or more first-level protocol data units to a first entity of the receiver (e.g., a PDCP/SDAP 2524).

The first entity (e.g., the PDCP/SDAP 2524) of the receiver may receive the one or more first-level protocol data units. The first entity of the receiver may reassemble one or more packets (e.g., packet 1 and/or packet 2) using the one or more first-level protocol data units. The first entity of the receiver may remove a duplicate first-level protocol data unit (e.g., the PDCP PDU 1 2508 and/or the PDCP PDU 2 2510). The first entity of the receiver (e.g., the PDCP/SDAP 2524) may perform a reordering 2526 of the one or more reassembled packets. The first entity of the receiver may make available (e.g., provide, deliver, send) the one or more packets (e.g., the one or more reordered packets) to an upper layer of the receiver.

Figure 26:
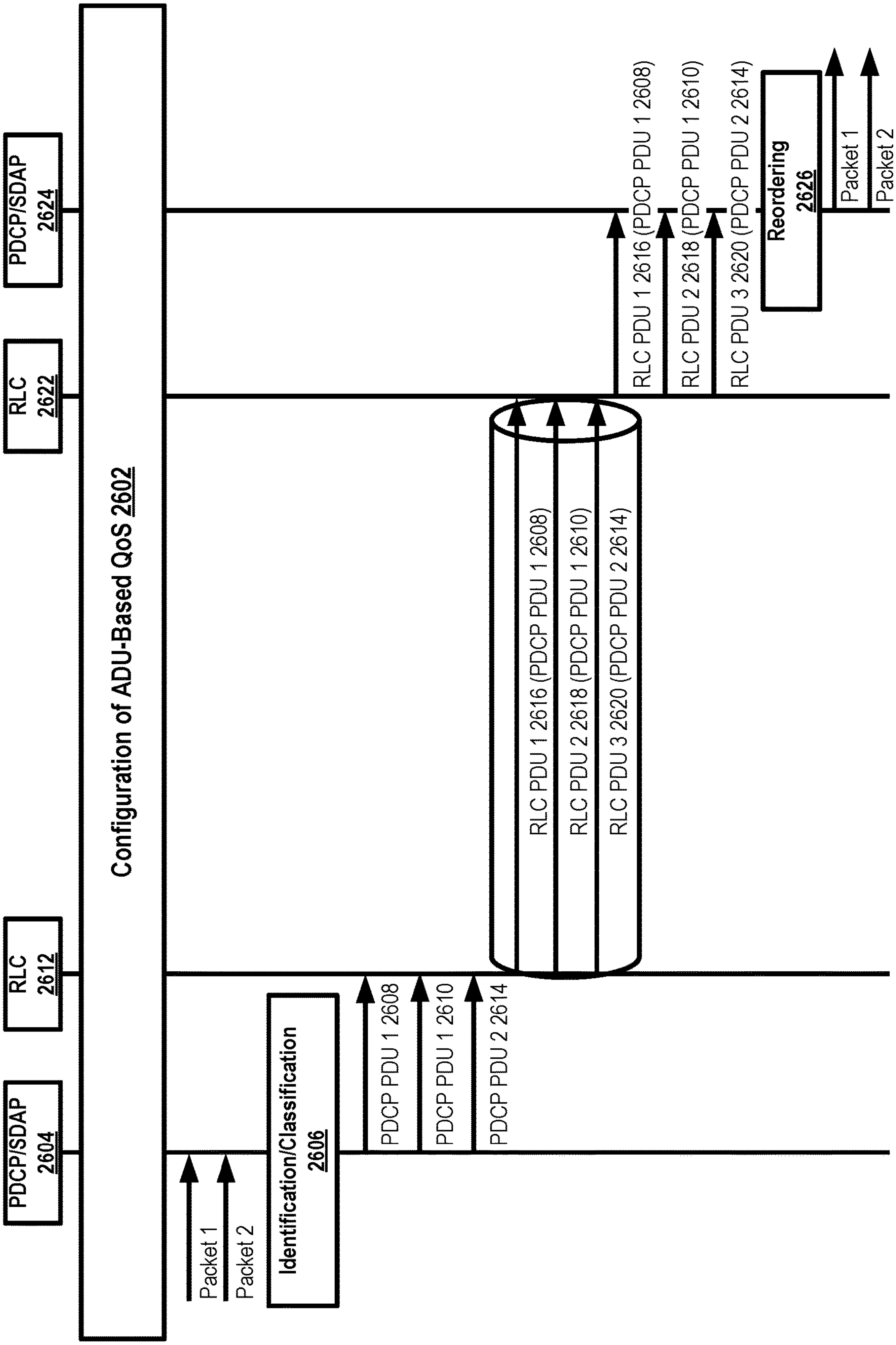
FIG. 26 shows an example of ADU-based quality management for packet communication.

FIG. 26 shows an example of ADU-based quality management for packet communication. FIG. 26 shows PDU duplication for differentiated treatment of packets associated with different ADUs and/or different types of ADUs. For example, a PDU comprising a packet that is associated with an ADU and/or a type of ADU (e.g., a more important ADU and/or ADU type, a higher priority ADU and/or ADU type, an ADU that other ADUs and/or ADU types depend on) may be duplicated. For example, a PDU comprising a packet that is associated with another type of ADU and/or ADU type (e.g., a less important ADU and/or ADU type, a lower priority ADU and/or ADU type, an ADU that other ADUs and/or other ADU types do not depend on) may not be duplicated. Duplicating PDUs comprising packets that are associated with an ADU and/or a type of ADU type (e.g., a more important and/or higher priority ADU and/or ADU type) may, for example, increase a probability of delivering ADUs associated with that ADU and/or that type of ADU and/or achieve one or more additional advantages described herein.

Configuration of ADU-based QoS 2602 may be performed, for example, to configure one or more network nodes to support ADU-based QoS (e.g., to configure one or more network nodes with one or more ADU-based QoS associated configuration parameters as described herein for FIG. 19 and/or FIG. 20). An NG-RAN may configure a wireless device to support ADU-based QoS, for example, based on the ADU-based QoS associated configuration.

A wireless may receive one or more packets from an upper layer. The wireless device may determine one or more ADU types associated with the one or more packets, for example, based on the one or more ADU-based QoS associated configuration parameters. For example, the one or more packets from an upper layer may comprise a first packet (e.g., packet 1) and/or a second packet (e.g., packet 2). The first packet may comprise a first ADU and/or the second packet may comprise a second ADU. An ADU-based QoS associated configuration parameter may comprise ADU identification information. The ADU identification information may indicate how to identify an ADU type associated with a packet. For example, the ADU identification information may indicate that one or more fields in a packet is used to identity a type of an ADU associated with the packet. For example, one of the one or more fields may be a DSCP field. The packet may be determined as being associated with a first type of ADU, for example, based on the DSCP field of a packet indicating a first value. The packet may be determined as being associated with a second type of ADU, for example, based on the DSCP field of a packet indicating a second value. One of the one or more fields may be a field indicating a type of video frame or a type of audio frame. The packet may be determined as being associated with a third type of ADU, for example, based on the field indicating a first value. The packet may be determined as being associated with a fourth type of ADU, for example, based on the field indicating a second value. The ADU identification information may be used to determine one or more ADU types associated with one or more packets of a service data flow.

The wireless device may determine that one or more packets (e.g., the first packet, packet 1) if associated with a first ADU type, for example, based on the ADU identification information. The wireless device may determine that one or more packets (e.g., the second packet, packet 2) are associated with a second ADU type, for example, based on the ADU identification information. For example, a first entity (e.g., a PDCP entity, an RLC entity, a MAC entity, an SDAP entity) of the wireless device may perform identification of one or more ADU types associated with the one or more packets. For example, a PDCP/SDAP entity 2604 of the wireless device may perform identification and classification 2606 of one or more ADU types associated with the one or more packets. For example, the first entity may determine that the first packet is associated with a first ADU type. For example, the first entity may determine that the second packet is associated with a second ADU type.

The wireless device may be configured with one or more protocol settings for one or more ADU types, for example, to support ADU-based QoS. The protocol settings may comprise one or more parameters (e.g., a timer value, a buffer size, a window size, a quantity of retransmissions, duplication, etc.) for one or more protocol entities (e.g., a PDCP entity, an RLC entity, a MAC entity, an SDAP entity). For example, the first entity (e.g., the PDCP/SDAP entity 2604) may be configured with one or more protocol settings comprising a first protocol setting and/or a second protocol setting. The first protocol setting may be used for one or more packets associated with the first ADU type. The second protocol setting may be used for one or more packets associated with the second ADU type. The first protocol setting may indicate that duplication (e.g., duplicated PDU transmission) is used. The second protocol setting may indicate that duplication (e.g., duplicated PDU transmission) is not used.

The first entity (e.g., the PDCP/SDAP entity 2604) may process the one or more packets and/or may generate one or more first-level protocol data units (e.g., PDCP PDUs, RLC PDUs) using the one or more packets, for example, after identifying one or more ADU types associated with the one or more packets. The first entity may generate a first first-level protocol data unit (e.g., PDCP PDU 1 2608) using the first packet. The first entity may use the first protocol setting to the first packet, for example, based on the first packet being associated with the first ADU type. The first entity may duplicate the first first-level protocol data unit (e.g., the PDCP PDU 1 2608) and may generate a duplicate first first-level protocol data unit (e.g., duplicate PDCP PDU 1 2610), for example, based on the first protocol setting. The first entity may make available (e.g., provide, deliver, send) the generated first first-level protocol data unit and/or the duplicated the first first-level protocol data unit to a second entity (e.g., RLC entity 2612). The first entity may generate a second first-level protocol data unit (e.g., PDCP PDU 2 2614) using the second packet. The first entity may use the second protocol setting to the second packet, for example, based on the second packet being associated with the second ADU type. The first entity may not duplicate the second first-level protocol data unit (e.g., PDCP PDU 2 2614), for example, based on the second protocol setting. The first entity may make available (e.g., provide, deliver, send) the generated second first-level protocol data unit to the second entity.

The second entity (e.g., the RLC entity 2612) may receive the one or more first-level protocol data units from the first entity (e.g., the PDCP/SDAP entity 2604). The one or more first-level protocol data units may comprise the first first-level protocol data unit, the duplicate first-level protocol data unit, and/or the second first-level protocol data unit (e.g., the PDCP PDU 1 2608, the duplicate PDCP PDU 1 2610, and/or the PDCP PDU 2 2614). A data unit sent by a first-level protocol entity and received by a second-level protocol entity may be referred to as a protocol data unit (PDU) from the perspective of the first-level protocol entity that sends the data unit and as a service level data unit (SDU) from the perspective of the second-level protocol entity that receives the data unit. For example, a first first-level protocol data unit (e.g., the PDCP PDU 1 2608) sent by a first-level protocol entity (e.g., the PDCP/SDAP 2604) may be a first second-level service data unit (e.g., an RLC SDU 1 (not shown)) that is received at a second-level protocol entity (e.g., the RLC 2612). The duplicated first first-level protocol data unit (e.g., the PDCP PDU 2610) sent by the first-level protocol entity may be a second second-level service data unit (e.g., an RLC SDU 2 (not shown)) that is received at the second-level protocol entity. The second first-level protocol data unit (e.g., the PDCP PDU 2614) sent by the first-level protocol entity may be a third second-level service data unit (e.g., an RLC SDU 3 (not shown)) that is received by the second-level protocol entity.

The second entity (e.g., the RLC entity 2612) may process the one or more second-level service data units and/or may generate one or more second-level protocol data units, for example, using the one or more second-level service data units. For example, the RLC entity 2612 may generate an RLC PDU 1 2616 using PDCP PDU 1 2608. For example, the RLC entity 2612 may generate RLC PDU 2 2618 using PDCP PDU 2 2610. For example, the RLC entity 2612 may generate RCL PDU 3 2620 using PDCP PDU 3 2614. The second entity may send the one or more second-level protocol data units.

A second entity (e.g., an RLC entity 2622) of a receiver may receive the one or more second-level protocol data units. The second entity of the receiver may reassemble one or more second-level service data units using the received one or more second-level protocol data units (e.g., the RLC PDU 1 2616, the RLC PDU 2 2618, and/or the RLC PDU 3 2620). The second entity of the receiver may make available (e.g., provide, deliver, send) the one or more second-level service data units to a first entity (e.g., a PDCP/SDAP 2624) of the receiver.

The first entity (e.g., the PDCP/SDAP 2624) of the receiver may receive the one or more second-level service data units. The one or more second-level service data units may be one or more first-level protocol data units. The first entity of the receiver may reassemble one or more packets (e.g., packet 1 and/or packet 2) using the one or more first-level protocol data units (e.g., the PDCP PDU 1 2608, the PDCP PDU 1 2610, and/or the PDCP PDU 2 2614). The first entity may remove and/or discard one of the first-level protocol data units, for example, based on one or more first-level protocol data units for the same packet (e.g., PDCP PDU 1 2608 and PDCP PDU 2610) existing and/or being received more than once. The first entity of the receiver may remove a duplicate first-level protocol data unit. The first entity of the receiver (e.g., the PDCP/SDAP 2624) may perform a reordering 2626 of the one or more reassembled packets. The first entity of the receiver may make available (e.g., provide, deliver, send) the one or more packets (e.g., the one or more reordered packets) to an upper layer of the receiver.

Figure 27:
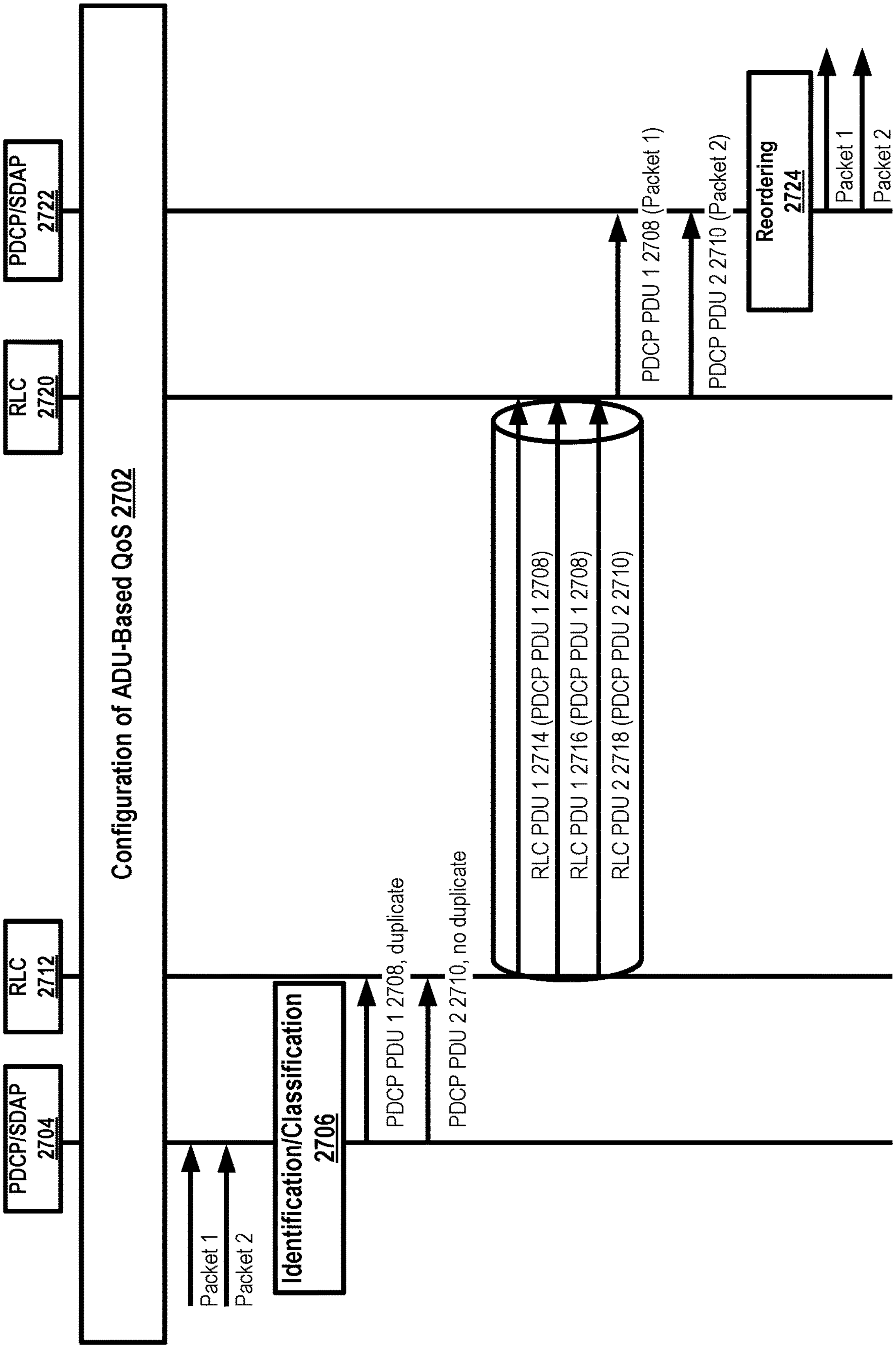
FIG. 27 shows an example of ADU-based quality management for packet communication.

FIG. 27 shows an example of ADU-based quality management for packet communication. FIG. 27 shows PDU duplication for differentiated treatment of packets associated with different types of ADUs. For example, a PDU comprising a packet that is associated with a type of ADU (e.g., a more important ADU, a higher priority ADU, an ADU that other ADUs depend on) may be duplicated. For example, a PDU comprising a packet that is associated with another type of ADU (e.g., a less important ADU, a lower priority ADU, an ADU that other ADUs do no depend on) may not be duplicated. Duplicating PDUs comprising packets that are associated with an ADU and/or a type of ADU (e.g., a more important and/or higher priority ADU and/or ADU type) may, for example, increase a probability of delivering ADUs associated with that ADU and/or that type of ADU and/or achieve one or more additional advantages described herein. An ADU-based QoS associated configuration parameter may indicate whether or not to duplicate a PDU.

Configuration of ADU-based QoS 2702 may be performed, for example, to configure one or more network nodes to support ADU-based QoS (e.g., to configure one or more network nodes with one or more ADU-based QoS associated configuration parameters as described herein for FIG. 19 and/or FIG. 20). An NG-RAN may configure a wireless device to support ADU-based QoS, for example, based on the one or more ADU-based QoS associated configuration parameters.

A wireless device may receive one or more packets from an upper layer. The wireless device may determine one or more ADU types associated with the one or more packets, for example, based on one or more ADU-based QoS associated configuration parameters. For example, the one or more packets from an upper layer may comprise a first packet (e.g., packet 1) and/or a second packet (e.g., packet 2). The first packet may comprise a first ADU and/or the second packet may comprise a second ADU. An ADU-based QoS associated configuration parameter may comprise ADU identification information. The ADU identification information may indicate how to identify an ADU type associated with a packet. For example, the ADU identification information may indicate that one or more fields in a packet is used to identity a type of an ADU associated with the packet. For example, one of the one or more fields may be a DSCP field. The packet may be determined as being associated with a first type ADU, for example, based on the DSCP field of a packet indicating a first value. The packet may be determined as being associated with a second type ADU, for example, based on the DSCP field of a packet indicating a second value. One of the one or more fields may be a field indicating a type of video frame or a type of audio frame. The packet may be determined as being associated with a third type of ADU, for example, based on the field indicating a first value. The packet may be determined as being associated with a fourth type of ADU, for example, based on the field indicating a second value. The ADU information may be used to determine one or more ADU types associated with one or more packets of a service data flow.

The wireless device may determine that one or more packets (e.g., the first packet, packet 1) are associated with a first ADU type, for example, based on the ADU identification information. The wireless device may determine that one or more packets (e.g., the second packet, packet 2) are associated with a second ADU type, for example, based on the ADU identification information. For example, a first entity (e.g., a PDCP entity, an RLC entity, a MAC entity, an SDAP entity) of the wireless device may perform identification of one or more ADU types associated with the one or more packets. For example, a PDCP/SDAP entity 2704 of the wireless device may perform identification and classification 2706 of one or more ADU types associated with the one or more packets. For example, the first entity may determine that the first packet is associated with a first ADU type. For example, the first entity may determine that the second packet is associated with a second ADU type.

The wireless device may be configured with one or more protocol settings for one or more ADU types, for example, to support ADU-based QoS. The protocol settings may comprise one or more parameters (e.g., a timer value, a buffer size, a window size, a quantity of retransmissions, duplication, etc.) for one or more protocol entities (e.g., a PDCP entity, an RLC entity, a MAC entity, an SDAP entity). For example, the first entity (e.g., the PDCP/SDAP entity 2704) may be configured with one or more protocol settings comprising a first protocol setting and/or a second protocol setting. The first protocol setting may be used for one or more packets associated with the first ADU type. The second protocol setting may be used for one or more packets associated with the second ADU type. The first protocol setting may indicate that duplication (e.g., duplicated PDU transmission) is used. The second protocol setting may indicate that duplication (e.g., duplicated PDU transmission) is not used.

The first entity (e.g., the PDCP/SDAP entity 2704) may process the one or more packets and/or may generate one or more first-level protocol data units (e.g., PDCP PDUs) using the one or more packets, for example, after identifying the one or more ADU types associated with the one or more packets. The first entity may generate a first first-level protocol data unit (e.g., PDCP PDU 1 2708) using the first packet (e.g., packet 1). The first entity may generate a second first-level protocol data unit (e.g., PDCP PDU 2 2710) using the second packet (e.g., packet 2).

The first entity may make available (e.g., provide, deliver, send), to a second entity (e.g., an RLC entity 2712), the first first-level protocol data unit (e.g., the PDCP PDU 1 2708) with information associated with the ADU-type, for example, based on the first packet being associated with the first ADU type. For example, the information associated with the ADU type may comprise information indicating or associated with the protocol setting associated with the ADU type. For example, the information associated with the ADU type may indicate that duplicated transmission is desired/preferred/required. For example, the information associated with the ADU type may indicate that the first first-level protocol data unit is of higher importance, is associated with a higher priority, and/or has a relationship (e.g., a dependency relationship) with one or more other first-level protocol data units.

The first entity may make available (e.g., provide, deliver, send), to the second entity (e.g., the RLC entity 2712), the second first-level protocol data unit (e.g., the PDCP PDU 2 2710) with information associated with the ADU-type, for example, based on the second packet being associated with the second ADU type. For example, the information associated with the ADU type may comprise information indicating or associated with the protocol setting associated with the ADU type. For example, the information associated with the ADU type may indicate that duplicated transmission is not desired/preferred/required. For example, the information associated with the ADU type may indicate that the second first-level protocol data unit is of lower importance, is associated with a lower priority, and/or does not have a relationship (e.g., a dependency relationship) with other first-level protocol data units.

The second entity (e.g., the RLC entity 2712) may receive one or more first-level protocol data units from the first entity (e.g., the PDCP/SDAP entity 2704). The second entity may receive information associated with one or more ADU types. For example, the second entity may receive the first first-level protocol data unit (e.g., PDCP PDU 1 2708) as a first second-level service data unit. The second entity may receive the first second-level service data unit with information associated with the ADU type (e.g., the first protocol setting indicating "duplicate"). For example, the second entity may receive the second first-level protocol data unit (e.g., PDCP PDU 2 2710) as a second second-level service data unit. The second entity may receive the second second-level service data unit with information associated with the ADU type (e.g., the second protocol setting indicating "no duplicate"). The first protocol setting may indicate one or more parameters that the second entity may use to process the first second-level service data unit. For example, the first protocol setting may indicate that the second entity may perform duplicated transmission for the first second-level service data unit and/or a second-level protocol data unit (e.g., an RLC PDU 1 2714 and/or RLC PDU 1 2716) associated with the first second-level service data unit. For example, the first protocol setting may indicate that the second entity may use a first timer and/or a first quantity of retransmissions for the first second-level service data unit and/or a second-level protocol data unit associated with the first second-level service data unit. The second protocol setting may indicate one or more parameters that the second entity may use to process the second second-level service data unit. For example, the second protocol setting may indicate that the second entity may not perform duplicated transmission for the second second-level service data unit and/or a second-level protocol data unit (e.g., an RLC PDU 2 2718) associated with the second second-level service data unit. For example, the second protocol setting may indicate that the second entity may use a second timer and/or a second quantity of retransmissions for the second second-level service data unit and/or a second-level protocol data unit associated with the second second-level service data unit. The second entity may send the one or more second-level protocol data units. The second entity may perform re-transmission of the first second-level service data unit as soon as it performs the first transmission of the first second-level service data unit, for example, based on the first protocol setting. The second entity may perform duplicated transmission of the first second-level service data unit using different logical channels and/or different MAC entities and/or different frequencies and/or different cells, for example, based on the first protocol setting.

A second entity (e.g., an RLC entity 2720) of the receiver may receive the one or more second-level protocol data units. The second entity of the receiver may reassemble one or more second-level service data units using the received one or more second-level protocol data units (e.g., the RLC PDU 1 2714, the RLC PDU 1 2716, and/or the RLC PDU 2 2718). The second entity of the receiver may make available (e.g., provide, deliver, send) the one or more second-level service data units to a first entity (e.g., a PDCP/SDAP entity 2722) of the receiver.

The first entity (e.g., the PDCP/SDAP 2722) of the receiver may receive the one or more second-level service data units. The one or more second-level service data units may be one or more first-level protocol data units. The first entity of the receiver may reassemble one or more packets (e.g., packet 1 and/or packet 2) using the one or more first-level protocol data units (e.g., PDCP PDU 1 2708 and/or PDCP PDU 2 2710). The second entity may remove and/or discard one of the first-level protocol data units, for example, based on one or more first-level protocol data units for the same packet (e.g., PDCP PDU 1 2708) existing. The second entity of the receiver may remove a duplicate first-level protocol data unit (e.g., second-level service data unit). The first entity of the receiver (e.g., the PDCP/SDAP 2722) may perform a reordering 2724 of the one or more reassembled packets. The first entity of the receiver may make available (e.g., provide, deliver, send) the one or more packets (e.g., the one or more reordered packets) to an upper layer of the receiver.

Figure 28:
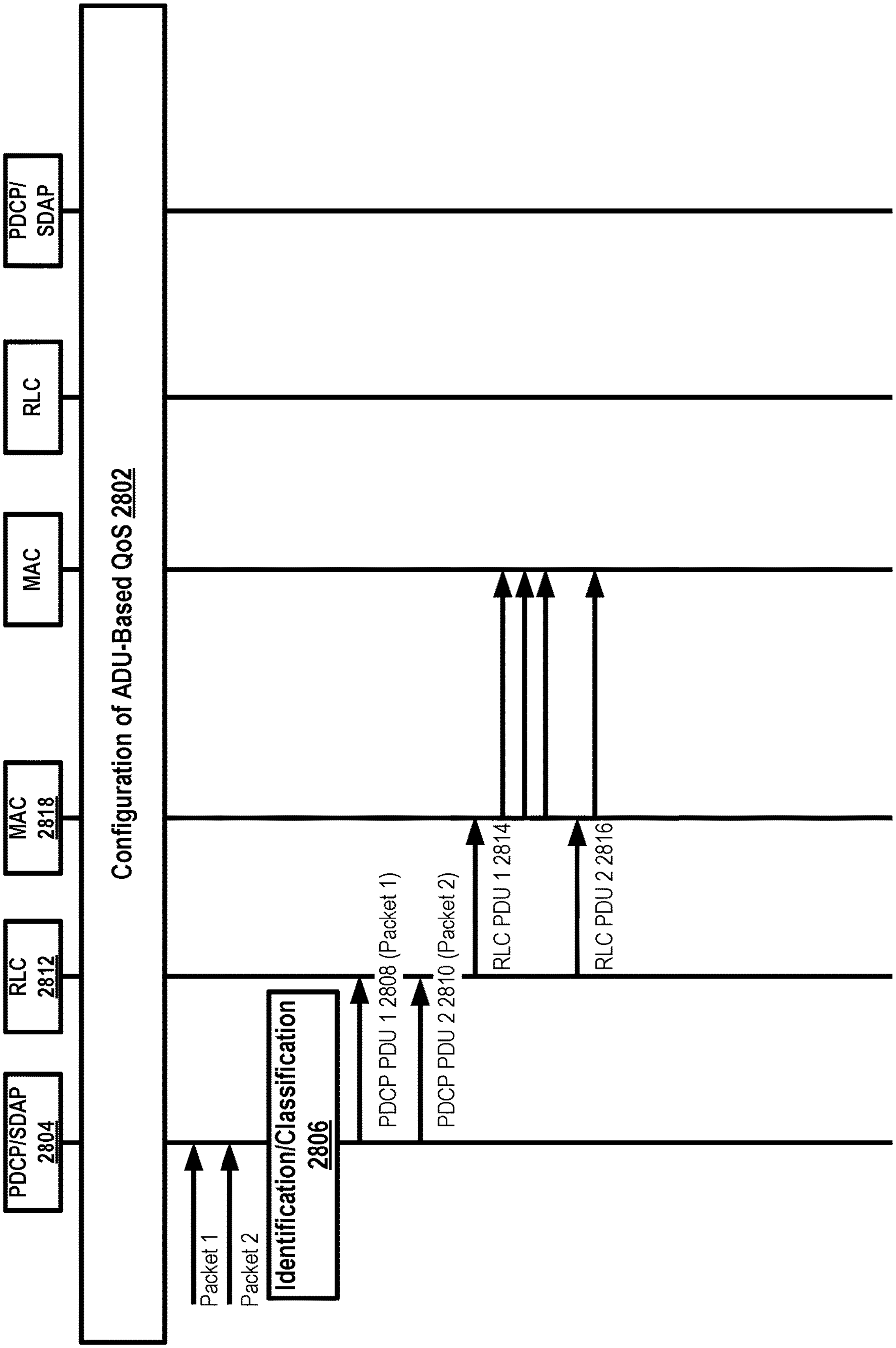
FIG. 28 shows an example of ADU-based quality management for packet communication.

FIG. 28 shows an example of ADU-based quality management for packet communication. FIG. 28 shows transmission duplication for differentiated treatment of packets associated with different types of ADUs. For example, a transmission associated with a packet that is associated with a type of ADU (e.g., a more important ADU, a higher priority ADU, an ADU that other ADUs depend on) may be duplicated. For example, a transmission associated with a packet that is associated with another type of ADU (e.g., a less important ADU, a lower priority ADU, an ADU that other ADUs do not depend on) may not be duplicated. Duplicating transmissions of packets that are associated with an ADU and/or a type of ADU (e.g., a more important and/or higher priority ADU and/or ADU type) may, for example, increase a probability of delivering ADUs associated with that ADU and/or type of ADU and/or achieve one or more additional advantages described herein. ADU information may indicate whether or not to duplicate a transmission of a packet.

Configuration of ADU-based QoS 2802 may be performed, for example, to configure one or more network nodes to support ADU-based QoS (e.g., to configure one or more network nodes with one or more ADU-based QoS associated configuration parameters as described herein for FIG. 19 and/or FIG. 20). An NG-RAN may configure a wireless device to support ADU-based QoS, for example, based on the one or more ADU-based QoS associated configuration parameters.

A wireless device may receive one or more packets from an upper layer, the wireless device may determine one or more ADU types associated with the one or more packets, for example, based on one or more ADU-based QoS associated configuration parameters. For example, the one or more packets from an upper layer may comprise a first packet (e.g., packet 1) and/or a second packet (e.g., packet 2). The first packet may comprise a first ADU and/or the second packet may comprise a second ADU. An ADU-based QoS associated configuration parameter may comprise ADU identification information. The ADU identification information may indicate how to identify an ADU type associated with a packet. For example, the ADU identification information may indicate that one or more fields in a packet is used to identity a type of an ADU associated with the packet. For example, one of the one or more fields may be a DSCP field. The packet may be determined as being associated with a first type ADU, for example, based on the DSCP field of a packet indicating a first value. The packet may be determined as being associated with a second type ADU, for example, based on the DSCP field of a packet indicating a second value. One of the one or more fields may be a field indicating a type of video frame or a type of audio frame. The packet may be determined as being associated with a third type of ADU, for example, based on the field indicating a first value. The packet may be determined as being associated with a fourth type of ADU, for example, based on the field indicating a second value. The ADU information may be used to determine one or more ADU types associated with one or more packets of a service data flow.

The wireless device may determine that one or more packets (e.g., the first packet, packet 1) are associated with a first ADU type, for example, based on the ADU identification information. The wireless device may determine that one or more packets (e.g., the second packet, packet 2) are associated with a second ADU type, for example, based on the ADU identification information. For example, a first entity (e.g., a PDCP entity, an RLC entity, a MAC entity, an SDAP entity) of the wireless device may perform identification of one or more ADU types associated with the one or more packets. For example, a PDCP/SDAP entity 2804 of the wireless device may perform identification and classification 2806 of one or more ADU types associated with the one or more packets. For example, the first entity may determine that the first packet is associated with a first ADU type. For example, the first entity may determine that the second packet is associated with a second ADU type.

The wireless device may be configured with one or more protocol settings for one or more ADU types, for example, to support ADU-based QoS. The protocol settings may comprise one or more parameters (e.g., a timer value, a buffer size, a window size, a quantity of retransmissions, duplication, etc.) for one or more protocol entities (e.g., a PDCP, an RLC entity, a MAC entity, an SDAP entity). For example, the first entity (e.g., the PDCP/SDAP entity 2804) may be configured with one or more protocol settings comprising a first protocol setting and/or a second protocol setting. The first protocol setting may be used for one or more packets associated with the first ADU type. The second protocol setting may be used for one or more packets associated with the second ADU type. The first protocol setting may indicate that duplication (e.g., duplicated transmissions) is used. The second protocol setting may indicate that duplication (e.g., duplicated transmissions) is not used.

The first entity (e.g., the PDCP/SDAP entity 2804) may process the one or more packets and/or may generate one or more first-level protocol data units (e.g., PDCP PDUs) using the one or more packets, for example, after identifying the one or more ADU types associated with the one or more packets. The first entity may generate a first first-level protocol data unit (e.g., PDCP PDU 1 2808) using the first packet (e.g., packet 1). The first entity may generate a second first-level protocol data unit (e.g., PDCP PDU 2 2810) using the second packet (e.g., packet 2).

The first entity may make available (e.g., provide, deliver, send), to a second entity (e.g., an RLC entity 2812), the first first-level protocol data unit (e.g., the PDCP PDU 1 2808) with information associated with the ADU-type, for example, based on the first packet being associated with the first ADU type. For example, the information associated with the ADU type may comprise information indicating or associated with the protocol setting associated with the ADU type. For example, the information associated with the ADU type may indicate that duplicated transmission is desired/preferred/required. For example, the information associated with the ADU type may indicate that the first first-level protocol data unit is of higher importance, is associated with a higher priority, and/or has a relationship (e.g., a dependency relationship) with one or more other first-level protocol data units.

Identification of an ADU-type associated with a packet may be performed in a fourth entity (e.g., an SDAP). The fourth entity may identify an ADU type associated with the packet, for example, based on the fourth entity receiving a packet from an application layer for a service data flow. The fourth entity may generate a fourth-level protocol data unit based on the packet. The fourth entity may make available (e.g., provide, deliver, send) the fourth-level protocol data unit to a first entity with the information indicating the ADU type of an ADU associated with the packet. The first entity may use the ADU type information.

The first entity may make available (e.g., provide, deliver, send), to the second entity (e.g., the RLC entity 2812), the second first-level protocol data unit (e.g., the PDCP PDU 2 2810) with information associated with the ADU-type, for example, based on the second packet being associated with the second ADU type. For example, the information associated with the ADU type may comprise information indicating or associated with the protocol setting associated with the ADU type. For example, the information associated with the ADU type may indicate that duplicated transmission is not desired/preferred/required. For example, the information associated with the ADU type may indicate that the second first-level protocol data unit is of lower importance, is associated with a lower priority, and/or does not have a relationship (e.g., a dependency relationship) with other first-level protocol data units.

The second entity (e.g., the RLC entity 2812) may receive one or more first-level protocol data units from the first entity (e.g., the PDCP/SDAP entity 2804). The second entity may receive information associated with one or more ADU types. For example, the second entity may receive the first first-level protocol data unit (e.g., PDCP PDU 1 2808) as a first second-level service data unit. The second entity may receive the first second-level service data unit with information associated with the ADU type (e.g., the first protocol setting). For example, the second entity may receive the second first-level protocol data unit (e.g., PDCP PDU 2 2810) as a second second-level service data unit. The second entity may receive the second second-level service data unit with information associated with the ADU type (e.g., the second protocol setting).

The second entity (e.g., the RLC entity 2812) may generate one or more second-level protocol data units using the one or more second-level service data units. For example, the second entity may generate a first second-level protocol data unit (e.g., RLC PDU 1 2814) using the first second-level service data unit (e.g., PDCP PDU 1 2808). For example, the second entity may generate a second second-level protocol data unit (e.g., RLC PDU 2 2816), using the second second-level service data unit (e.g., PDCP PDU 2 2810). The second entity may make available (e.g., provide, deliver, send) the one or more second-level protocol data units (e.g., RLC PDU 1 2814 and/or RLC PDU 2 2816) to a third entity (e.g., a MAC entity 2818). The second entity may provide information associated with the one or more ADU types that are associated with the one or more second-level protocol data units to the third entity.

The third entity (e.g., the MAC entity 2818) may receive, from the second entity, the one or more information associated with the one or more ADU types that are associated with the one or more second-level protocol data units (e.g., RLC PDU 1 2814 and/or RLC PDU 2 2816). The one or more second-level protocol data units may be received as one or more third-level service data units. The third entity may process the one or more second-level protocol data units, for example, based on the information associated with the one or more ADU types. The third entity may determine a quantity of retransmissions (HARQ retransmissions) and/or transmission power and/or multiplexing of channels, etc., for example, based on the information associated with the one or more ADU types. The third entity may use a higher quantity of retransmissions and/or higher transmission power and/or no multiplexing with other channels and so on, for example, for one or more third-level service data units that are associated with the first ADU type. The third entity may use a lower quantity of retransmissions and/or lower transmission power and/or potential multiplexing with other channels and so on, for one or more third-level service data units that are associated with the second ADU type. The third entity may perform more HARQ retransmissions, for example, for the first second-level protocol data unit (e.g., the RLC PDU 1 2814). The third entity may perform fewer HARQ retransmissions, for example, for the second second-level protocol data unit (e.g., RLC PDU 2 2816).

The third entity (e.g., the MAC entity 2818) may be configured to use one or more radio resources, based on one or more ADU-types associated with one or more second-level protocol data units. The sender may be configured to use a first configured grant and/or a first network slice and/or a first random access resource and/or a first dynamic grant and/or a first frequency and/or a first cell, for example, for one or more third-level service data units that are associated with the first ADU type. The sender may be configured to use a second configured grant and/or a second network slice and/or a second random access resource and/or second dynamic grant and/or a second frequency and/or a second cell, for example, for one or more third-level service data units that are associated with the second ADU type. The third entity may perform transmission based on the configuration for the one or more ADU types associated with the one or more third-level service data units, for example, for the received one or more third-level service data units.

Figure 29:
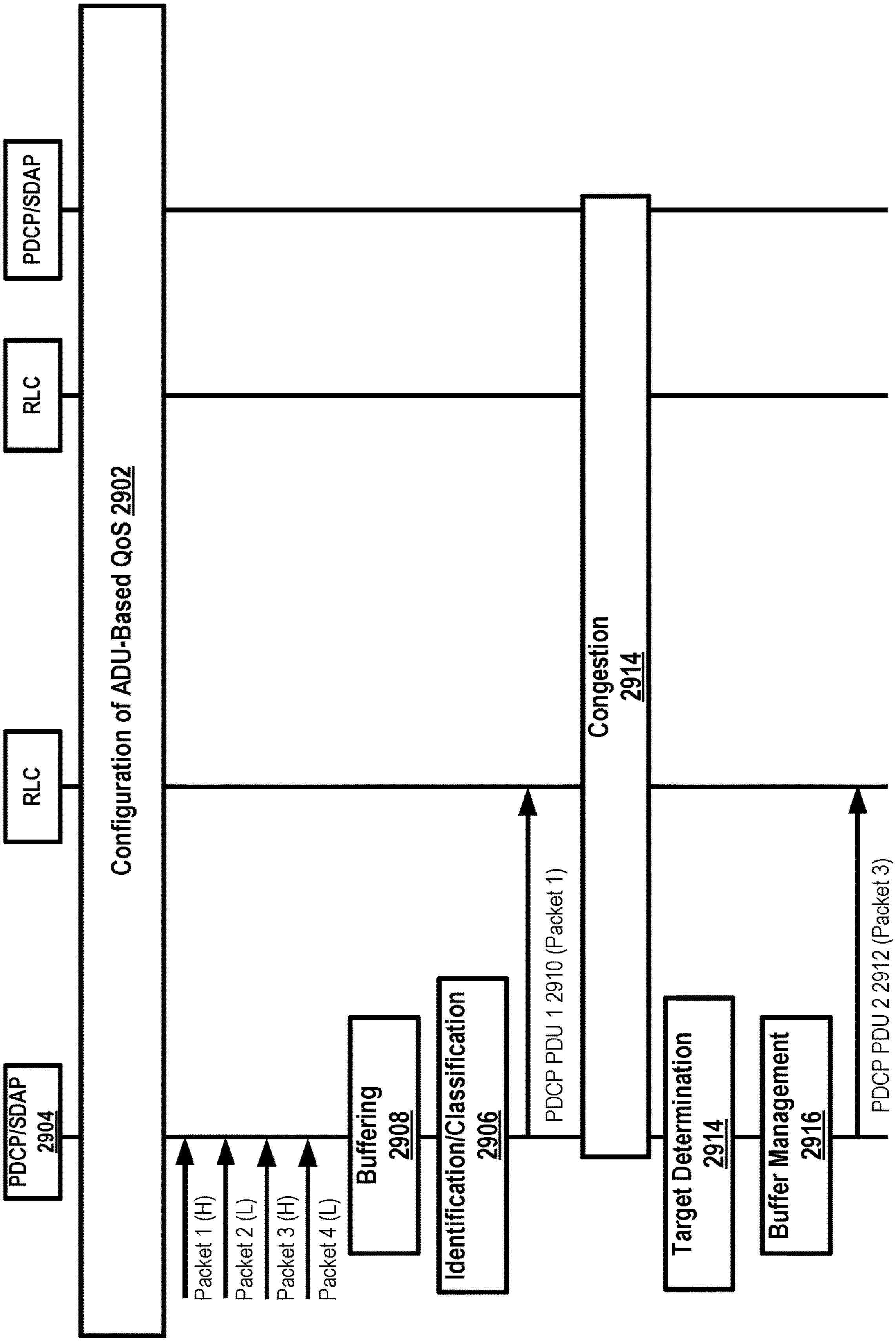
FIG. 29 shows an example of ADU-based quality management for packet communication.

FIG. 29 shows an example of ADU-based quality management for packet communication. FIG. 29 shows differentiated treatment of packets sent by a wireless device via one or more congested radio resources. For example, a packet that is associated with an ADU and/or a type of ADU (e.g., a less important ADU and/or ADU type, a lower priority ADU and/or ADU type, an ADU and/or ADU type that other ADUs and/or ADU types do not depend on) may be removed/discarded/dropped/ignored based on a radio resource being congested. For example a packet that is associated with another ADU and/or type of ADU (e.g., a more important ADU and/or ADU type, a higher priority ADU and/or ADU type, an ADU and/or ADU type that other ADUs and/or ADU types depend on) may not be removed/discarded/dropped/ignored based on a radio resource being congested. Dropping one or more packets associated with an ADU and/or a type of ADU and/or not dropping packets associated with another ADU and/or type of ADU may, for example, increase a probability of delivering the latter ADU and/or the latter type of ADU via one or more congested radio resources and/or achieve one or more additional advantages described herein.

Configuration of ADU-based QoS 2902 may be performed, for example, to configure one or more network nodes to support ADU-based QoS (e.g., to configure one or more network nodes with one or more ADU-based QoS associated configuration parameters as described herein for FIG. 19 and/or FIG. 20). An NG-RAN may configure a wireless device to support ADU-based QoS, for example, based on the one or more ADU-based QoS associated configuration parameters.

A wireless device may receive one or more packets from an upper layer. The wireless device may determine one or more ADU types associated with the one or more packets, for example, based on the one or more ADU-based QoS associated configuration parameters. For example, the one or more packets from an upper layer may comprise a first packet (e.g., packet 1) and/or a second packet (e.g., packet 2) and/or a third packet (e.g., packet 3) and/or a fourth packet (e.g., packet 4). The one or more packets may be associated with a service data flow. The first packet may comprise at least a portion of a first ADU and/or the second packet may comprise at least a portion of a second ADU. The third packet may comprise at least a portion of a third ADU and/or the fourth packet may comprise at least a portion of a fourth ADU. An ADU-based QoS associated configuration parameter may comprise ADU identification information. The ADU identification information may indicate how to identify an ADU type associated with a packet. The ADU identification information may be used to determine one or more ADU types associated with one or more packets of a service data flow.

The wireless device may determine that one or more packets (e.g., packet 1 and/or packet 3) are associated with a first ADU type, for example, based on the ADU identification information. The wireless device may determine that one or more packets (e.g., packet 2 and/or packet 4) are associated with a second ADU type, for example, based on the ADU identification information. For example, a first entity (e.g., a PDCP, an RLC entity, a MAC entity, an SDAP entity) of the wireless may perform identification of one or more ADU types associated with the one or more packets. For example, a PDCP/SDAP entity 2904 of the wireless device may perform identification and classification 2906 of one or more ADU types associated with the one or more packets. For example, the first entity may determine that the first packet and/or the third packet are associated with the first ADU type. For example, the first entity may determine that the second packet and/or the fourth packet are associated with the second ADU type. The first entity may determine that the first packet and the third packet are associated with the first ADU type, for example, based on ADU information indication a high priority (e.g., "H"). The first entity may determine that the second packet and the fourth packet are associated with the second ADU type, for example, based on ADU information indicating a low priority (e.g., "L").

The wireless device may be configured with one or more protocol settings for one or more ADU types, for example, to support ADU-based QoS. The protocol settings may comprise one or more parameters (e.g., a timer value, a buffer size, a window size, a quantity of retransmissions, duplication, a priority, etc.) for one or more protocol entities (e.g., a PDCP, an RLC entity, a MAC entity, an SDAP entity). For example, the first entity (e.g., the PDCP/SDAP entity 2904) may be configured with one or more protocol settings comprising a first protocol setting and/or a second protocol setting. The first protocol setting may be used for one or more packets associated with the first ADU type. The second protocol setting may be used for one or more packets associated with the second ADU type. The first protocol setting may indicate that the one of more packets associated with the first ADU type may not be removed/discarded/dropped/ignored and/or may be prioritized. The second protocol setting may indicate that the one of more packets associated with the second ADU type may be removed/discarded/dropped/ignored and/or may not be prioritized.

The first entity (e.g., the PDCP/SDAP entity 2904) may process the first packet and/or may generate one or more first-level protocol data units (e.g., PDCP PDU 1 2910) for the first packet. The first entity may send the one or more first-level protocol data units. One or more packets (e.g., the second packet, the third packet, and/or the fourth packet) may be buffered 2908 in the memory of the first entity, for example, based on a radio resource being congested. One or more timers for the packets may expire, for example, based on congestion 2914 of one or more radio resources. For example, a first timer may be started when the first packet arrives. For example, a second timer may be started when the second packet arrives. A timer may be stopped when its associated packet is successfully sent. The first entity may determine to remove/discard/drop/ignore one or more packets associated with the one or more expired timers, for example, to address congestion of one or more radio resources. The first entity may determine to remove/discard/drop/ignore one or more packets associated with the second ADU type, for example, based on the second protocol settings. The first entity may determine not to remove/discard/drop/ignore one or more packets associated with the first ADU type, for example, based on the first protocol settings. The first entity may remove/discard/drop/ignore the second packet and/or the fourth packet. For example, the first entity may remove/discard/drop/ignore one or more first-level protocol data units associated second packet and/or the fourth packet. Target determination 2914 may be performed. Target determination 2914 may comprise determining which targets (e.g., PDU(s), packets(s)) to remove/discard/drop/ignore. For example, target determination 2914 may comprise identifying one or more candidates (e.g., one or more candidate PDUs, one or more packets) to remove/discard/drop/ignore. Buffer management 2916 may be performed, for example, to address (e.g., reduce, resolve) the congestion 2916. Buffer management 2916 may be performed, for example, based on a buffer (e.g., the memory) being full and/or the storage available at the buffer meeting a threshold. Buffer management may include at least one of removing/discarding/deleting data (e.g., removing/discarding/deleting one or more packets from the buffer) and/or sending higher priority before lower priority packets, for example, based on an ADU-based QoS configuration as described herein. The first entity may process the third packet (e.g., packet 3) and/or generate one or more first-level protocol data units for the third packet (e.g., PDCP PDU 2 2912). The first entity may send the one or more first-level protocol data units for the third packet.

Figure 30:
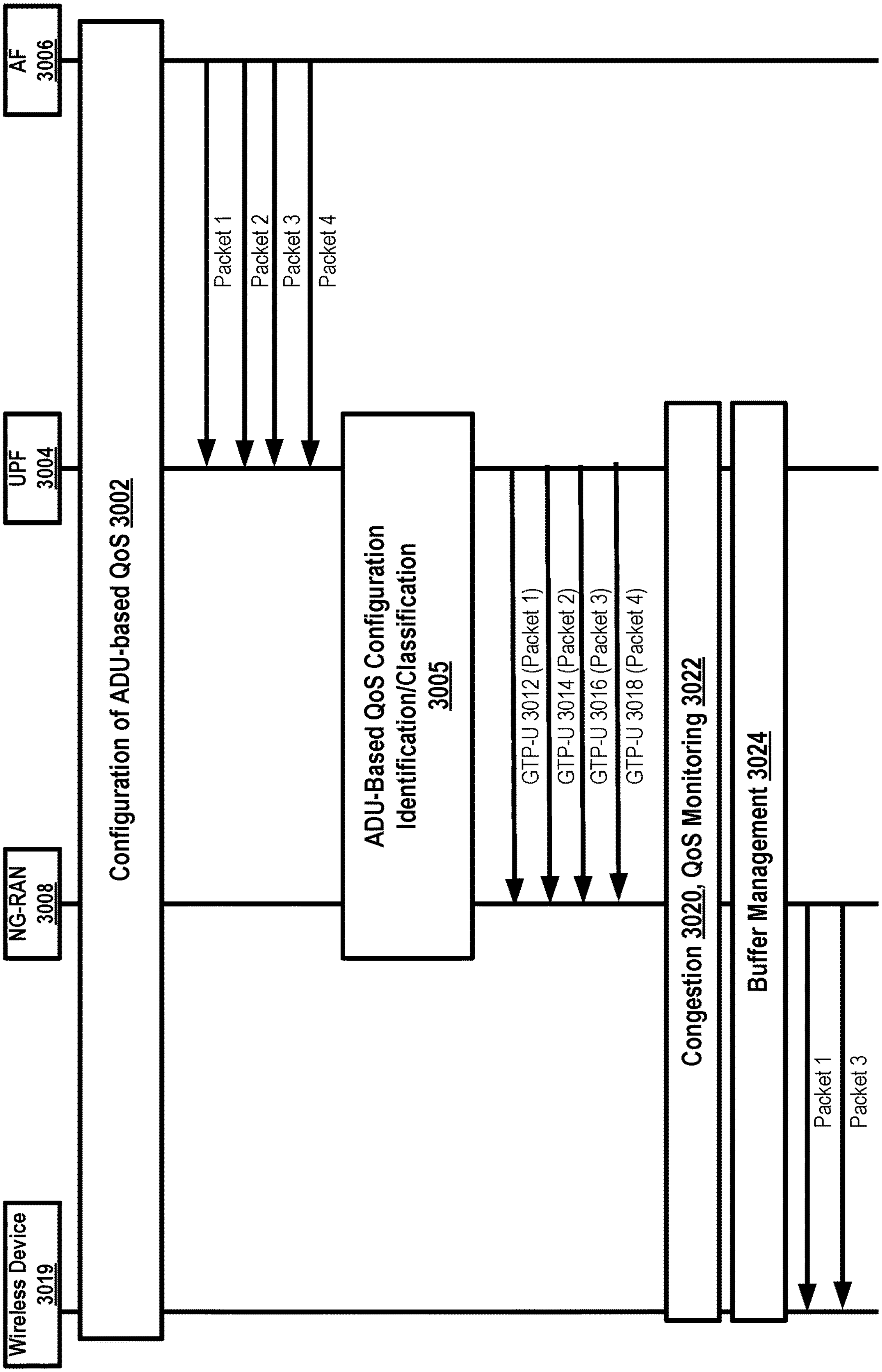
FIG. 30 shows an example of ADU-based quality management for packet communication.

FIG. 30 shows an example of ADU-based quality management for packet communication. FIG. 30 shows differentiated treatment of packets sent by a network node via one or more congested radio resources. For example, a packet that is associated with a type of ADU (e.g., a less important ADU, a lower priority ADU, an ADU that other ADUs do not depend on) may be removed/discarded/dropped/ignored based on a radio resource being congested. For example a packet that is associated with another type of ADU (e.g., a more important ADU, a higher priority ADU, an ADU that other ADUs depend on) may not be removed/discarded/dropped/ignored based on a radio resource being congested. Dropping one or more packets associated with an ADU and/or a type of ADU (e.g., a less important ADU and/or ADU type) and/or not dropping one or more packets associated with another ADU and/or type) of ADU (e.g., a more important ADU and/or ADU type) may, for example, increase a probability of delivering the latter type of ADUs via one or more congested radio resources and/or achieve one or more additional advantages described herein.

Configuration of ADU-based QoS 3002 may be performed, for example, to configure one or more network nodes (e.g., a UPF, an NG-RAN) to support ADU-based QoS (e.g., to configure one or more network nodes with one or more ADU-based QoS associated configuration parameters as described herein for FIG. 19 and/or FIG. 20).

A first network node (e.g., a UPF 3004) may receive one or more packets from an AF 3006. The first network node may determine one or more ADU types associated with the one or more packets, for example, based on the one or more ADU-based QoS associated configuration parameters. For example, the one or more packets from the AF may comprise a first packet (e.g., packet 1) and/or a second packet (e.g., packet 2) and/or a third packet (e.g., packet 3) and/or a fourth packet (e.g., packet 4). The one or more packets may be associated with a service data flow. The first packet may comprise a first ADU and/or the second packet may comprise a second ADU. The third packet may comprise a third ADU and/or the fourth packet may comprise a fourth ADU. An ADU-based QoS associated configuration parameter may comprise ADU identification information. The ADU identification information may indicate how to identify an ADU type associated with a packet. The ADU identification information may be used to determine one or more ADU types (e.g., more important, less important) associated with one or more packets of a service data flow.

The first network node (e.g., the UPF 3004) may determine that one or more packets are associated with a first ADU type, for example, based on the ADU identification information. For example, the first network node may perform ADU-based QoS identification and classification 3005 of one or more ADUs and/or ADU types associated with the one or more packets, for example, based on an ADU-based QoS Configuration. The first network node may determine that one or more packets are associated with a second ADU type, for example, based on the ADU identification information. For example, the first network node may determine that the first packet and/or the third packet are associated with the first ADU type (e.g., the first packet and/or the third are more important). For example, the first network node may determine that the second packet and/or the fourth packet are associated with the second ADU type (e.g., the second packet and/or the fourth packet are less important).

The first network node may send one or more GTP-U packets to a second network node (e.g., an NG-RAN 3008). The one or more GTP-U packets may comprise the one or more packets and/or one or more ADU information associated with the one or more packets. For example, a first GTP-U packet 3010 may comprise the first packet (e.g., packet 1). For example, a second GTP-U packet 3012 may comprise the second packet (e.g., packet 2). For example, a third GTP-U packet 3014 may comprise the third packet (e.g., packet 3). For example, a fourth GTP-U packet 3016 may comprise the fourth packet (e.g., packet 4). The respective ADU information associated with the one or more GTP-U packets may indicate one or more ADUs and/or one or more ADU types associated with the one or more packets. For example, a first GTP-U packet may comprise first ADU information that indicates a first ADU and/or a first ADU type associated with a first packet. For example, a second GTP-U packet may comprise second ADU information that indicates a second ADU and/or a second ADU type associated with a second packet.

The second network node (e.g., the NG-RAN 3008) may be configured with one or more protocol settings for one or more ADU types, for example, to support ADU-based QoS. The protocol settings may comprise one or more parameters (e.g., a timer value, a buffer size, a window size, a quantity of retransmissions, duplication, a priority, etc.) for one or more protocol entities (e.g., a PDCP, a RLC entity, a MAC entity, a SDAP entity, a network node). For example, the second network node (e.g., the NG-RAN 3008) may be configured with one or more protocol settings comprising the first protocol setting and/or the second protocol setting. The first protocol setting may be used for one or more packets associated with the first ADU type. The second protocol setting may be used for one or more packets associated with the second ADU type. The first protocol setting may indicate that the one of more packets associated with the first ADU type (e.g., more important) may not be removed/discarded/dropped/ignored and/or may be prioritized. The second protocol setting may indicate that the one of more packets associated with the second ADU type (e.g., less important) may be removed/discarded/dropped/ignored and/or may not be prioritized.

The one or more packets may be buffered in the memory of the second network node (e.g., the NG-RAN 3008). The second network node may determine to remove/discard/drop/ignore one or more packets, for example, to address (e.g., reduce, resolve) congestion of one or more radio resources. The second network node may determine to remove/discard/drop/ignore one or more packets associated with the second ADU type, for example, based on the second protocol settings. The second network node may determine not to remove/discard/drop/ignore one or more packets associated with the first ADU type, for example, based on the first protocol settings. For example, the second network node may remove/discard/drop/ignore the second packet (e.g., packet 2) and/or the fourth packet (e.g., packet 4). For example, the second network node may not remove/discard/drop/ignore the first packet (e.g., packet 1) and/or the third packet (e.g., packet 3) and send the first packet and/or the second packet to a wireless device (e.g., a wireless device 3019).

The first network node (e.g., the UPF 3004) determine to remove/discard/drop/ignore one or more packets. The first network node may not remove/discard/drop/ignore one or more packets associated with the first ADU type, when the network is congested 3020, for example, based on a first QoS configuration associated with the first ADU type. The first network node may remove/discard/drop/ignore one or more packets associated with the second ADU type when the network is congested, for example, based on a second QoS configuration associated with the second ADU type. QoS monitoring 3022 may be performed. The QoS monitoring 3022 may comprise assessing/evaluating/detecting/determining whether congestion exists. For example, the QoS monitoring may comprise determining whether a congestion threshold is met. The QoS monitoring may comprise determining that congestion exists, for example, based on a congestion threshold being met. Buffer management 3024 may be performed, for example, by the first network node (e.g., the UPF 3004), the second network node (e.g., the NG-RAN 3008), and/or a wireless device (e.g., the wireless device 3026) as described herein.

Figure 31:
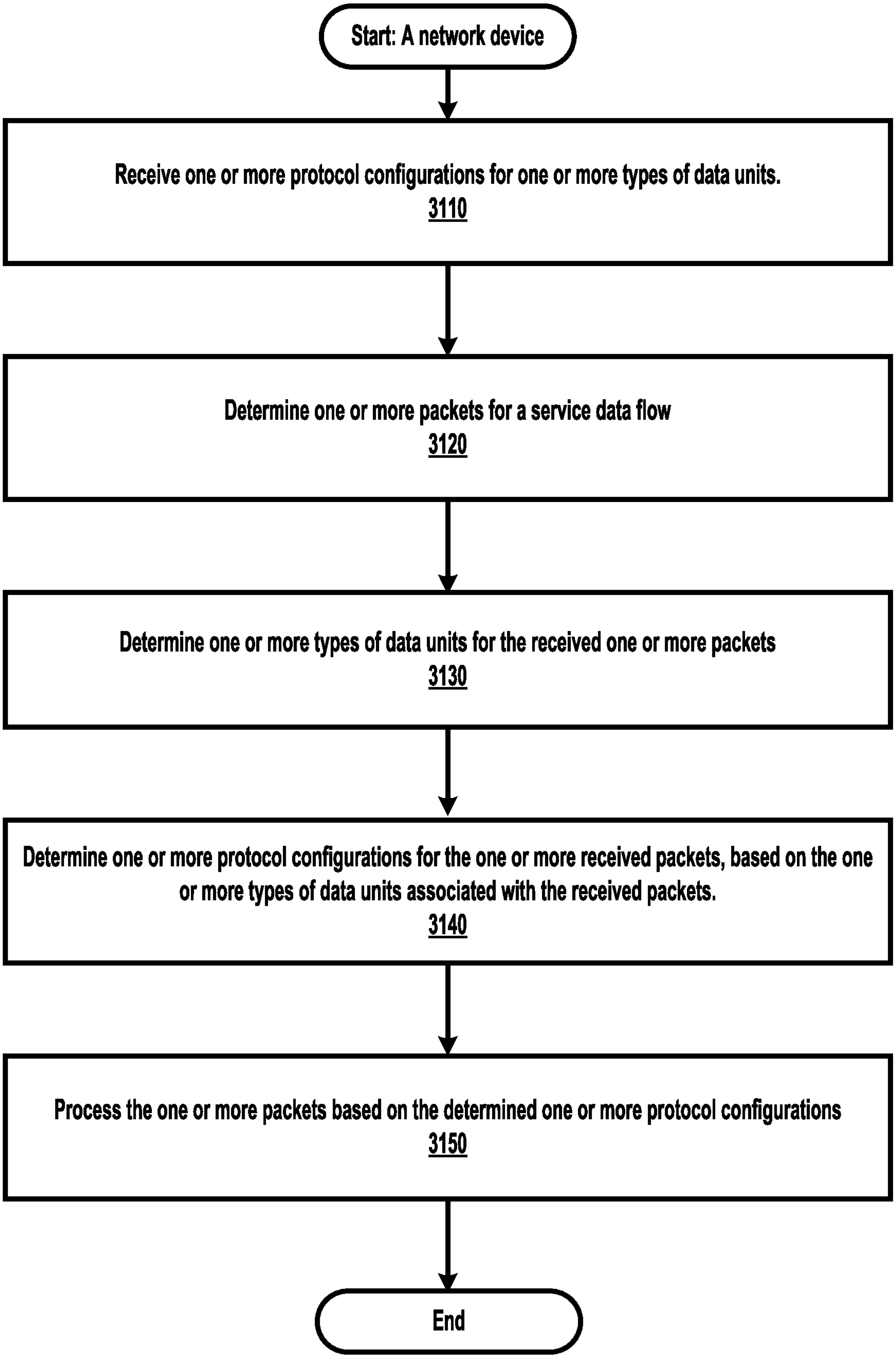
FIG. 31 shows an example method for quality management of wireless communications.

FIG. 31 shows an example method for quality management of wireless communications. The method shown in FIG. 31 may be from the perspective of a network device.

At step 3110 a network device (e.g., a UPF, an NG-RAN, a wireless device) may receive one or more protocol configurations for one or more types of data units. For example, the one or more types of data units may comprise a first type of data unit and a second type of data unit. The one or more protocol configurations may comprise a first protocol configuration and a second protocol configuration. For example, the first protocol configuration may be used for the first type of data unit and/or a second protocol configuration may be used for a second type of data unit. The network device may be configured with information of identifying the one or more types of data units associated with one or more packets. The one or more packets may comprise a service data flow.

At step 3120, one or more packets for a service data flow may (optionally) be determined (e.g., by a network device). A packet for a service data flow may be determined as described herein, for example, by acquiring the packet. For example, the one or more packets may comprise a first packet and/or a second packet.

At step 3130, the network device may determine one or more types of data units associated with the one or more packets. The network device may determine the one or more types of data units associated with the one or more packets, for example, based on the information of identifying the one or more types of data units. For example, the network device may determine that the first packet is associated with the first type of data unit. For example, the network device may determine that the second packet is associated with the second type of data unit.

At step 3140, the network device may determine one or more protocol configurations applicable to the one or more packets. The network device may determine the one or more protocol configurations applicable to the one or more packets, for example, based on the one or more determined types of data units associated with the one or more packets. The network device may determine to use a first protocol configuration for the first packet, for example, based on the first packet being associated with the first type of data unit, the network device may determine to use a second protocol configuration for the second packet, for example, based on the second packet being associated with the second type of data unit.

At step 3150, the network device may use one or more protocol configurations to the one or more packets. The network device may use the one or more protocol configurations to the one or more packets, for example, based on the one or more determined protocol configurations The network device may use the first protocol configuration to the first packet. For example, the network may perform duplicated transmission for the first packet. The network device may use the second protocol configuration to the second packet. For example, the network may not perform duplicated transmission for the second packet.

Figure 32:
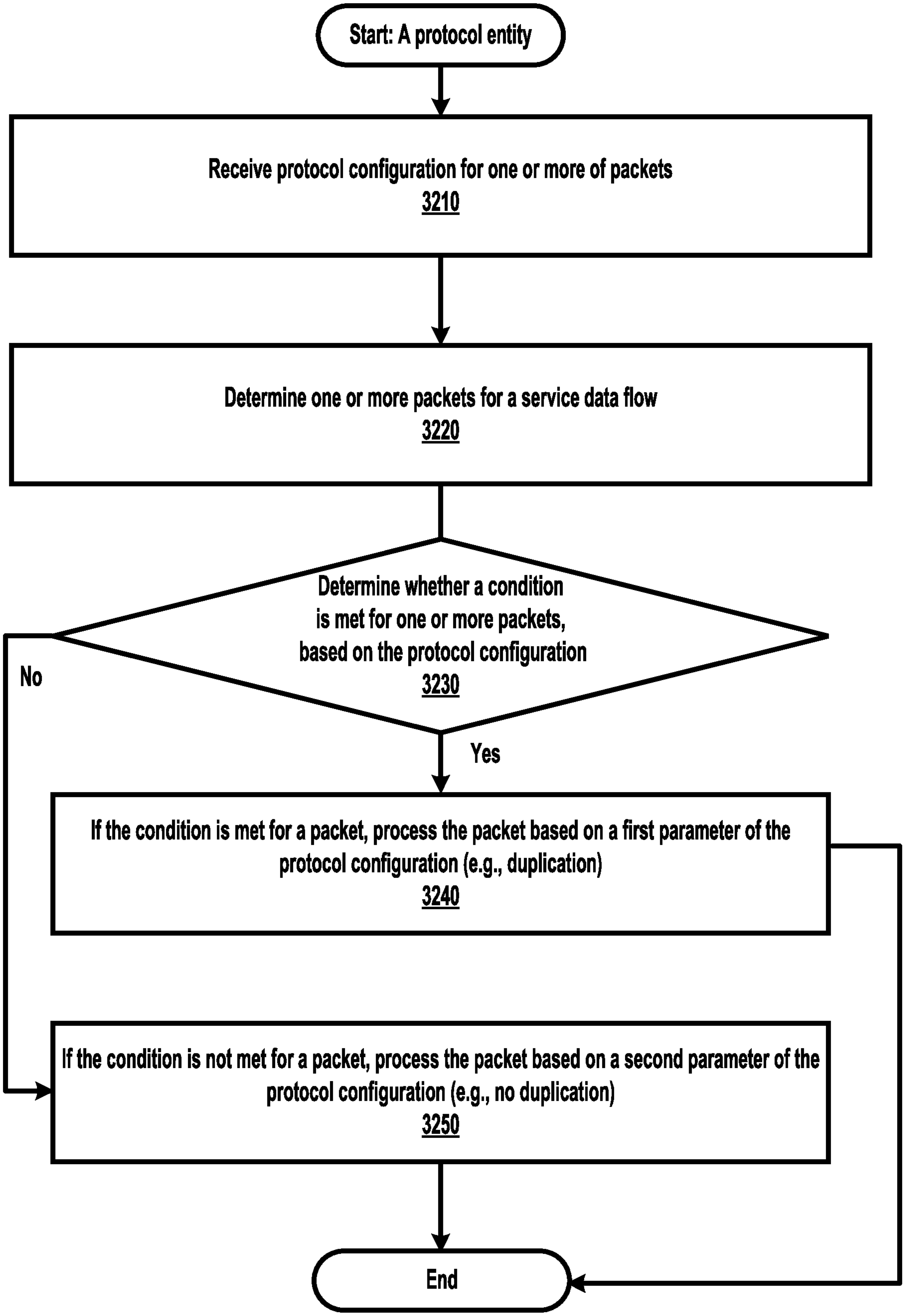
FIG. 32 shows an example method for quality management of wireless communications.
Figure 33:
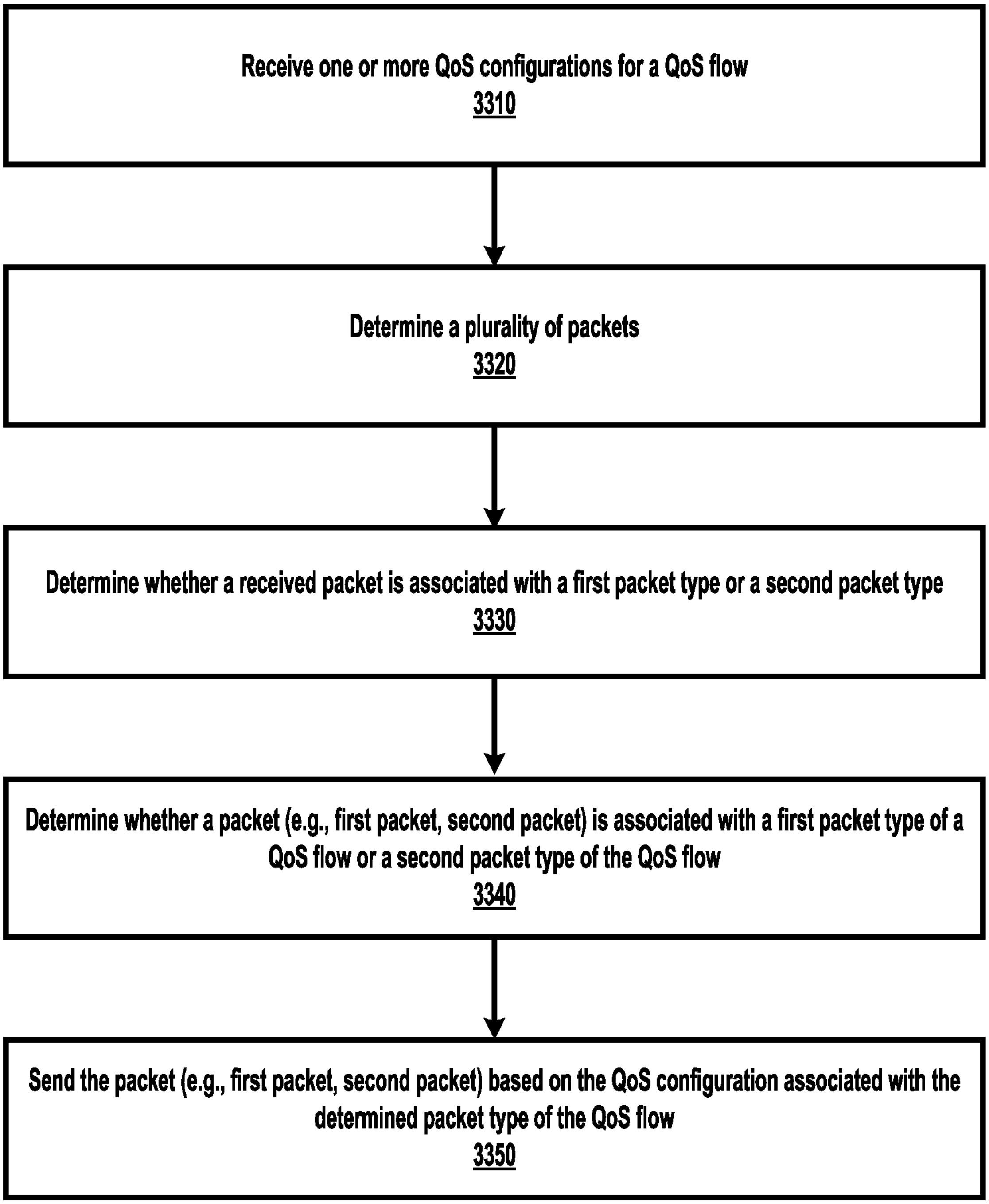
FIG. 33 shows an example method for quality management of wireless communications.
Figure 34:
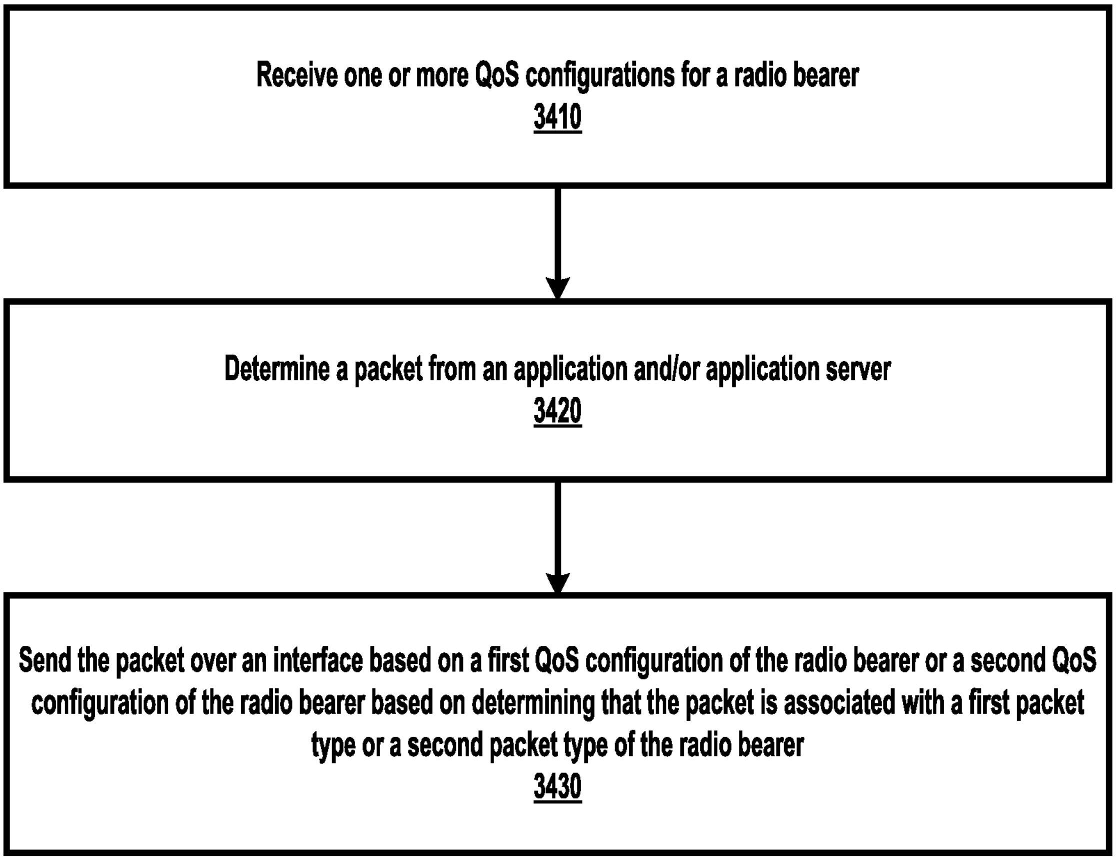
FIG. 34 shows an example method for quality management of wireless communications.
Figure 35:
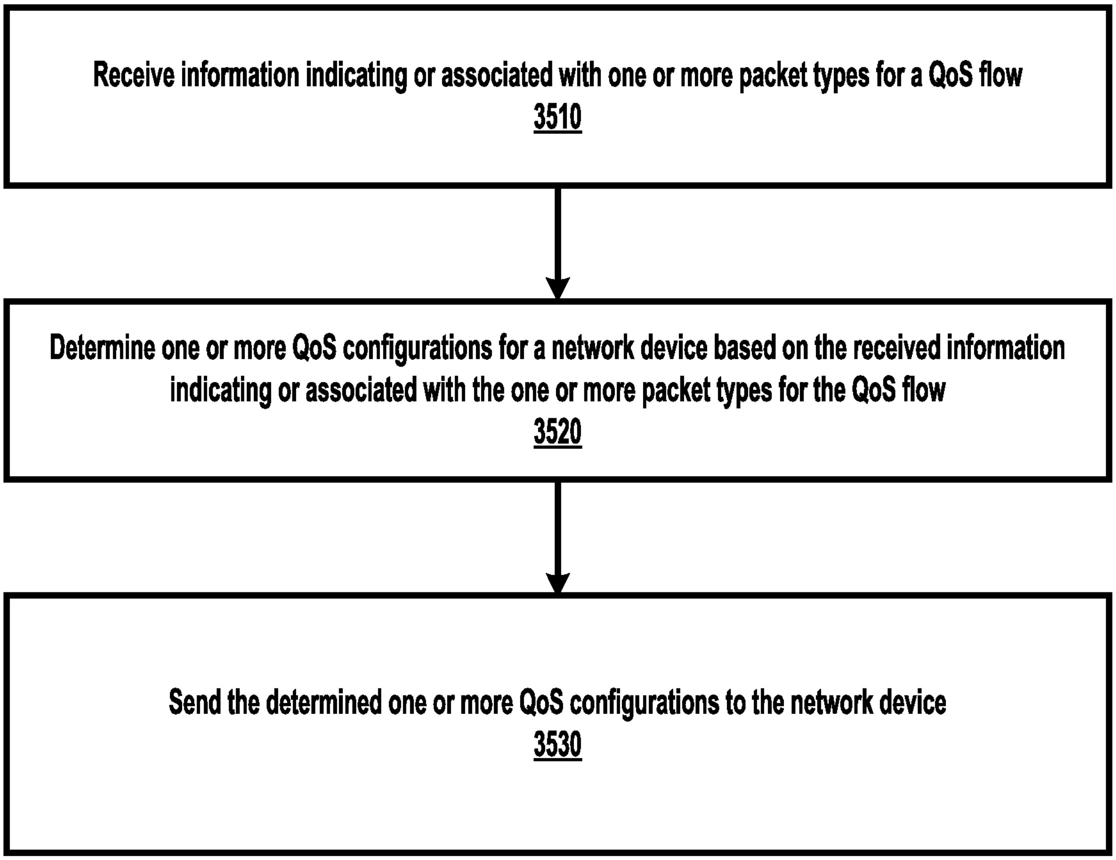
FIG. 35 shows an example method for quality management of wireless communications.
Figure 36:
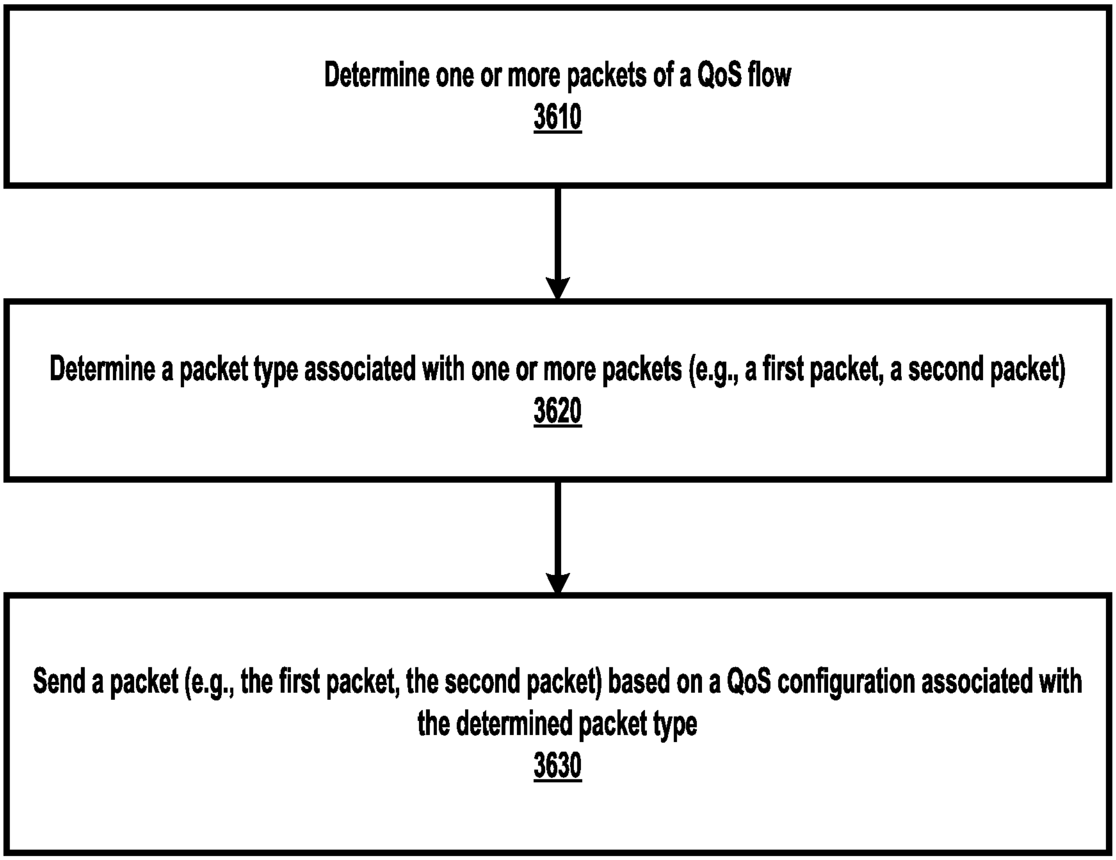
FIG. 36 shows an example method for quality management of wireless communications.
Figure 37:
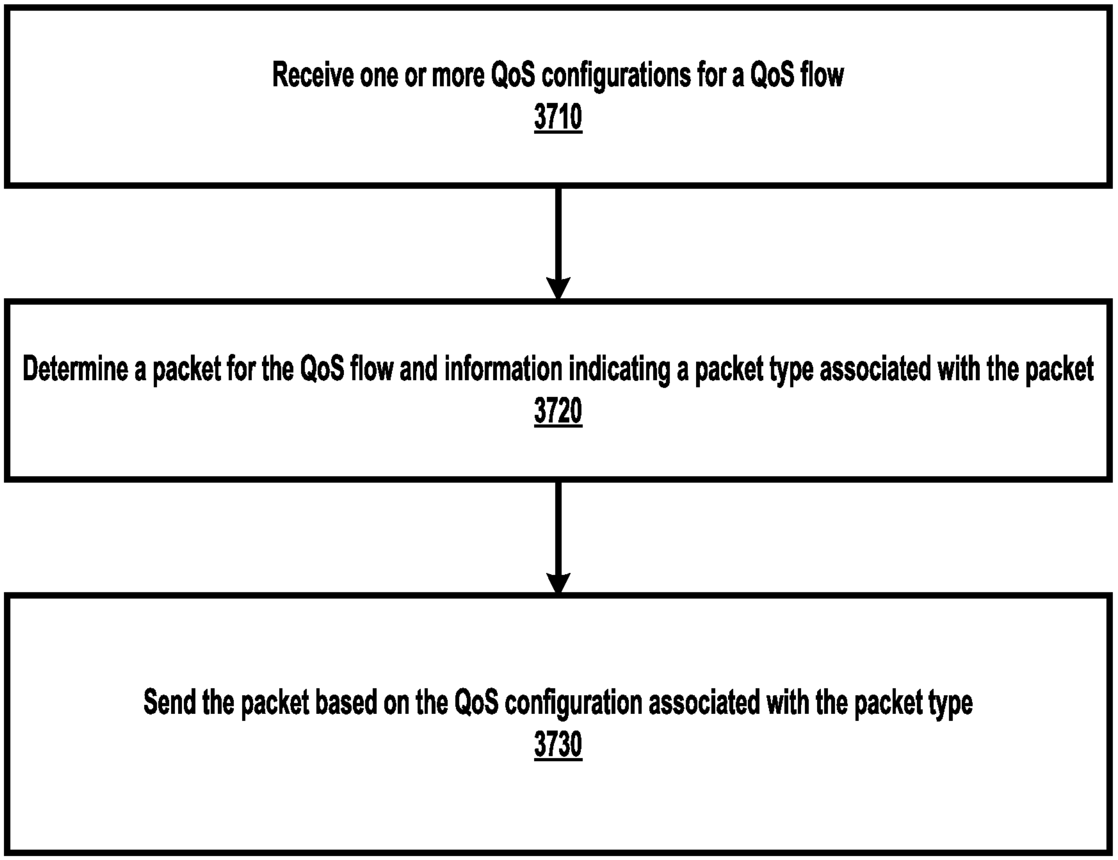
FIG. 37 shows an example method for quality management of wireless communications.
Figure 38:
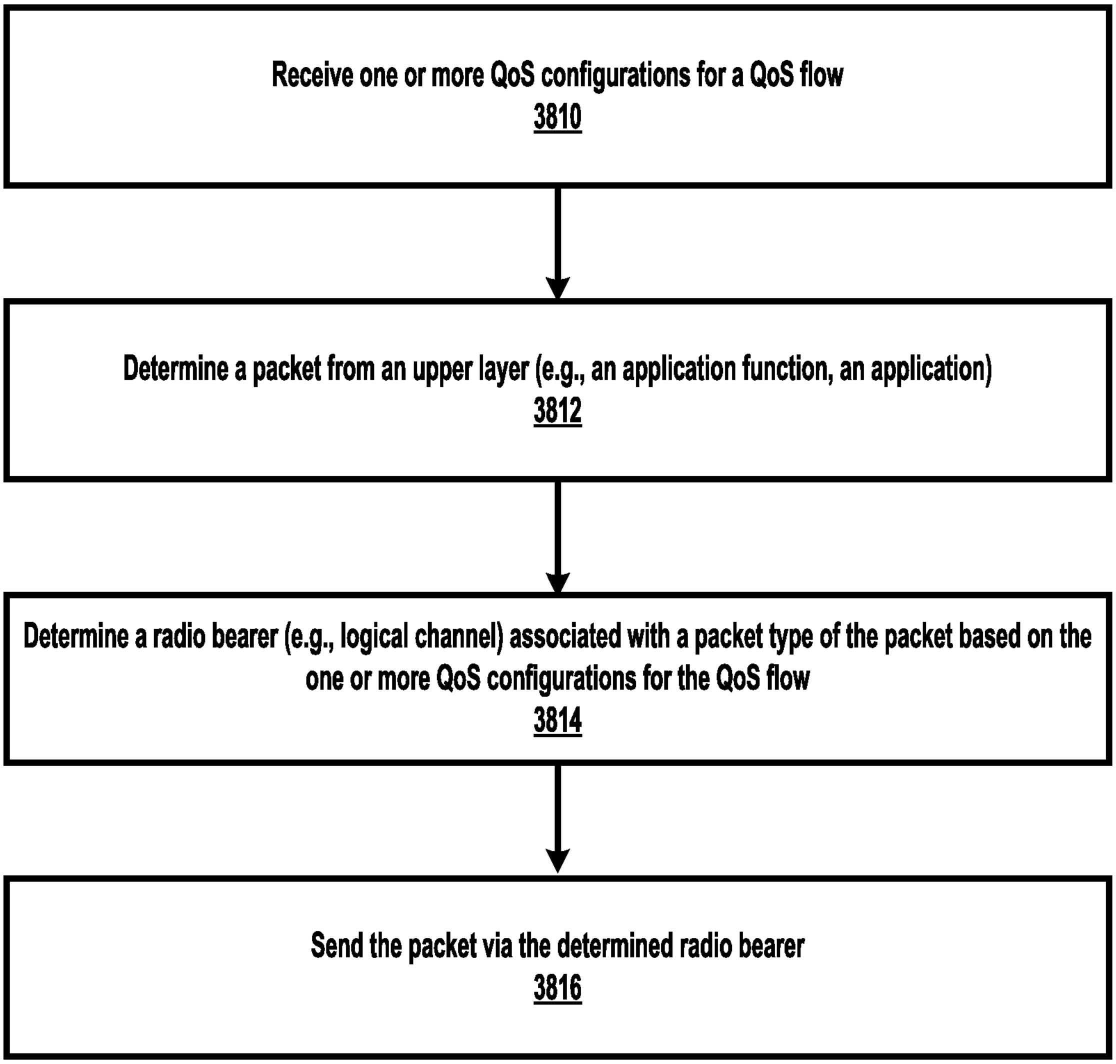
FIG. 38 shows an example method for quality management of wireless communications.
Figure 39:
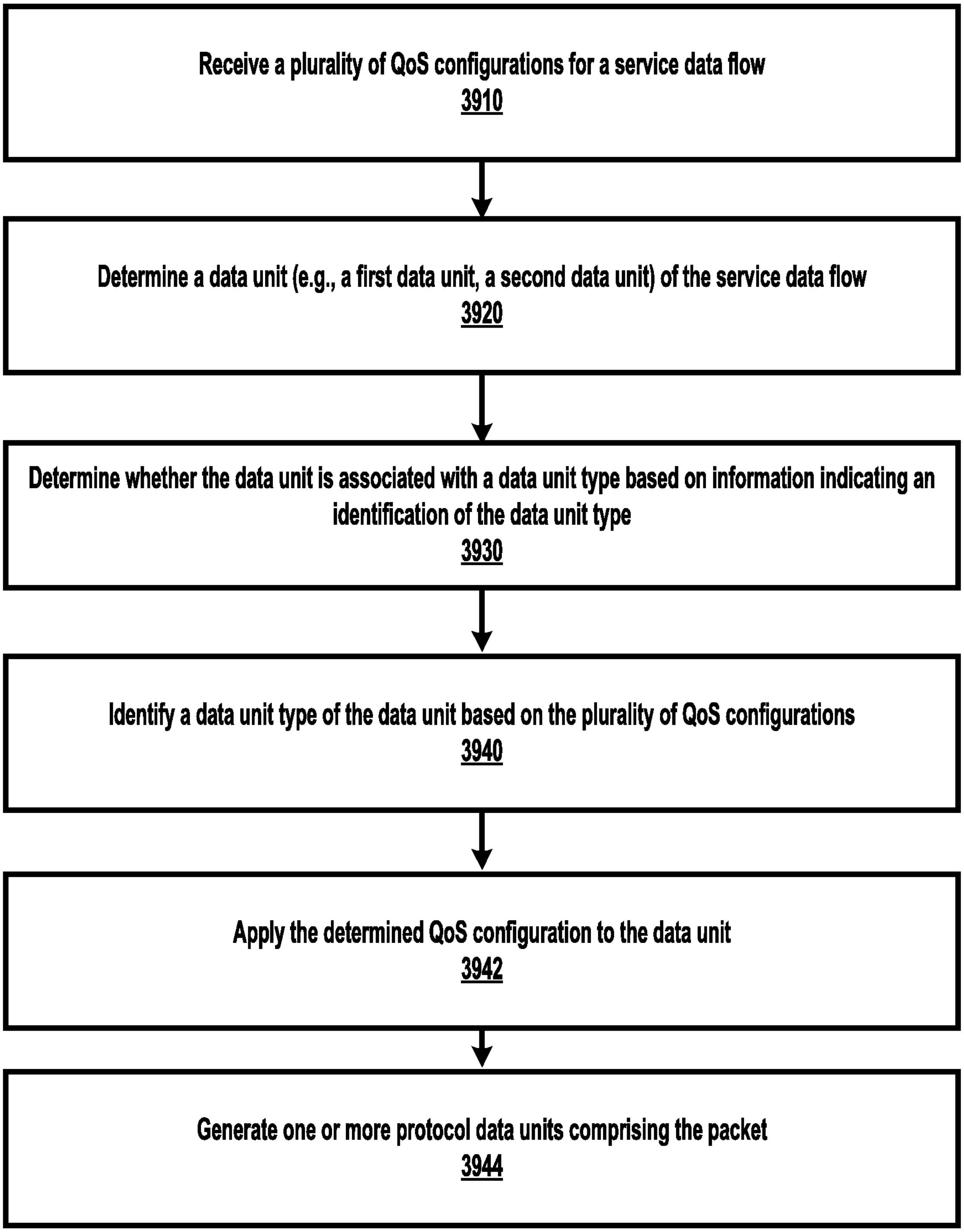
FIG. 39 shows an example method for quality management of wireless communications.
Figure 40:
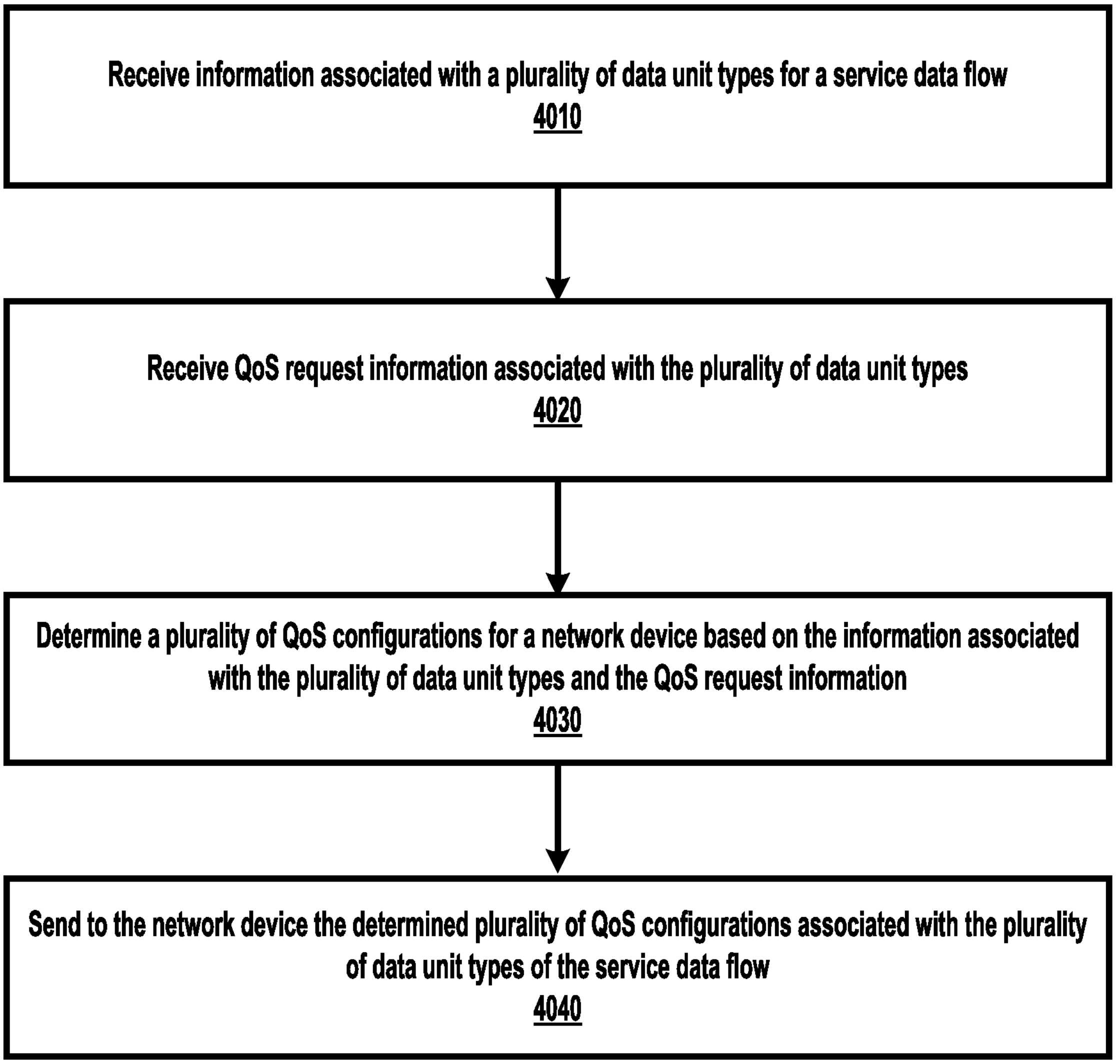
FIG. 40 shows an example method for quality management of wireless communications.
Figure 41:
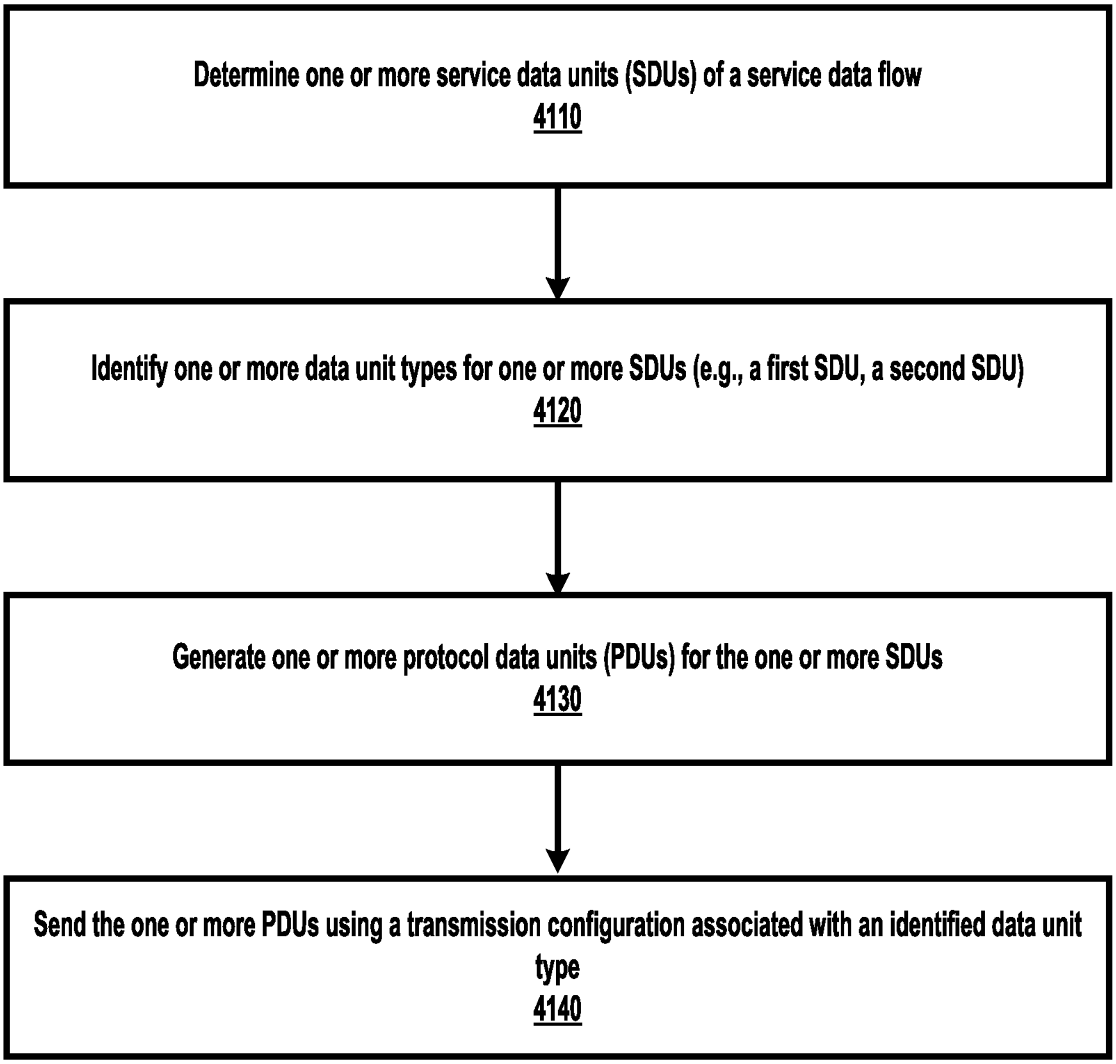
FIG. 41 shows an example method for quality management of wireless communications.
Figure 42:
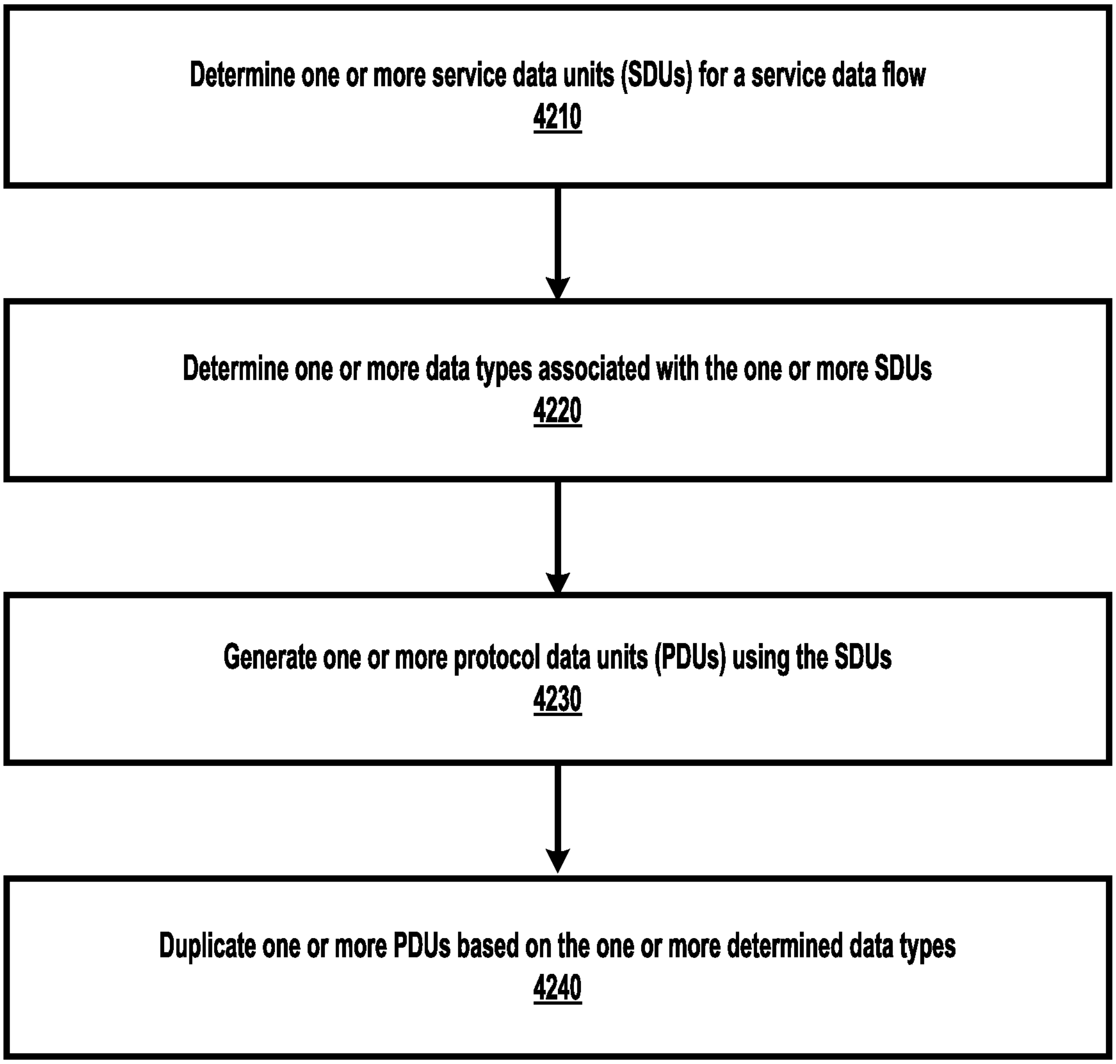
FIG. 42 shows an example method for quality management of wireless communications.
Figure 43:
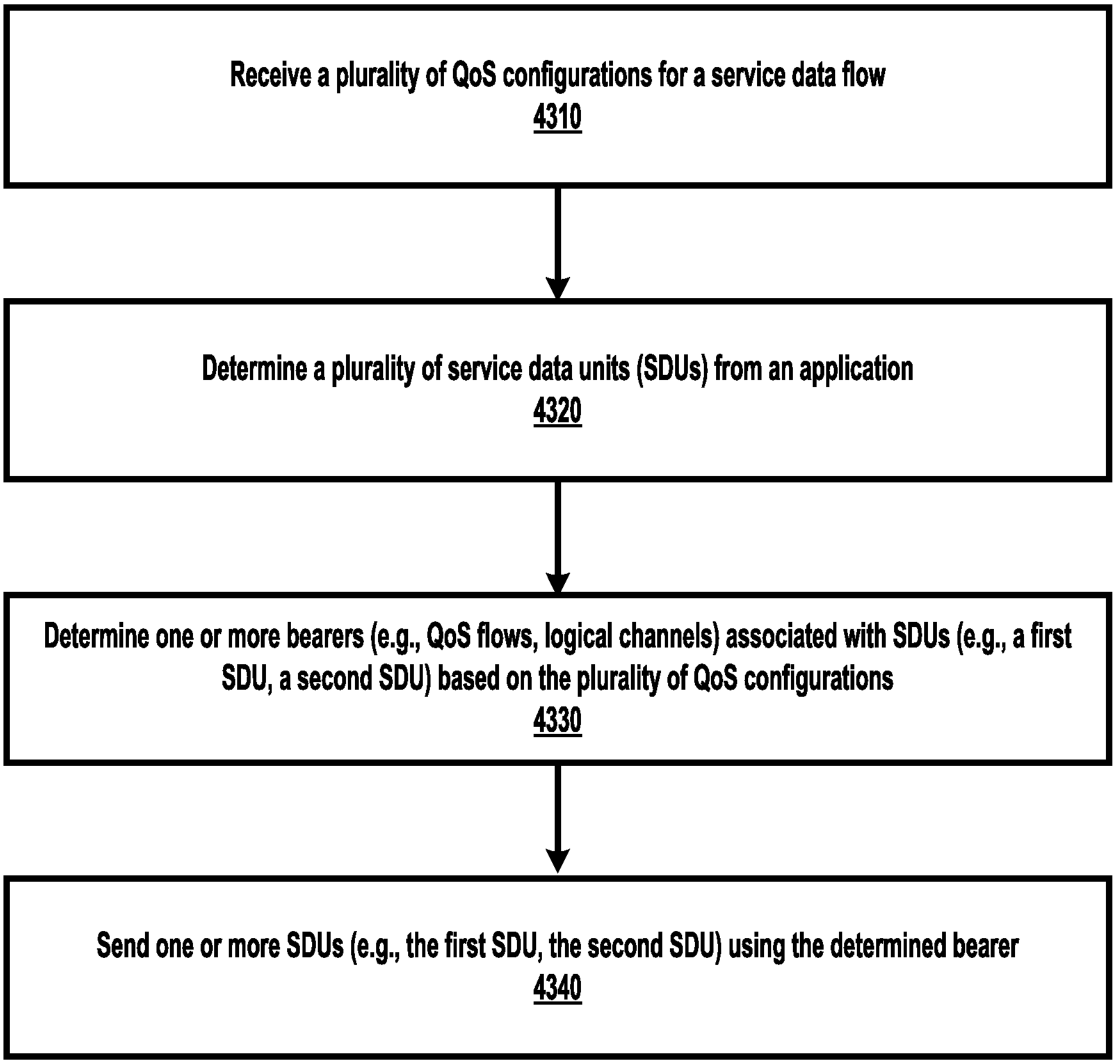
FIG. 43 shows an example method for quality management of wireless communications.

FIG. 32 shows an example method for quality management of wireless communications. The method shown in FIG. 31 may be from the perspective of a protocol entity.

At step 3210, a protocol entity (e.g., a PDCP entity, an SDAP entity, an RLC entity, a MAC entity, a PHY entity) may receive one or more protocol configurations for one or more types of data units. For example, the one or more types of data units may comprise a first type of data unit and a second type of data unit. The one or more protocol configurations may comprise a first protocol configuration and a second protocol configuration. For example, the one or more protocol configuration may comprise a first protocol configuration for the first type of data unit and/or a second protocol configuration for a second type of data unit. The protocol entity may be configured with information indicating one or more conditions for applying one or more protocol configurations for one or more packets.

At step 3220, one or more packets for a service data flow may (optionally) be determined (e.g., by a protocol entity). A packet for a service data flow may (optionally) be determined as described herein, for example, by acquiring the packet. For example, the one or more packets may comprise a first packet and/or a second packet.

At step 3230, the protocol entity may determine whether the one or more conditions are met for the one or more packets, for example, based on the information indication the one or more conditions for applying the one or more protocol configurations. For example, the first condition of the one or more conditions may comprise whether a packet of the one or more packets is associated with the first type of data unit. For example, the second condition of the one or more conditions may comprise whether a packet of the one or more packets is associated with the second type of data unit.

The protocol entity may determine one or more protocol configurations for the one or more packets, for example, based on whether the one or more conditions are met for the one or more packets. At step 3240, the protocol entity may use the first protocol configuration for the first packet, for example, based on the first condition being met for the first packet (e.g., based on a determination that the first condition is met for the first packet). For example, applying the first protocol configuration for the first packet may comprise processing the first packet with duplication. At step 3250, the protocol entity may use the second protocol configuration for the second packet, for example based on the second condition being met for the second packet (e.g., based on a determination that the second condition is not met for the second packet). For example, applying the second protocol configuration for the second packet may comprise processing the second packet without duplication.

FIG. 33, FIG. 34, FIG. 35, FIG. 36, FIG. 37, FIG. 38, FIG. 39, FIG. 40, FIG. 41, FIG. 42, and FIG. 43 show example methods for quality management of wireless communications. The example method shown in FIG. 33 may be from the perspective of a network device (e.g., a user plane function, a wireless device, an NG-RAN, etc.). The example method shown in FIG. 34 may be from the perspective of a network device (e.g., a wireless device, an NG-RAN). The example method shown in FIG. 35 may be from the perspective of a network device (e.g., an SMF). The example method shown in FIG. 36 may be from the perspective of a protocol entity (e.g., a PDCP entity, an RLC entity, an SDAP entity). The example method shown in FIG. 37 may be from the perspective of a protocol entity. The example method shown in FIG. 38 may be from the perspective of a network device (e.g., a wireless device). The example method shown in FIG. 39 may be from the perspective of a network device (e.g., a wireless device, an NG-RAN, a UPF). The example method shown in FIG. 40 may be from the perspective of a network device (e.g., an SMF). The example method shown in FIG. 41 may be from the perspective of a protocol entity (e.g., a PDCP entity, an). The example method shown in FIG. 42 may be from the perspective of a protocol entity (e.g., a PDCP entity, an RLC entity), The example method shown in FIG. 43 may be from the perspective of a network device (e.g., a UPF, a wireless device, an NG-RAN). The example methods shown in FIGS. 33-43 may be from other example perspectives.

At step 3310, one or more QoS configurations for a QoS flow may be received, for example, by a network device (e.g., a user plane function, a wireless device, an NG-RAN, etc.). For example, a network device may receive the one or more QoS configurations from a second network device (e.g., a session management function, an application function, an NG-RAN, a policy control function, a network exposure function, etc.). The QoS configurations may comprise a first QoS configuration for a first packet type of the QoS flow and a second QoS configuration for a second packet type of the QoS flow. For example, one or more packets of a service data flow may comprise the QoS flow. The service flow may map to the QoS flow. The QoS flow may be between a first host (e.g., a wireless device, an application, an application server) and a second host (e.g., an application, an application server, a UE). The QoS flow may be identified with a source address and/or a destination address. The one or more packets of the service data flow may comprise at least one of one or more first packets of the first packet type and/or one or more second packets of the second packet type. For example, the one or more first packets of the service data flow may comprise a first sub-QoS flow and/or a first sub-service data flow. For example, the one or more second packets of the service data flow may comprise a second sub-QoS flow and/or a second sub-service data flow. For example, a QoS configuration may comprise at least one of: information indicating a packet error rate, information indicating a packet delay budget, information indicating a data rate, information indicating a configuration of an access stratum layer, information indicating an identification of one or more packet types, information indicating an identification of the first packet type, information indicating an identification of the second packet type, and/or information indicating one or more priorities for the one or more packet types.

The first QoS configuration may be used for one or more packets of the first packet type. The first QoS configuration may be used for one or more packets of the first sub-QoS flow and/or the first sub-service data flow. For example, the first QoS configuration may comprise at least one of: information indicating a packet error rate, information indicating a packet delay budget, information indicating a data rate, information indicating a configuration of an access stratum layer, information indicating an identification of one or more packet types, information indicating an identification of the first packet type, and/or information indicating the priority of the first packet type (e.g., a higher priority).

The second QoS configuration may be used for one or more packets of the second packet type. The second QoS configuration may be used for one or more packets of the second sub-QoS flow and/or the second sub-service data flow. For example, the second QoS configuration may comprise at least one of: information indicating a packet error rate, information indicating a packet delay budget, information indicating a data rate, information indicating a configuration of an access stratum layer, information indicating an identification of one or more packet types, information indicating an identification of the second packet type, and/or information indicating a the priority of the second packet type (e.g., lower priority). For example, the information indicating a configuration of an access stratum layer may comprise at least one of: information indicating a configuration of a packet data convergence protocol entity, information indicating a configuration of a radio link control entity, information indicating a configuration of a medium access control entity, information indicating a configuration of a service data adaptation protocol entity, information indicating an identification of one or more packet types, information indicating a maximum number of retransmissions, information indicating a timer value for retransmission, information indicating a timer value for remove/discard/drop/ignore, information indicating a timer value for reordering, information indicating a HARQ parameter, information indicating a transmit power, information indicating a priority, information indicating a logical channel, information indicating a radio bearer, and/or information indicating duplication.

The information indicating an identification of one or more packet types and/or the information indicating an identification of the first packet type and/or the information indicating an identification of the second packet type may comprise information of one or more fields of one or more packets. At step, 3320, a plurality of packets may (optionally) be determined (e.g., by a network device). A plurality of packets may (optionally) be determined as described herein, for example, by acquiring the plurality of packets. One or more packet types associated with one or more packets may be determined (e.g., by the network device), for example, based on the one or more fields of one or more packets. At step 3330, whether a received packet is associated with the first packet type or a second packet type may be determined (e.g., by a network device), for example, based on the one or more fields of one or more packets. For example, the one or more fields of one or more packets may comprise at least one of: one or more fields of a packet, one or more fields of an application data unit (ADU), one or more fields of an IP packet, one or more fields of an RTP packet, one or more fields of a UDP packet, one or more fields of a TCP packet, one or more fields of an HTTP packet, one or more fields of an NAL container, a timestamp field, and/or a DSCP field.

One or more packets may be received (e.g., by a network device) from an upper layer (e.g., an application, an application server). The one or more packets may comprise a first packet and/or a second packet. The one or more first packets may comprise the first packet. The one or more second packets may comprise the second packet.

At step 3340, whether the first packet is associated with the first packet type of a QoS flow or whether the first packet is associated with the second packet type of the QoS flow may be determined (e.g., by a network device). For example, a network device may determine whether the first packet is the first packet type, for example, based on information of identifying one or more packet types of one or more QoS configurations and/or based on information indicating an identification of the first packet type. The network device may determine whether the first packet is the second packet type, for example, based on information indicating an identification of one or more packet types of the one or more QoS configurations and/or based on information indicating an identification of the second packet type. The network device may identify that the one or more fields of the first packet matches the information indicating an identification of the first packet type of a first QoS configuration, for example, based on the information indicating an identification of the first packet type. The network device may determine that the first packet is associated with the first packet type, for example, based on the identification. The network device may identify that the one or more fields of the second packet matches the information indicating an identification of the second packet type of a second QoS configuration, for example, based on the information indicating an identification of the second packet type. The network device may determine that the second packet is associated with the second packet type, for example, based on the identification. At least one of the first packet type and/or the second packet type may be associated with at least one of: a type of a multimedia frame, a priority of a packet, a type of an application data unit, a type of protocol used for a packet.

At step 3340, whether the second packet is associated with the first packet type of a QoS flow or whether the first packet is associated with the second packet type of the QoS flow may be determined (e.g., by a network device). For example, a network device may determine whether the second packet is the first packet type, for example, based on information indicating an identification of one or more packet types of one or more QoS configurations and/or based on information indicating an identification of the first packet type. The network device may determine whether the second packet is the second packet type, for example, based on information indicating an identification of one or more packet types of the one or more QoS configurations and/or based on information of identifying the second packet type.

At step 3350, the first packet may be sent based on the QoS configuration associated with the determined packet type of the QoS flow (e.g., by a network device). For example, the network device may send the first packet, for example, based on a determination that the first packet is the first packet type and based on the first QoS configuration. The network device may send the first packet by duplication, for example, based on the first QoS configuration. The network device may send the first packet over a first logical channel, for example, based on the first QoS configuration.

At step 3350 the second packet may be sent based on the QoS configuration associated with the determined packet type of the QoS flow (e.g., by the network device). For example, the network device may send the second packet, for example, based on a determination that the second packet is the second packet type and based on the second QoS configuration. The network device may send the second packet without duplication, for example, based on the second QoS configuration. The network device may send the second packet over a second logical channel, for example, based on the second QoS configuration.

The QoS configuration may further comprise a third QoS configuration. The third QoS configuration may be used for one or more packets of both the first packet type and the second packet type. The network device may use the third QoS configuration for one or more packets of both the first packet type and the second packet type, for example, if one or more resources for the first QoS configuration and/or the second QoS configuration are unavailable (e.g., due to a lack of one or more network resources). The network device may use the third QoS configuration for one or more packets of both the first packet type and the second packet type, for example, if the first QoS configuration is not unavailable for the first network node and/or the second QoS configuration is not unavailable for the first network node.

At step 3410 one or more QoS configurations for a radio bearer may be received, for example, by a network device (e.g., a wireless device, an NG-RAN). The one or more QoS configurations may comprise a first QoS configuration for a first packet type for the radio bearer and a second QoS configuration for a second packet type for the radio bearer. At step 3420, a first packet from an application and/or an application server may (optionally) be determined. A packet from an application server may (optionally) be determined as described herein, for example, by acquiring the packet from the application and/or application server. At step 3430, first packet may be sent over a Uu interface (UMTS air interface) (e.g., by a network device). For example, a network device may send the first packet based on the first QoS configuration, for example, if the network device determines that the first packet is associated with the first packet type of the radio bearer. The network device may send the first packet based on the second QoS configuration, for example, if the network device determines that the first packet is associated with the second packet type of the radio bearer.

At step 3510, information indicating or associated with one or more packet types for a QoS flow may be received, for example, by second network device (e.g., an SMF) from a third network device (e.g., a PCF, an NEF, a UDM). The information indicating or associated with the one or more packet types may comprise, for example, information indicating or associated with a first packet type for the QoS flow and/or information indicating or associated with a second packet type for the QoS flow. At step 3520, one or more QoS configurations for a first network device (e.g., a UPF, an NG-RAN, a wireless device) may be determined (e.g., by a second network device), for example, based on the information indicating or associated with one or more packet types. The one or more QoS configurations may comprise a first QoS configuration for the first packet type and/or a second QoS configuration for the second packet type. At step 3530, the determined one or more QoS configurations associated with the one or more packet types to the first network device (e.g., by second network device).

At step 3610, one or more packets for a QoS flow may (optionally) be determined, for example, by a protocol entity (e.g., a PDCP entity, an RLC entity, an SDAP entity). A packet for a QoS flow may (optionally) be determined as described herein, for example, by acquiring the packet from a second protocol entity (e.g., an SDAP entity, a PDCP entity, an upper layer). The one or more packets may comprise at least one of a first packet for the QoS flow and/or a second packet for the QoS flow. At step 3620, at least one of a first packet type associated with the first packet and/or a second packet type associated with the second packet may be determined (e.g., by a protocol entity). At step 3630, at least one of the first packet based on a first QoS configuration associated with the first packet type and/or the second packet based on a second QoS configuration associated with the second packet type may be sent (e.g., by the protocol entity).

At step 3710, one or more QoS configurations for a QoS flow may be received (e.g., by a protocol entity). The one or more QoS configurations may comprise a first QoS configuration for a first packet type of the QoS flow and/or a second QoS configuration for a second packet type of the QoS flow. At step 3720, a first packet for the QoS flow and information indicating the first packet type associated with the first packet may be determined (e.g., by a protocol entity). The first packet may (optionally) be determined as described herein, for example, by acquiring the first packet. At step 3730, the first packet may be sent (e.g., by a protocol entity), for example, based on the first QoS configuration associated with the first packet type.

At step 3810, one or more QoS configurations for a QoS flow may be received, for example, by a first network device (e.g., a wireless device) from a fourth network device (e.g., an NG-RAN). The one or more QoS configurations may comprise at least a first radio bearer and/or a second radio bearer. At step 3812, a first packet from an upper layer (e.g., application function, an application) may (optionally) be determined (e.g., by a first network device). The first packet may (optionally) be determined as described herein, for example, by acquiring the first packet. At step 3814, at least one of a first radio bearer (e.g., a first logical channel) associated with a first packet type or a second radio bearer (e.g., a second logical channel) associated with a second packet type may be determined for the first packet (e.g., by a first network device), for example, based on the one or more QoS configurations for the QoS flow. At step 2816, the first packet may be sent via the determined radio bearer (e.g., by a first network device).

At step 3910, a plurality of QoS configurations for a service data flow may be received, for example, by a network device (e.g., a wireless device, an NG-RAN, a UPF). For example, a network device may receive the plurality of QoS configuration for the service data flow from a second network device (e.g., a session management function, an application function, an NG-RAN, a policy control function, a network exposure function, etc.). The service data flow may comprise a plurality of data unit types. The plurality of data unit types may comprise at least one of a first data unit type and/or a second data unit type.

At step 3920, a one or more data units of the service data flow may (optionally) be determined (e.g., by a network device). A data unit may (optionally) be determined as described herein, for example, by acquiring the data unit. For example, a network device may determine a first data unit and a second data unit of the service data flow. The service data flow may be associated with a first host (e.g., a wireless device, an application, an application server) and a second host (e.g., an application server, a wireless device, an application). For example, the first data unit and the second data unit may be exchanged between the first host and/or the second host. For example, the service data flow may be identified with using a source address and/or a destination address. The service data flow may comprise a first sub-service data flow and/or a second sub-service data flow. The first sub-service data flow may comprise one or more data units of the first data unit type. The second sub-service data flow may comprise one or more data units of the second data unit type. The plurality of data unit types may be associated with at least one of: a type of a multimedia frame associated with the data unit, a priority of the data unit, a type of an application data unit associated with the data unit, a protocol used for the data unit, and/or a type of the data unit.

The plurality of QoS configurations may comprise a first QoS configuration and/or a second QoS configuration. The plurality of QoS configurations may be associated with the plurality of data unit types. The first QoS configuration may be associated with the first data unit type. The second QoS configuration may be associated with the second data unit type. The first QoS configuration may be used for a data unit of the first data unit type. The second QoS configuration may be used for a data unit of the second data unit type. For example, the plurality of QoS configurations and/or the first QoS configuration and/or the second QoS configuration may comprise at least one of: information indicating a packet error rate, information indicating a packet delay budget, information indicating a data rate, information indicating a configuration of an access stratum layer, information indicating an identification of one or more data unit types, information indicating an identification of the first data unit type, information indicating an identification of identifying the second data unit type, and/or information indicating a priority for the one or more data unit types.

The first QoS configuration may be used for one or more data units of the first data unit type. The first QoS configuration may be used for one or more data units of the first sub-QoS flow and/or the first sub-service data flow. For example, the first QoS configuration may comprise at least one of: information indicating a packet error rate, information indicating a packet delay budget, information indicating a data rate, information indicating a configuration of an access stratum layer, information indicating an identification of one or more data unit types, information indicating an identification of the first data unit type, and/or information indicating a priority of the first data unit type (e.g., a higher priority).

The second QoS configuration may be used for one or more data unit s of the second data unit type. The second QoS configuration may be used for one or more data units of the second sub-QoS flow and/or the second sub-service data flow. For example, the second QoS configuration may comprise at least one of: information indicating a packet error rate, information indicating a packet delay budget, information indicating a data rate, information indicating a configuration of an access stratum layer, information indicating an identification of one or more data unit types, information indicating an identification of the second data unit type, and/or information indicating a priority of the second data unit type (e.g., a lower priority)

The information indicating a configuration of an access stratum layer may comprise at least one of: information indicating a configuration of a packet data convergence protocol entity, information indicating a configuration of a radio link control entity, information indicating a configuration of a medium access control entity, information indicating a configuration of service data adaptation protocol entity, information indicating an identification of one or more packet types, a maximum number of retransmissions, a timer value for retransmission, a timer value for remove/discard/drop/ignore, a timer value for reordering, a HARQ parameter, a transmit power, a priority, indication of a logical channel, indication of a radio bearer, and/or indication of duplication.

The information indicating an identification of the plurality of data unit types and/or the information indicating an identification of the first data unit type and/or the information indicating an identification of the second data unit type may comprise information of one or more fields of the one or more data units. The network device may determine whether the data unit is associated with a first data unit type and/or may determine whether the data unit is associated with a second data unit type, for example, based on identifying the one or more fields of a data unit. The one or more fields may comprise at least one of: one or more fields of an application data unit (ADU), one or more fields of an IP packet, one or more fields of an RTP packet, one or more fields of a UDP packet, one or more fields of a TCP packet, one or more fields of a HTTP packet, one or more fields of an NAL container, a timestamp field, and/or a DSCP field.

At step 3930, whether the first data unit is associated with the first data unit type may be determined (e.g., by a network device), for example, based on the information indicating an identification of the first data unit type. For example, a network device may determine whether the first data unit is associated with the first data unit type, for example, based on one or more fields indicated by the information indicating an identification of the first data unit type. The network device may determine that the first data unit is associated with the first data unit type, for example, based on the one or more values of the first packet for the one or more fields indicated by the information indicating an identification of the first data unit type. The network device may determine that the first data unit is associated with the first data unit type, for example, if the one or more values of the first packet for the one or more fields are set to specific value.

At step 3940, a data unit type of the first data unit may be identified (e.g., by a network device), for example, based on the plurality of QoS configurations. For example, a network device may determine that the first data unit is associated with the first data unit type. The network device may identify a data unit type of the second data unit, for example, based on the plurality of QoS configurations. For example, the network device may determine that the second data unit is associated with the second data unit type.

The network device may determine the first QoS configuration of the plurality QoS configurations, for example, based on the identified first data unit type. The network device may determine the second QoS configuration of the plurality QoS configurations, for example, based on the identified second data unit type.

At step 3942, the determined first QoS configuration to the first data units may be applied (e.g., by a network device). For example, a network device may apply the determined second QoS configuration to the second data units. The network device may send the first data unit with duplicated transmission, for example, based on the first QoS configuration. The network device may send the second data unit without duplicated transmission, for example, based on the second QoS configuration. The network device may send the first data unit over the first logical channel, for example, based on the first QoS configuration. The network device may send the second data unit over the second logical channel, for example, based on the second QoS configuration.

At step 3944, one or more protocol data units comprising the one or more packets may be generated (e.g., by a network device). For example, the one or more protocol data units may comprise at least one of the following: one or more GTP-U containers, one or more SDAP PDUs, one or more PDCP PDUs, one or more RLC PDUs, and/or one or more MAC PDUs.

At step 4010, information associated with a plurality of data unit types for a service data flow may be received, for example, by a second network device (e.g., an SMF) from a third network device (e.g., a PCF, an NEF, a UDM). At step 4020, QoS request information associated with the plurality of data unit types may be received, for example, by a second network device from a third network device. At step 4030, a plurality of QoS configurations for a first network device (e.g., a UPF, an NG-RAN, a wireless device) may be determined (e.g., by a second network device), for example, based on the information associated with the plurality of data unit types and the QoS request information. At step 4040, the determined plurality of QoS configurations associated with the plurality of data unit types of the service data flow may be sent, for example, by a second network device to the first network device.

At step 4110, one or more service data units (SDUs) of a service data flow may (optionally) be determined, for example, by a first protocol entity (e.g., a PDCP entity, an RLC entity). An SDU of a service data flow may (optionally) be determined (e.g., by a first protocol entity) as described herein, for example, by acquiring the SDU from a second protocol entity (e.g., an SDAP/PDCP entity). The one or more SDUs may comprise at least one of a first SDU and/or a second SDU. At step 4120, at least one of a first data unit type associated with the first SDU or a second data unit type associated with the second SDU may be identified (e.g., by a first protocol entity). At step 4130, one or more first protocol data units (PDUs) for the first SDU may be generated (e.g., by a first protocol entity). At step 4140, the one or more first PDUs may be sent using a first transmission configuration associated with the first data unit type (e.g., by a first protocol entity).

At step 4210, one or more service data units (SDUs) for a service data flow may (optionally) be determined, for example, by a first protocol entity (e.g., a PDCP entity, an RLC entity). A service data unit may (optionally) be determined as described herein, for example, by acquiring the SDU from a second protocol entity (e.g., an SDAP entity, a PDCP entity). At step 4220, one or more data unit types associated with the one or more SDUs may be determined (e.g., by a first protocol entity). At step 4230, one or more protocol data units (PDUs) may be generated using the one or more SDUs (e.g., by a first protocol entity). At step 4240, the one or more protocol data units may be duplicated (e.g., by a first protocol entity), for example, based on the one or more determined data unit types.

At step 4310, a plurality of QoS configurations for a service data flow may be received, for example, by a first network device (e.g., a UPF, a wireless device, an NG-RAN) from a second network device (e.g., an SMF). At step 4320, a plurality of service data units (SDUs) from an application may (optionally) be determined (e.g., by a first network device). An SDU may (optionally) be determined as described herein, for example, by acquiring the SDU from an application. The plurality of SDUs may comprise at least a first SDU and/or a second SDU. At step 4330, at least a first bearer (e.g., a first QoS flow, a first logical channel) associated with the first SDU or a second bearer (e.g., a second QoS flow, a second logical channel) associated with the second SDU may be determined (e.g., by a first network device), for example, based on the plurality of QoS configurations. At step 4340, at least one of the first SDU may be sent using the first bearer and/or the second SDU using the second bearer (e.g., by a first network device).

A computing device (e.g., one or more wireless devices, one or more network devices, and/or one or more application servers) may perform a method comprising multiple operations. A quality of service (QoS) configuration for a data flow may be received. The data flow may comprise one or more first packets associated with a first application data unit (ADU) type. The data flow may comprise one or more second packets associated with a second ADU type. A plurality of packets may be received. The plurality of packets may be sent based on the QoS configuration. The sending may comprise sending a first packet of the plurality of packets with first information that indicates the first packet is associated with the first ADU type. The sending may comprise sending a second packet of the plurality of packets with second information that indicates the second packet is associated with the second ADU type. The computing device may comprise one or more processors and memory storing instructions that, when executed by the one or more processors, cause the computing device to perform the described method, additional operations, and/or include additional elements. A system may comprise the computing device configured to perform the described method, additional operations, and/or include additional elements; one or more other computing devices (e.g., one or more wireless devices, one or more network devices, and/or one or more application servers) configured to communicate with the computing device; and one or more core network devices configured to communicate with the computing device and/or the one or more other computing devices. A computer-readable medium may store instructions that, when executed, cause performance of the described method, additional operations, and/or include the additional elements.

A wireless device may perform a method comprising multiple operations. The wireless device may receive quality of service (QoS) configurations of a QoS flow. The QoS configurations comprise a first QoS configuration for first packets associated with a first application data unit (ADU) type. The QoS configurations may comprise a second QoS configuration for second packets associated with a second ADU type. The wireless device may receive a packet. The wireless device may send the packet using the first QoS configuration based on the packet being associated with the first ADU type. The wireless device may send the packet using the second QoS configuration based on the packet being associated with the second ADU type. The QoS configurations may comprise at least one of: information of packet error rate; information of packet delay budget; information of data rate; information of configuration of access stratum layer; or information of identifying one or more ADU types. The information of configuration of access stratum layer comprises at least one of: configuration of packet data convergence protocol (PDCP) entity; configuration of radio link control (RLC) entity; configuration of medium access control (MAC) entity; configuration of service data adaptation protocol (SDAP) entity; and information of identifying one or more ADU types. The QoS configurations of the QoS flow may comprise a third QoS configuration for third packets. The first QoS configuration may comprise at least one of: information of packet error rate for first packets; information of packet delay budget for first packets; information of data rate for first packets; information of configuration of access stratum layer for first packets; or information of identifying the first packets associated with the first ADU type. The second QoS configuration may comprise at least one of: information of packet error rate for second packets; information of packet delay budget for second packets; information of data rate for second packets; information of configuration of access stratum layer for second packets; or information of identifying the second packets associated with the second ADU type. The information of identifying one or more ADU types may comprise information of one or more fields of at least one of the first packets and the second packets. The one or more fields may comprise at least one of one or more fields of a packet; one or more fields of an application data unit (ADU); one or more fields of an IP packet; one or more fields of an RTP packet; one or more fields of a UDP packet; one or more fields of a TCP packet; one or more fields of an HTTP packet; one or more fields of an NAL container; a timestamp field; or a DSCP field. The packet may be determined to be associated with the first ADU type, based on that one or more fields of the packet match the information of identifying the first packets associated with the first ADU type. The packet may be determined to be associated with the second ADU type, based on that one or more fields of the packet match the information of identifying the second packets associated with the second ADU type. At least one of the first QoS configuration or the second QoS configuration may indicate that the first packets has a higher priority than the second packets. The wireless device may receive the QoS configurations for the QoS flow from a network device. The network device may comprise at least one of: a user plane function; an NG-RAN; a session management function; an application function; a policy control function; or a network exposure function. The first packets and the second packets may be delivered for the QoS flow between a first host and a second host. The first host may comprise the wireless device. The second host may comprises at least one of: an application; or an application server. The information of configuration of access stratum layer may comprises at least one of: maximum number of retransmissions; time interval for retransmissions; time duration for discard; time duration for reordering; hybrid automatic request (HARQ) parameter; transmit power; priority; information of a logical channel; information of a radio bearer; or information of duplication. The QoS flow may be identified with a source address and a destination address. An ADU type may be associated with at least one of: different types of multimedia frames; different priorities of different ADUs; or different values for a field of different ADUs. Based on the first QoS configuration, the wireless device may send the packet by duplication. Based on the second QoS configuration, the wireless device sends the packet without duplication. The third packets may not be associated with the first ADU type and the third packets may not be associated with the second ADU type. The wireless device may send the third packets based on the third QoS configuration. The packet may comprise at least a portion of an ADU of the first ADU type when the packet is associated with the first ADU type. The packet may comprise at least a portion of an ADU of the second ADU type when the packet is associated with the second ADU type. The wireless device may comprise one or more processors and memory storing instructions that, when executed by the one or more processors, cause the wireless device to perform the described method, additional operations, and/or include additional elements. A system may comprise the wireless device configured to perform the described method, additional operations, and/or include additional elements; one or more computing devices (e.g., one or more other wireless devices, one or more network devices, and/or one or more application servers) configured to communicate with the wireless device; and one or more core network devices configured to communicate with the wireless device and/or the one or more computing devices. A computer-readable medium may store instructions that, when executed, cause performance of the described method, additional operations, and/or include the additional elements.

A network device may perform a method comprising multiple operations. The network device may receive QoS configurations for a radio bearer. The QoS configurations comprise a first QoS configuration for a first packet type for the radio bearer. The QoS configurations comprise a second QoS configuration for a second packet type for the radio bearer. The network device may receive a first packet. The network device may send the first packet, based on the first QoS configuration, in response to determining the first packet is associated with the first packet type of the radio bearer. The network device may send the first packet, based on the second QoS configuration, in response to determining the first packet is associated with the second packet type of the radio bearer. The network device may comprise one or more processors and memory storing instructions that, when executed by the one or more processors, cause the network device to perform the described method, additional operations, and/or include additional elements. A system may comprise the network device configured to perform the described method, additional operations, and/or include additional elements; one or more computing devices (e.g., one or more wireless devices, one or more other network devices, and/or one or more application servers) configured to communicate with the network device; and one or more core network devices configured to communicate with the network device and/or the one or more computing devices. A computer-readable medium may store instructions that, when executed, cause performance of the described method, additional operations, and/or include the additional elements.

One or more network devices (e.g., a first network device, a second network device, a third network device) may perform a method comprising multiple operations. The second network device may receive information of one or more packet types for a QoS flow. The second network device may comprise an SMF. The second network device may receive the information of one or more packet types for a QoS flow from the third network device. The third network device may comprise a PCF, an NEF, or a UDM. The information of one or more packet types for a QoS flow may comprise information of a first packet type for the QoS flow. The information of one or more packet types for a QoS flow may comprise information of a second packet type for the QoS flow. The second network device may determine, based on the information of one or more packet types, QoS configurations for a first network device. The first network device may comprise a UPF, an NG-RAN, or a wireless device. The QoS configurations determined for a first network device may comprise a first QoS configuration for the first packet type. The QoS configurations determined for a first network device may comprise a second QoS configuration for the second packet type. The first network device may send, to the second network device, the determined one or more QoS configurations associated with the one or more packet types. A network device of the one or more network devices may comprise one or more processors and memory storing instructions that, when executed by the one or more processors, cause the network device to perform the described method, additional operations, and/or include additional elements. A system may comprise the network device configured to perform the described method, additional operations, and/or include additional elements; one or more computing devices (e.g., one or more wireless devices, one or more other network devices, and/or one or more application servers) configured to communicate with the network device; and one or more core network devices configured to communicate with the network device and/or the one or more computing devices. A computer-readable medium may store instructions that, when executed, cause performance of the described method, additional operations, and/or include the additional elements.

A protocol entity may perform a method comprising multiple operations. The protocol entity may receive one or more packets for a QoS flow. The protocol entity may comprise a PDCP and/or an RLC. The protocol entity may receive the one or more packet from a second protocol entity. The second protocol entity may comprise an SDAP and/or a PDCP. The one or more packets may comprise a first packet for the QoS flow. The one or more packets may comprise a second packet for the QoS flow. The protocol entity may determine at least one of: first packet type associated with the first packet; or a second packet type associated with the second packet. The protocol entity may send at least one of: the first packet based on a first QoS configuration for the first packet type; or the second packet based on a second QoS configuration for the second packet type. A protocol entity may comprise one or more processors and memory storing instructions that, when executed by the one or more processors, cause the protocol entity to perform the described method, additional operations, and/or include additional elements. A system may comprise the protocol entity configured to perform the described method, additional operations, and/or include additional elements; one or more computing devices (e.g., one or more wireless devices, one or more network devices, and/or one or more application servers) configured to communicate with the protocol entity; and one or more core network devices configured to communicate with the protocol entity and/or the one or more computing devices. A computer-readable medium may store instructions that, when executed, cause performance of the described method, additional operations, and/or include the additional elements.

A protocol entity may perform a method comprising multiple operations. The protocol entity may receive QoS configurations for a QoS flow. The QoS configurations may comprise a first QoS configuration for a first packet type of the QoS flow. The QoS configurations may comprise a second QoS configuration for a second packet type of the QoS flow. The protocol entity may receive a first packet for the QoS flow with information indicating the first packet type. The protocol entity may send the first packet based on the first QoS configuration. A protocol entity may comprise one or more processors and memory storing instructions that, when executed by the one or more processors, cause the protocol entity to perform the described method, additional operations, and/or include additional elements. A system may comprise the protocol entity configured to perform the described method, additional operations, and/or include additional elements; one or more computing devices (e.g., one or more wireless devices, one or more network devices, and/or one or more application servers) configured to communicate with the protocol entity; and one or more core network devices configured to communicate with the protocol entity and/or the one or more computing devices. A computer-readable medium may store instructions that, when executed, cause performance of the described method, additional operations, and/or include the additional elements.

A network device may perform a method comprising multiple operations. The network device may receive QoS configurations for a QoS flow. The network device may be a wireless device. The network device may receive the QoS configurations from another network device. The other network device may be an NG-RAN. The QoS configurations may comprise a first radio bearer. The QoS configurations may comprise a second radio bearer. The network device may receive a first packet. The network device may receive the first packet from an AF. The network device may receive the first packet from an application. The network device may determine, based on the QoS configurations for the QoS flow, for the first packet, a first radio bearer associated with a first packet type. The first radio bearer may comprise a first logical channel. The network device may determine, based on the QoS configurations for the QoS flow, for the first packet, a second radio bearer associated with a second packet type. The second radio may comprise a second logical channel. The network device may send the first packet over the determined radio bearer. The network device may comprise one or more processors and memory storing instructions that, when executed by the one or more processors, cause the network device to perform the described method, additional operations, and/or include additional elements. A system may comprise the network device configured to perform the described method, additional operations, and/or include additional elements; one or more computing devices (e.g., one or more wireless devices, one or more other network devices, and/or one or more application servers) configured to communicate with the network device; and one or more core network devices configured to communicate with the network device and/or the one or more computing devices. A computer-readable medium may store instructions that, when executed, cause performance of the described method, additional operations, and/or include the additional elements.

A network device may perform a method comprising multiple operations. The network device may receive a plurality of QoS configurations for a service data flow. The service data flow may comprise a plurality of data unit types. The network device may receive a first data unit of the service data flow. The network device may identify, based on the plurality of QoS configurations, a first data unit type of the first data unit. The network device may determine, based on the identified first data unit type, a first QoS configuration of the plurality QoS configurations. The network device may apply the determined first QoS configuration to the first data units. The network device may receive a second data unit, of a second data unit type, for the service data flow. The network device may determine, based on the second data unit type, the second QoS configuration. The network device may apply a second QoS configuration to the second data unit. The plurality of QoS configurations may comprise at least one of: information of error rate, information of delay, information of data rate, information of configuration of access stratum layer, information of identifying the plurality of data unit types. The access stratum layer may comprise at least one of: packet data convergence protocol entity, radio link control entity, medium access control entity, service data adaptation protocol entity. The plurality of QoS configurations may be associated with the plurality of data unit types. The first QoS configuration may be associated with the first data unit type and the second QoS configuration is associated with the second data unit type. The plurality of data unit types may comprise at least one of the first data unit type and the second data unit type. The plurality of QoS configurations may comprise information of identifying the plurality of data unit types for one or more data units of the service data flow. The information of identifying the plurality of data unit types comprise information of one or more fields of the one or more data units. The one or more fields comprises at least one of: one or more fields of an application data unit (ADU), one or more fields of an IP packet, one or more fields of an RTP packet, one or more fields of a UDP packet, one or more fields of a TCP packet, one or more fields of a HTTP packet, one or more fields of a NAL container, a timestamp field, a DSCP field. The first data unit type may be identified based on that the one or more fields of the first data units are set one or more specific values. The network device may comprise at least one of: a user plane function, a wireless device, an NG-RAN. The network device may receive the plurality of QoS configurations for the service data flow from a second network device. The second network device may comprise at least one of: a session management function, an application function, an NG-RAN, a policy control function, a network exposure function. The first data unit and the second data unit for the service data flow may be delivered between a first host and a second host. The first host may comprise at least one of: a wireless device, an application, an application server. The second host comprises at least one of: a wireless device, an application, an application server. The plurality of QoS configurations may comprise at least the first QoS configuration and a second QoS configuration. The network device may apply the first QoS configuration to the first data unit type. The network device may apply the second QoS configuration to the second data unit type.

Information of configuration of access stratum layer may comprise at least one of: maximum number of retransmissions, timer value for retransmission, timer value for discard, timer value for reordering, HARQ parameter, transmit power, priority, logical channel, duplication. The service data flow may be identified with a source address and a destination address. The network device may generate one or more protocol data units using the first data unit. The plurality of data unit types may be associated with at least one of: a type of a video frame associated with the data unit, a priority of the data unit, a type of an application data unit associated with the data unit, a protocol used for the data unit, a type of the data unit. Based on the first QoS configuration, the network device may apply duplications for the first data units of the first data unit type. Based on the second QoS configuration, the network device does not apply duplications for the second data unit of the second data unit type. The network device may send, to another network device, the one or more protocol data units. The one or more protocol data units may comprise at least one of: one or more GTP-U container, one or more SDAP PDUs, one or more PDCP PDUs, one or more RLC PDUs, one or more MAC PDUs. Based on the first QoS configuration, the network device may use a first logical channel for the first data unit of the first data unit type. Based on the second QoS configuration, the network device may use a second logical channel for the second data unit of the second data unit type. The network device may comprise one or more processors and memory storing instructions that, when executed by the one or more processors, cause the network device to perform the described method, additional operations, and/or include additional elements. A system may comprise the network device configured to perform the described method, additional operations, and/or include additional elements; one or more computing devices (e.g., one or more wireless devices, one or more other network devices, and/or one or more application servers) configured to communicate with the network device; and one or more core network devices configured to communicate with the network device and/or the one or more computing devices. A computer-readable medium may store instructions that, when executed, cause performance of the described method, additional operations, and/or include the additional elements.

One or more network devices (e.g., a first network device, a second network device, and/or a third network device) may perform a method comprising multiple operations. A second network device may receive, from a third network device, information of plurality of data unit types for a service data flow. The second network device may comprise an SMF. The third network device may comprise a PCF, an NEF, or a UDM. The second network device may receive a plurality of QoS request information associated with the plurality of data unit types. The second network device may receive the plurality of QoS request information associated with the plurality of data unit types from the third network device. The second network device may determine, based on the information of plurality of data unit types and the plurality of QoS request information, the plurality of QoS configurations for a first network device, the first network device may comprise a UPF, an NG-RAN, or a wireless device. The second network device may send, to the first network device, the determined plurality of QoS configurations associated with the plurality of data unit types of the service data flow. A network device of the one or more network devices may comprise one or more processors and memory storing instructions that, when executed by the one or more processors, cause the network device to perform the described method, additional operations, and/or include additional elements. A system may comprise the network device configured to perform the described method, additional operations, and/or include additional elements; one or more computing devices (e.g., one or more wireless devices, one or more other network devices, and/or one or more application servers) configured to communicate with the network device; and one or more core network devices configured to communicate with the network device and/or the one or more computing devices. A computer-readable medium may store instructions that, when executed, cause performance of the described method, additional operations, and/or include the additional elements.

A protocol entity may perform a method comprising multiple operations. The protocol entity may receive one or more service data units (SDUs) for a service data flow. The protocol entity may comprise a PDCP or an RLC. The protocol entity may receive the one or more SDUs from a second protocol entity. The second protocol entity may comprise an SDAP or a PDCP. The one or more SDUs may comprise a first SDU. The one or more SDUs may comprise a second SDU. The protocol entity may identify a first data unit type associated with the first SDU. The protocol entity may identify a second data unit type associated with the second SDU. The protocol entity may generate one or more first protocol data units (PDUs) for the first SDU. The protocol entity may send the one or more first PDUs using a first transmission configuration associated with the first data unit type. A protocol entity may comprise one or more processors and memory storing instructions that, when executed by the one or more processors, cause the protocol entity to perform the described method, additional operations, and/or include additional elements. A system may comprise the protocol entity configured to perform the described method, additional operations, and/or include additional elements; one or more computing devices (e.g., one or more wireless devices, one or more network devices, and/or one or more application servers) configured to communicate with the protocol entity; and one or more core network devices configured to communicate with the protocol entity and/or the one or more computing devices. A computer-readable medium may store instructions that, when executed, cause performance of the described method, additional operations, and/or include the additional elements.

A protocol entity may perform a method comprising multiple operations. The protocol entity may receive one or more service data units (SDUs) for a service data flow. The protocol entity may comprise a PDCP or an RLC. The protocol entity may receive the SDUs from a second protocol entity. The protocol entity may determine one or more data unit types associated with the one or more SDUs. The protocol entity may generate one or more protocol data units (PDUs) using the one or more SDUs. The protocol entity may duplicate, based on the one or more determined data unit types, the one or more PDUs. A protocol entity may comprise one or more processors and memory storing instructions that, when executed by the one or more processors, cause the protocol entity to perform the described method, additional operations, and/or include additional elements. A system may comprise the protocol entity configured to perform the described method, additional operations, and/or include additional elements; one or more computing devices (e.g., one or more wireless devices, one or more network devices, and/or one or more application servers) configured to communicate with the protocol entity; and one or more core network devices configured to communicate with the protocol entity and/or the one or more computing devices. A computer-readable medium may store instructions that, when executed, cause performance of the described method, additional operations, and/or include the additional elements.

One or more network devices (e.g., a first network device and/or a second network device) may perform a method comprising multiple operations. A first network device may receive a plurality of QoS configurations for a service data flow. The first network device may comprise a UPF, a wireless device, or an NG-RAN. The first network device may receive the plurality of QoS configurations from a second network device. The second network device may be an SMF. The first network device may receive a plurality of service data units (SDUs). The first network device may receive the plurality of SDUs from an AF. The first network device may receive the plurality of SDUs from an application. The plurality of SDUs may comprise a first SDU. The plurality of SDUs may comprise a second SDU. The first network device may determine, based on the plurality of QoS configurations, a first bearer associated with the first SDU. The first bearer may comprise a first QoS flow. The first bearer may comprise a first logical channel. The first network device may determine, based on the plurality of QoS configurations, a second bearer associated with the second SDU. The second bearer may comprise a second QoS flow. The second bearer may comprise a second logical channel. The first network device may send the first SDU using the first bearer. The first network device may send the second SDU using the second bearer. A network device of the one or more network devices may comprise one or more processors and memory storing instructions that, when executed by the one or more processors, cause the network device to perform the described method, additional operations, and/or include additional elements. A system may comprise the network device configured to perform the described method, additional operations, and/or include additional elements; one or more computing devices (e.g., one or more wireless devices, one or more other network devices, and/or one or more application servers) configured to communicate with the network device; and one or more core network devices configured to communicate with the network device and/or the one or more computing devices. A computer-readable medium may store instructions that, when executed, cause performance of the described method, additional operations, and/or include the additional elements.

A computing device (e.g., a network device) may perform a method comprising multiple operations. A computing device may receive a quality of service (QoS) configuration. The QoS configuration may be associated with a data flow. The computing device may receive a plurality of packets of the data flow. The computing device may send the plurality of packets based on the QoS configuration. The computing device may send, based on the QoS configuration, a first packet of the plurality of packets with first information that indicates the first packet is associated with a first application data unit (ADU) type The computing device may send, based on the QoS configuration, a second packet of the plurality of packets with second information that indicates the second packet is associated with a second ADU type. The first information may indicate that the first packet is associated with at least one of a higher importance or a higher priority than the second packet. The second information may indicate that the first packet is associated with at least one of a higher importance or a higher priority than the second packet. The sending the first packet may comprise sending, based on the QoS configuration, the first packet via a first QoS flow. The sending the second packet may comprise sending, based on the QoS configuration, the second packet via a second QoS flow. The sending the first packet may comprise sending, based on the QoS configuration, the first packet via a first sub-flow of a QoS flow The sending the second packet may comprise sending, based on the QoS configuration, the second packet via a second sub-flow of the QoS flow. The computing device may discard, based on detecting congestion and based on the QoS configuration, at least one packet of the plurality of packets. The computing device may send, based on the QoS configuration, at least one packet of the plurality of packets by duplication. The QoS configuration may indicate at least one of an importance of an ADU type or a priority associated with the ADU type. The computing device may comprise one or more processors and memory storing instructions that, when executed by the one or more processors, cause the computing device to perform the described method, additional operations, and/or include additional elements. A system may comprise the computing device configured to perform the described method, additional operations, and/or include additional elements; one or more other computing devices (e.g., one or more wireless devices, one or more network devices, and/or one or more application servers) configured to communicate with the computing device; and one or more core network devices configured to communicate with the computing device and/or the one or more other computing devices. A computer-readable medium may store instructions that, when executed, cause performance of the described method, additional operations, and/or include the additional elements.

A computing device (e.g., a network device) may perform a method comprising multiple operations. A computing device may receive a quality of service (QoS) configuration associated with a data flow. The computing device may send, based on the QoS configuration, at least one first packet and at least one second packet. The at least one first packet may be associated with a first application data unit (ADU) of the data flow. The at least one second packet may be associated with a second ADU of the data flow. The computing device may send, based on the QoS configuration, the at least one first packet with first information that indicates the at least one first packet is associated with a first packet type. The computing device may send, based on the QoS configuration, the at least one second packet with second information that indicates the at least one second packet is associated with a second packet type. The first information may indicate that the at least one first packet is associated with at least one of a higher importance or a higher priority than the at least one second packet. The second information may indicate that the at least one first packet is associated with at least one of a higher importance or a higher priority than the at least one second packet. The sending the at least one first packet may comprise sending, based on the QoS configuration, a first packet of the at least one first packet via a first QoS flow. The sending the at least one second packet may comprise sending, based on the QoS configuration, a second packet of the at least one second packet via a second QoS flow. The sending the at least one first packet may comprise sending, based on the QoS configuration, a first packet of the at least one first packet via a first sub-flow of a QoS flow. The sending the at least one second packet may comprise sending, based on the QoS configuration, a second packet of the at least one second packet via a second sub-flow of the QoS flow. The computing device may discard, based on detecting congestion and based on the QoS configuration, at least one packet associated with the data flow. The computing device may send, based on the QoS configuration, a first packet of the at least one first packet by duplication. The computing device may send, based on the QoS configuration, a second packet of the at least one second packet by duplication. The computing device may receive at least one of the at least one first packet or the at least one second packet. The computing device may comprise one or more processors and memory storing instructions that, when executed by the one or more processors, cause the computing device to perform the described method, additional operations, and/or include additional elements. A system may comprise the computing device configured to perform the described method, additional operations, and/or include additional elements; one or more other computing devices (e.g., one or more wireless devices, one or more network devices, and/or one or more application servers) configured to communicate with the computing device; and one or more core network devices configured to communicate with the computing device and/or the one or more other computing devices. A computer-readable medium may store instructions that, when executed, cause performance of the described method, additional operations, and/or include the additional elements.

A wireless device may perform a method comprising multiple operations. A wireless device may receive a quality of service (QoS) configuration associated with a data flow. The wireless device may send, based on the QoS configuration, a first packet of the data flow with first information that indicates the first packet is associated with a first application data unit (ADU) type. The wireless device may send, based on the QoS configuration, a second packet of the plurality of packets with second information that indicates the second packet is associated with a second ADU type. The first information may indicate that the first packet is associated with at least one of a higher importance or a higher priority than the second packet. The second information may indicate that the first packet is associated with at least one of a higher importance or a higher priority than the second packet. The wireless device may send, based on the QoS configuration, packets of the data flow via different QoS flows. The wireless device may send, based on the QoS configuration, packets of the data flow via different QoS sub-flows of a QoS flow. The wireless device may discard, based on detecting congestion and based on the QoS configuration, at least one packet of the data flow. The wireless device may send, based on the QoS configuration, at least one packet of the data flow by duplication. The wireless device may receive one or more packets of the data flow. The wireless device may comprise one or more processors and memory storing instructions that, when executed by the one or more processors, cause the wireless device to perform the described method, additional operations, and/or include additional elements. A system may comprise the wireless device configured to perform the described method, additional operations, and/or include additional elements; one or more computing devices (e.g., one or more other wireless devices, one or more network devices, and/or one or more application servers) configured to communicate with the wireless device; and one or more core network devices configured to communicate with the wireless device and/or the one or more computing devices. A computer-readable medium may store instructions that, when executed, cause performance of the described method, additional operations, and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. Various examples may be used, for example, if the one or more criteria are met.

It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, 6G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described herein, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

receiving, by a computing device, a quality of service (QoS) configuration associated with a data flow;

receiving a plurality of packets of the data flow;

determining, based on a first Differentiated Services Code Point (DSCP) value of a first packet of the plurality of packets, that the first packet is associated with a first application data unit (ADU) type;

determining, based on a second DSCP value of a second packet of the plurality of packets, that the second packet is associated with a second ADU type;

sending, based on the QoS configuration, the first packet with first information that indicates the first packet is associated with the first ADU type; and sending, based on the QoS configuration, the second packet with second information that indicates the second packet is associated with the second ADU type.

2. The method of claim 1, wherein at least one of the first information or the second information indicates that the first packet is associated with at least one of a higher importance or a higher priority than the second packet.

3. The method of claim 1, wherein:

the sending the first packet comprises sending, based on the QoS configuration, the first packet via a first QoS flow; and the sending the second packet comprises sending, based on the QoS configuration, the second packet via a second QoS flow.

4. The method of claim 1, wherein:

the sending the first packet comprises sending, based on the QoS configuration, the first packet via a first sub-flow of a QoS flow; and the sending the second packet comprises sending, based on the QoS configuration, the second packet via a second sub-flow of the QoS flow.

5. The method of claim 1, further comprising discarding, based on detecting congestion and based on the QoS configuration, at least one packet of the plurality of packets.

6. The method of claim 1, further comprising sending, based on the QoS configuration, at least one packet of the plurality of packets by duplication.

7. The method of claim 1, wherein the QoS configuration indicates at least one of an importance of an ADU type or a priority associated with the ADU type.

8. A method comprising:

receiving, by a computing device, a quality of service (QoS) configuration associated with a data flow;

sending, based on the QoS configuration, at least one first packet with first information that indicates the at least one first packet is associated with a first packet type, wherein the at least one first packet is associated with a first application data unit (ADU) of the data flow based on a first Differentiated Services Code Point (DSCP) value of the at least one first packet; and sending, based on the QoS configuration, at least one second packet with second information that indicates the at least one second packet is associated with a second packet type, wherein the at least one second packet is associated with a second ADU of the data flow based on a second DSCP value of the at least one second packet.

9. The method of claim 8, wherein at least one of the first information or the second information indicates that the at least one first packet is associated with at least one of a higher importance or a higher priority than the at least one second packet.

10. The method of claim 8, wherein:

the sending the at least one first packet comprises sending, based on the QoS configuration, a first packet of the at least one first packet via a first QoS flow; and the sending the at least one second packet comprises sending, based on the QoS configuration, a second packet of the at least one second packet via a second QoS flow.

11. The method of claim 8, wherein:

the sending the at least one first packet comprises sending, based on the QoS configuration, a first packet of the at least one first packet via a first sub-flow of a QoS flow; and the sending the at least one second packet comprises sending, based on the QoS configuration, a second packet of the at least one second packet via a second sub-flow of the QoS flow.

12. The method of claim 8, further comprising discarding, based on detecting congestion and based on the QoS configuration, at least one packet associated with the data flow.

13. The method of claim 8, further comprising sending, based on the QoS configuration, at least one of:

a first packet of the at least one first packet by duplication; or a second packet of the at least one second packet by duplication.

14. The method of claim 8, further comprising receiving at least one of:

the at least one first packet; or the at least one second packet.

15. A method comprising:

receiving, by a wireless device, a quality of service (QoS) configuration associated with a data flow;

determining, based on a first Differentiated Services Code Point (DSCP) value of a first packet of the data flow, that the first packet is associated with a first application data unit (ADU) type;

determining, based on a second DSCP value of a second packet of the data flow, that the second packet is associated with a second ADU type;

sending, based on the QoS configuration, the first packet of the data flow with first information that indicates the first packet is associated with the first ADU type; and sending, based on the QoS configuration, the second packet of the data flow with second information that indicates the second packet is associated with the second ADU type.

16. The method of claim 15, wherein at least one of the first information or the second information indicates that the first packet is associated with at least one of a higher importance or a higher priority than the second packet.

17. The method of claim 15, further comprising sending, based on the QoS configuration, packets of the data flow via different QoS flows or via different QoS sub-flows of a QoS flow.

18. The method of claim 15, further comprising discarding, based on detecting congestion and based on the QoS configuration, at least one packet of the data flow.

19. The method of claim 15, further comprising sending, based on the QoS configuration, at least one packet of the data flow by duplication.

20. The method of claim 15, further comprising receiving one or more packets of the data flow.

* * * * *